(12) United States Patent
Cutler

(10) Patent No.: US 11,209,979 B2
(45) Date of Patent: Dec. 28, 2021

(54) SYSTEMS AND METHODS FOR INPUT INTERFACES PROMOTING OBFUSCATION OF USER NAVIGATION AND SELECTIONS

(71) Applicant: MICROSOFT TECHNOLOGY LICENSING, LLC, Redmond, WA (US)

(72) Inventor: Ross Garrett Cutler, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/409,765

(22) Filed: May 10, 2019

(65) Prior Publication Data
US 2020/0356260 A1 Nov. 12, 2020

(51) Int. Cl.
G06F 3/048 (2013.01)
G06F 3/0488 (2013.01)
G06F 3/0482 (2013.01)

(52) U.S. Cl.
CPC ........ G06F 3/04886 (2013.01); G06F 3/0482 (2013.01)

(58) Field of Classification Search
CPC ........................... G06F 3/04886; G06F 3/0482
See application file for complete search history.

(56) References Cited

U.S. PATENT DOCUMENTS

| | | |
|---|---|---|
| 6,798,887 B1 | 9/2004 | Andre |
| 6,954,862 B2 | 10/2005 | Serpa |
| 6,954,962 B1 | 10/2005 | Cheng et al. |
| 8,176,324 B1 | 5/2012 | Krishnamurthy |
| 2002/0129269 A1 | 9/2002 | Cheol-shin et al. |
| 2003/0146931 A1 | 8/2003 | Cheol-shin et al. |
| 2004/0030933 A1 | 2/2004 | Park |
| 2005/0246138 A1 | 11/2005 | Park |

(Continued)

FOREIGN PATENT DOCUMENTS

| | | |
|---|---|---|
| EP | 2306362 A1 | 4/2011 |
| EP | 2463798 A1 | 6/2012 |

(Continued)

OTHER PUBLICATIONS

Watanabe, K., Higuchi, F., Inami, M., Igarashi, T., "CursorCamouflage: Multiple Dummy Cursors as A Defense against Shoulder Surfing", In Proceedings of SIGGRAPH Asia Emerging Technologies, Nov. 28, 2012, 2 pages. (Year: 2012).*

(Continued)

Primary Examiner — Claudia Dragoescu
(74) Attorney, Agent, or Firm — NovoTechIP International PLLC

(57) ABSTRACT

Techniques for obfuscating selection of an option during user-input of sensitive information, involving displaying several targets, such as via a virtual keyboard, on a device display, where each target corresponds to one of multiple options. When a first visual indication of a current user target moves to a first target in response to a first user navigation input, an obfuscation system can concurrently or soon thereafter move a second visual indication of a first distractor target to another target. The current user target is thus obfuscated as two different visual indicators move through the targets.

24 Claims, 74 Drawing Sheets

(56) References Cited

U.S. PATENT DOCUMENTS

| | | |
|---|---|---|
| 2005/0251752 A1 | 11/2005 | Tan et al. |
| 2007/0165001 A1 | 7/2007 | Boss et al. |
| 2007/0198847 A1 | 8/2007 | Watari |
| 2007/0259716 A1 | 11/2007 | Mattice et al. |
| 2007/0259717 A1 | 11/2007 | Mattice et al. |
| 2008/0303793 A1 | 12/2008 | Carroll |
| 2008/0320410 A1 | 12/2008 | Whytock et al. |
| 2009/0048020 A1 | 2/2009 | Gruen et al. |
| 2009/0235197 A1 | 9/2009 | Chen et al. |
| 2010/0318807 A1 | 12/2010 | Wang |
| 2010/0324704 A1* | 12/2010 | Murphy ............... H04L 67/22 700/94 |
| 2010/0333198 A1 | 12/2010 | Mikake |
| 2011/0066975 A1 | 3/2011 | Kim |
| 2011/0205160 A1 | 8/2011 | Song et al. |
| 2012/0098743 A1 | 4/2012 | Lai et al. |
| 2012/0210275 A1 | 8/2012 | Park et al. |
| 2012/0242581 A1 | 9/2012 | Laubach et al. |
| 2012/0293439 A1 | 11/2012 | Pahud et al. |
| 2013/0091583 A1* | 4/2013 | Karroumi ........... G06F 3/04886 726/26 |
| 2013/0187858 A1* | 7/2013 | Griffin ................ G06F 3/0237 345/168 |
| 2014/0078063 A1 | 3/2014 | Bathiche et al. |
| 2014/0201832 A1 | 7/2014 | Yi et al. |
| 2014/0201844 A1 | 7/2014 | Buck |
| 2014/0237413 A1 | 8/2014 | Markiewicz et al. |
| 2014/0245205 A1 | 8/2014 | Smith |
| 2014/0315519 A1 | 10/2014 | Nielsen |
| 2014/0317547 A1 | 10/2014 | Bi et al. |
| 2015/0058723 A1 | 2/2015 | Cieplinski et al. |
| 2015/0067602 A1 | 3/2015 | Bernstein et al. |
| 2015/0128091 A1 | 5/2015 | Laubach |
| 2015/0317076 A1 | 11/2015 | Goel et al. |
| 2015/0326560 A1 | 11/2015 | Menezes et al. |
| 2015/0365234 A1 | 12/2015 | Marten |
| 2016/0034179 A1 | 2/2016 | Medina |
| 2016/0162183 A1 | 6/2016 | Jeong |
| 2016/0202881 A1 | 7/2016 | Ahmad et al. |
| 2017/0300675 A1 | 10/2017 | Betz et al. |
| 2017/0302648 A1 | 10/2017 | Ferrydiansyah et al. |
| 2017/0357403 A1 | 12/2017 | Geary et al. |
| 2017/0364261 A1 | 12/2017 | Bennet et al. |
| 2018/0067624 A1 | 3/2018 | Laubach |
| 2018/0084422 A1 | 3/2018 | Mendelovich et al. |
| 2018/0089404 A1 | 3/2018 | Uchida |
| 2018/0096171 A1 | 4/2018 | Kwon et al. |
| 2018/0101850 A1 | 4/2018 | Pisut et al. |
| 2018/0173417 A1 | 6/2018 | Foresti |
| 2018/0181185 A1 | 6/2018 | Graham et al. |
| 2018/0224989 A1 | 8/2018 | Deasy et al. |
| 2018/0225433 A1 | 8/2018 | Saboori et al. |
| 2018/0239882 A1 | 8/2018 | Bean et al. |
| 2018/0288026 A1 | 10/2018 | Callaghan |
| 2019/0068585 A1 | 2/2019 | Zeng et al. |
| 2019/0080066 A1 | 3/2019 | Van Os et al. |
| 2019/0332659 A1 | 10/2019 | Yang et al. |
| 2020/0356185 A1 | 11/2020 | Cutler |
| 2020/0356186 A1 | 11/2020 | Cutler |
| 2020/0356261 A1 | 11/2020 | Cutler |
| 2020/0356262 A1 | 11/2020 | Cutler |
| 2020/0356263 A1 | 11/2020 | Cutler |
| 2020/0356264 A1 | 11/2020 | Cutler |

FOREIGN PATENT DOCUMENTS

| | | |
|---|---|---|
| KR | 20070029472 A | 3/2007 |
| WO | 0199338 A1 | 12/2001 |
| WO | 2004027632 A1 | 4/2004 |
| WO | 2008151114 A1 | 12/2008 |
| WO | 2011157754 A2 | 12/2011 |
| WO | 2013147084 A1 | 10/2013 |
| WO | 2015191575 A1 | 12/2015 |
| WO | 2016010524 A1 | 1/2016 |

OTHER PUBLICATIONS

"Non Final Office Action Issued in U.S. Appl. No. 16/409,770", dated Apr. 16, 2020, 6 Pages.

"Non Final Office Action Issued in U.S. Appl. No. 16/409,773", dated May 1, 2020, 16 Pages.

"Non Final Office Action Issued in U.S. Appl. No. 16/409,766", dated Feb. 20, 2020, 15 Pages.

"Final Office Action Issued in U.S. Appl. No. 16/409,766", dated Sep. 3, 2020, 18 Pages.

"Non Final Office Action Issued in U.S. Appl. No. 16/409,769", dated Sep. 9, 2020, 27 Pages.

"Final Office Action Issued in U.S. Appl. No. 16/409,773", dated Aug. 31, 2020, 14 Pages.

Watanabe, et al., "CursorCamoflage: Multiple Dummy Cursors as a Defense against Shoulder Surfing", In Proceedings of SIGGRAPH Asia Emerging Technologies, Nov. 28, 2012, 2 Pages.

"International Search Report and Written Opinion Issued in PCT Application No. PCT/US20/026804", dated Jul. 9, 2020, 14 Pages.

"International Search Report and Written Opinion Issued in PCT Application No. PCT/US20/026806", dated Jul. 8, 2020, 13 Pages.

"International Search Report and Written Opinion Issued in PCT Application No. PCT/US20/027879", dated Jul. 9, 2020, 12 Pages.

"International Search Report and Written Opinion Issued in PCT Application No. PCT/US20/028022", dated Jul. 10, 2020, 10 Pages.

"International Search Report and Written Opinion Issued in PCT Application No. PCT/US20/027880", dated Jul. 17, 2020, 15 Pages.

De Luca, et al., "Using fake cursors to secure on-screen password entry", In Proceedings of the SIGCHI Conference on Human Factors in Computing Systems, Apr. 27, 2013, pp. 2399-2402.

"International Search Report and Written Opinion Issued in PCT Application No. PCT/US20/027878", dated Jul. 21, 2020, 12 Pages.

"Non Final Office Action Issued in U.S. Appl. No. 16/409,763", dated Oct. 20, 2020, 29 Pages.

"Notice of Allowance Issued in U.S. Appl. No. 16/409,770", dated Oct. 15, 2020, 13 Pages.

"Non Final Office Action Issued in U.S. Appl. No. 16/409,775", dated Oct. 22, 2020, 34 Pages.

"Advisory Action Issued in U.S. Appl. No. 16/409,769", dated Jun. 15, 2021, 5 Pages.

"Non Final Office Action Issued in U.S. Appl. No. 16/409,766", dated Dec. 23, 2020, 13 Pages.

"Final Office Action Issued in U.S. Appl. No. 16/409,769", dated Mar. 17, 2021, 19 Pages.

"Notice of Allowance Issued in U.S. Appl. No. 16/409,763", dated May 12, 2021, 7 Pages.

"Non Final Office Action Issued in U.S. Appl. No. 16/409,773", dated Jan. 11, 2021, 14 Pages.

"Non-Final Office Action Issued in U.S. Appl. No. 16/409,769", dated Aug. 26, 2021, 20 Pages.

* cited by examiner

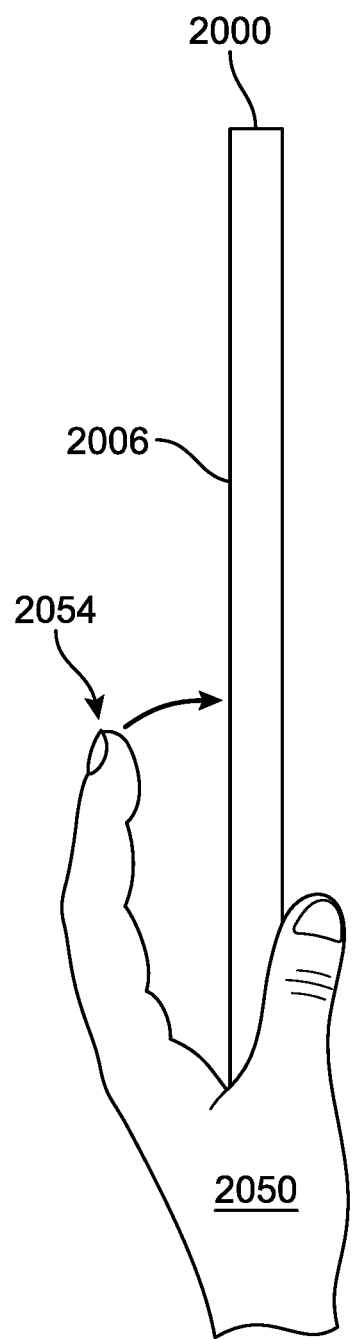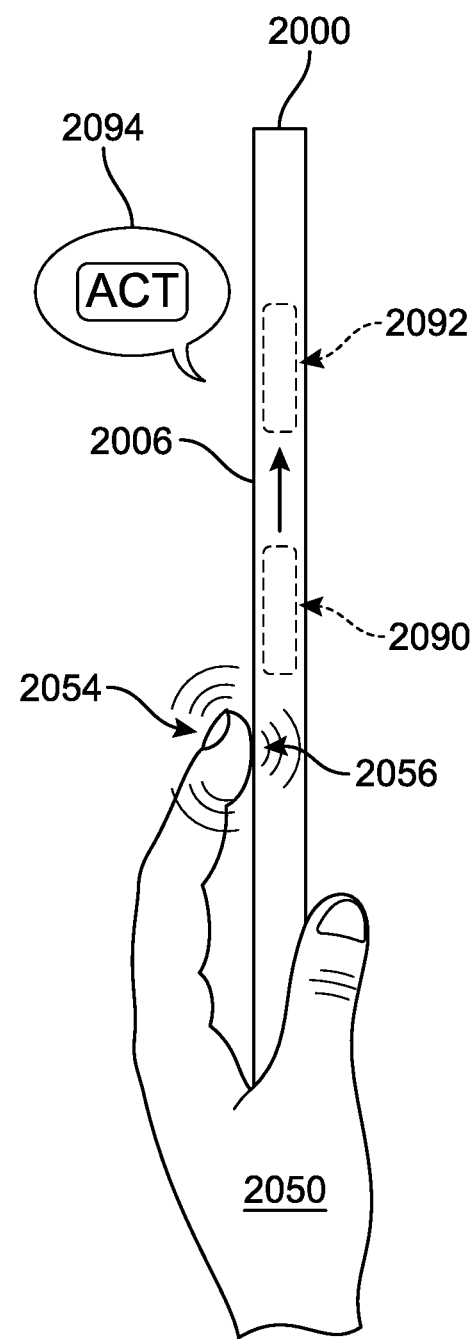
FIG. 20G  FIG. 20H

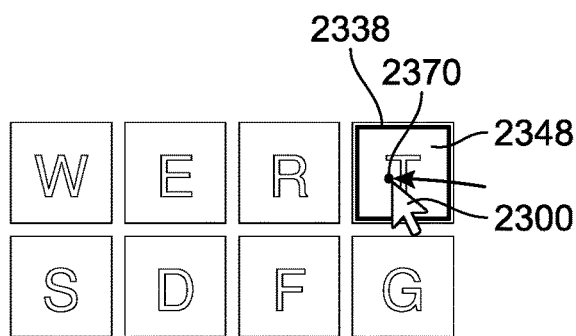
FIG. 23C T5
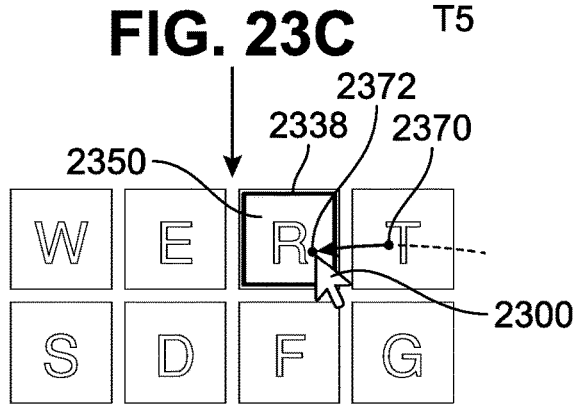
FIG. 23D T6
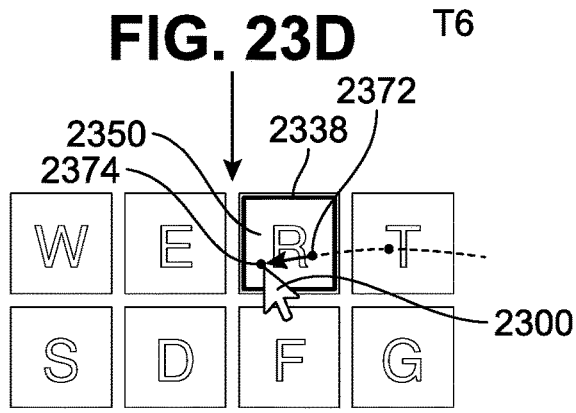
FIG. 23E T7
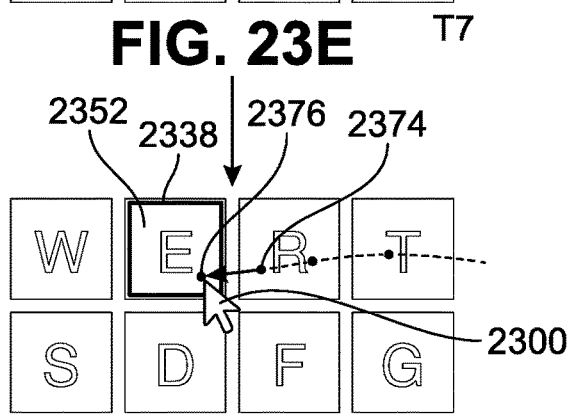
FIG. 23F T8
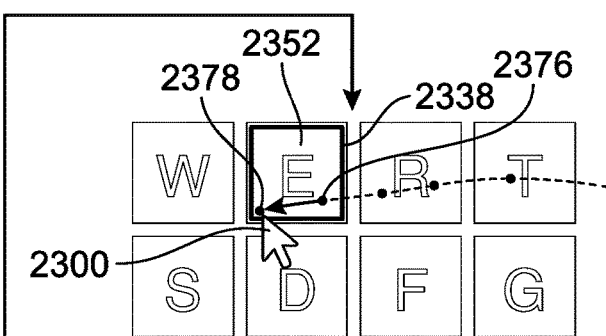
FIG. 23G T9
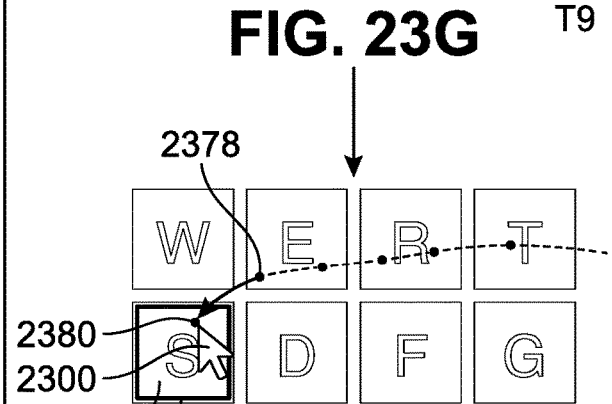
FIG. 23H T10
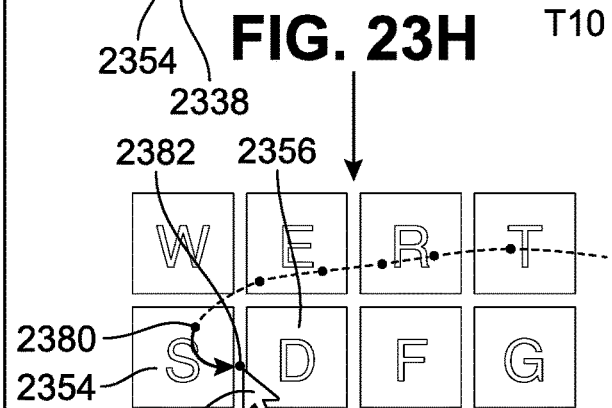
FIG. 23I T11
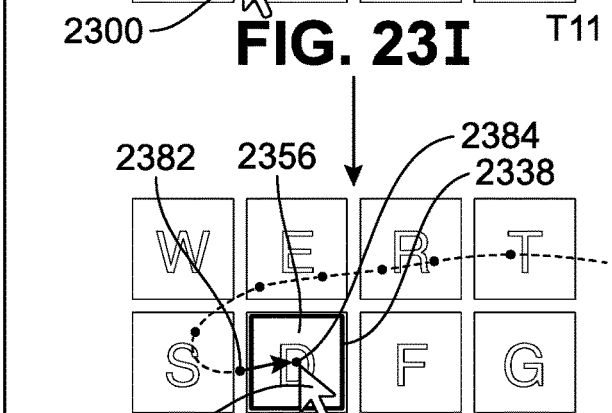
FIG. 23J T12

SYSTEMS AND METHODS FOR INPUT INTERFACES PROMOTING OBFUSCATION OF USER NAVIGATION AND SELECTIONS

BACKGROUND

Passwords are often used by systems as one step toward authenticating a user's access to a protected resource. Typically, a password includes a sequence of alphanumeric symbols known to both the user who is requesting access to the protected resource as well as to the system that has been configured to authenticate the user and grant the user access to the protected resource. Some examples of protected resources include a bank account accessed at a public automatic teller machine (ATM), personal digital files or electronic content, the contents of a locked cellular phone, access to a particular website, an email account accessed on a public computer, or an online service (for example, Netflix™ or Facebook™).

The level of security of the protected resource will depend heavily on the assurance that the user (or others who have a legitimate right to the resource) is the only one in possession of the password granting access. When an 'outsider' or third party that is not approved for such access identifies the password, they may damage or otherwise take advantage of the protected resource. Users often find themselves in situations where simply entering a password into a device is risky in that other parties may be observing the input. In such cases, the security of the resource may have to be reestablished by invalidating the compromised password. Users are forced to reinitiate the password authentication process and memorize a new password. Thus, there remain significant areas for new and improved ideas for the more effective and comprehensive protection of passwords.

SUMMARY

A system adapted to obfuscate a user target actuation, in accord with a first aspect of this disclosure, includes a processor and machine-readable media including instructions which, when executed by the processor, cause the processor to concurrently display a first plurality of targets, where the first plurality of targets include a first target, a second target, a third target, and a fourth target. The instructions also cause the processor to move a first visual indication of a current user target to the first target at a first time to reflect a change of the current user target to the first target in response to a first user input for discrete movement of the current user target, as well as move the first visual indication to the second target at a second time after the first time to reflect a change of the current user target to the second target in response to a second user input for discrete movement of the current user target. The instructions also cause the processor to actuate the current user target at a third time after the second time in response to a third user input for actuation of the current user target, and move a second visual indication of a first distractor target to the third target at a fourth time at or after the first time. Finally, the instructions also cause the processor to move the second visual indication to the fourth target at a fifth time after the fourth time and before the third time.

A method of obfuscating selection of an option, in accord with a second aspect of this disclosure, includes concurrently displaying a first plurality of targets, the first plurality of targets including a first target, a second target, a third target, and a fourth target, and moving a first visual indication of a current user target to the first target at a first time to reflect a change of the current user target to the first target in response to a first user input for discrete movement of the current user target. The method also includes moving the first visual indication to the second target at a second time after the first time to reflect a change of the current user target to the second target in response to a second user input for discrete movement of the current user target, and actuating the current user target at a third time after the second time in response to a third user input for actuation of the current user target. In addition, the method includes moving a second visual indication of a first distractor target to the third target at a fourth time at or after the first time, and moving the second visual indication to the fourth target at a fifth time after the fourth time and before the third time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 20G and 20H illustrate an implementation of an obfuscation system in which user commands are generated by tapping a handheld computing device;

FIGS. 23A-23J illustrate an example of a sequence in which a pointer is moved along a path on a seventh interface over multiple points in time;

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings. In the following material, indications of direction, such as "top" or "left," are merely to provide a frame of reference during the following discussion, and are not intended to indicate a required, desired, or intended orientation of the described articles.

Figure 1:
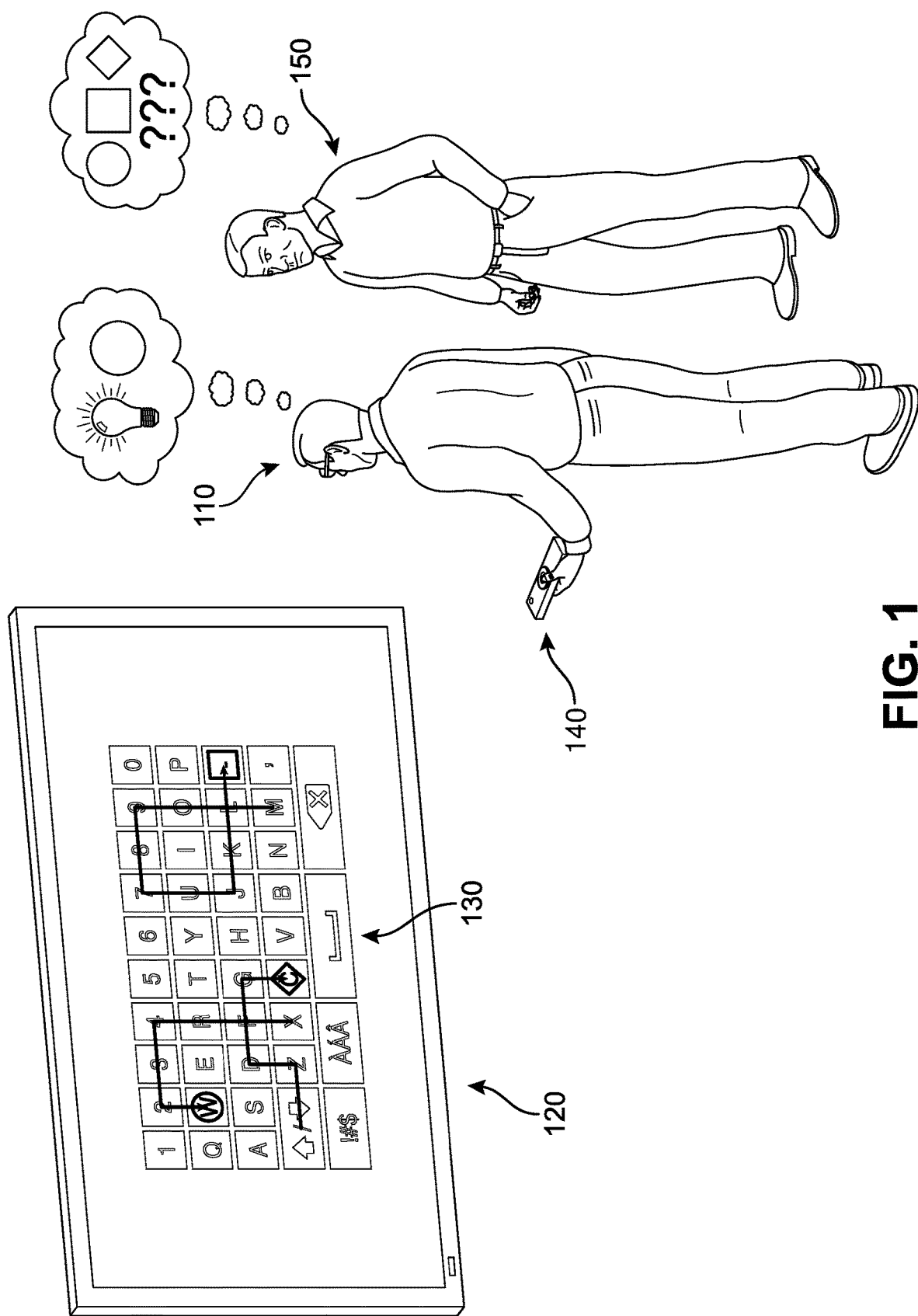
FIG. 1 illustrates an example of a first user positioned near a display device while using an implementation of an obfuscation system.

FIG. 1 illustrates an example of a first user 110 positioned near a first display device 120. The display device 120 in FIG. 1 is a large-screen television. However, in other implementations, the display device can include any type of display component for a computing device or system, including devices having a wide range of form factors, such as but not limited to a display for a desktop or laptop computer, a tablet, mobile phone, gaming systems or gamepads, or any other system in which a display is provided or integrated. In different implementations, the display device 120 is communicatively coupled to a computing device, as will be described further below. In one example, the computing device can include a system configured to operate various applications or execute instructions that cause presentation of various interfaces on the display.

The first display device 120 in this case presents a first graphical user interface ("first interface") 130 that is configured to permit the first user to input sensitive information for use by the computing device or associated systems. In some implementations, the first interface 130 can present one or more options for selection by a user. Through and/or in response to user input events (which may be referred to as "user input" and/or "input events") generated by the first user 110, such as via a remote input device 140, interacts with, and provides commands and/or receives feedback from, the first interface 130. However, it should be understood that in other implementations, the first user 110 may be able to interact more directly with the first interface 130 via a touchscreen of the display device, for example. In addition, for purposes of illustration, a first observer 150 is also present and able to view the first interface 130 while the first user 110 is selecting various options from the first interface 130. However, by virtue of the techniques described herein, the first user 110 is able to reliably and securely select from the options presented without the observer 150 being able to discern which options have been selected by the first user 110. As a result, the first user 110 is able to proceed with actions (such as entering a password) in settings that previously would have been difficult or socially and personally uncomfortable or undesirable. As will be discussed, the proposed implementations can confound potential observers by providing a means of obfuscating the user inputs.

Figure 2A:
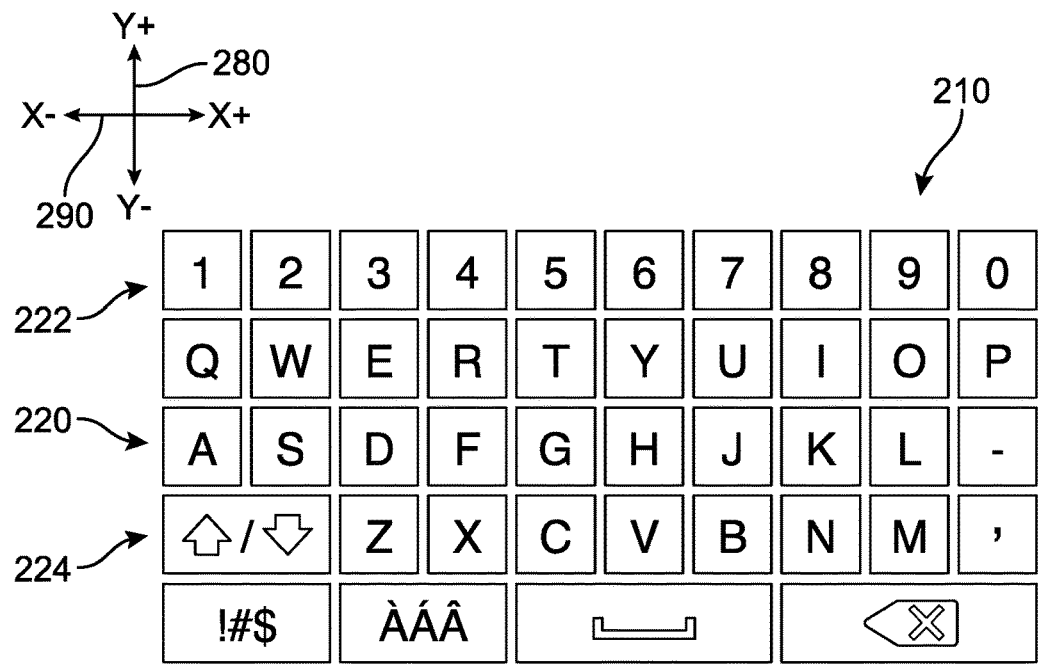
FIGS. 2A and 2B illustrate examples of different user interfaces configured to display selectable targets for a user.

In order to provide the reader with a better appreciation of the proposed systems and methods, FIGS. 2A-8 illustrate a series of possible input mechanisms and interfaces that may be provided to a user. FIG. 2A illustrates an isolated view of a second user interface ("second interface") 210 comprising a GUI configured to display selectable targets for a user as well as facilities for navigating among the targets. In this case the second interface 210 provides a virtual keyboard, allowing a user to perform alphanumeric input through the targets. Specifically, the second interface 210 can be understood to include and concurrently display a first plurality of targets 220. Furthermore, the virtual keyboard of FIG. 2A includes a first target type that is associated with a character such as a number or letter or symbol (e.g., 0-9, A-Z, other symbols), as well as a second target type that is associated with an action that will be performed following actuation of that target. As an illustration, a first target 222 (here, "1") is identified for the reader which is of the first target type. In addition, a second target 224 (here, an option to select lowercase characters via the second interface 210) is identified for the reader which is of the second target type. For purposes of reference, a first axis 280 substantially parallel to a vertical axis is depicted, along with a second axis 290 that is substantially orthogonal to the first axis. As a general matter, the targets provided by the second interface 210 are arranged in rows that are substantially parallel to the second axis 290. In some examples, the targets may also or alternatively be aligned to the first axis 280.

The disclosed implementations can incorporate any of the features, components, methods, systems, software, and other aspects described in U.S. Patent Application Publication Numbers 2018/0173417 (entitled "FACILITATING SELECTION OF HOLOGRAPHIC KEYBOARD KEYS" and published on Aug. 2, 2018), 2017/0364261 (entitled "HOLOGRAPHIC KEYBOARD DISPLAY" and published on Jan. 25, 2018), 2009/0048020 (entitled "EFFICIENT TEXT INPUT FOR GAME CONTROLLERS AND HANDHELD DEVICES" and published on Feb. 19, 2009), 2008/0320410 (entitled "VIRTUAL KEYBOARD TEXT REPLICATION" and published on Dec. 25, 2008), and 2008/0303793 (entitled "On-screen keyboard" and published on Dec. 11, 2008), each of which are incorporated by reference herein in their entireties.

Figure 2B:
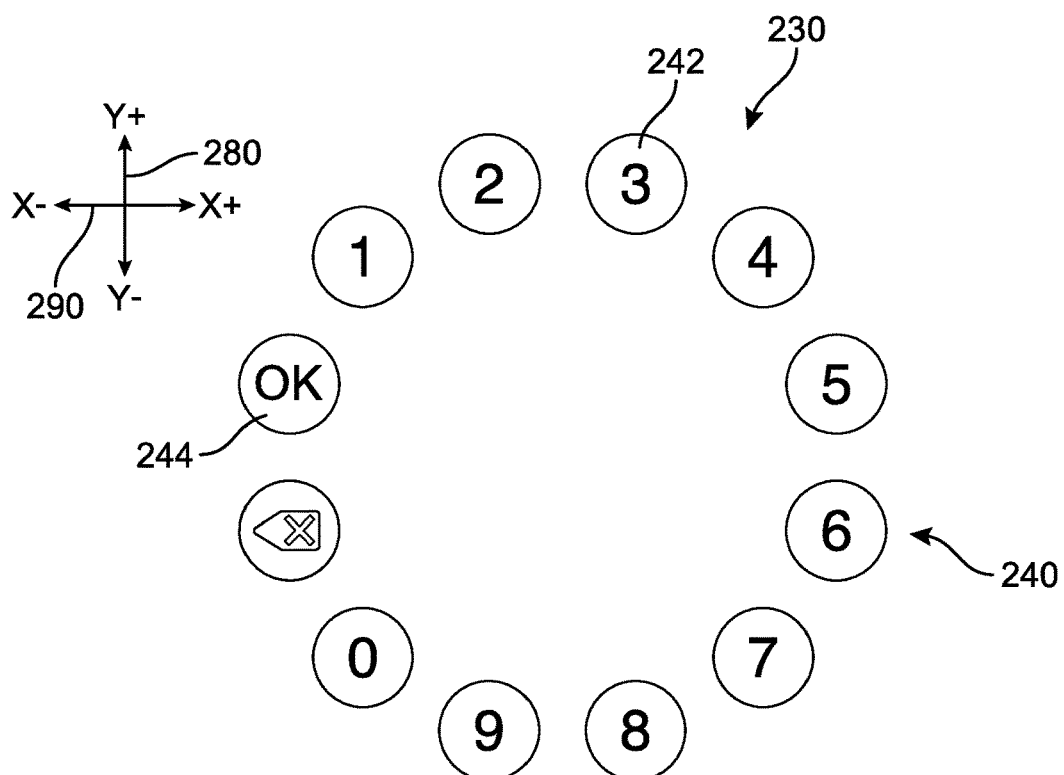

Referring next to FIG. 2B, a different interface is shown for purposes of comparison. FIG. 2B illustrates an isolated view of a third user interface ("third interface") 230 comprising a GUI also configured to concurrently display selectable targets for a user. However, in this case the third interface 230 provides a virtual input mechanism for the entry of numeric information, such as a PIN. Specifically, the third interface 230 can be understood to include a second plurality of targets 240. Furthermore, the virtual input mechanism of FIG. 2B also includes targets of the first target type that are associated with an alphanumeric character, similar to FIG. 2A. In this case the third target type includes numbers (i.e., 0-9) as well as targets of the second target type associated with an action that will be performed following actuation of that target. As an illustration, a third target 242 (here, "3") is identified for the reader, which is of the first target type. In addition, a fourth target 244 (here, an option to indicate that the entry of the sensitive input is complete and submit the sensitive input to the system) is identified for the reader which is of the second target type. In some implementations, such submission may be performed in response to a specific user input event, such as actuation of a submit button. It can be observed that the arrangement of the second plurality of targets 240 differs from the arrangement in rows shown in FIG. 2A, and is instead configured radially, or in a circular pattern. In other words, the various input mechanisms provided by an interface can vary widely and can include both regular (e.g., patterns) or irregular arrangements of targets.

Figure 3:
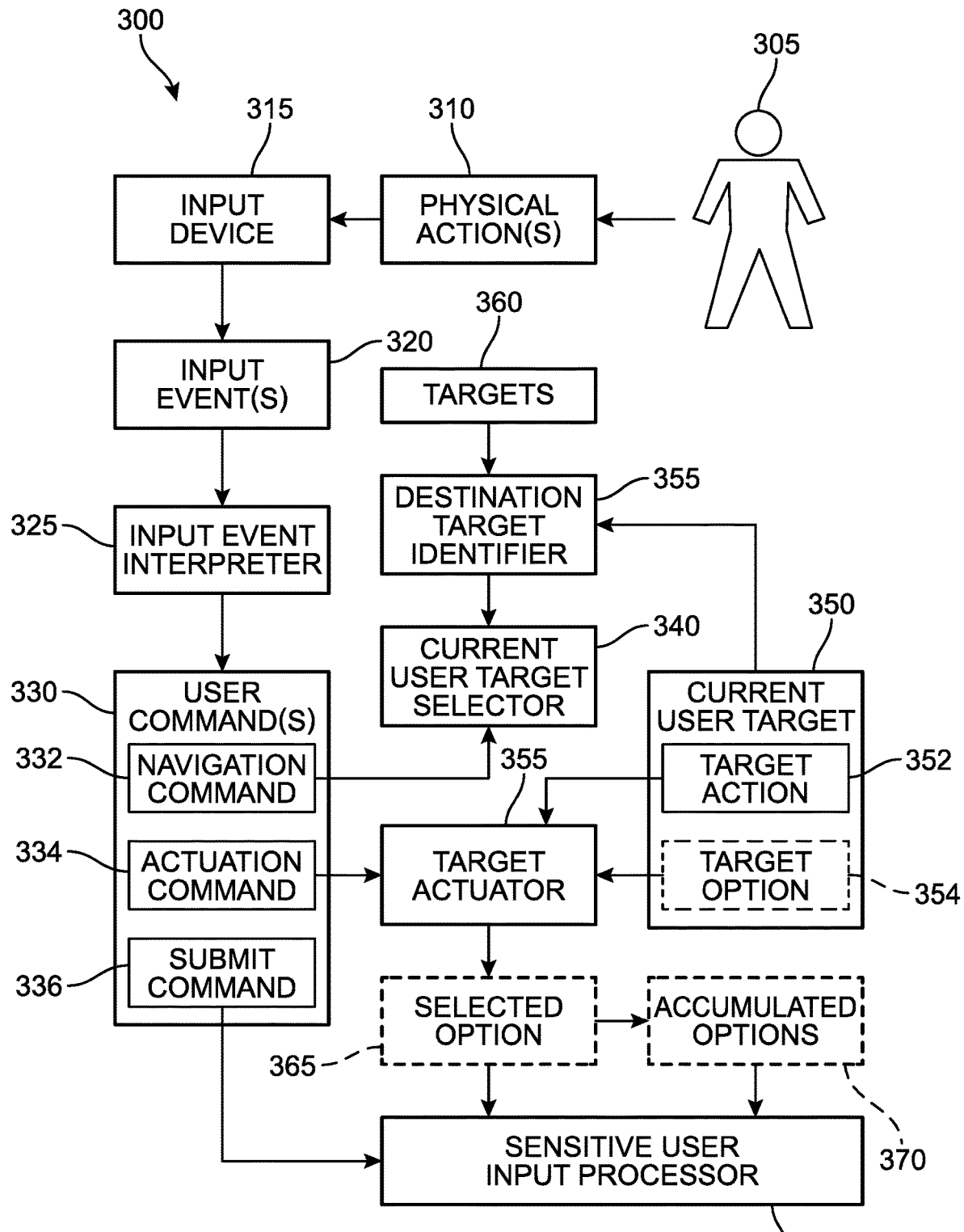
FIG. 3 illustrates an example of a user submitting sensitive data via an implementation of an obfuscation system.

FIG. 3 illustrates an example in which a user 305 submits sensitive data via an obfuscation system 300 configured to apply techniques described herein. The user 305 interacts with an input device 315 by performing one or more physical action(s) 310, resulting in one or more corresponding input event(s) 320 being generated by the input device 315. An input event interpreter 326 included in the obfuscation system 300 generates one or more user command(s) 330 corresponding to the input event(s) 320 received from the input device 315. FIG. 3 illustrates three examples of the user command(s) 330: a navigation command 332, an actuate command 334, and a submit command 336. In some implementations, the obfuscation system 300 is configured to perform the operations described for the submit command 336 in response to receiving an actuation command 334. The navigation command 332 instructs the obfuscation system 300 to move a current user target 350 to a different one of the targets 360. In response to receiving the navigation command 332, a current user target selector 340 included in the obfuscation system 300 moves the current user target to a destination target for the current user target 350 identified by a destination target identifier 355 and corresponding to the receive navigation command 332. An input interface may be updated accordingly. In response to receiving the actuation command 334, a target actuator 355 included in the obfuscation system 300 executes a target action 352 associated with the current user target 350. In some examples, the target action 352 corresponds to performing a selection of a target option 354 associated with the current user target 350, resulting in a selected option 365. For example, the letter "I" may be a target option associated with the first target 222 in FIG. 2A, with actuation of the first target 222 resulting in a selection option of the letter "I." In some implementations, the selected option 365 may be appended or otherwise added to a series of accumulated options 370. In response to receiving the submit command 336, a sensitive user input processor 375 receives and operates on the selected option 365 and/or the accumulated options 370.

Figure 4A:
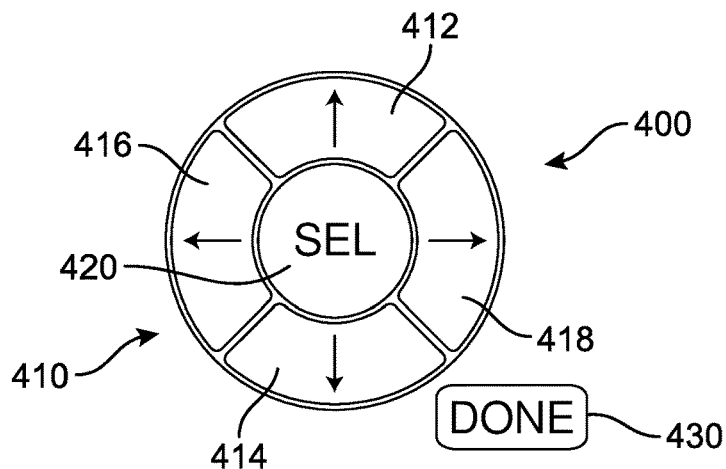
FIGS. 4A and 4B each illustrate an isolated view of an implementation of an input mechanism portion of a physical device.
Figure 4B:
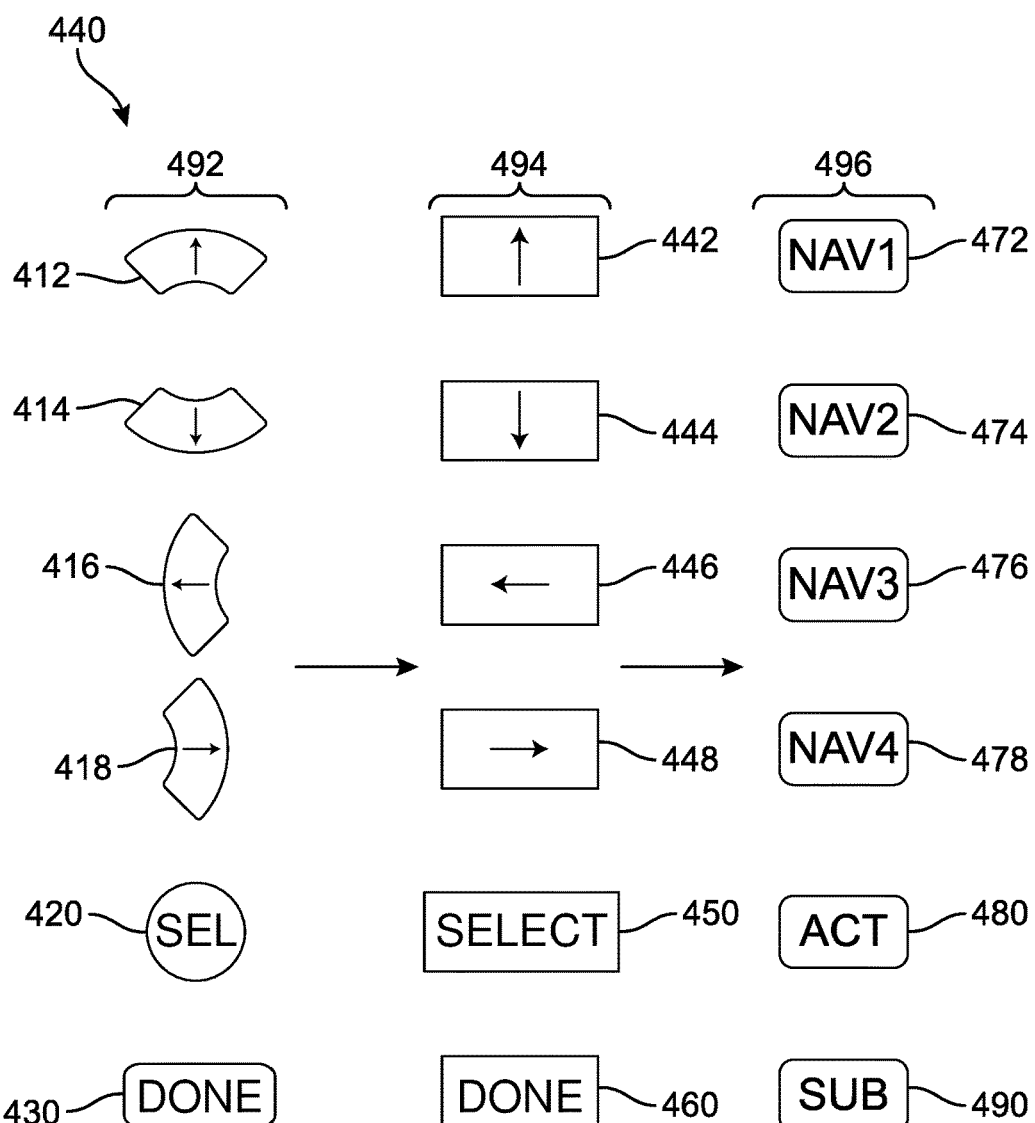

FIGS. 4A and 4B illustrate an isolated view of an implementation of an input mechanism portion 400 of a physical device. In other words, physical actions performed by a user via such a device can generate input events for a computing device. In some implementations, the physical device can be integrated with the computing device, while in other implementations, the physical device may be remote relative to the computing device. In this case, the input mechanism portion 400 comprises a plurality of mechanical buttons 410, including a first button 412 ("UP"), a second button 414 ("DOWN"), a third button 416 ("LEFT"), and a fourth button 418 ("RIGHT"), as well as a central button 420 ("SEL" or "SELECT"). In some implementations, additional buttons may be provided for submission of the input, such as a fifth button 430 ("DONE" or "SUBMIT").

In FIG. 4B, for purposes of clarity, additional details are provided regarding the buttons provided by input mechanism portion 400 of FIG. 4A with reference to a reference chart 450. The reference chart 440 includes a first column 492, a second column 494, and a third column 496, where the first column 492 presents a listing with each of the buttons, the second column 494 presents the input event corresponding to the depicted button, and the third column 496 presents the specific user command for the input event. Referring to the first column 492, the first button 412 (labeled with an UP arrow) can be seen to correspond to a first input event 442 ("direction up") presented in the second column 494, that is recognized as a first user command 472 ("NAV1"), as shown in the third column 496. In addition, the second button 414 (labeled with a DOWN arrow) corresponds to a second input event 444 ("direction down") that is recognized as a second user command 474 ("NAV2"). The third button 416 (labeled with a LEFT arrow) corresponds to a third input event 446 ("direction left") that is recognized as a third user command 476 ("NAV3"). Furthermore, the fourth button 418 (labeled with a RIGHT arrow) corresponds to a fourth input event 448 ("direction right") that is recognized as a fourth user command 478 ("NAV4"). The fifth button 420 (labeled "SEL") corresponds to a fifth input event 450 ("select") that is recognized as a fifth user command 480 ("actuate", shown as "ACT", which may be referred to as an "actuation command"). The sixth button 430 (labeled "DONE") corresponds to a sixth input event 460 ("done") that is recognized as a sixth user command 490 ("submit", shown as "SUB", which may be referred to as a "submit command"). In different implementations, the user commands NAV1, NAV2, NAV3, and NAV4 are also referred to as "navigation commands", the effect of which will be described in greater detail below.

Figure 5A:
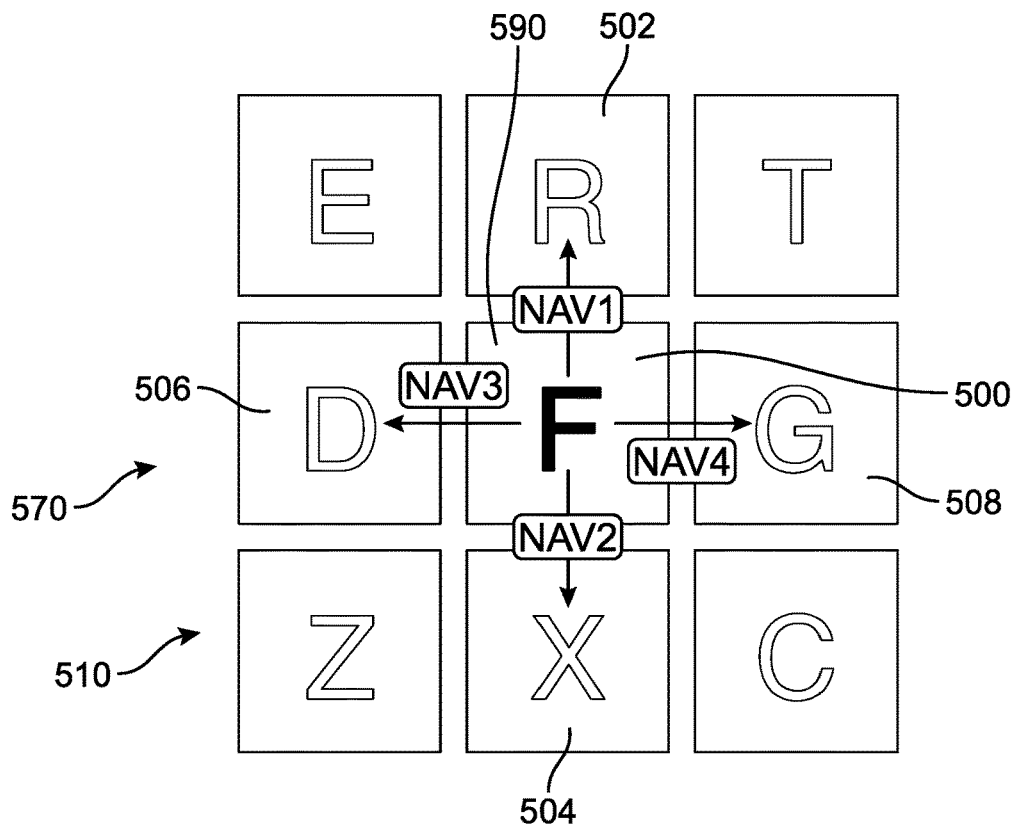
FIGS. 5A-5E illustrate a sequence in which an overview of a navigational process is presented, where one or more destination targets for a current target are available.

Referring now to FIGS. 5A-5E, an overview of a navigational process in which one or more destination targets for a current target are available will be introduced to the reader. In FIG. 5A, an isolated view of a first portion 570 of the second interface 210 is depicted in which a first set of targets 510 are presented, including a first target 500 which in this case corresponds to a current target 590. The first set of targets 510 further includes a first destination target 502, a second destination target 504, a third destination target 506, and a fourth destination target 508. In other words, in some implementations, the current target 500 has a plurality of destination targets that each correspond to a respective navigation command. In this example, the first navigation command NAV1, resulting from use of the up or first button 412 of FIG. 4B, corresponds to the first destination target 502 (here labeled as "R"), which is positioned directly above and adjacent to the current target 500. Similarly, the second navigation command NAV2, resulting from use of the down or second button 414 of FIG. 4B, corresponds to the second destination target 504 (here labeled as "X"), which is positioned directly below and adjacent to the current target 500, and the third navigation command NAV3, resulting from use of the left or third button 416 of FIG. 4B, corresponds to the third destination target 506 (here labeled as "D"), which is positioned directly leftward of and adjacent to the current target 500. Finally, the fourth navigation command NAV4, resulting from use of the right or fourth button 418 of FIG. 4B, corresponds to the fourth destination target 508 (here labeled as "G"), which is positioned directly rightward and adjacent to the current target 500.

Figure 5B:
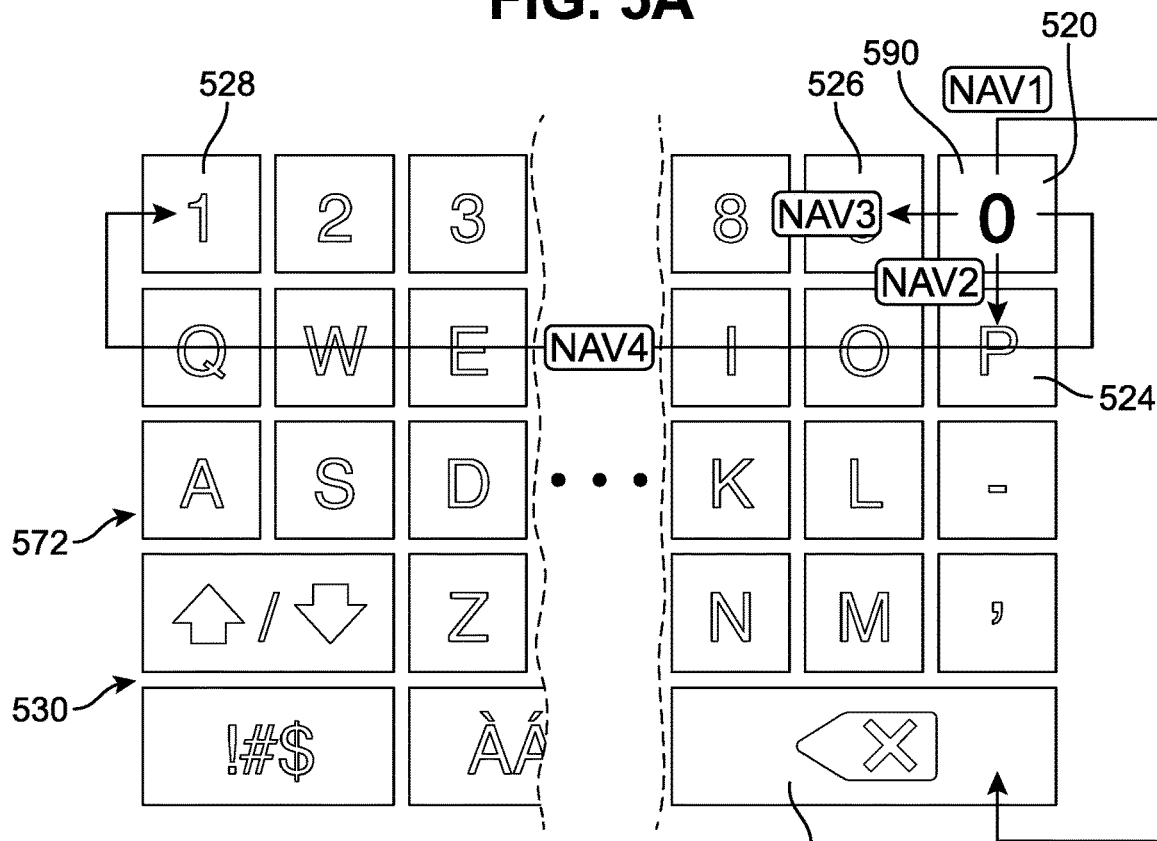

In FIG. 5B, a different, breakaway second portion 572 of the second interface 210 is depicted in which another arrangement of destination targets are shown with reference to a second set of targets 530. In this case, the current target 590 is represented by a second target 520 (here labeled as "O"). The current target 590 is again associated with a plurality of destination targets. Similar to FIG. 5A, the second navigation command NAV2, resulting from use of the down or second button 414 of FIG. 4B, corresponds to a second destination target 524, and the third navigation command NAV3, resulting from the use of the left or third button 416 of FIG. 4B, corresponds to a third destination target 526, both being directly adjacent to the current target 590. However, in contrast to the arrangement of FIG. 5A, the first navigation command NAV1, resulting from use of the up or first button 412 of FIG. 4B, now corresponds to a first destination target 522 (here identified by a Backspace symbol) that is positioned at a distance from the current target 590, and the fourth navigation command NAV4, resulting from use of the right or fourth button 418 of FIG. 4B, corresponds to a fourth destination target 528 that is also spaced apart from the current target 590. In other words, in different implementations, 'peripheral targets' or targets that are disposed along an outermost portion or region of the interface can be associated with distant destination targets. This can occur when destination targets are configured as a 'wrap around' of the virtual keyboard, such that navigation from a current target located on a periphery will lead to or be associated with destination targets disposed on an opposing side of the virtual keyboard, giving the user a shorter path between certain combinations of targets as well as a sense of continuity. However, it should be understood that such an arrangement is a design choice, and in some implementations, the design can be configured to limit the current target in this case to only two targets that are directly adjacent to the current target.

Figure 5C:
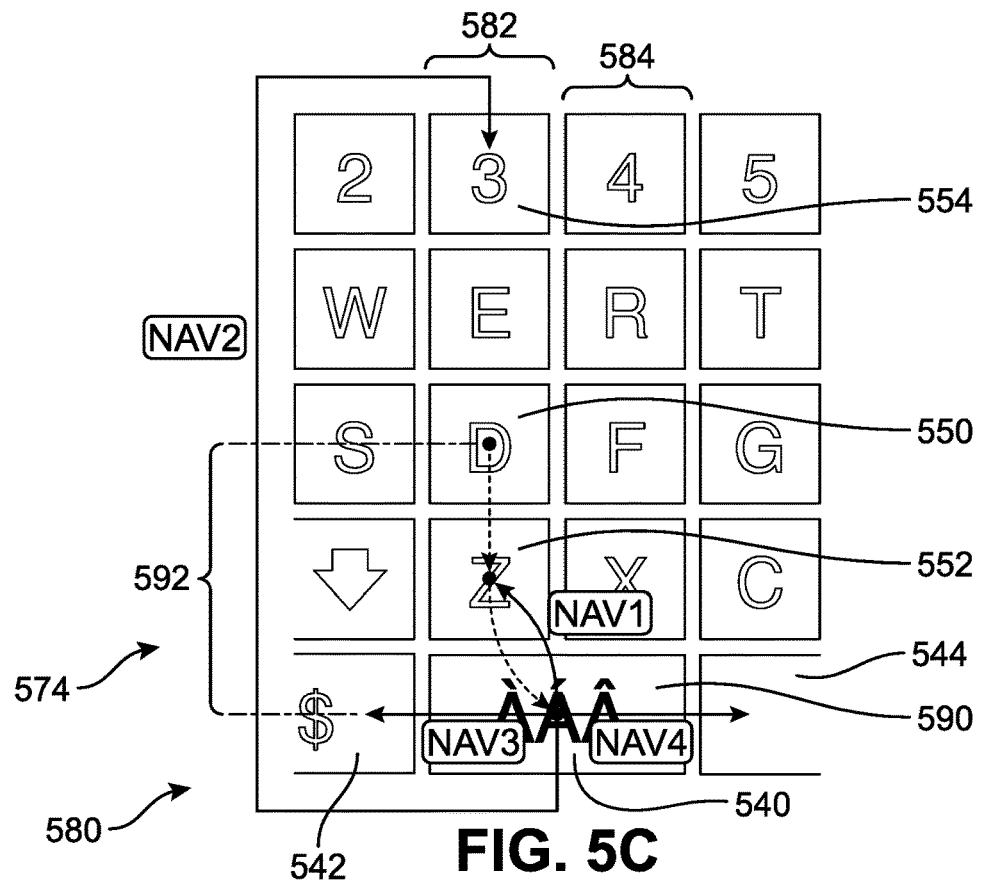
Figure 5D:
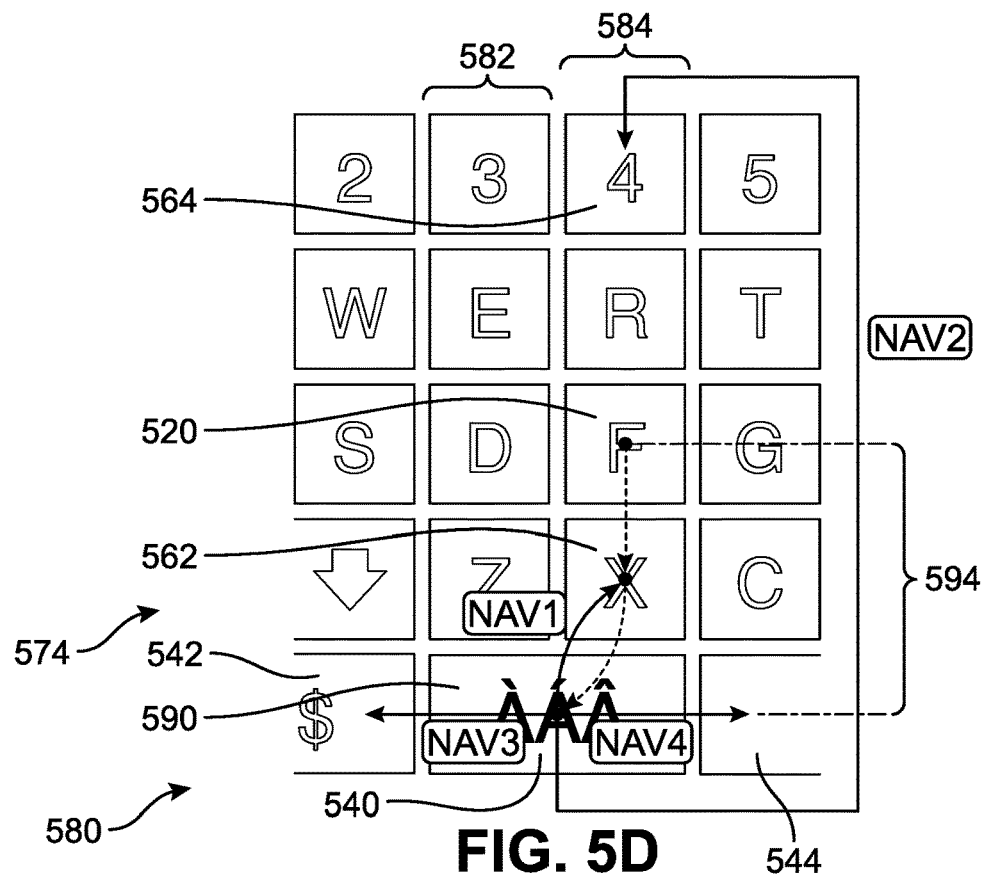

The subsequent FIGS. 5C and 5D depict another possible navigational arrangement in which previous user commands may factor in a determination of one or more destination targets for a current target. In FIGS. 5C and 5D, an isolated view of a third portion 574 of the second interface is shown, comprising a third set of targets 580 and the current target 590 is a third target 540 (here associated with a target modification action, labeled as "ÀÁÂ"). Again, one or more destination targets corresponding to respective navigation commands may be identified for the current target 590. In FIGS. 5C and 5D, and similar to FIG. 5A, the third navigation command NAV3, resulting from the use of the left or third button 416 of FIG. 4B, corresponds to a third destination target 542, and the fourth navigation command NAV4, resulting from use of the right or fourth button 418 of FIG. 4B, corresponds to a fourth destination target 544, where both of these are directly adjacent to the current target 590.

In addition, similar to the arrangement of FIG. 5B, the current target 590, being disposed along a periphery of the keyboard, is also associated with destination targets that follow a 'wrap-around' pattern. However, in this case, it can be seen that the third target 540 is a larger-sized target relative to previously identified targets. More specifically, the third target 540 has a width along the second axis 290 that encompasses or extends across the widths of two columns of other targets, including a first column 582 and a second column 584. In some implementations, a determination of which destination targets should occur or be selected in response to the first navigation command NAV1 and the second navigation command NAV2 from such a larger target is based on one or more previous navigation commands (which may be referred to as a "previous navigation history" or "travel") that led to the result where the third target 540 as the current target 590.

In FIG. 5C, the current target 590 navigated to the third target 540 according to a first previous sequence of navigation commands 592, represented by broken-lined arrows from a fourth target 550 to a fifth target 552 and next to the third target 540, indicating that the current target 590 arrived to the third target 540 from a target in the first column 582. As a result, an upward or return navigation (e.g., in response to first navigation command NAV1, such as from use of the up or first button 412 of FIG. 4B) will also follow a path back toward or 'into' the first column 582. Thus, a target in the first column 582 provides a first destination target 552 ("Z") that will be selected in response to the first navigation command NAV1. Similarly, for a downward or forward navigation (e.g., in response to second navigation command NAV2, such as from use of the down or second button 414 of FIG. 4B) a 'wrap around' will proceed to a target in the first column 582. Thus, a second destination target 554 ("3") will be selected in response to the second navigation command NAV2.

In contrast, as shown in FIG. 5D, if the current target 590 navigated to the third target 540 according to a second previous sequence of user input events 594, represented by broken-lined arrows from a sixth target 520 to a seventh target 562 and next to the third target 540, indicating that the current target 590 arrived to the third target 540 from a target in the second column 584. As a result, an upward or return navigation will also follow a path back toward or 'into' the second column 584. Thus, a target in the first column 584 provides a second destination target 562 ("X") that will be selected in response to the first navigation command NAV1. Similarly, for a downward or forward navigation a 'wrap around' will proceed to a target in the second column 584. Thus, a second destination target 564 ("4") will be selected in response to the second navigation command NAV2.

Figure 5E:
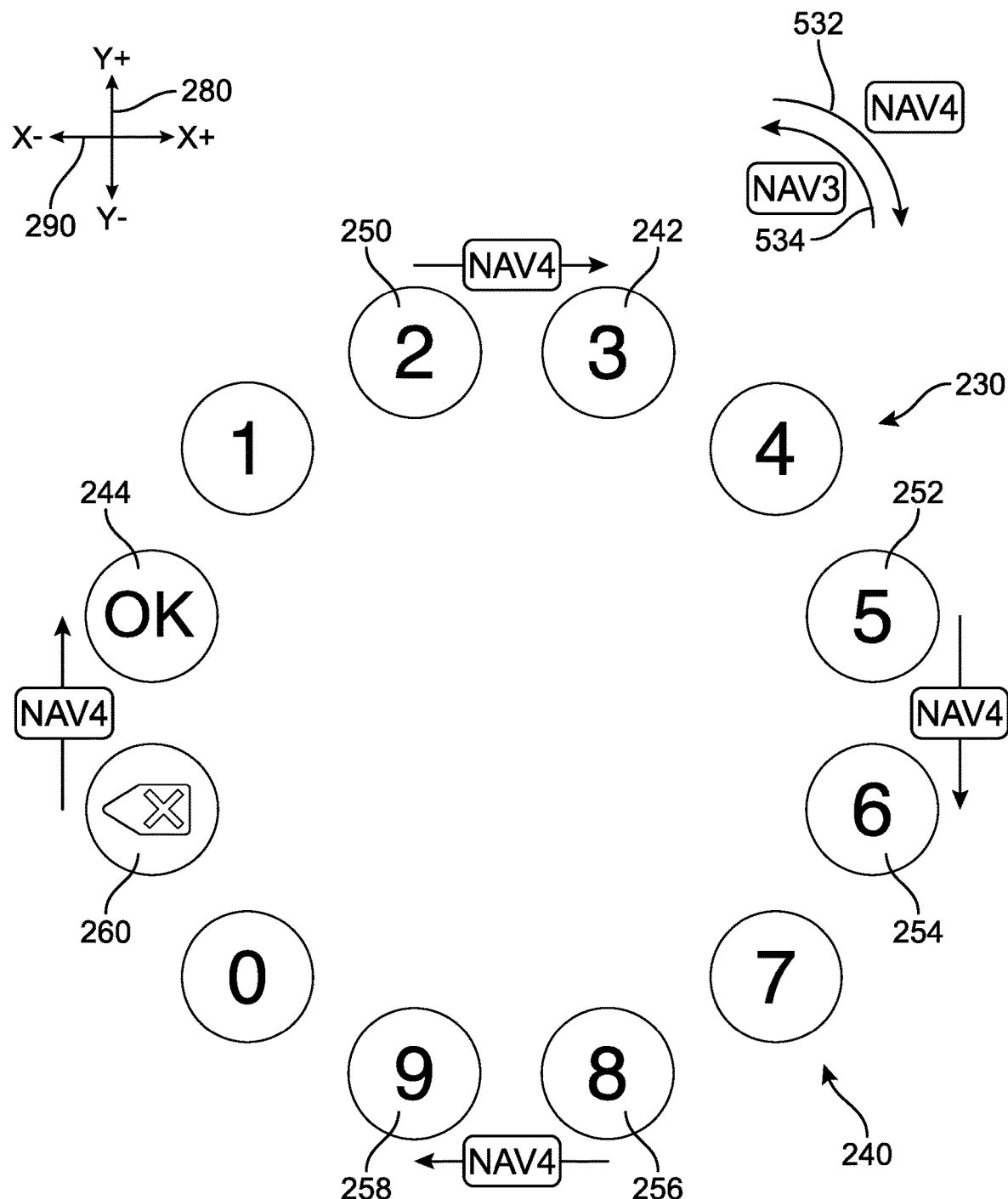

FIG. 5E illustrates an example of a possible navigational pattern for the third interface 230 of FIG. 2B. In FIG. 5E, the second plurality of targets 240 include a generally circular arrangement. Thus, as a user moves between targets, the direction can be accorded a "clockwise" direction 532 and a "counterclockwise" direction 534. In this case, the user command NAV4 results in transitioning between targets along the clockwise direction 532, while a user command NAV3 results in transitioning between targets along the counterclockwise direction 532. As a result, from a target 250 ("2") the destination target 242 associated with NAV4 is located to the right of the target 250, whereas from a target 252 ("5") the destination target 254 associated with NAV4 is located below the target 252. In addition, from a target 256 ("8") the destination target 258 associated with NAV4 is located to the left of the target 256, and from a target 260 ("undo") the destination target 244 associated with NAV4 is located to above the target 260.

Figure 6:
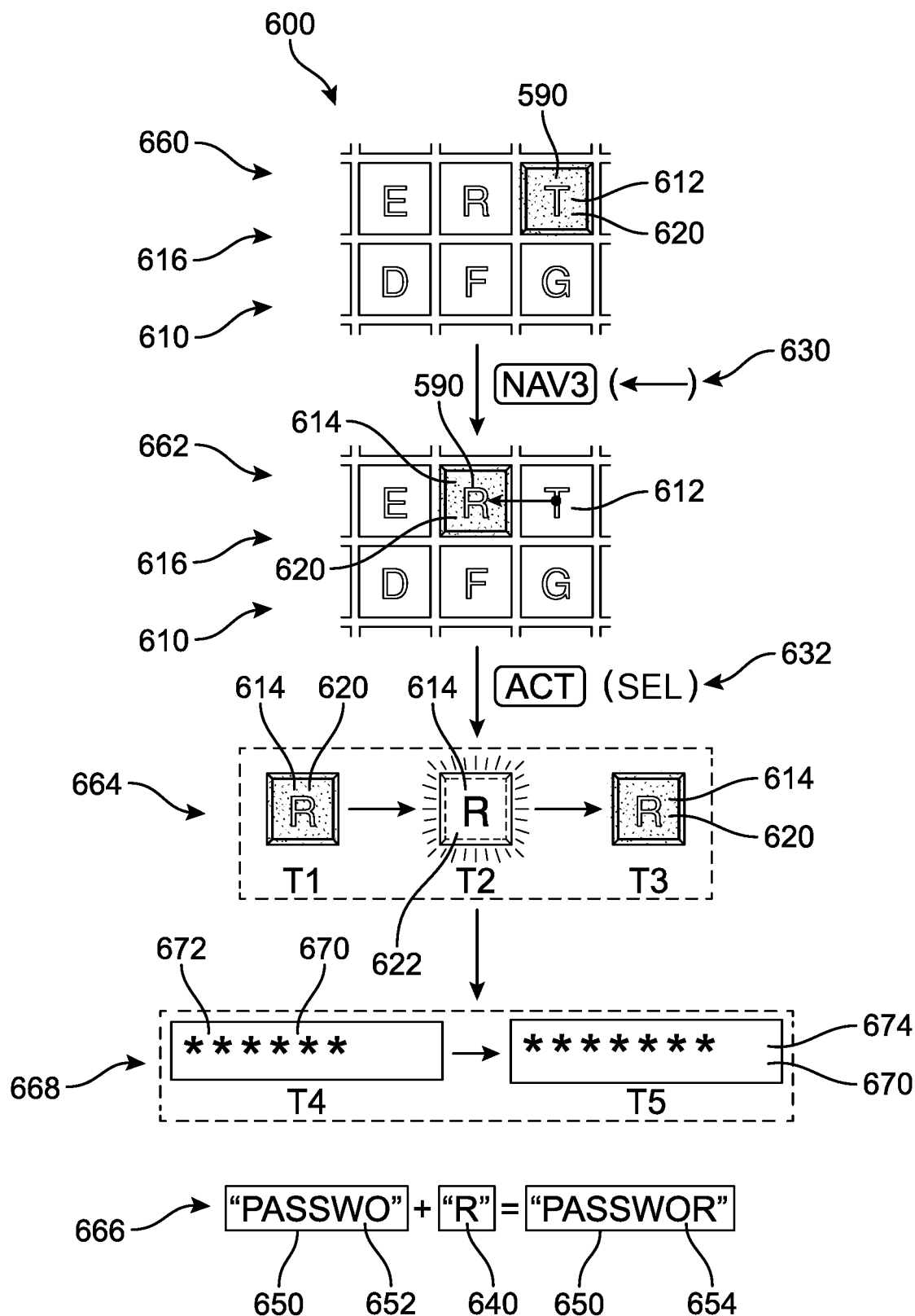
FIG. 6 illustrates an example of a first process for entering a password using an implementation of an obfuscation system.
Figure 7:
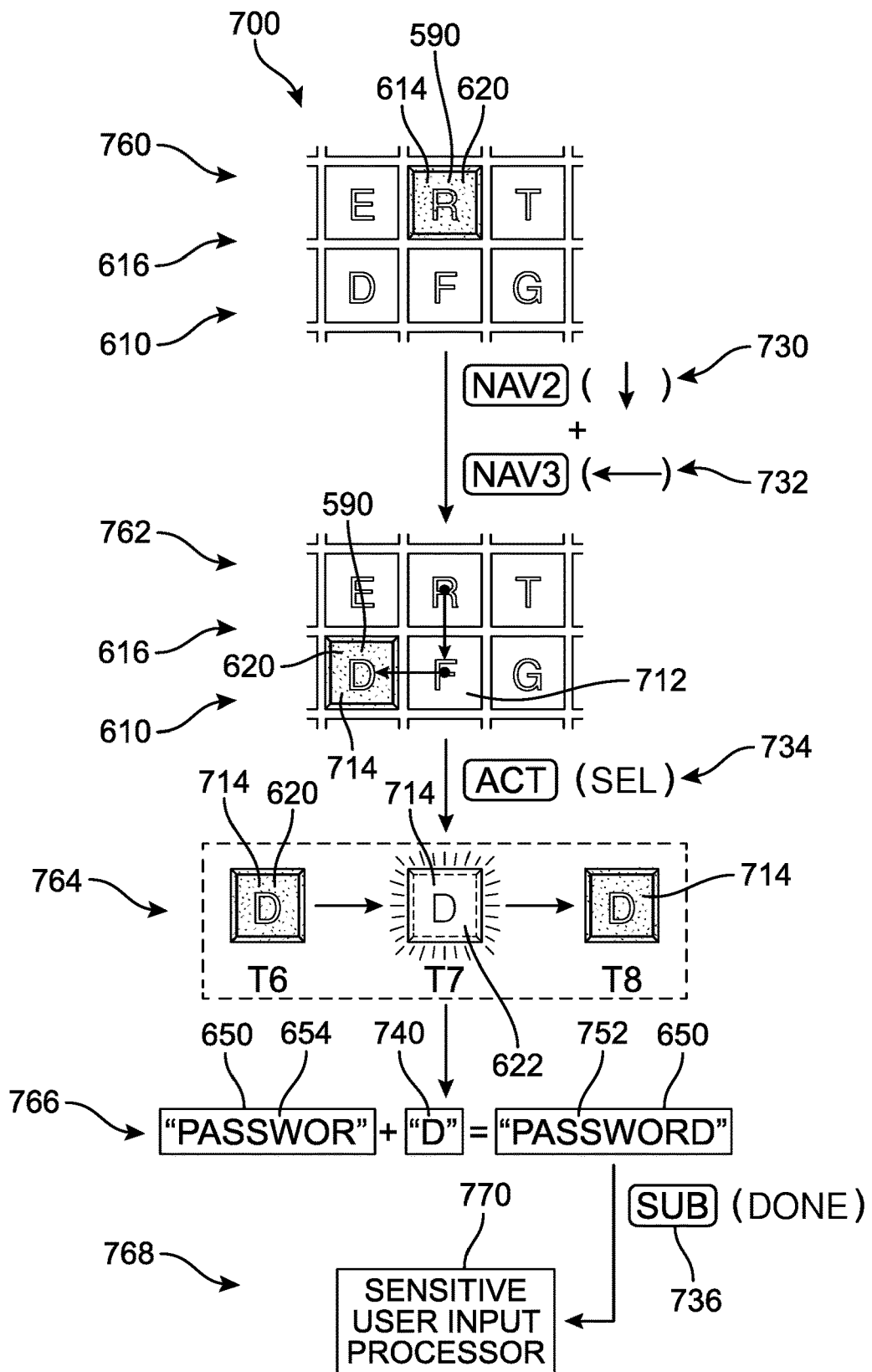
FIG. 7 illustrates an example of a second process for entering a password using an implementation of an obfuscation system.

With reference to FIGS. 6 and 7, we return more directly to processes of a navigating to and actuating desired targets to select a sequence of associated options (which may be referred to as "selections"); in this example, to enter a password for a system. FIG. 6 illustrates an example of a first process 600, and FIG. 7 illustrates an example of a second process 700. In FIG. 6, an isolated view of a fourth portion 610 of the second interface, including a fourth set of targets 616. In this case, the current target 590 is represented by a first target 612 ("T"). In different implementations, the current target 590 can be readily identified by the presentation of a visual indicator (which may be referred to as a "visual indication") that may be overlaid or otherwise associated with the current target 590. Although a first visual indication ("first indication") 620 is shown as a shading of the region associated with the region corresponding to the current target 590, in other implementations, any other type of visual effects may be used, including but not limited to variations in shape, color, style, size, formatting, border patterns, position relative to other targets, brightness, or any other visual effect. A visual indication such as the first visual indication 620 may also be referred to as a "focus indication," and a current target identified with a focus indication may be referred to as a "focus target" or "focused target." In some examples, there may be multiple concurrent current targets displayed with respective focus indications, allowing current targets to be readily distinguished from other targets by their visual appearances.

With reference to the first process 600, at a first stage 660 the fourth portion 610 is as shown, and a first user command 630 is received. In response, referring to a second stage 662, the current target 590 shifts to a second target 614 ("R"). In addition, the first indicator 620 is removed from the first target 612 and is applied to the second target 614 to reflect the change of the current target 590 to the second target 614. When a second user command 632 (the actuate command ACT) is received in which the user requests the current target to be added to the sequence of inputs entered thus far, the system can in some implementations respond by presentation of a signal that provides the user with confirmation that the selected character has been added and/or that second user command 632 has been received. An example of this is shown in an optional third stage 664, where the second target 614 is depicted with a flashing sequence. In other words, at a first time T1 the "R" is associated with the first indication 620, and at a subsequent second time T2, a second visual indication 622 is briefly displayed, followed by a return to the first indication 620 at a next third time T3. As will be discussed later, other techniques may be performed to confirm the second user command 632.

Finally, in a fourth stage 666, in response to the second user command 632 and the resulting action performed for the second target 614, a character 640 ("R") associated with the second target 614 (which may be referred to as a "selection option" or a "selection") is appended to a first accumulated selection sequence 652 (which may be referred to as "accumulated options") recorded and maintained in a memory 650 of previously entered characters (if any), resulting in the memory 650 storing a new second accumulated selection sequence 654. In an optional fifth stage 668, in some implementations, placeholder symbols can be used to reflect the entry of characters. For example, a masking display region 670 (that may be part of the user interface) may be shown in which a first masked sequence 672 is displayed for the first accumulated selection sequence 652 at a fourth time T4, followed by a presentation at a fifth time T5 of a (longer) second masked sequence 674 for the new second accumulated selection sequence 654 when the character 640 is selected.

An example of an additional or subsequent input is shown with reference to FIG. 7. In this case, the current target 590 remains the second target 614 ("R"), and accordingly is visually identified by the first indication 620 during a sixth stage 760. Following two navigation commands (first navigation command 730 and second navigation command 732), a seventh stage 762 results in which the current target 590 shifts to a third target 712 ("F") and then next to a fourth target 714 ("D"). The first indication 620 is removed from the second target 614, may be applied briefly to the third target 712, and then is applied to the fourth target 714. As noted earlier, if a fifth user command 734 ("ACT") is received in which the user requests the current target 590 to be actuated, causing an associated character 740 ("D") added to the sequence of selections made thus far, the system can in some implementations respond by presentation of a signal that provides the user with confirmation that the selected character has been added and/or that fifth user command 734 has been received. An example of this is shown in an optional eighth stage 764, where the fourth target 714 is depicted with a flashing sequence as described for the third stage 664. In other words, at a sixth time T6 the "D" is associated with the first indication 620, and at a subsequent seventh time T7, the second visual indication 622 is briefly displayed, followed by a return to the first indication 620 at an eighth time T8.

In a ninth stage 766, in response to the fifth user command 734 and the resulting action performed for the fourth target 714, the character 740 associated with the fourth target 714 is appended to the (previously new) second accumulated selection sequence 654 recorded in the memory 650, resulting in a new or updated third accumulated selection sequence 752. Finally, in a tenth stage 768, in response to a sixth user command 736 (the submit command SUB), the updated accumulated sequence 752 is provided to a sensitive user input processor 770. In some implementations, the second interface 210 is then removed or no longer displayed. In some implementations, the sensitive user input processor 770 is configured invoke a predetermined function in response to the accumulated sequence 752 meeting a prescribed condition.

Figure 8:
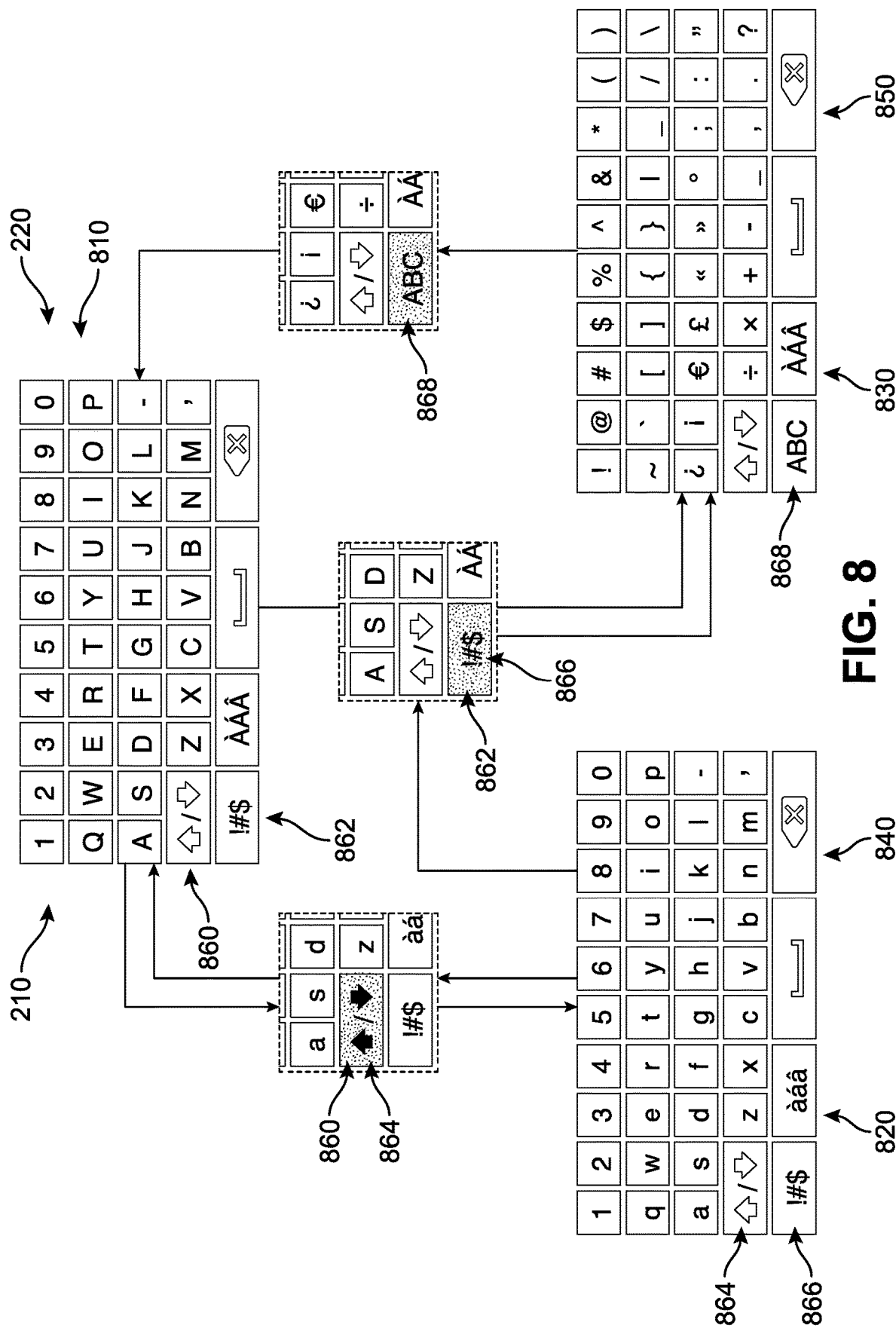
FIG. 8 illustrates an example of a change of targets associated with different input modes for an interface.

Referring next to FIG. 8, an example of a change of targets is presented. In a first mode 810, the second interface 210 presents the first plurality of targets 220 as previously depicted in FIG. 2A. In a second mode 820, the second interface 210 presents a second plurality of targets 840, and in a third mode 830, the second interface presents a third plurality of targets 850. Each of the modes presents a different set of options to the user. In some implementations, the second plurality of targets 840 and third plurality of targets 850 offer new or different targets than first plurality of targets 220, while in some other implementations, the actions associated with each of the first plurality of targets 220 are simply re-mapped to new sets of actions, including offering new sets of options for the user to select.

In different implementations, while displaying the second interface 210 in the first mode 810, actuation of a first transition target 860 can transition the second interface 210 to the second mode 820. Similarly, actuation of a second transition target 862 can transition the second interface 210 to the third mode 830. In addition, while displaying the second interface 210 in the second mode 820, actuation of a third transition target 864 can transition the second interface 210 back to the first mode 810. Similarly, actuation of a fourth transition target 866 can transition the second interface 210 to the third mode 830. Finally, while displaying the second interface 210 in the third mode 830, actuation of a fifth transition target 868 can transition the second interface 210 back to the first mode 810. Similarly, actuation of a fourth transition target 866 can transition the second interface 210 to the third mode 830. In some implementations, a user input device, such as the remote input device 140 shown in FIG. 1, may offer a means of input (for example, an additional button) for changing between modes (for example, between the first mode 810 providing uppercase character options and the second mode 820 providing lowercase character options).

Figure 9A:
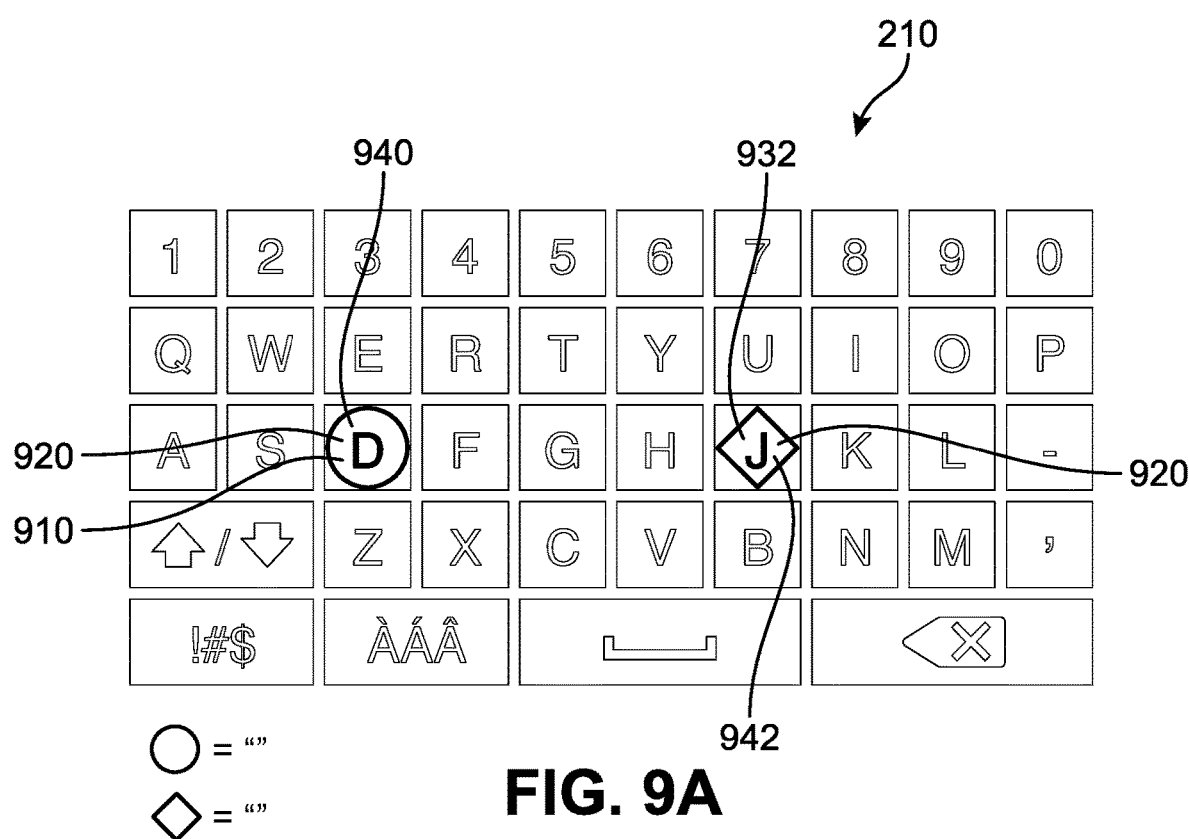
FIGS. 9A-9F are a sequence providing an introduction to an implementation of an obfuscation system.

FIGS. 9A. 9B, 9C, 9D, 9E, and 9F provide an introduction to an implementation of an obfuscation system. In FIG. 9A, the second interface 210 is again shown, including a current user target 910 (corresponding to a first target 940 "D") and current distractor target 920 (corresponding to a second target 942 "J"), where each target is denoted by or otherwise associated with a first visual indication 930 and a second visual indication 932. In different implementations, the visual indications associated with the user targets and the distractor targets may be similar or may differ. It should be understood that the presentation of "D" and "J" as current targets is for purposes of illustration only, and the initial 'current' targets can be generated and/or chosen by a randomized process. In this example, the user seeks to enter a sequence of characters B-L-U-E as sensitive information being submitted via second interface 210. While the user navigates to the necessary targets, the current distractor target 920 will also move from target to target. This can serve as a simulation of navigation by a user, resulting in an obfuscation of whether it is the current user target 910 or the current distractor target 920 that is actually associated with the user's interaction with the second interface 210, as will be illustrated now with reference to FIGS. 9B-9F.

Figure 9B:
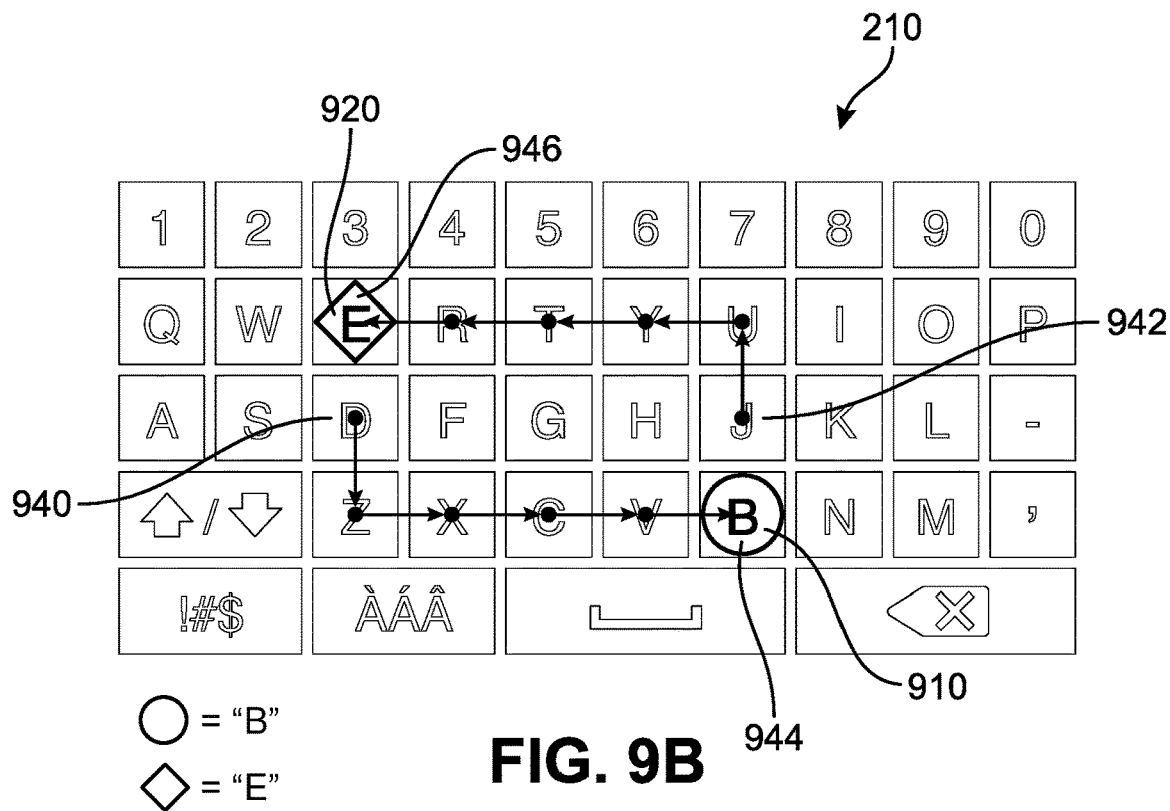

In FIG. 9B, the user has navigated from the first target 940 to a third target 944 ("B", now corresponding to the current user target 910) through a series of five navigation commands. During that same period of time, the first current distractor target 920 has simulated five navigation commands, resulting in the current distractor target 920 being moved from the second target 942 to a fourth target 946 ("E"). Then, the user submits an actuation command resulting in the character "B" being added to a memory for an accumulated sequence of characters, similar to the memory 650 described in FIGS. 6 and 7. In some implementations, the actuation command results in visual feedback of the user's selection being displayed, much as described in the third stage 664 of FIG. 6. In such implementations, at the same time, the fourth target 946 is also associated with a visual feedback similar to that described in the third stage 664 of FIG. 6. As a result, an observer is unable to determine whether the user selected the character "B" or the character "E".

Figure 9C:
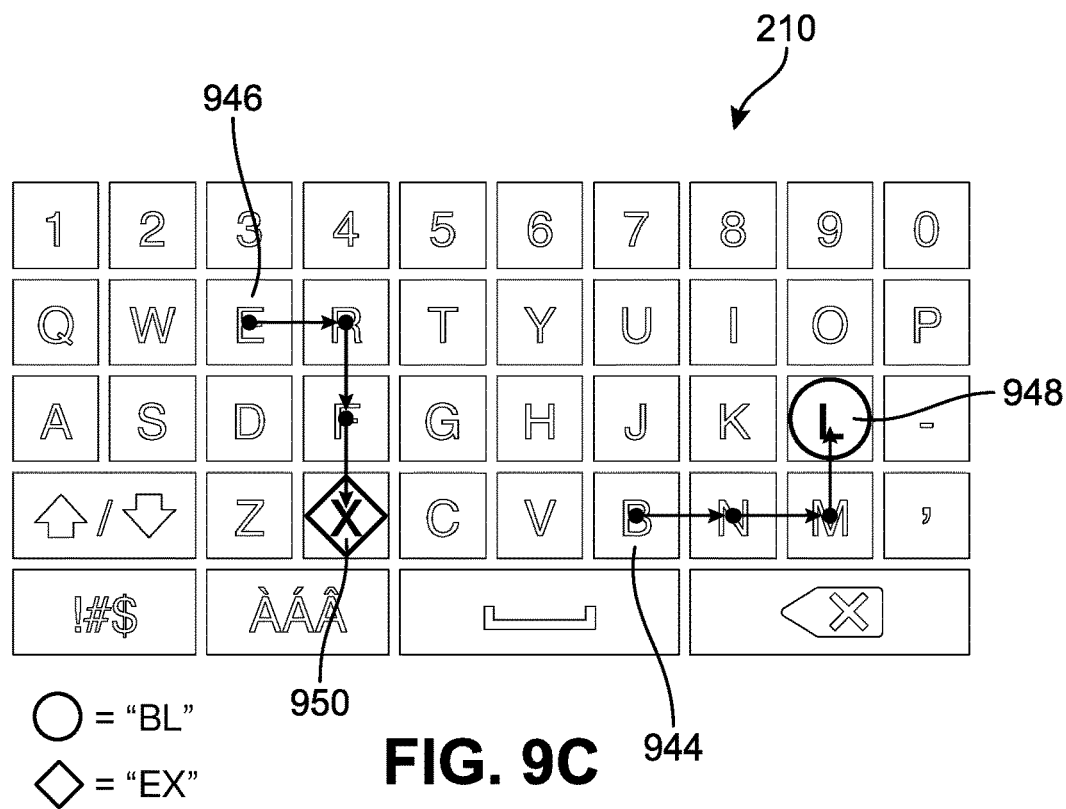

Similarly, in FIG. 9C, the user has navigated from the third target 944 to a fifth target 948 ("L", now corresponding to the current user target 910) through a series of four navigation commands. During that same period of time, the current distractor target 920 has simulated four navigation commands, resulting in the current distractor target 920 being moved from the fourth target 946 to a sixth target 950 ("X"). Then, the user submits an actuation command resulting in the character "L" being added to a memory for an accumulated sequence of characters. As noted earlier, in some implementations, visual feedback of the user's selection is also displayed along with a visual feedback for the distractor's 'selection' of the sixth target 950. As a result, an observer is unable to determine whether the user selected the character "L" or the character "X".

Figure 9D:
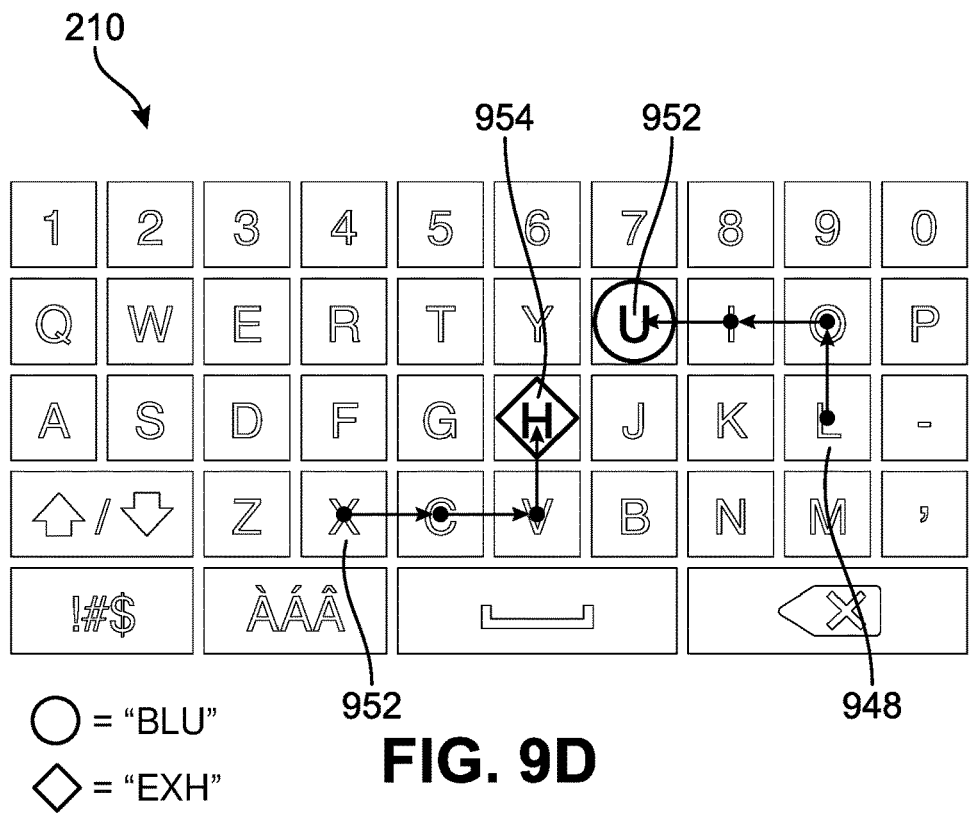

In FIG. 9D, the user has navigated from the fifth target 948 to a seventh target 952 ("U", now corresponding to the current user target 910) through a series of three navigation commands. During that same period of time, the current distractor target 920 has simulated three navigation commands, resulting in the current distractor target 920 being moved from the sixth target 950 to an eighth target 954 ("H"). Then, the user submits an actuation command resulting in the character "U" being added to a memory for an accumulated sequence of characters. As noted earlier, in some implementations, visual feedback of the user's selection is also displayed along with a visual feedback for the distractor's 'selection' of the eighth target 954. As a result, an observer is unable to determine whether the user selected the character "U" or the character "H".

Figure 9E:
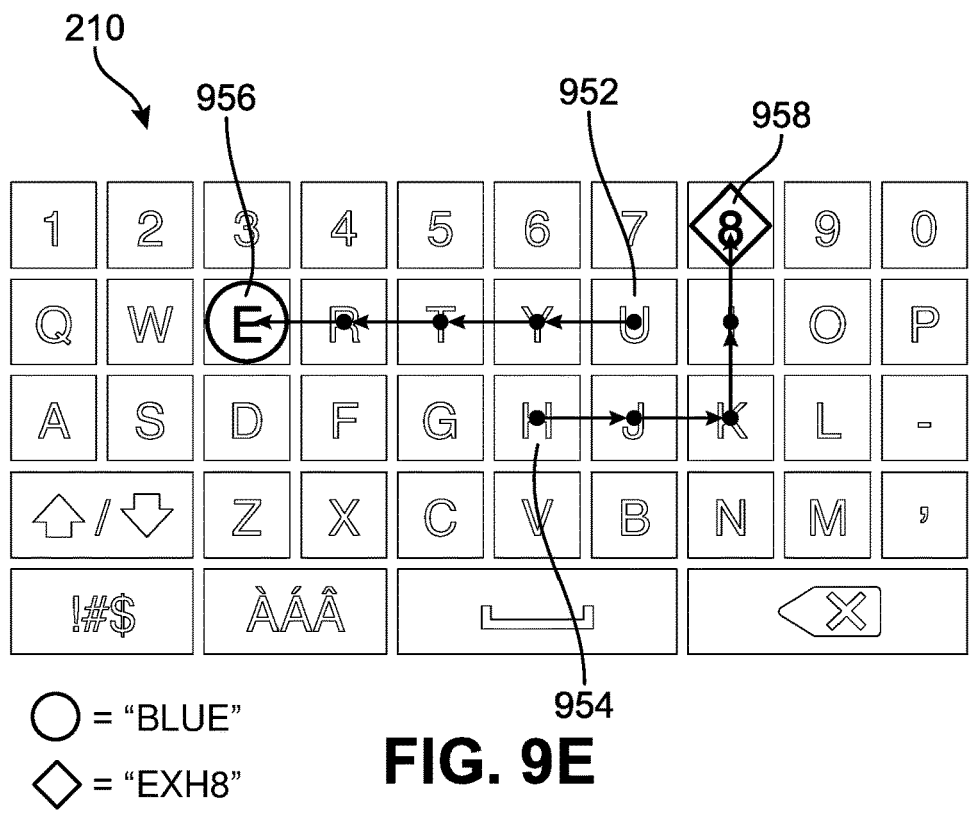

Finally, in FIG. 9E, the user has navigated from the seventh target 952 to a ninth target 956 ("E", now corresponding to the current user target 910) through a series of four navigation commands. During that same period of time, the current distractor target 920 has simulated four navigation commands, resulting in the current distractor target 920 being moved from the eighth target 954 to a tenth target 958 ("8"). Then, the user submits an actuation command resulting in the character "E" being added to a memory for an accumulated sequence of characters. As noted earlier, in some implementations, visual feedback of the user's selection is also displayed along with a visual feedback for the distractor's 'selection' of the tenth target 958. As a result, an observer is unable to determine whether the user selected the character "E" or the character "8". As shown in FIGS. 9A-9E, the obfuscation system has caused the current user target 910 and its respective first visual indication 930 to move, over the shown period of time, through a first subset of the displayed targets to enter user selections of targets. Also as shown in FIGS. 9A-9E, the obfuscation system has caused the first current distractor target 920 and its respective second visual indication 932 to move, over the same period of time, through a second subset of the displayed targets in a manner that is different from the current user target 910 and its respective first visual indication 930 moving through the first subset of the displayed targets.

Figure 9F:
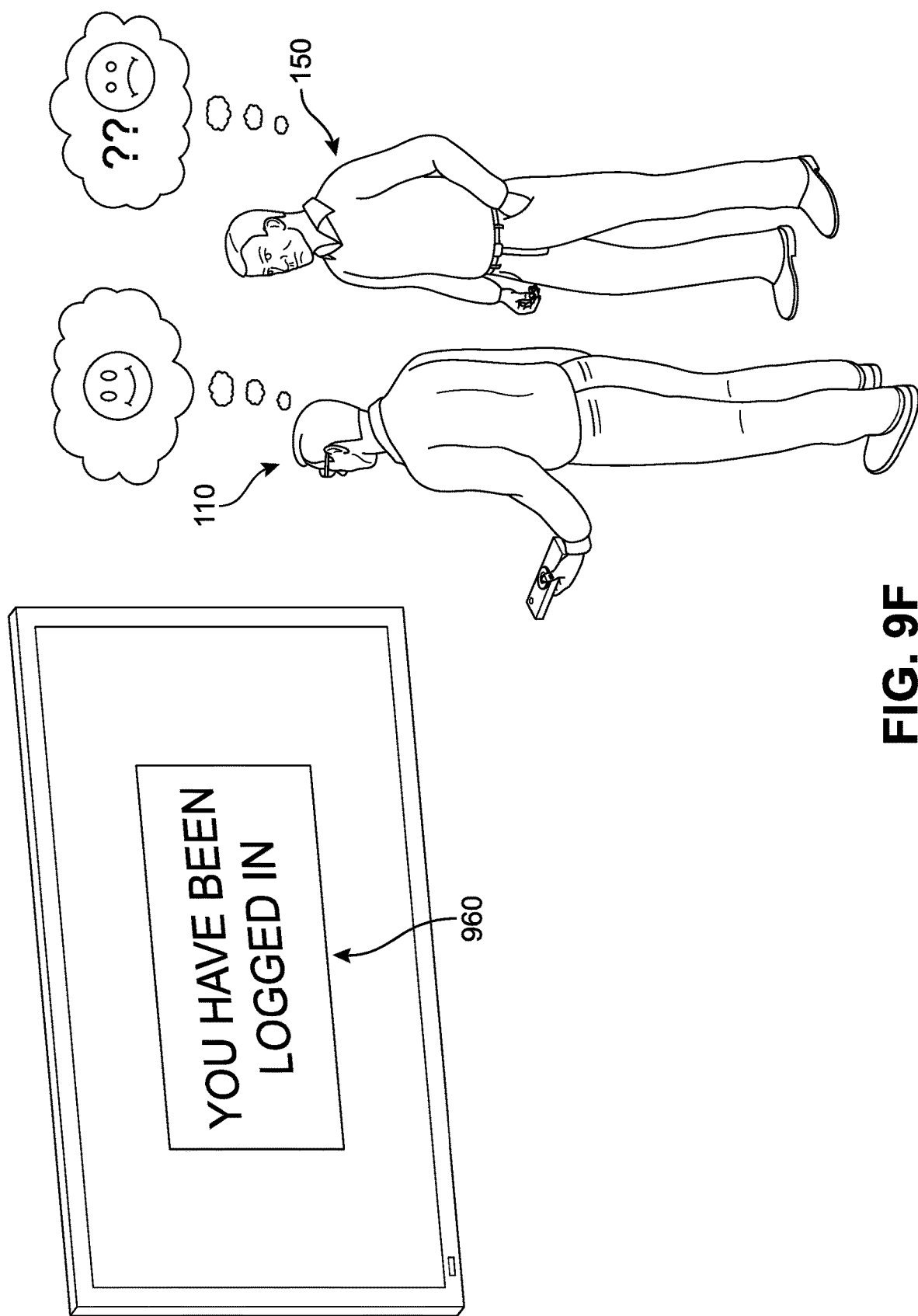

In addition, as described for the tenth stage 768 in FIG. 7, the user can then submit an actuation command resulting in the accumulated sequence of characters "BLUE" being submitted as the sensitive information. An example of a possible system response is depicted in FIG. 9F, where the first user 110 is informed of a successful log-in event via a message 960, while the observer 150 remains ignorant of the content of the sensitive information.

Figure 10:
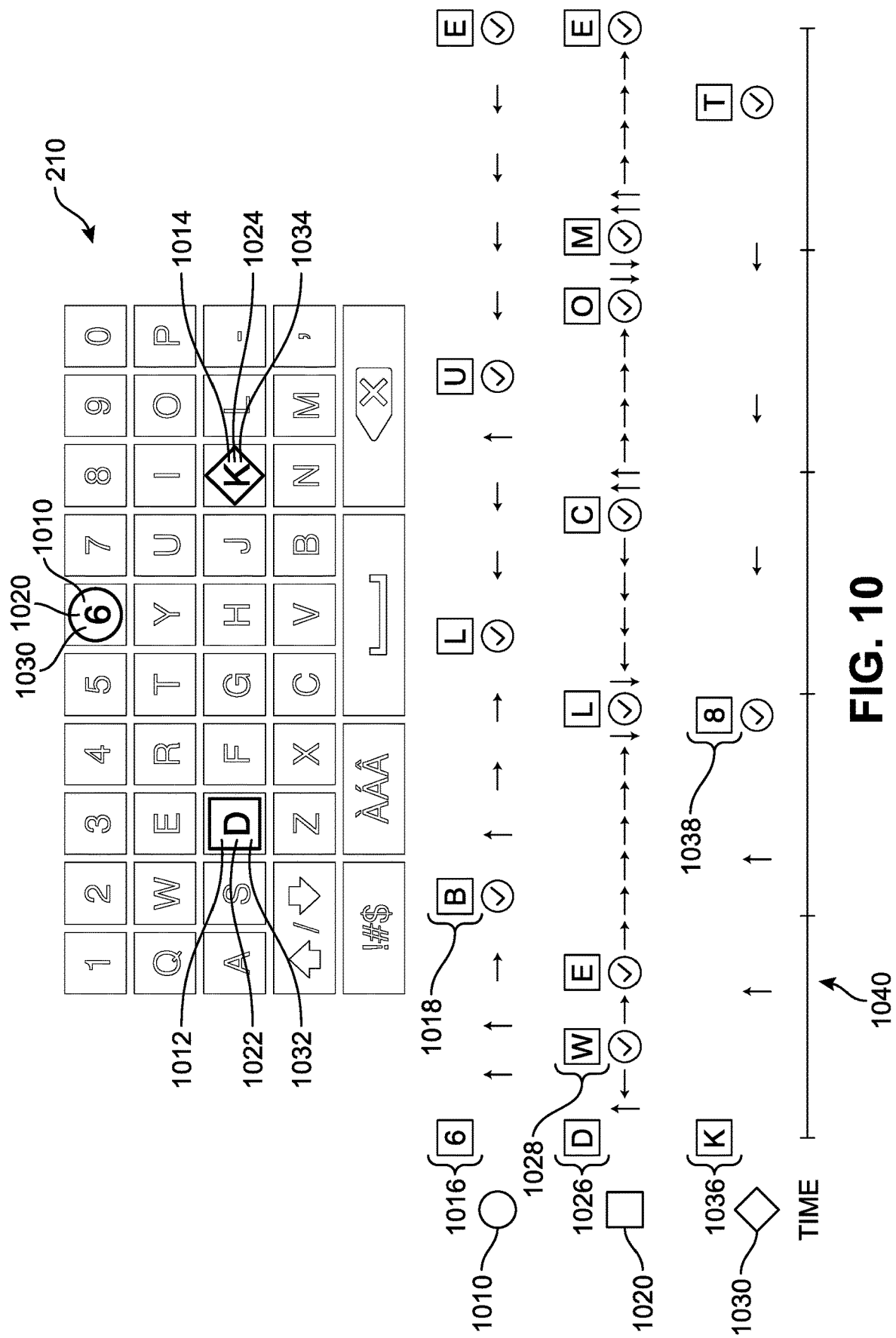
FIG. 10 illustrates a second interface in which the current user target and current distractor targets are depicted over a period of time.

In some implementations, the simulated navigation of the distractor can occur at varying speeds and/or patterns. In FIG. 10, the second interface 210 is presented, including a current user target 1010 (corresponding to a first target 1020 "6"), a first current distractor target 1012 (corresponding to a second target 1022 "D"), and a second current distractor target 1014 (corresponding to a third target 1024 "K"). In this case, each of the targets are associated with visual indications. For example, the current user target 1010 includes a first visual indication 1030 (represented as a circle overlaid on or around the target area), the first current distractor target 1012 includes a second visual indication 1032 (represented as a square overlaid on or around the target area), and the second current distractor target 1014 includes a third visual indication 1034 (represented as a diamond overlaid on or around the target area). In other implementations, the visual indications may be the same. In different implementations, the selection of initial current targets may be a random process. In addition, in some implementations, the visual indications may be randomly assigned or generated for each of the current targets. For example, in FIG. 10, the (initial) current user target 1010 is "6" while in FIG. 9A the (initial) current user target 910 was "D". Similarly, the initial current distractor targets can be randomly selected for each user input session.

Referring back to FIGS. 9A-9E, it should be understood that in some implementations, a current distractor target can perform virtual commands simulating user commands synchronously with the user commands received from the actual user. However, in other implementations, as reflected in FIG. 10, current distractor targets may operate asynchronously, in which their associated virtual commands are performed at times and/or with speeds different from those of the user commands. In the example shown in FIG. 10, over a 30 second period of time (see a time axis 1040), the user performs 17 user commands 1016 including four actuation commands corresponding to characters 1018 "B", "L", "U", and "E", much as described earlier. The first current distractor target 1012 on the other hand, during that same interval of time, performs 36 virtual commands 1026 including seven virtual actuation commands for letters 1028 "W", "E", "L", "C", "O", "M", and "E". In other words, the first current distractor target appears to be performing commands at a higher speed than the user. In contrast, the second current distractor target 1014, during the same interval of time, performs seven virtual commands 1036 including two virtual actuation commands for characters 1038 "8" and "T". During much of FIG. 10, the second current distractor target 1014 is maintained at a target while first current distractor target 1012 makes multiple movements. In other words, the second current distractor target appears to be performing commands at a lower speed than the user. In different implementations, the speeds may be assigned by a random process to each distractor, and/or the speeds for a specific distractor target may also vary over the performance interval. Although for convenience of illustration the user commands 1016 and the virtual commands 1026 and 1036 have been depicted as being performed at constant rates, it is understood that they may increase or decrease throughout the interval. Thus, by operating at varying or differing speeds, the system can further confound the efforts of an observer to keep track of the navigation and selections being performed by each of the current targets.

In different implementations, the obfuscation system may be configured to pre-select a series of targets to be actuated in advance by a current distractor target. In the example of FIG. 10, for the first current distractor target 1012, the sequence "WELCOME" was pre-selected. In some implementations, such pre-selections may be generated in whole or in part using a dictionary, such as a dictionary of frequently used passwords. By using sequences of characters that resemble actual passwords, the obfuscation becomes more robust against an observer that manages to successfully keep track of the selections performed for multiple current targets. In addition, in some implementations, the obfuscation system may pre-generate a navigation path for a distractor. These various options may be selected or combined in different ways to further reduce the predictability of the current distractor targets.

Figure 11:
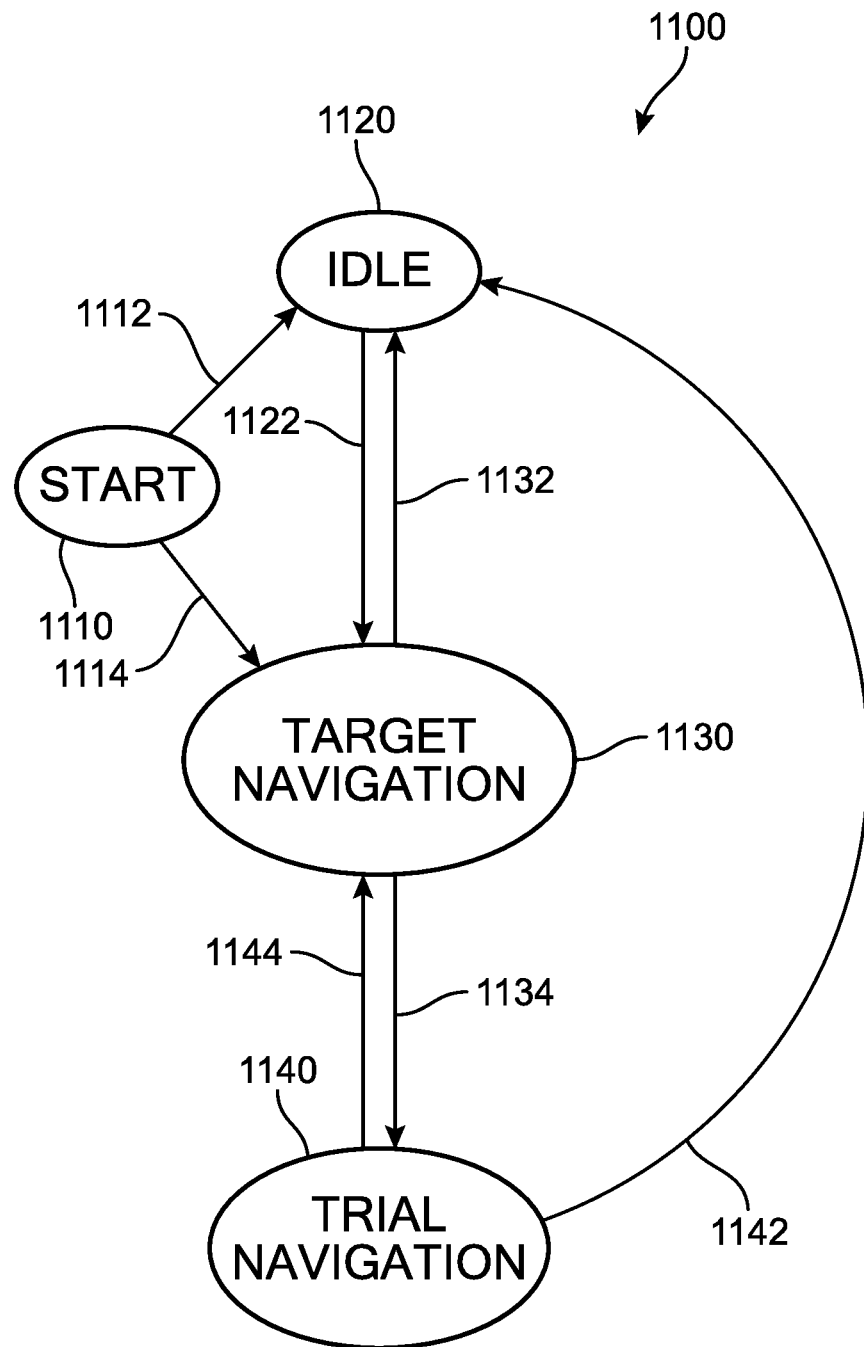
FIG. 11 illustrates an example in which an obfuscation system operates according to four states.

In some implementations, the obfuscation system may operate according to a plurality of states (which may be referred to as "operating states"). FIG. 11 illustrates an example in which an obfuscation system operates according to four states, including a first state 1110, a second state 1120, a third state 1130, and a fourth state 1140. The first state 1110 (labeled "START"), which may be referred to a "start state" corresponds to when an input interface is initially presented to a user. The obfuscation system, while in this start state 1110, may perform certain operations and/or set certain parameters that result in useful behavior when the user first starts interacting with an input interface. FIG. 11 illustrates two transitions 1112 and 1114 from the start state 1110 to other states. In some implementations, a timer may be used to determine when the obfuscation system may transition out of the start state 1110. If, after the timer has expired, the pointer is making little to no movement, the transition 1112 occurs from the start state 1110 to the second state 1120, which may be referred to as an "idle state". On the other hand, if more significant pointer movement is occurring at the expiration of the timer, the obfuscation system instead makes the transition 1114 from the start state 1110 to the third state 1130.

In the idle state 1120 (labeled "IDLE"), there is a transition 1122 to the third state 1130, which occurs when the pointer has performed a threshold amount of movement within a specified period of time. A transition 1132 from the third state 1140 back to the idle state 1120 can also occur if, for example, the pointer is making little to no movement after a timer has expired (i.e., once the pointer has failed to perform a threshold amount of movement within a period of time). The third state 1130 (labeled "TARGET NAVIGATION") corresponds to a state in which the obfuscation system has not yet determined whether the pointer is engaged in trial navigation corresponding to the fourth state 1140. FIG. 11 also illustrates a transition 1134 from the third state 1130 to the fourth state 1140, which occurs when the obfuscation system, based on recent pointer movement, classifies that movement as being performed for a trial navigation assessment. As will be discussed below, in some implementations, such classifications may be performed with the aid of one or more machine-trained models.

In the fourth state 1140 (labeled "TRIAL NAVIGATION"), the obfuscation system has determined that a user is engaged in a trial navigation assessment and is configured to move one or more distractor pointers according to synthetic trial navigation assessments. In some implementations, the synthetic trial navigation assessments result in the pointer moving in a manner that is distinct from the movements being performed by the user to facilitate the user quickly and correctly identifying the user pointer from among multiple pointers. As shown in FIG. 11, a transition 1142 may occur from the fourth state 1140 to the idle state 1120. In some examples, this may occur once the pointer has failed to perform a threshold amount of movement within a period of time. Finally, in some implementations, a transition 1144 may occur from the fourth state 1140 to the third state 1130. In some examples, the transition 1144 may occur in response to the obfuscation system no longer classifying pointer movement as corresponding to a trial navigation assessment, determines that the user pointer is still actively moving, but is unable to classify the user pointer movement as target navigation behavior.

It is understood that although four states are shown in FIG. 11 and certain conditions for transitioning between the illustrated states are described here and elsewhere in this disclosure, the techniques described herein are not limited to the number of states shown, the activities performed in each of those states, and the various conditions used to transition between states. In some implementations, as described or suggested for some of the above states, one or more machine-trained models may be applied the obfuscation system to identify circumstances in which the obfuscation system will transition from a current state to a different state.

Figure 12A:
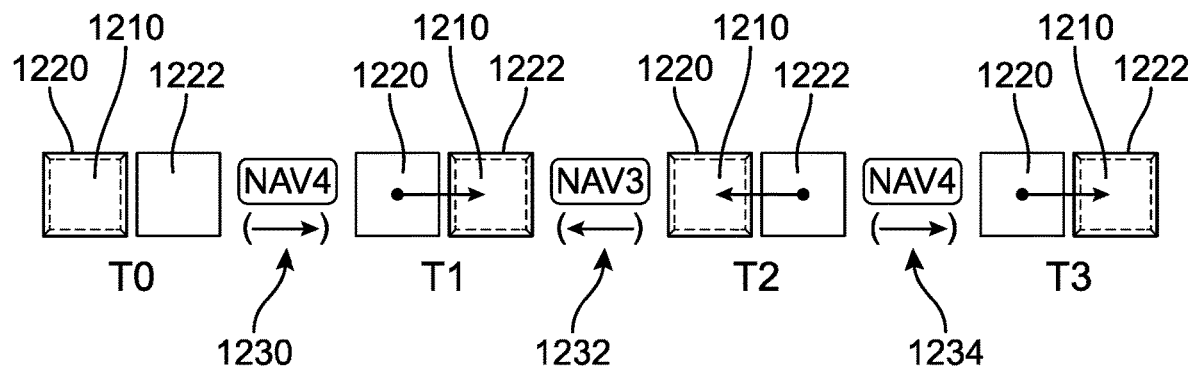
FIGS. 12A and 12B illustrate an example of two patterns that may occur during a trial navigation assessment.
Figure 12B:
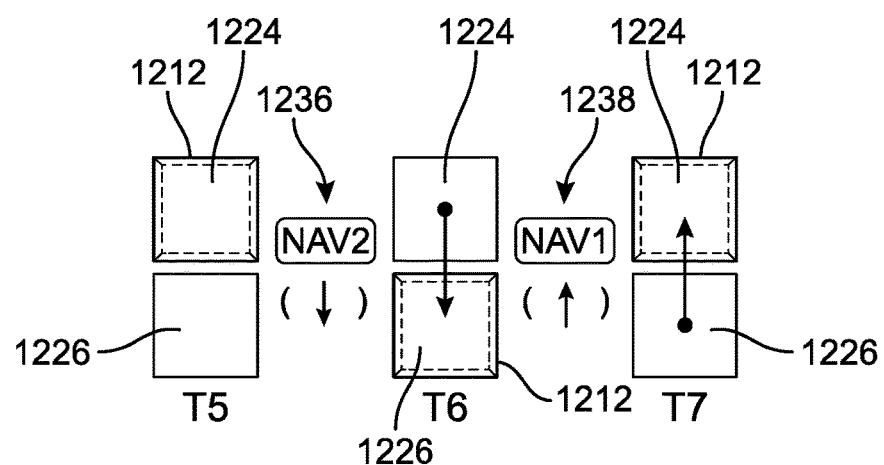

With the current user target and one or more current distractor targets being placed at random initial positions and, where different visual indications are applied, with randomly assigned visual indictors, a user will likely be uncertain as to which of the current targets corresponds to the user or is the current user target. Many users, when faced with this situation, will perform a trial navigation assessment to observe which current target moves according to which navigation commands submitted by the user. These trial navigation assessments often follow a number of common patterns, including but not limited an alternating between two neighboring targets. FIG. 12A shows one such example in which, as part of a trial navigation assessment, a current user target 1210 alternates back and forth (or left and right) between a first target 1220 and a second target 1222 in accordance with trial navigation commands 1230, 1232, and 1234, over a period of time represented by times T0, T1, T2, and T3. Similarly, in a second example presented in FIG. 12B, as part of another trial navigation assessment, a current user target 1212 alternates up and down between a first target 1224 and a second target 1226 in accordance with trial navigation commands 1236 and 1238, over a period of time represented by times T5, T6, T7.

In some implementations, the obfuscation system may be configured to identify when a user is performing a trial navigation assessment based on detection of a current user target immediately returning to its previous target location without an intervening actuation command, particularly when this is observed at a beginning or initial stage of the user input process. For example, with reference to FIG. 12A, at the time T1 the current user target 1210 moves from the first target 1220 to the second target 1222. Then, at time T2, the current user target 1210 returns to the first target 1220 that was its previous location. In response to this, the obfuscation system may determine that the user is performing a trial navigation assessment and, as a result, may be configured to navigate any current distractor targets in a manner that allows the user to more quickly distinguish them from the current user target 1210.

Figure 12C:
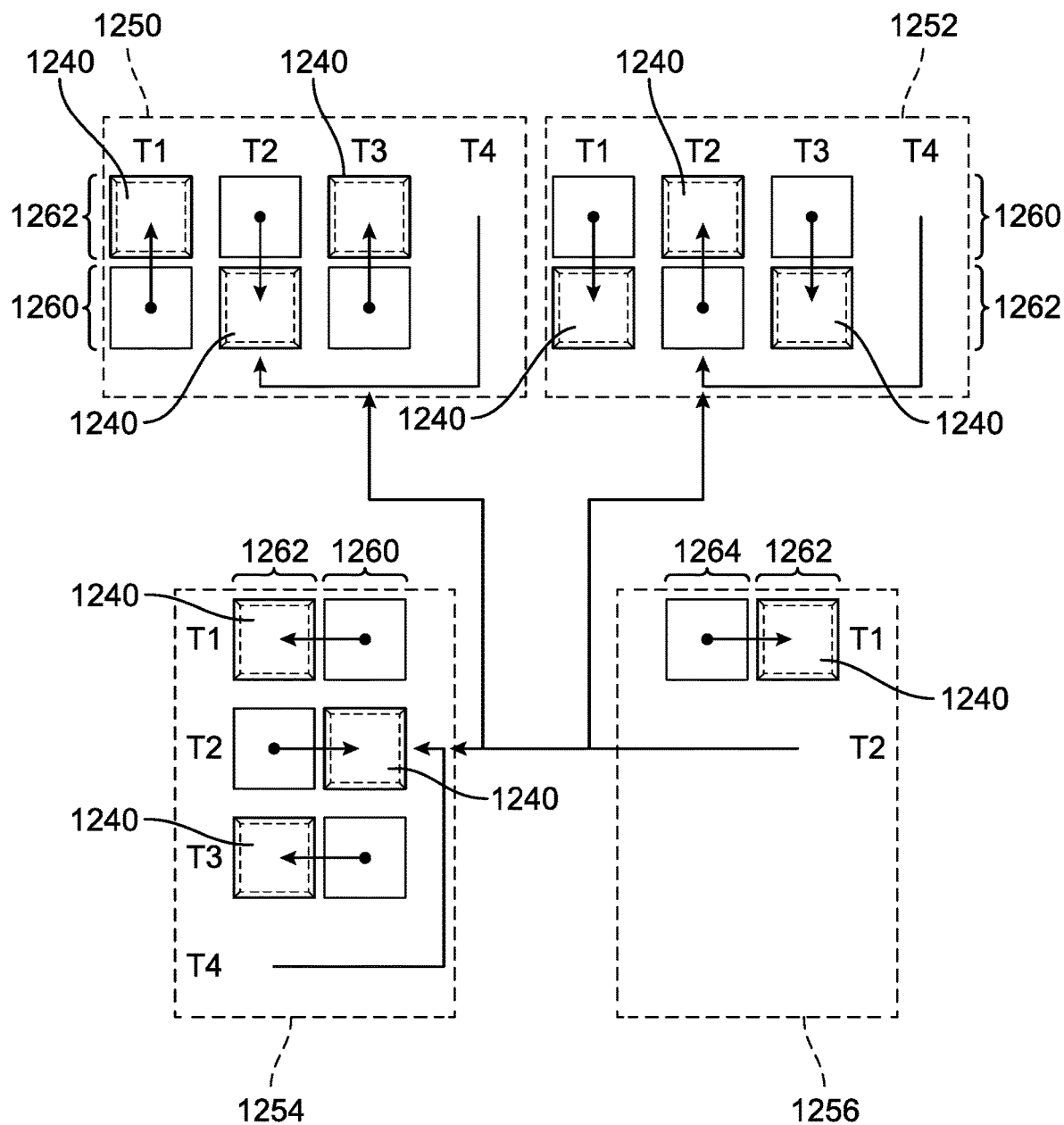
FIG. 12C illustrates an example of possible navigation for a current distractor target in response to a detection of a trial navigation assessment.

One example of such navigation in response to a detection of a trial navigation assessment is shown in FIG. 12C for a current distractor target 1240. Four scenarios including a first scenario 1250, a second scenario 1252, a third scenario 1254, and a fourth scenario 1256 are shown in FIG. 12C. In each of the three scenarios 1250, 1252, and 1254 the current distractor target 1240 has navigated from a fifth target 1260 to a sixth target 1262 at the time T1. In the first scenario 1250, the sixth target 1262 is above the fifth target 1260; in the second scenario 1252, the sixth target 1262 is below the fifth target 1260; and in the third scenario 1254, the sixth target 1262 is to the left of the fifth target 1260. In the fourth scenario 1256 the current distractor target 1240 has navigated from a seventh target 1264 to a sixth target 1262 at the time T1, with the sixth target 1262 being to the right of the seventh target 1264. In response to the detection of the user performing the trial navigation assessment at the time T2, the current distractor target 1240 begins performing a simulated trial navigation procedure by also alternating its position between the fifth target 1260 and the sixth target 1262 as shown in FIG. 12C for times T2 and T3 for the first scenario 1250, second scenario 1252, and third scenario 1254. However, in the fourth scenario 1256, the current distractor target 1240 will not be distinguishable from the current user target 1210 if it simply returns to its starting position at the seventh target 1264. Instead, for the fourth scenario 1256, at the time T2, the current distractor target 1240 begins to follow the movement patterns shown for the first scenario 1250, second scenario 1252, and third scenario 1254. From that point, as long as the user continues to alternate their position between two targets, the current distractor target 1240 will as well, as shown for the time T3 and at the time T4 when the virtual procedure returns to the arrangement shown for the time T2. Thus, regardless of the last virtual navigation performed by the current distractor target 1240, it will also appear to be performing trial navigation assessment but in a manner that does not correspond to the navigation commands being submitted by the user, allowing the user to very quickly identify which of the current targets is the real current user target 1210.

Figure 13A:
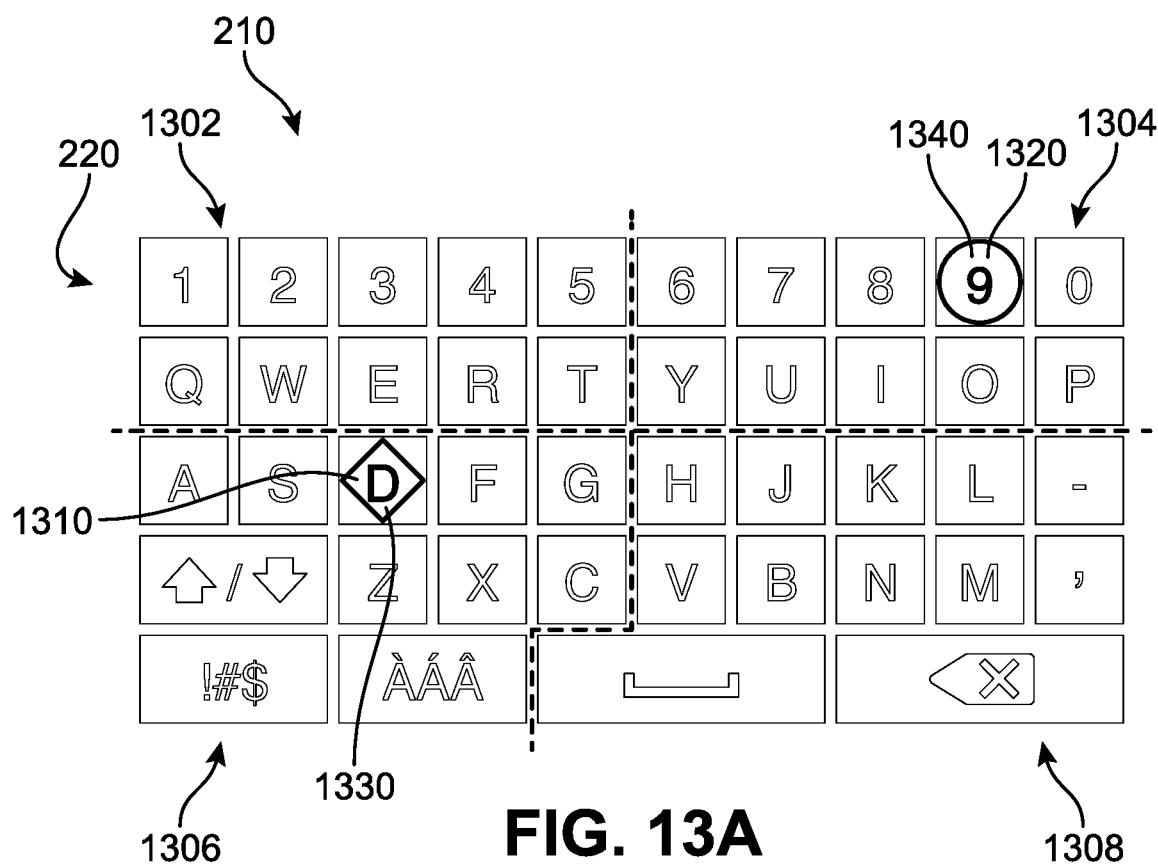
FIGS. 13A, 13B, and 13C illustrate an example of navigation of a current distractor target configured to respond to user navigation by maintaining a distance from the current user target.
Figure 13B:
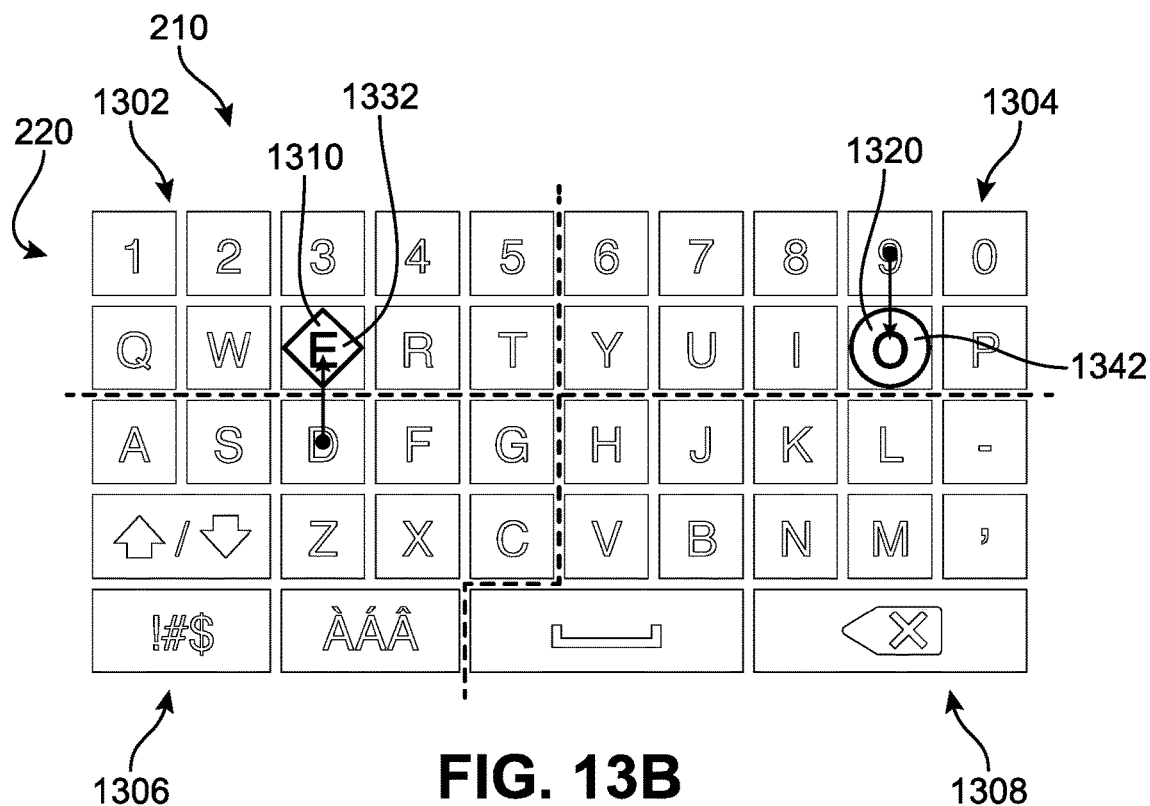
Figure 13C:
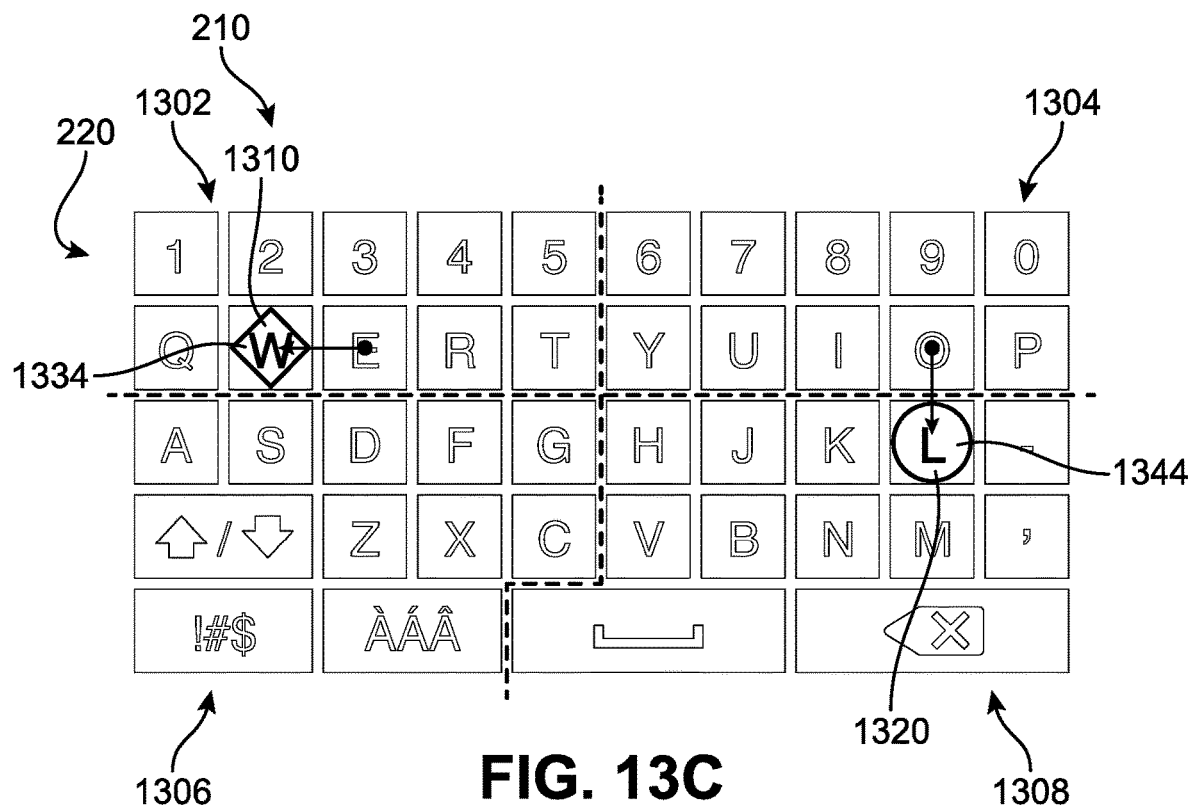

Navigation of a current distractor target can respond to user navigation in various other ways. FIGS. 13A, 13B, and 13C illustrate one such example in which, while a user is traveling to an option, the current distractor target is navigated to maintain a distance from the current user target. FIG. 13A illustrates an initial state of the sequence of target positions in which a current user target 1310 is at a first target 1330 ("D") and a current distractor target 1320 is at a second target 1340 ("9"). In this particular example, navigation of the current distractor target 1320 is controlled according to a first algorithm in which the first plurality of targets 220 of the second interface 210 are divided into four separate quadrants 1302, 1304, 1306, and 1308. As shown in FIG. 13A, an upper left quadrant 1302 includes ten targets, an upper right quadrant 1304 also has ten targets (including second target 1340), a lower left quadrant 1306 includes eleven targets (including first target 1330), and a lower right quadrant 1308 includes twelve targets. The first algorithm is configured to, in response to the current user target 1310 navigating from one quadrant into a different quadrant, navigate the current distractor target 1320 to a diagonally opposite quadrant. For example, in FIG. 13A, the current user target 1310 and the current distractor target 1320 are already in diagonally opposing quadrants 1306 and 1304. As a result, the current distractor target 1320 may be navigated according to an additional algorithm due to the condition sought by the first algorithm being satisfied.

In FIG. 13B, the current user target 1310 navigates to a third target 1332, resulting in the current user target 1310 moving from the third quadrant 1304 into the first quadrant 1302. Due to this, the condition sought by the first algorithm is no longer satisfied, and as a result, navigation of the current distractor target 1320 will proceed according to the first algorithm toward the fourth quadrant 1308 diagonally opposite to the first quadrant 1302. This cannot be performed in a single step, so in FIG. 13B, the current distractor target 1320 moves downward toward the fourth quadrant 1308 into a fourth target 1342.

In FIG. 13C, the current user target 1310 navigates to a fifth target 1334, and remains in the first quadrant 1302. As the condition sought by the first algorithm is still not satisfied, navigation of the current distractor target 1320 continues according to the first algorithm, resulting in the current distractor target 1320 again navigating downward to a sixth target 1344. This results in the current distractor target 1320 now being in the fourth quadrant 1308, thereby satisfying the conditions sought by the first algorithm.

It is understood the first algorithm shown with reference to FIGS. 13A-13C is one of many possible algorithms that may be used in response to user navigation. Navigation of distractor targets can proceed according to combinations of algorithms, and/or the algorithms can vary over time.

Figure 14A:
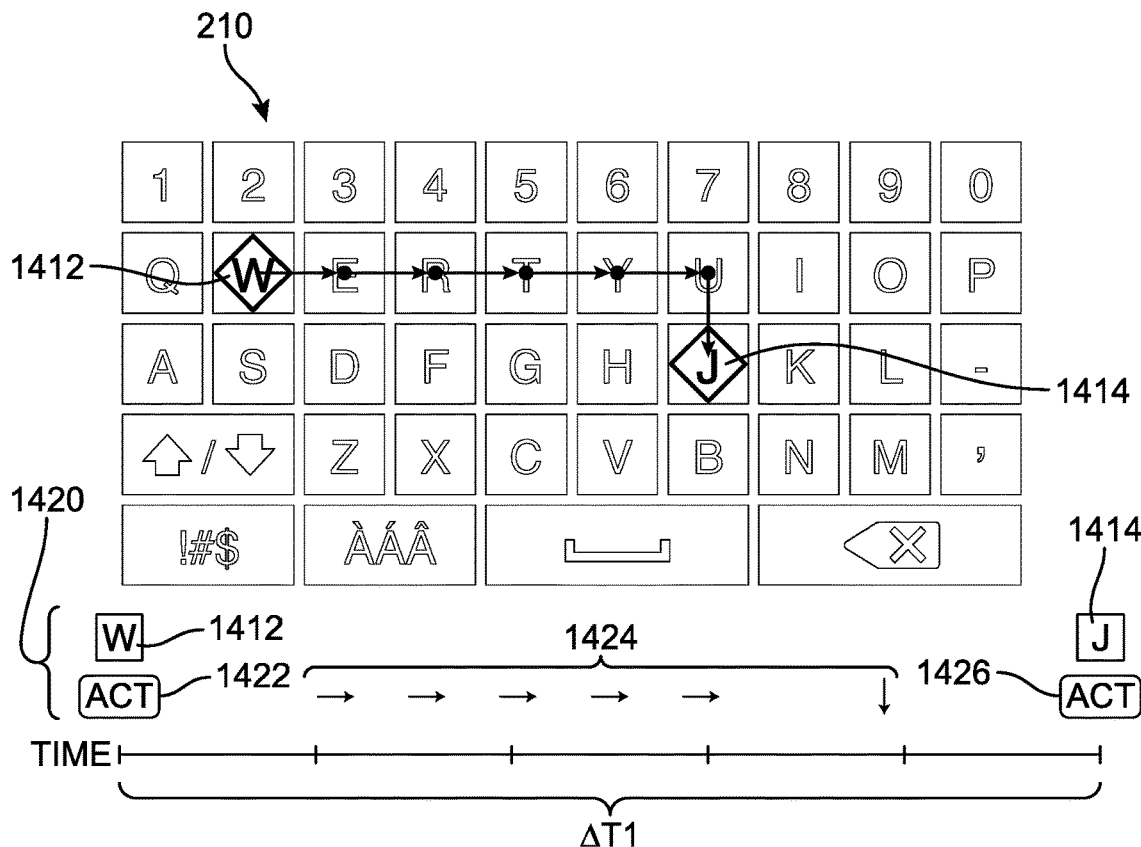
FIGS. 14A and 14B illustrate examples of user navigation sequences used to generate one or more virtual navigation models.
Figure 14B:
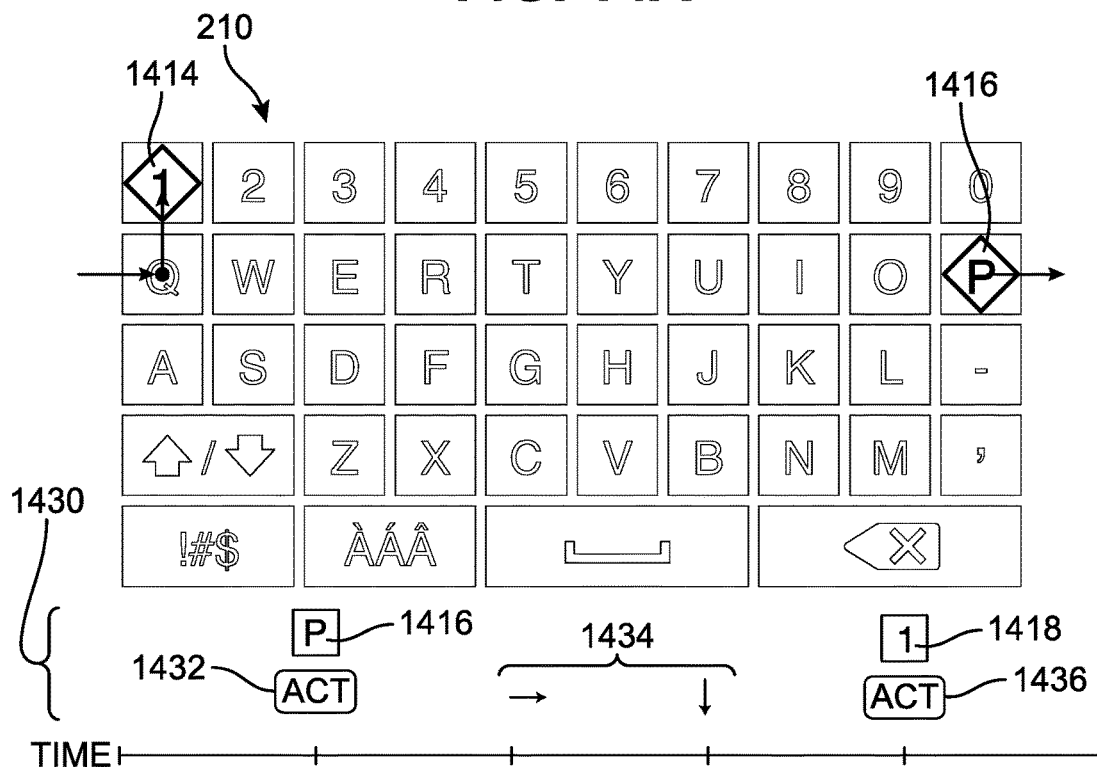
Figure 14C:
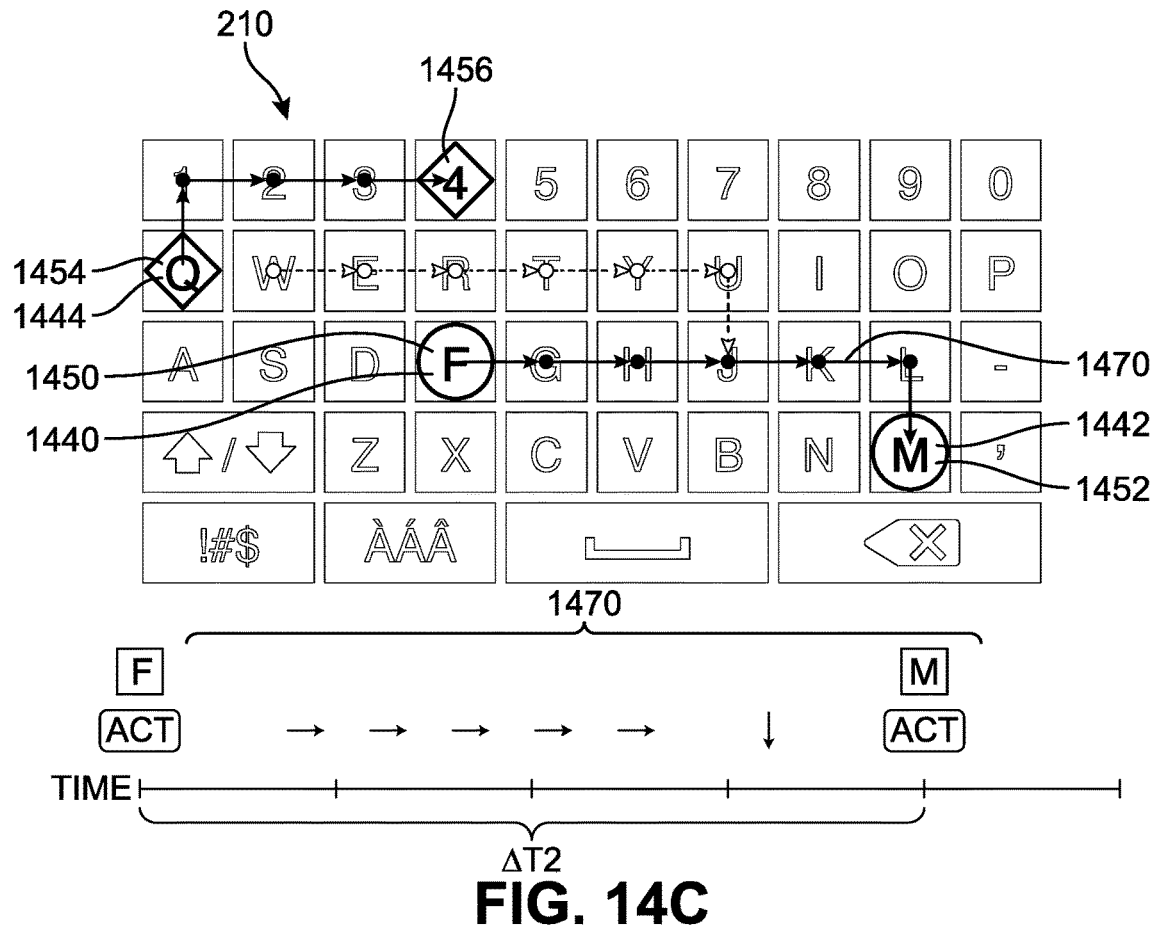
FIGS. 14C and 14D illustrate examples in which the generated virtual navigation models are applied to generate sequences of virtual navigation commands.
Figure 14D:
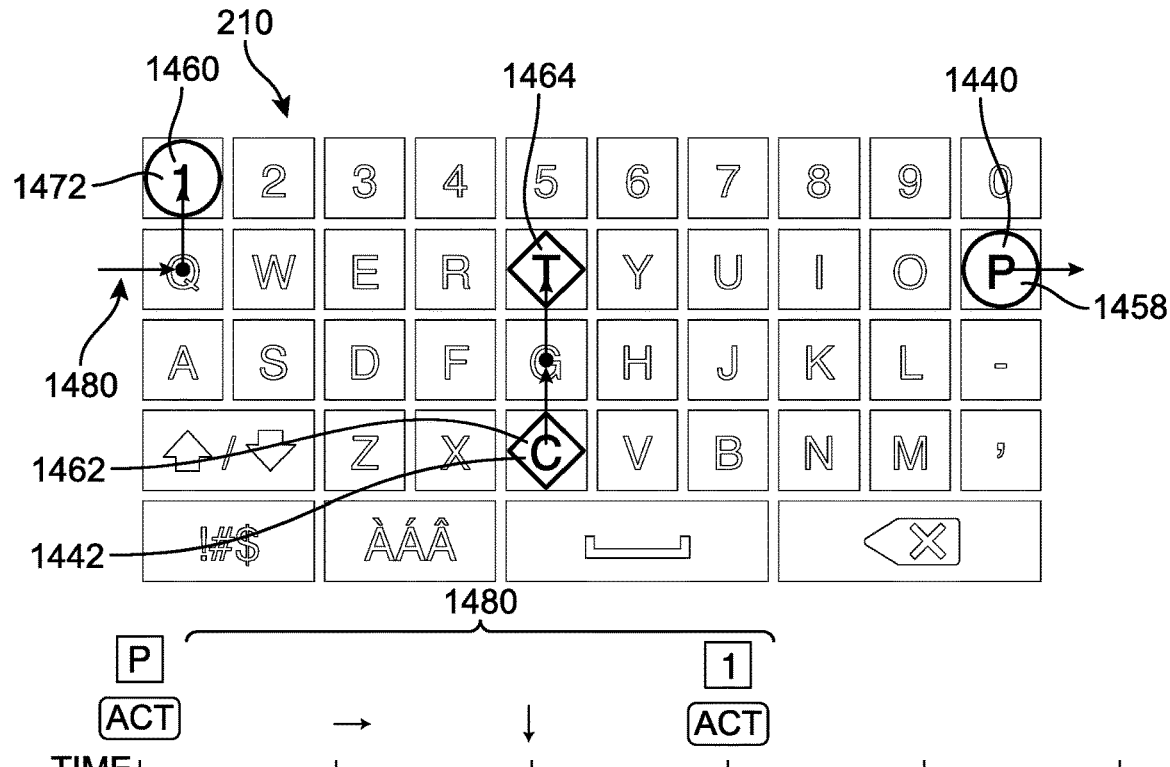

In some implementations, the obfuscation system is configured to apply one or more virtual navigation models generated based on observed and measured human navigation behavior, resulting in synthesized navigation of current distractor targets that is consistent with human navigation. FIGS. 14A and 14B illustrate examples of user navigation sequences used to generate one or more virtual navigation models and FIGS. 14C and 14D illustrate examples in which the generated virtual navigation models are applied to generate sequences of virtual navigation commands and, in some examples, also determine timings for those virtual navigation commands. Referring first to FIG. 14A, a user is shown submitting a first sequence of user commands used to navigate from a first target 1412 ("W") to a second target 1414 ("J"). The user commands include a first selection command 1422 followed by a sequence of six navigation commands 1424, which are then followed by a second selection command 1426, which collectively will be referred to as a first user pattern 1420 which then may be used for producing one or more of the navigation models. Similarly, in FIG. 14B, a user is shown submitting a different, second sequence of user commands used to navigate from a third target 1416 ("P") to a fourth target 1418 ("1"), in this case as a result of a wrap-around mechanism (see FIG. 5B). The user commands in this case include a third selection command 1432, followed by a sequence of two user commands 1434, which are then followed by a fourth user command 1436, which collectively will be referred to as a second user pattern 1430 and can be used to produce one or more navigation models. In some implementations, two or more user patterns can be used by the system to generate a navigation model. It is noted that the virtual navigation models may be generated based on observation of patterns for a specific (one) user or for a group of users (multiple patterns from many users). In some implementations, a generalized navigation model may be produced from a large number of user patterns collected from a large number of users. In addition, in some implementations, there may be a user specific navigation model generated based on the patterns observed for an individual user. The user specific model may be incomplete in comparison to the generalized navigation model and accordingly applied only in instances where a useful model has been generated for a specific circumstance or scenario.

FIGS. 14C and 14D illustrate examples in which one or more navigation models generated based on the first user pattern 1420 and the second user pattern 1430 of FIGS. 14A and 14B are applied for navigating a current distractor target. In FIG. 14C, the obfuscation system has identified a fifth target 1452 ("M") as an endpoint target 1442. Initially the current distractor target 1440 is at a sixth target 1450 ("F"). Based on the current distractor target 1440 and the endpoint target 1442 application of a navigation model produces a virtual navigation sequence 1470 that follows the overall navigation pattern of the first user pattern 1420 (i.e., a first horizontal distance of the virtual navigation sequence 1470 matches a second horizontal distance of the first user pattern 1420 and a first vertical distance of the virtual navigation sequence 1470 matches a second vertical distance of the first user pattern 1420), even while the pattern as a whole is offset relative to the first user pattern 1420. In other words, the virtual navigation sequence 1470 follows the same sequence of movements as the first user pattern 1420. In some implementations, as shown by the example of FIG. 14C, the current distractor target 1440 may operate asynchronously as discussed previously with reference to FIG. 10. For example, the virtual navigation sequence 1470 moves at a rate that is faster than the rate at which the first user pattern 1420. Thus, over a period of time T2 a current user target 1444 navigates five steps or commands to move from a seventh target 1454 ("Q") to an eighth target 1456 ("4"), while the current distractor target 1440 performed seven commands. Additionally, the seven commands are performed within a period of time T2 that is only about 60% of a corresponding period of time T1 for the first user pattern 1420. Durations between individual commands observed from the first user pattern 1420 may be used and scaled according to a desired speed for the current distractor target 1440.

Referring next to FIG. 14D the obfuscation system has identified a ninth target 1460 ("1") as an endpoint target 1472. Initially the current distractor target 1440 is at a tenth target 1458 ("P"). Based on the current distractor target 1440 and the endpoint target 1472 application of a navigation model produces a virtual navigation sequence 1480 that follows the same navigation pattern of the second user pattern 1430, such that they each have the same initial target and the same endpoint target. In other words, the virtual navigation sequence 1480 follows the same sequence of movements as the second user pattern 1430 that occurs over the same targets and at same rate or over the same time period (i.e., the two are synchronous).

Figure 15A:
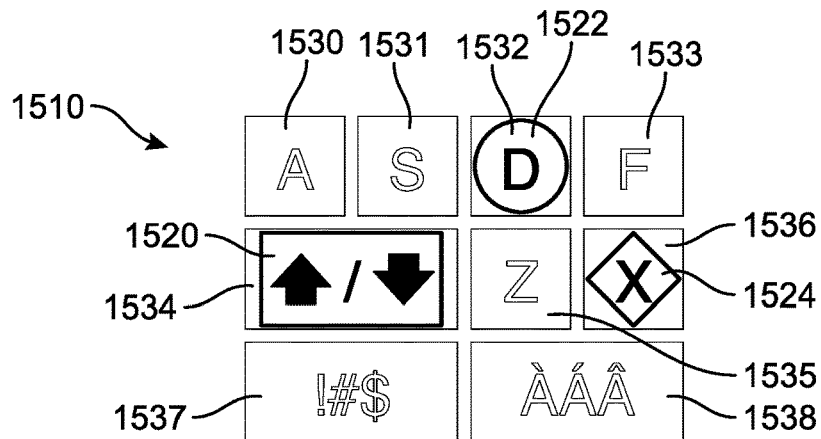
FIGS. 15A-15E illustrate an example in which multiple actions for respective modes of a target are concurrently displayed on an interface via transitions through different modes and navigation of a current user target and current distractor targets during each mode.

With reference to the multiple modes for the second interface 210 described previously in FIG. 8, in different implementations, it can be of great benefit to concurrently display multiple actions for respective modes of a target. This avoids a change in the mode signaling to an observer the position current user target. In FIG. 15A, an isolated view of a fifth portion 1510 is depicted, including a first target 1530 ("A), a second target 1531 ("S"), a third target 1532 ("D"), a fourth target 1533 ("F"), a first transition target 1534 (for changing between upper and lowercase character sets), a fifth target 1535 ("Z"), a sixth target 1536 ("X"), a second transition target 1537 (for entering and exiting a mode for presenting target options for symbol characters), and a third transition target 1538 (for entering and exiting a mode for presenting target options for multilingual characters).

Figure 15B:
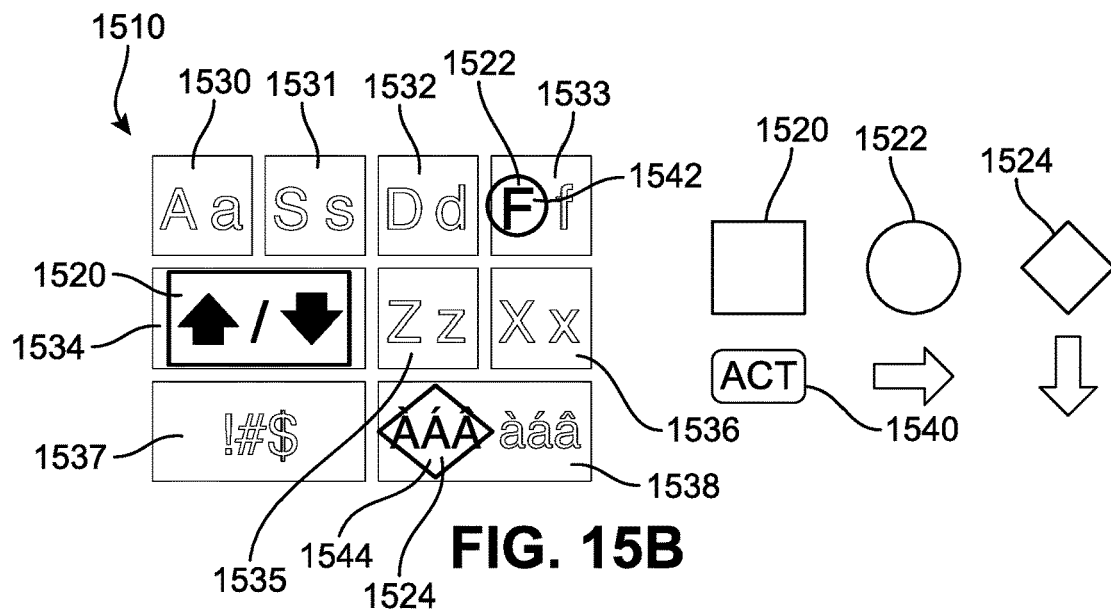

The isolated view of FIG. 15A represent an initial state in which a current user target 1520 is positioned at the first transition target 1534 and a first current distractor target 1522 is positioned at the third target 1532 and a second current distractor target 1524 is positioned at the sixth target 1536. Referring now to FIG. 15B, the obfuscation system receives a user activation command 1540 which actuates the first transition target 1534. This results in options for a second mode providing lowercase characters being available to the user (via the current user target 1520) while the first current distractor target 1522 and the second current distractor target 1524 are still operating according to the first mode shown in FIG. 15A. In other words, a single set of targets in which the options for both modes are displayed is presented, but the selection of an option by the current user target is directed to the second mode (access of lowercase characters) while a selection by either of the current distractor targets is directed to the first mode (access of uppercase characters).

Where targets have different actions for the modes associated with the current targets, the appearance of the targets is updated to identify all of the available actions for that target with those modes, as shown in FIG. 15B. Specifically, the first target 1530 has changed from displaying "A" to "A a", the second target 1531 from "S" to "S s", the third target 1532 from "D" to "D d", the fourth target 1533 from "F" to "F f", the fifth target 1535 from "Z" to "Z z", the sixth target 1536 from "X" to "X x", and the third transition target 1538 has changed from "ÀÁÂ" to "ÀÁÂ ààá". The first current distractor target 1522 has moved to the fourth target 1533 as seen in FIG. 15B. As a result of the fourth target 1533 displaying the two actions "F" and "f", a first visual indicator 1542 for the first current distractor target 1522 is reduced in size to only cover the region associated with the first mode ("F"). The second current distractor target 1524 has moved to the third transition target 1538 as seen in FIG. 15B. As a result of the third transition target 1538 displaying the two actions "ÀÁÂ and "ààá", a second visual indicator 1544 for the second current distractor target 1524 is reduced in size to only cover the region associated with the first mode ("ÀÁÂ").

Figure 15C:
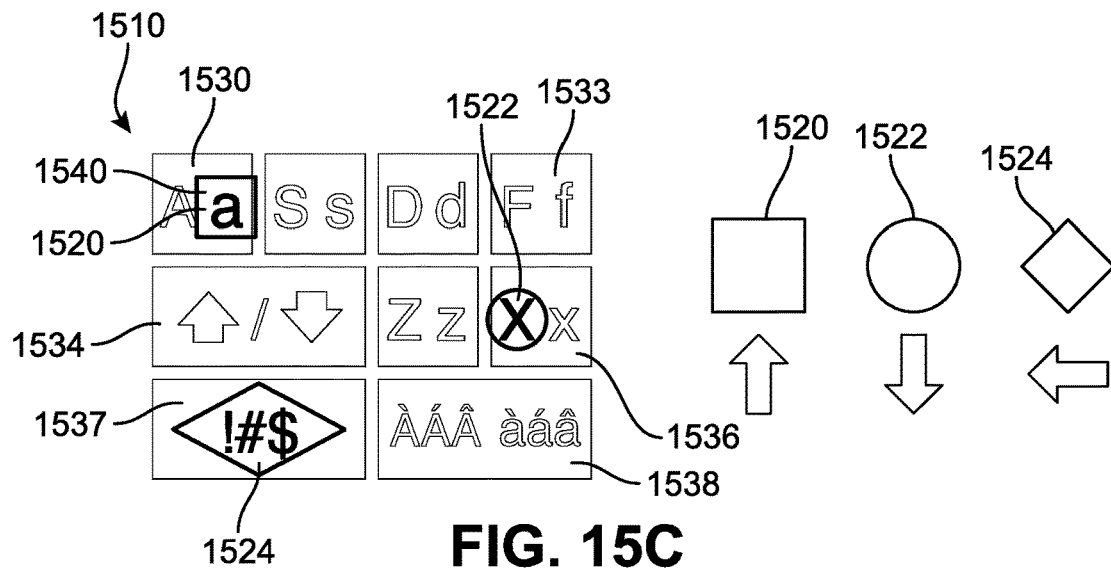

Referring now to FIG. 15C, the current user target 1520 has moved to the first target 1530. As a result of the first target 1530 displaying the two actions "A" and "a", a third visual indicator 1540 for the current user target 1520 only covers the region associated with the second mode ("a"), much as already described for the first current distractor target 1522 in FIG. 15B. The first current distractor target 1522 has moved to the sixth target 1536. In addition, the second current distractor target 1524 has moved to the second transition target 1537.

Figure 15D:
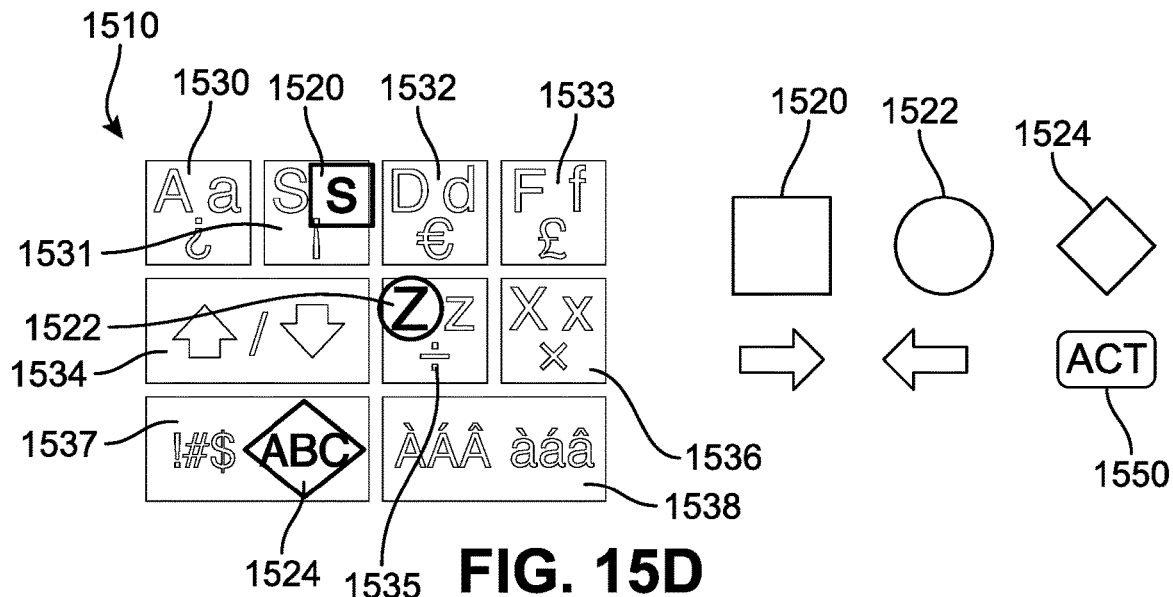

In FIG. 15D, the obfuscation system receives a virtual activation command 1550 for the second current distractor target 1524 which actuates the second transition target 1537. This results in options for a third mode providing symbol characters being available to the second current distractor target 1524. This occurs while the current user target 1520 is in the second mode and the first current distractor target 1522 remains operating according to the first mode. In other words, a single set of targets in which the options for all three modes are displayed is presented, but a virtual selection of an option by the second current distractor target 1524 is directed to the third mode.

Once again, where targets have different actions for the modes associated with the current targets, the appearance of the targets can be updated to identify all of the available actions for that target with those modes, as shown in FIG.

15D. Specifically, the first target 1530 has changed to further display "¿" (inverted question mark), the second target 1531 now also includes "¡" (inverted exclamation mark), the third target 1532 now also includes "€" (euro symbol), the fourth target 1533 now also includes "£" (pound symbol), the fifth target 1535 also has "÷" (division sign), the sixth target 1536 further includes "x" (multiplication sign), and the second transition target 1537 displays "!#$ ABC". The current user target 1520 has moved to the second target 1531. The first current distractor target 1522 has moved to the fifth target 1535.

Figure 15E:
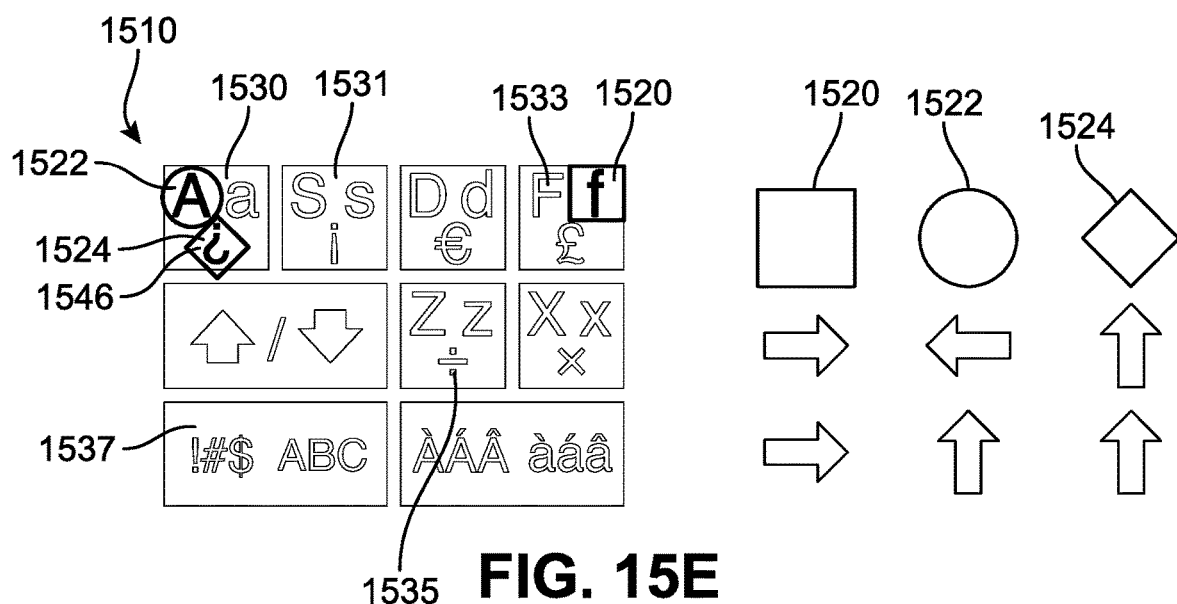

Furthermore, in FIG. 15E, the current user target 1520 has moved to the fourth target 1533, the first current distractor target 1522 has moved to the first target 1530, and the second current distractor target 1524 has also moved to first target 1530. In addition, the second current distractor target 1524 displays a third visual indicator 1546 and is reduced in size to only cover the region associated with the third mode ("¿").

Figure 16A:
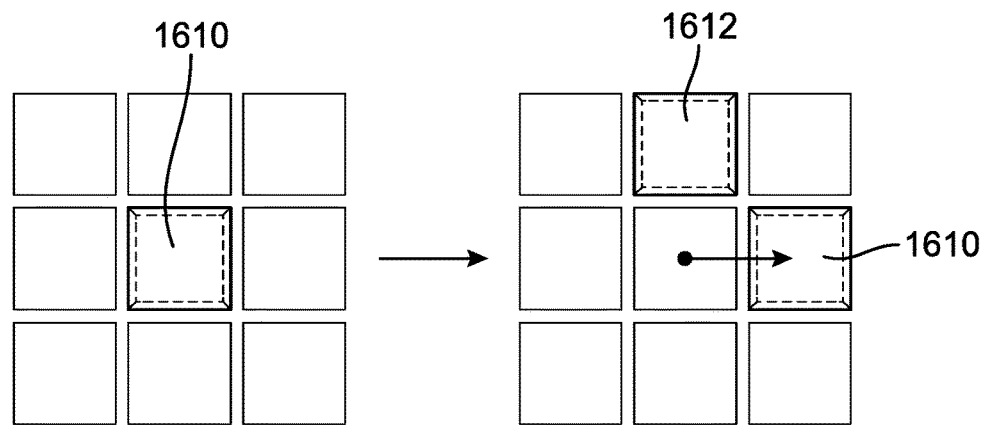
FIGS. 16A and 16B illustrate two examples of a current target that undergoes "splitting" when navigating.
Figure 16B:
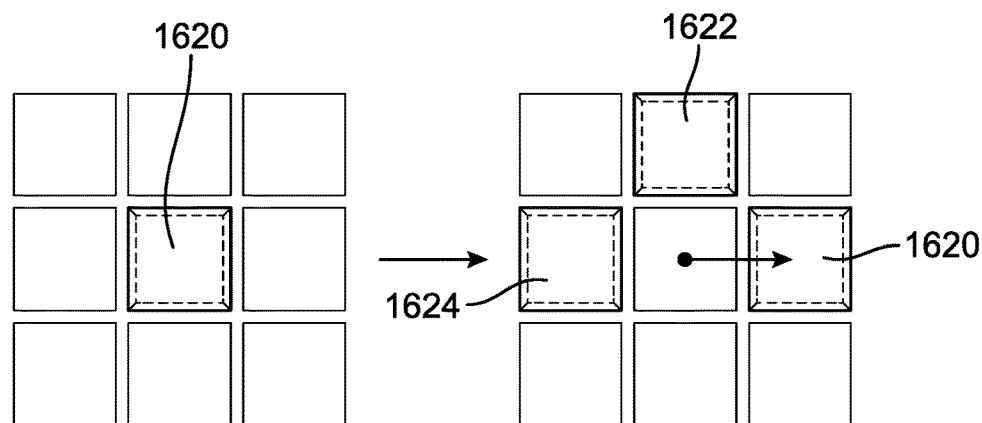
Figure 16C:
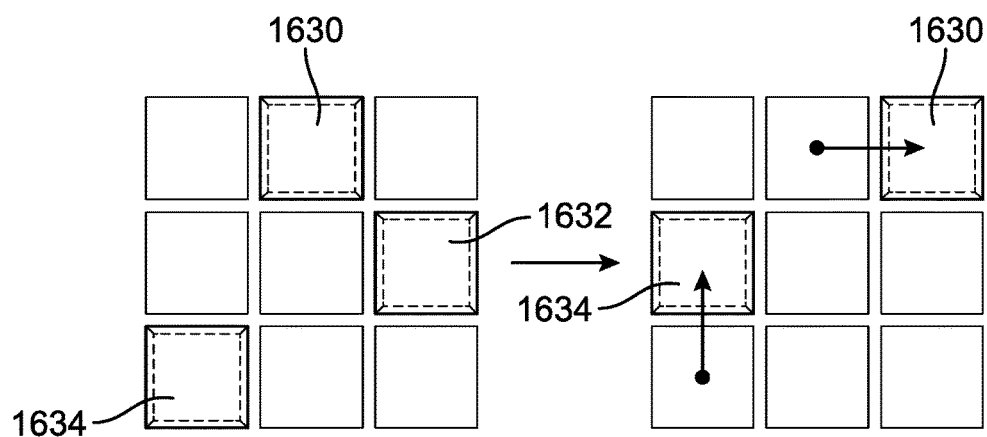
FIG. 16C illustrates an example of multiple current targets merging.

Referring now to FIG. 16A, an example of a first current target 1610 that "splits" when navigating, resulting in an additional second current target 1612 being produced. In this particular example, the first current target 1610 has moved to the right. In some implementations, the first current target 1610 is a current user target and the second current target 1612 is current distractor target. In some other implementations, both the first current target 1610 is a (first) current distractor target and the second current target 1612 is a (second) current distractor target. In FIG. 16B, a similar example of "splitting" is depicted in which two additional current targets 1622 and 1624 are produced. FIG. 16C shows a "merging" process in which two current targets (first current target 1630 and second current target 1632) appear to merge and the second current target 1632 is eliminated, leaving first current target 1630. In some implementations, the first current target 1630 is a current user target and the second current target 1632 is current distractor target. In some other implementations, both the first current target 1630 is a (first) current distractor target and the second current target 1632 is a (second) current distractor target. FIG. 16C also shows a third current target 1634. Accordingly, in FIG. 16C, the number of current targets has been reduced from three to two as a result of the "merging".

By displaying multiple current targets while a user is entering sensitive information, as described above in FIGS. 1-16C, an ability of an observer to identify which targets were activated by the user, and accordingly a content of the sensitive information, is greatly impaired. However, if the observer is able to observe the user's interactions with an input device, the observer may be able to successfully correlate the observed interactions with the actual current user target and determine a portion of the sensitive information. Conventional input techniques for touchscreen devices, where user input is provided through various touch-based interactions, are more easily observed than with a handheld remote input device. For example, directional taps on a touchscreen are readily discernable. Additionally, in situations in which a current target is displayed in close proximity to an area of touch-based input, this further simplifies the observer's attempts at correlating the two. To address such concerns, various implementations offering improved touch-based input techniques are described in connection with FIGS. 17-21B.

Figure 17:
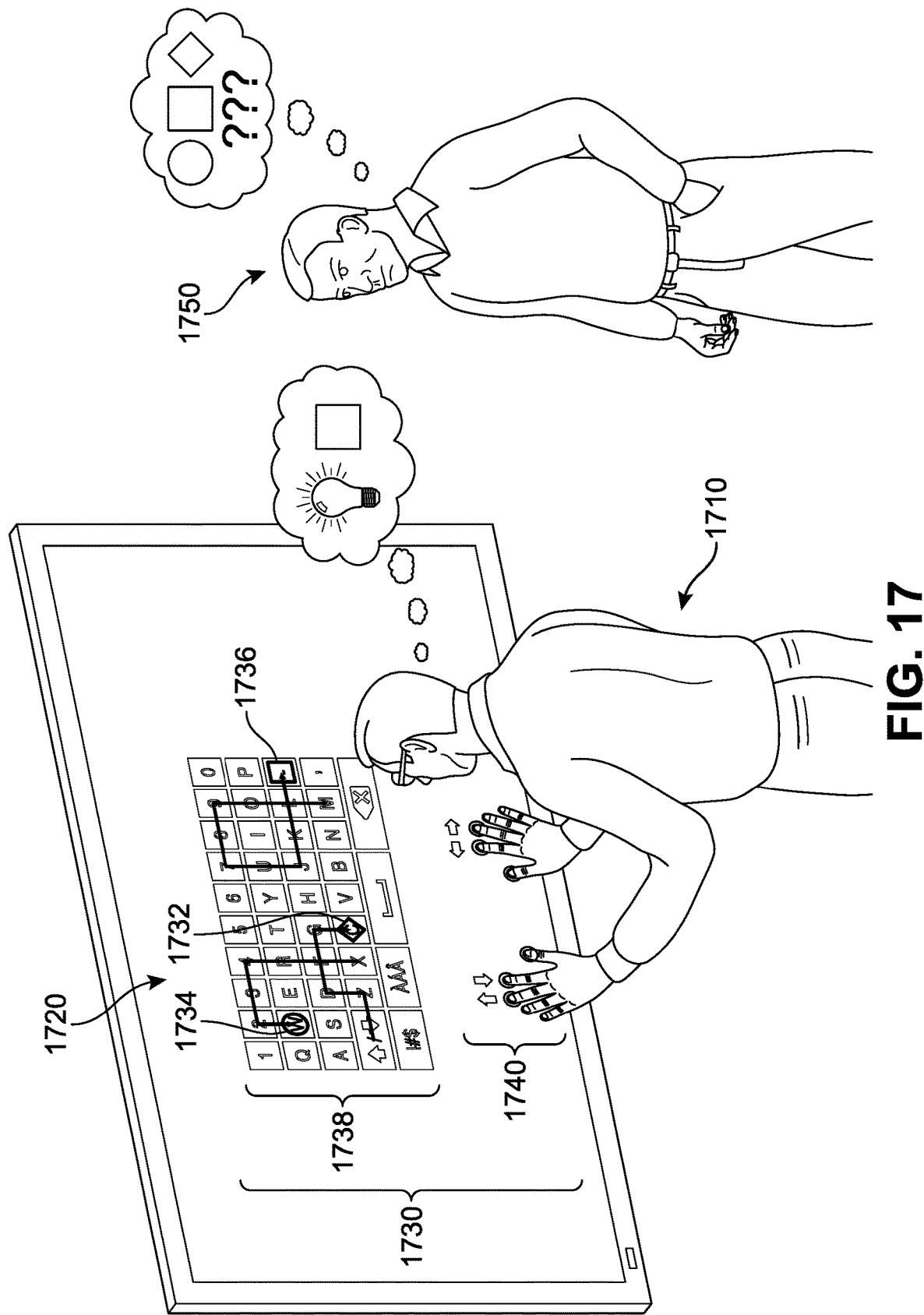
FIG. 17 illustrates an example of a second user positioned near a touchscreen display device while using an implementation of an obfuscation system.

FIGS. 17-19D illustrate examples of a first input technique 1700. FIG. 17 illustrates an example of a second user 1710 positioned near a touchscreen display device 1720. The touchscreen display device 1720 on which is displayed a third interface 1730 that includes a target display region 1738 as well as an input interface 1740, and is configured to permit the second user 1710 to input sensitive information (via the input interface 1740) for use by a computing device or associated systems. In some implementations, the third interface 1730 can present one or more options for selection by a user. In this case, the target display region 1738 is displaying three current targets, including a first current target 1732 (shown with a diamond shape), a second current target 1734 (shown with a circle), and a third current target 1736 (shown with a square). The second user 1710 is providing touch-based input using the touchscreen display device 1720 via input interface 1740 to provide user commands including navigation commands controlling the third current target 1736. In addition, a second observer 1750 is also present near the touchscreen display device 1720 and able to observe the interactions of the second user 1710 with the third interface 1730 including movements associated with the input interface 1740. However, despite being able to observe these interactions, the second observer 1750 remains unable to identify which of the three current targets is being used by the second user 1710.

Figure 18A:
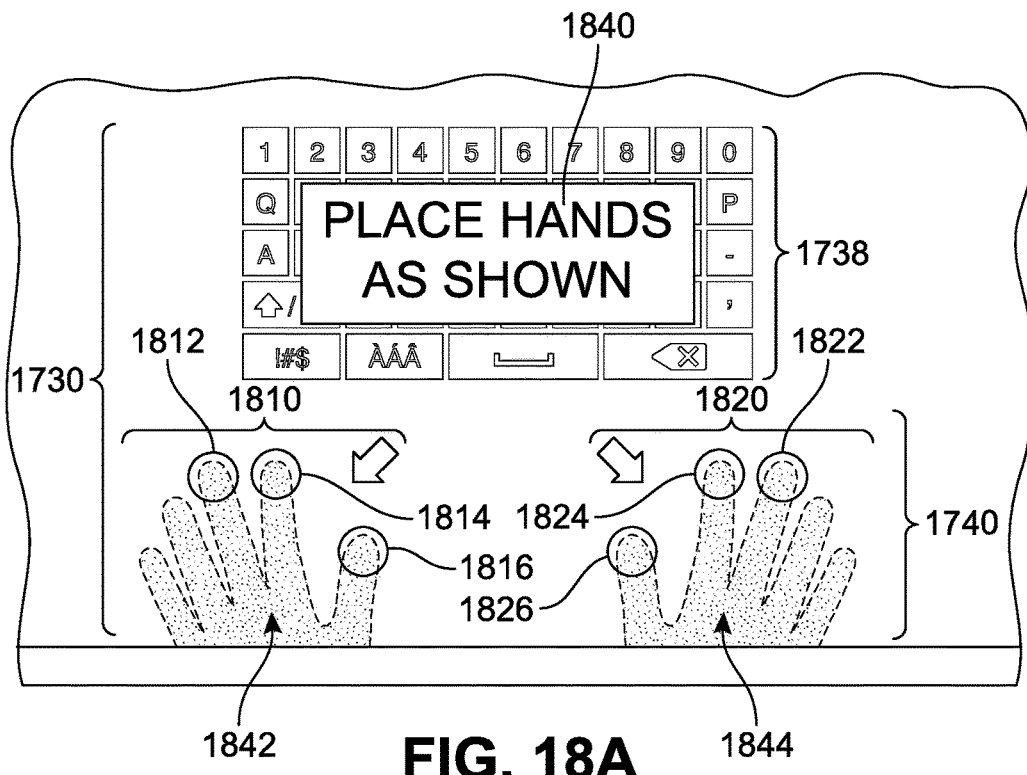
FIG. 18A illustrates an example of the input interface in an initial state.

In FIG. 18A, an isolated view of the third interface 1730 in which the input interface 1740 is shown in an initial state, prior to engagement by the second user. The input interface 1740 includes a first interaction region ("first region") 1810 and a second interaction region ("second region") 1820. In this case, the first region 1810 is intended for use by a left hand, and includes a first navigation input element 1812, a second navigation input element 1814, and a first user command input 1816. Similarly, the second region 1820 is intended for use by a right hand, and includes a third navigation input element 1822, a fourth navigation input element 1824, and a second user command input 1826.

In some implementations, as shown in FIG. 18A, the input interface 1740 displays visual guides to the user including a first visual guide 1840 offering textual instructions "Place hand as shown", a second visual guide 1842 in the form of a silhouette of a left hand, and a third visual guide 1844 in the form of a silhouette of a right hand. As indicated by the second visual guide 1842 and the third visual guide 1844, the two regions are intended for use by a user's digits. Thus, in this case, the second user 1710 is being instructed to place a left middle finger on the first navigation input element 1812, a left index finger on the second navigation input element 1814, and a left thumb on the first user command input 1816. Similarly, the second user 1710 is being instructed to place a right middle finger on the third navigation input element 1822, a right index finger on the fourth navigation input element 1824, and a right thumb on the second user command input 1826.

Figure 18B:
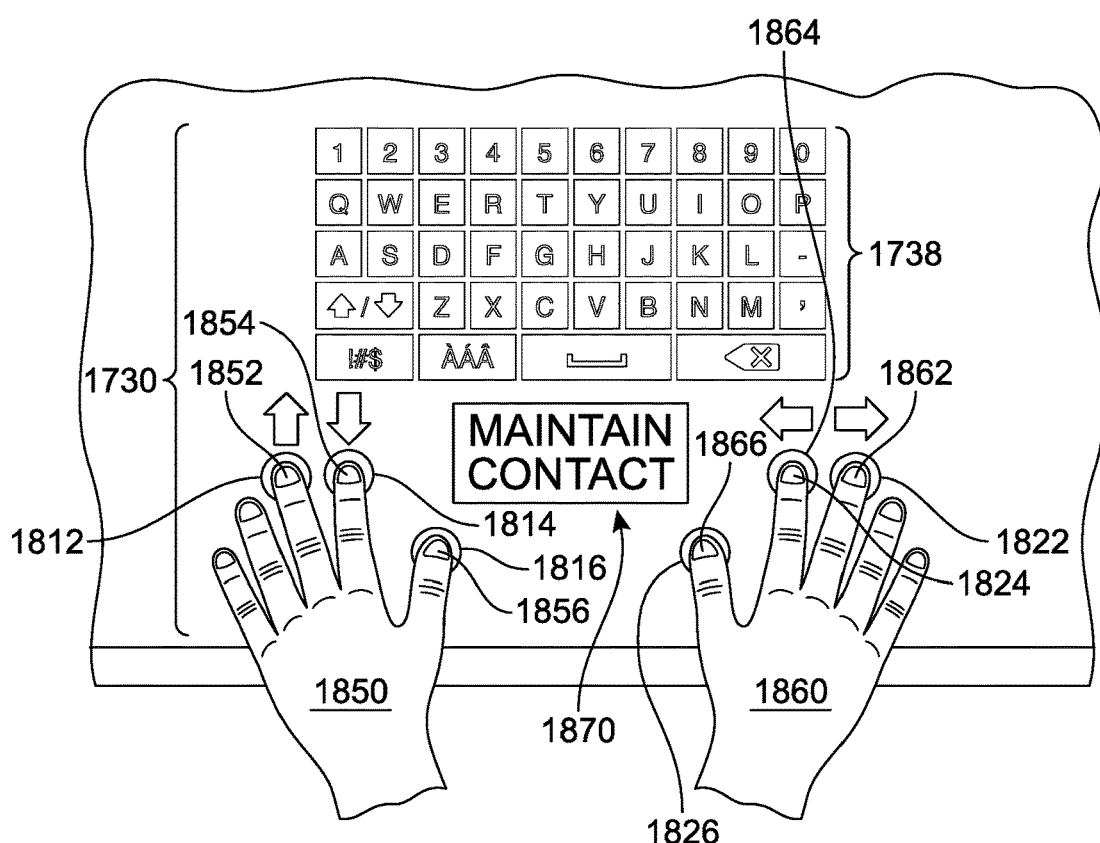
FIG. 18B illustrates an example of the input interface once a user has made contact with the touchscreen display.

In FIG. 18B, the second user 1710 has placed their left hand 1850 in contact with the first region 1810 and their right hand 1860 in contact with the second region 1820. On the user's left hand 1850, a left middle finger 1852 is in contact with the first navigation input element 1812, a left index finger 1854 is in contact with the second navigation input element 1914, a left thumb 1856 is in contact with the first user command input 1816. Similarly, on the user's right hand 1860, a right middle finger 1862 is in contact with the third navigation input element 1822, a right index finger 1864 is in contact with a fourth navigation input element 1824, and a right thumb 1866 is in contact with the second user command input 1826. In some implementations, further instructions can be provided to the user as they begin to initiate contact, such as a user guide 1870 "Maintain Contact". For example, there may be other visual indications of the user commands corresponding to actuation of a navigation input element. In some implementations, a "training mode" may be offered and invoked in which the user is provided detailed instructions for correct use of the input elements 1812, 1814, 1816, 1822, 1824, and/or 1826 and visual indications of input events detected during the training mode to improve user confidence outside of the training mode. In some implementations, the circles shown in FIG. 18B for the input elements 1812, 1814, 1816, 1822, 1824, and/or 1826 are not displayed to the user.

It is noted that the orientations and/or positions of any or all of the second visual guide 1842, the third visual guide 1844, and/or input elements 1812, 1814, 1816, 1822, 1824, and/or 1826 are displayed to the user as illustrative guidance but are not strictly required. In some implementations, orientations and/or positions of the input elements 1812, 1814, 1816, 1822, 1824, and/or 1826 are determined based on respective detections of contact with the touchscreen display device 1720. In some examples, orientations and/or positions input elements 1812, 1814, 1816, 1822, 1824, and/or 1826 may be changed over time in response to ongoing detections of contact with the touchscreen display device 1720. As a result, positions of hands 1850 and/or 1860 and/or digits 1852, 1854, 1856, 1862, 1864, and/or 1866 can rotate, shift, and scale, making the input interface 1740 much more comfortable to use.

Figure 19A:
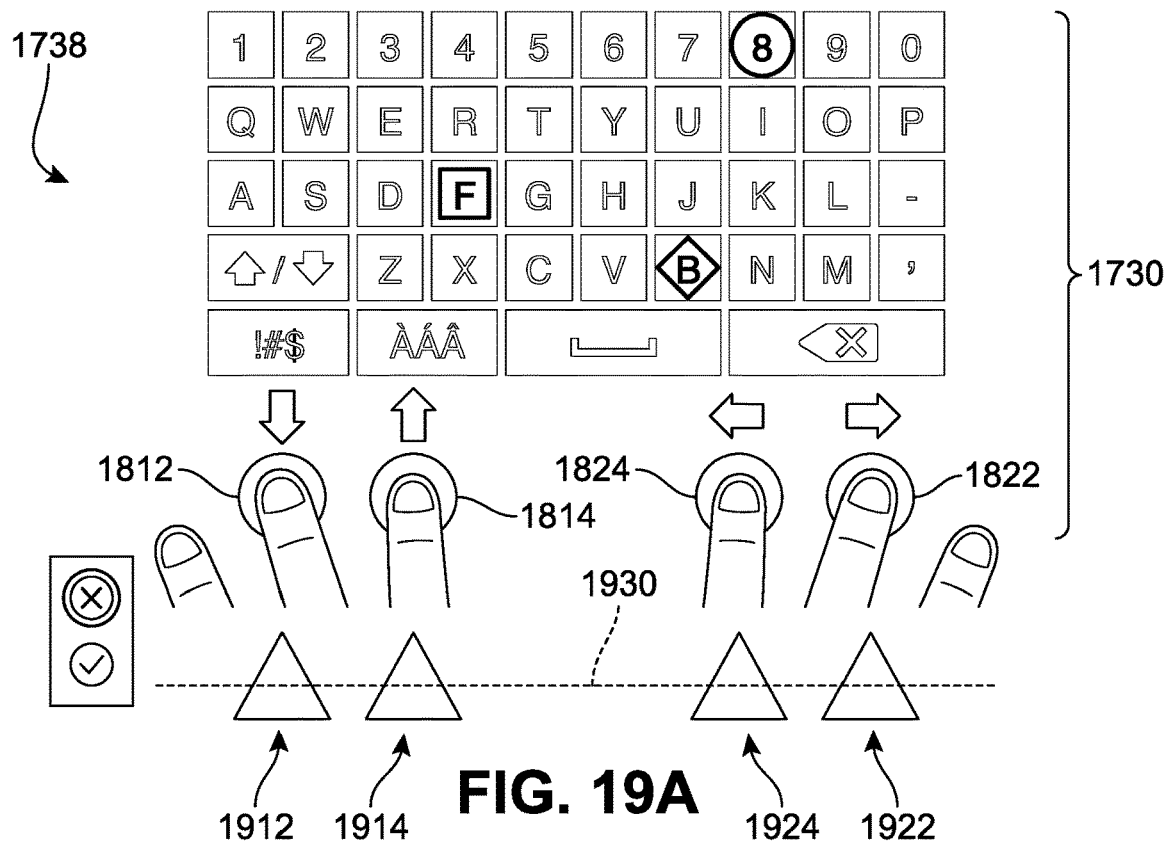
FIG. 19A illustrates an example of a third interface in which the input interface is in the initial state.

Referring now to FIG. 19A, a representation of the third interface 1730 is shown, where the input interface 1740 is depicted during its initial state (see FIG. 18A). The navigation input elements are symbolized by directional arrows, where the user is not yet in contact with the elements. Thus, the first navigation input element 1812 is represented with a first arrow (DOWN), the second navigation input element 1814 is represented with a second arrow (UP), the third navigation input element 1822 is represented with a third arrow (RIGHT), and the fourth navigation input element 1824 is represented with a fourth arrow (LEFT).

In addition, in the example shown in FIGS. 19A-19D, it can be understood that the touchscreen display device 1720 is force sensitive and capable of measuring amounts of force applied at multiple locations. For purposes of clarity for the reader, for each of the navigation input elements, there is also a respective force indicator shown (this may or may not be presented to the user). In this case, a first indicator 1912 is shown to indicate an amount of force being applied to the first navigation input element 1812, a second indicator 1914 is shown to indicate an amount of force being applied to the second navigation input element 1814, a third indicator 1922 is shown to indicate an amount of force being applied to the third navigation input element 1822, and a fourth indicator 1924 is shown to indicate an amount of force being applied to the fourth navigation input element 1824. A threshold 1930 extending across the four force indicators is also illustrated for purposes of reference.

Figure 19B:
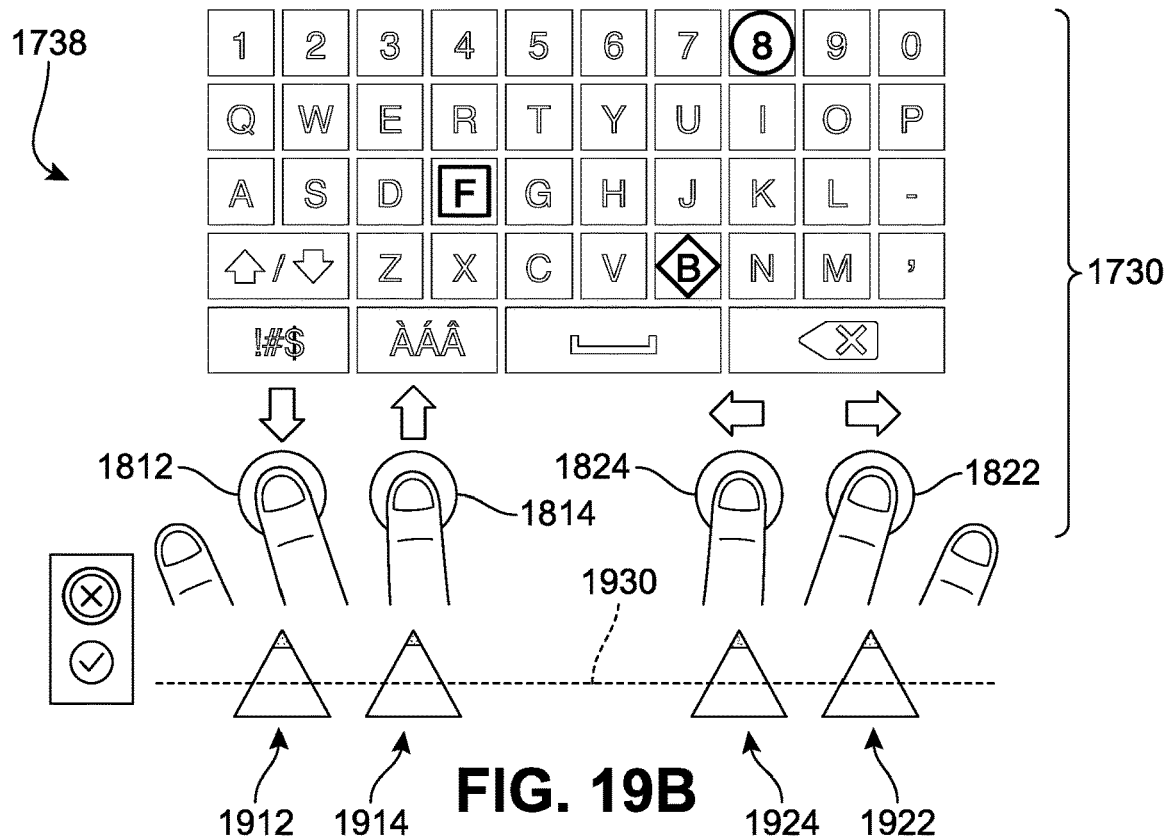
FIG. 19B illustrates an example of the third interface in a state in which a user is beginning to engage with the input interface.
Figure 19C:
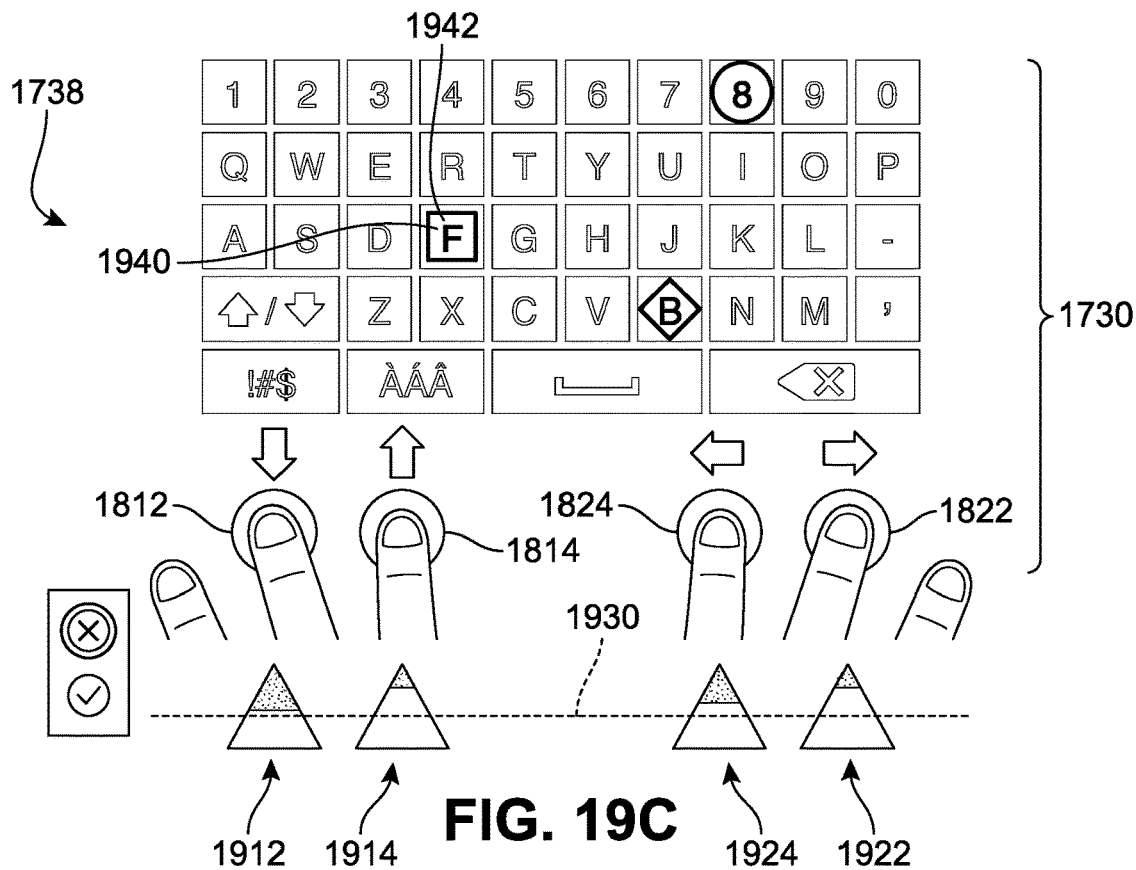
FIG. 19C illustrates an example of the forces being applied to the third interface.

In FIG. 19B, the user has made contact or engaged with the input interface 1740. In some implementations, in order for an input to be received by the system, all four navigation input elements must register a user contact. In other words, if force is applied to only one navigation input element, no response will be elicited by the system. An example of a detection of contact with all four navigation input elements is shown in FIG. 19B. The type of contact shown for each of the navigation input elements is minimal, corresponding to an amount of force that is below the minimum level of force required for registering an actuation (see threshold 1930). In FIG. 19C, the type of contact shown for each of the navigation input elements remains below the minimum level of force required for registering an actuation. However, it can be seen that there are varying amounts of force being applied with respect to each navigation input element. For example, the first indicator 1912 reflects an increase in force (i.e., approaching the threshold 1930) being exerted by the second user 1710. The other indicators also reflect slight increases in the amount of force applied, but none have exceeded the threshold 1930. Thus, no navigation command is generated.

Figure 19D:
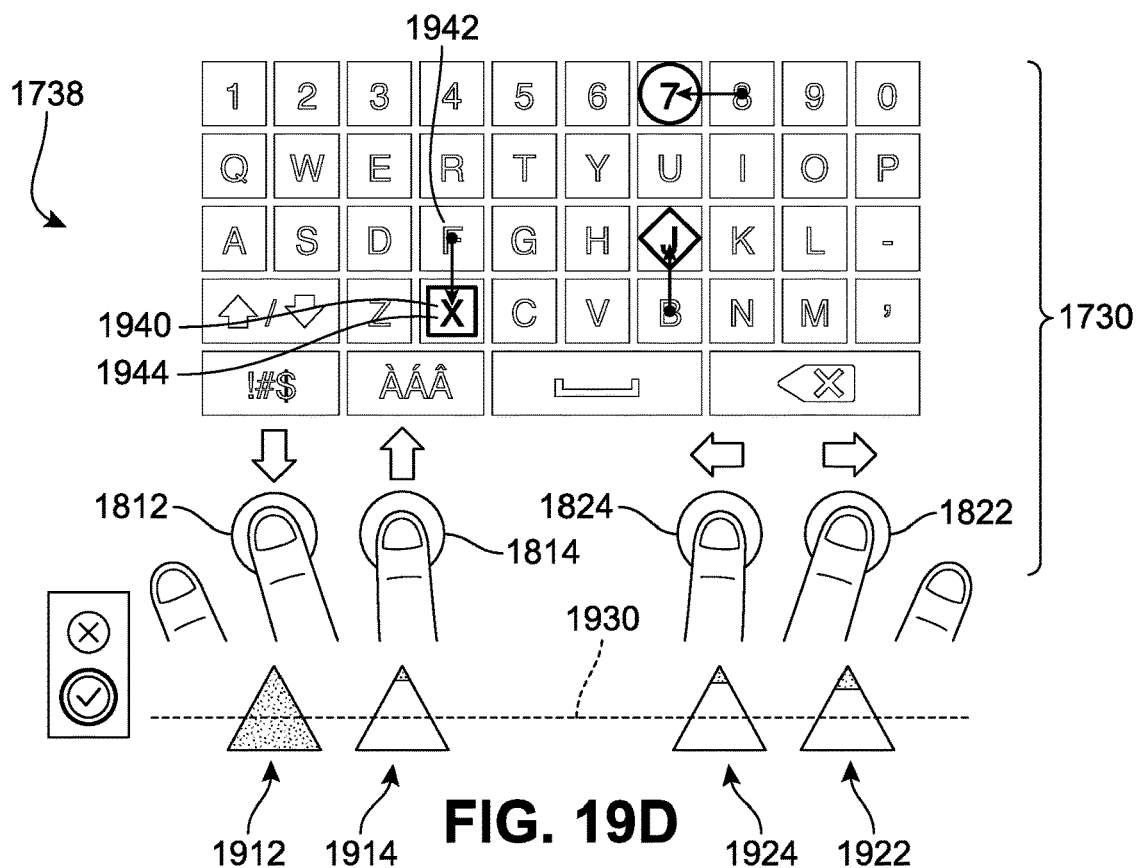
FIG. 19D illustrates an example where additional force is applied to a first navigation input element and generates a navigation command.

In FIG. 19D, the second user 1710 applies additional force on first navigation input element 1812, as reflected by the approximately "full" first indicator 1912, confirming that the threshold 1930 has been exceeded, while the remaining three indicators remain below the threshold 1930. As a result, a navigation command 1950 corresponding a down direction is generated, causing the current user target 1940 to move downward from a first target 1942 ("F") to a second target 1944 ("X"). Although a single threshold 1930 has been shown in FIGS. 19A-19D, in some other implementations, different thresholds may be established for each of the four navigation input elements. Furthermore, it should be understood that the thresholds may be changed dynamically. For example, a user specific threshold may be defined based on previous interactions of the second user 1710 with the third interface 1730. As another example, over time, users may learn to apply lower amounts of force for actuating the input interface 1740, which results in less discernable movement of the hands or fingers of the second user 1710, while providing user commands. In some implementations, there may be a second threshold that is greater than the threshold 1930, above which an amount of force will not be accepted as input, to encourage the second user 1710 not to apply excessive amounts of force that will result in easily observable movements. In some implementations, a warning may be provided to the user if the force detected exceeds the second threshold to guide the second user 1710 away from potentially movements discernable by observers.

In addition, although not illustrated in FIGS. 19A-19D, it should be understood that similar techniques can also be applied for the first user command input 1816 and the second user command input 1826. In some implementations, the second user command input 1826 is not included in the third interface 1740 and instead a submit user command can be generated by other interactions with the third interface 1740. For example, it may be generated by the second user 1710 disengaging from the third interface 1740. In some implementations, the first user command input 1816 may not be included in the third interface 1740. One benefit of this type of arrangement is that the four fingers remain in contact with the touchscreen display at the same time (i.e., the fingers are not removed from the screen throughout the duration of the input process) making it far more difficult for the second observer 1750 to identify when a user command has been submitted and/or which user command has been submitted.

Figure 20A:
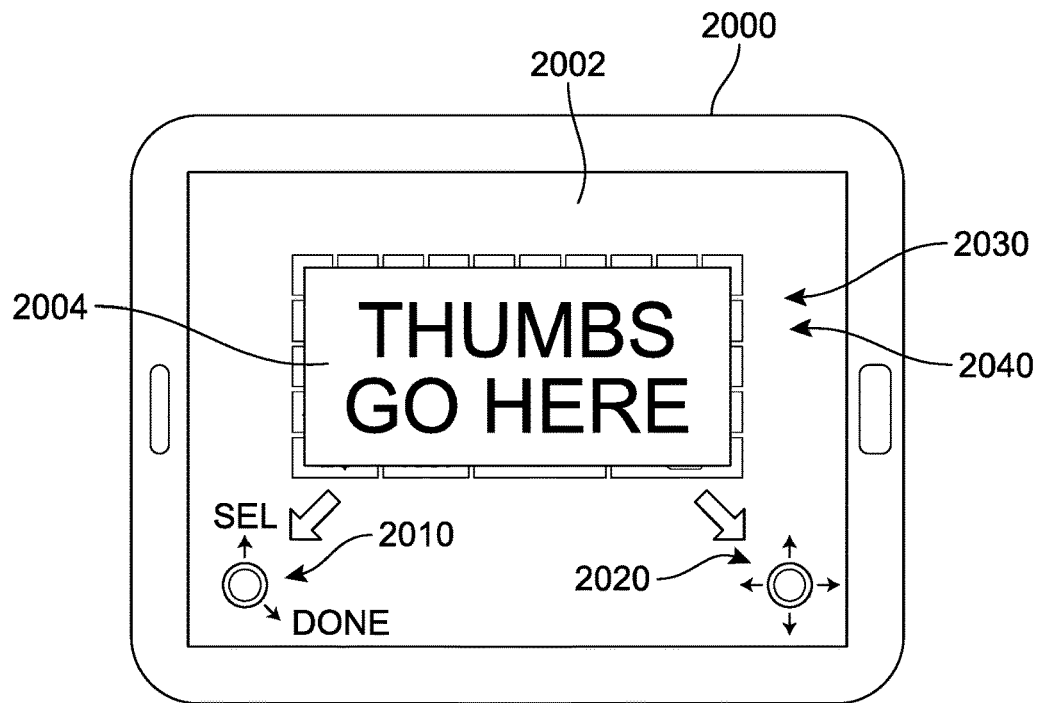
FIGS. 20A-20F illustrate an example of a sequence in which a user engages with an input interface of a fourth interface that is configured to receive navigation commands by 'rolling' of a thumb past thresholds associated with quadrants on the touchscreen display.

Referring now to FIGS. 20A-20G, an example of a handheld computing device 2000 including a touchscreen display 2002 is illustrated. In FIG. 20A, the touchscreen display 2002 presents a fourth interface 2030 that currently includes an input interface 2040, and is configured to permit a third user to input sensitive information (via the input interface 2040) for use by the handheld computing device or associated systems. In addition, the input interface 2040 comprises a first input region 2010 and a second input region 2020. In an initial state, the fourth interface 2030 also provides an informational message 2004 ("Thumbs go here").

Figure 20B:
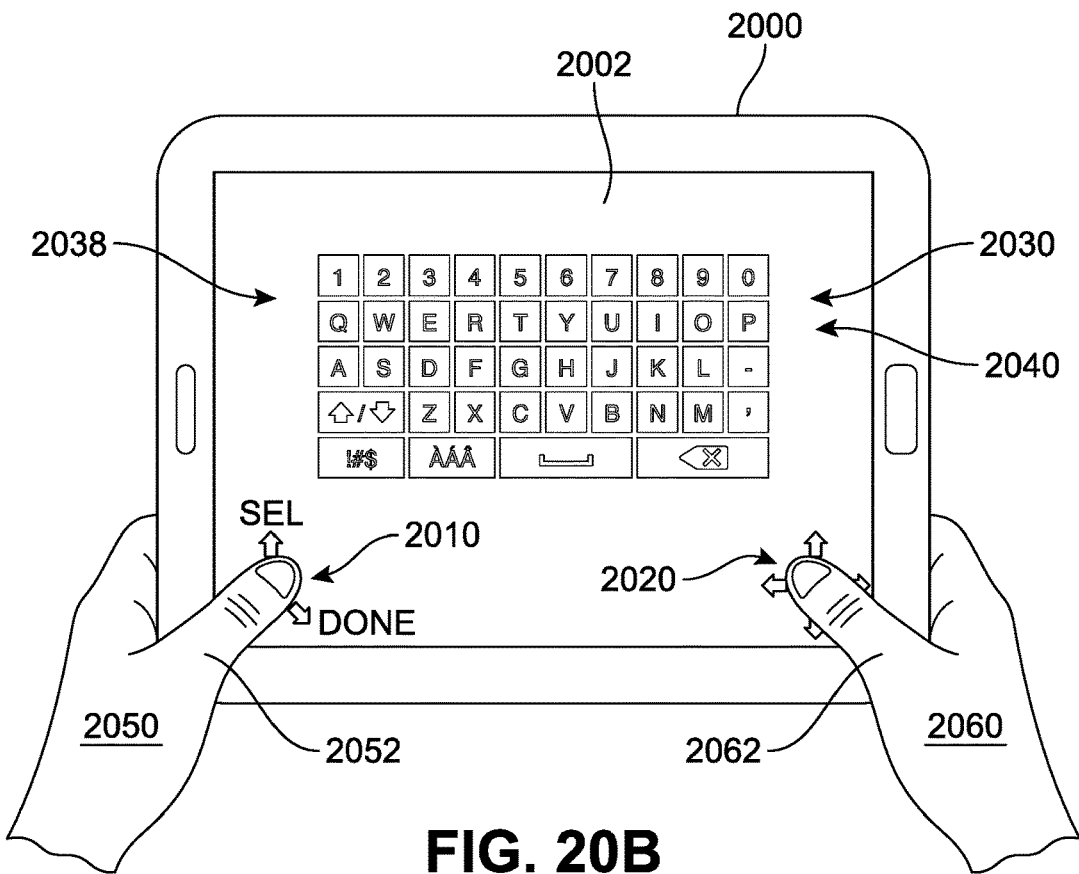

In FIG. 20B, an isolated view of the fourth interface 2030 in which the third user is now engaged with the input interface 2040 is shown. The third interface 2030, in response to a detection of the user's engagement or contact with the first input region 2010 and the second input region 2020, replaces the presentation of an informational message with a target display region 2038. It can be understood that the first input region 2010 is intended for use by a left hand 2050 including a left thumb 2052, while the second input region 2020 is intended for use by a right hand 2060 including a right thumb 2062, where in this example the two thumbs are in contact with the respective input region. It is noted that although the first input region 2010 and the second input region 2020 are shown in respective lower corners of the touchscreen display 2002, they may be positioned elsewhere on the touchscreen display 2002 in other implementations, either as a design choice or in response to a user preference setting. In some examples, a finger may be used instead of a thumb; however, users generally perform more subtle movements of the thumb.

Figure 20C:
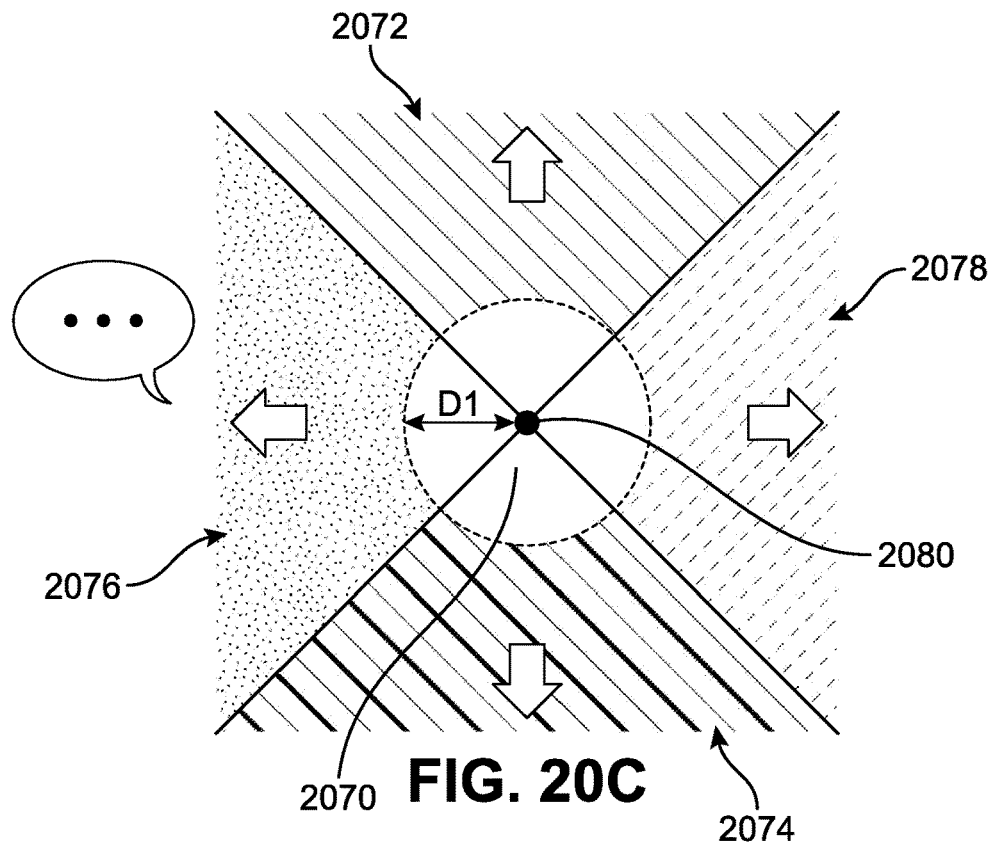

FIG. 20C illustrates an example of an operation of the second input region 2020 to detect input of user commands. In FIG. 20C, an isolated view of the second input region 2020 is depicted, including a center 2080. In some implementations, the center 2080, rather than being the center of the region that is displayed in the initial state (see FIG. 20A), is determined based on a point of contact determined for the right thumb 2062. In some examples, the point of contact may be a centroid of an area of contact between the right thumb 2062 and the touchscreen display 2002. In some examples, the point of contact is determined based on contact detected between the right thumb 2062 and the touchscreen display 2002 during a time or period of time, such as when the right thumb 2062 begins contact or shortly afterward. In some examples, the center 2080 may be changed over time in response to ongoing detections of contact positions between the right thumb 2062 and the touchscreen display 2002.

Above the center 2080 is a first quadrant with a first region 2072, where the first region 2072 corresponds to a first navigation command in an upward direction. Below the center is a second quadrant with a second region 2074 that corresponds to a second navigation command in a downward direction. In addition, to the left of the center 2080 is a third quadrant with a third region 2076 corresponding to a third navigation command in a leftward direction, and to the right of the center 2080 is a fourth quadrant with a fourth region 2078 that corresponds to a fourth navigation command in a rightward direction.

Figure 20D:
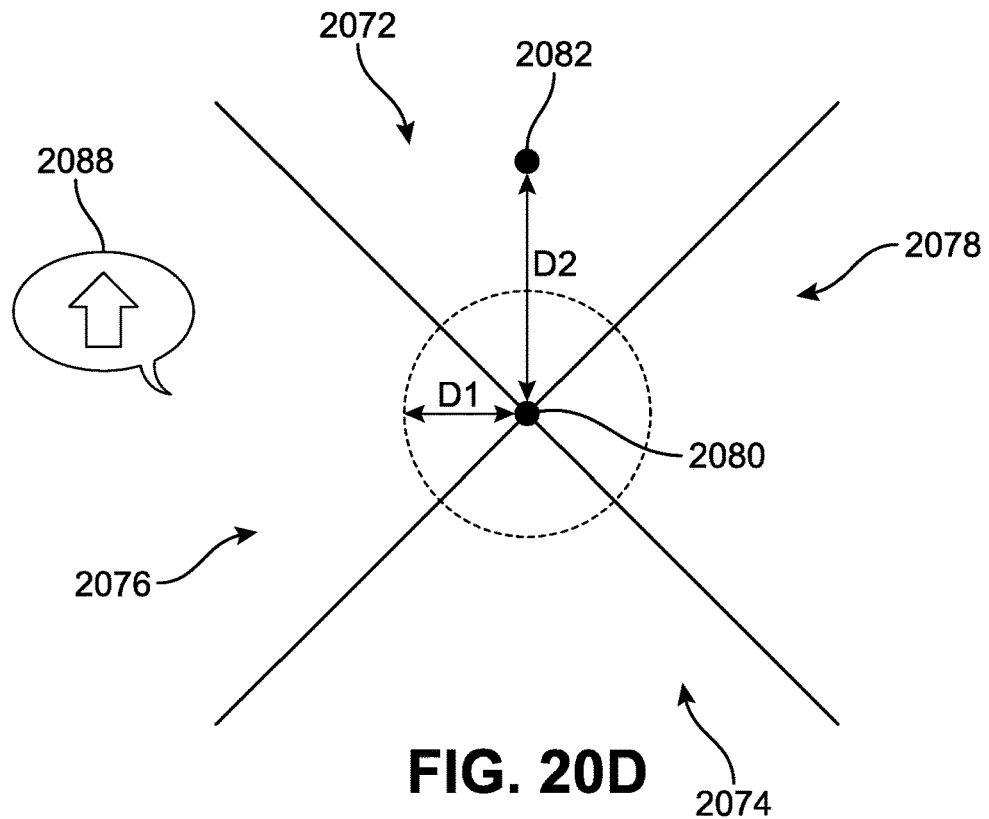

A circular region 2070 with a perimeter at a first threshold distance D1 from the center 2080 is not included in any of the four regions 2072, 2074, 2076, and 2078. As a result, the third user must roll the right thumb 2062 such that its point of contact with the touchscreen display 2002 is further than the first threshold distance D1 from the center 2080 in order to generate a navigation command. FIG. 20D illustrates an example in which the right thumb 2062 has been rolled upward such that its point of contact 2082 is at a distance D2 from the center 2080 that extends into the first region 2072 and in response a navigation command 2088 is generated corresponding to an upward direction.

Figure 20E:
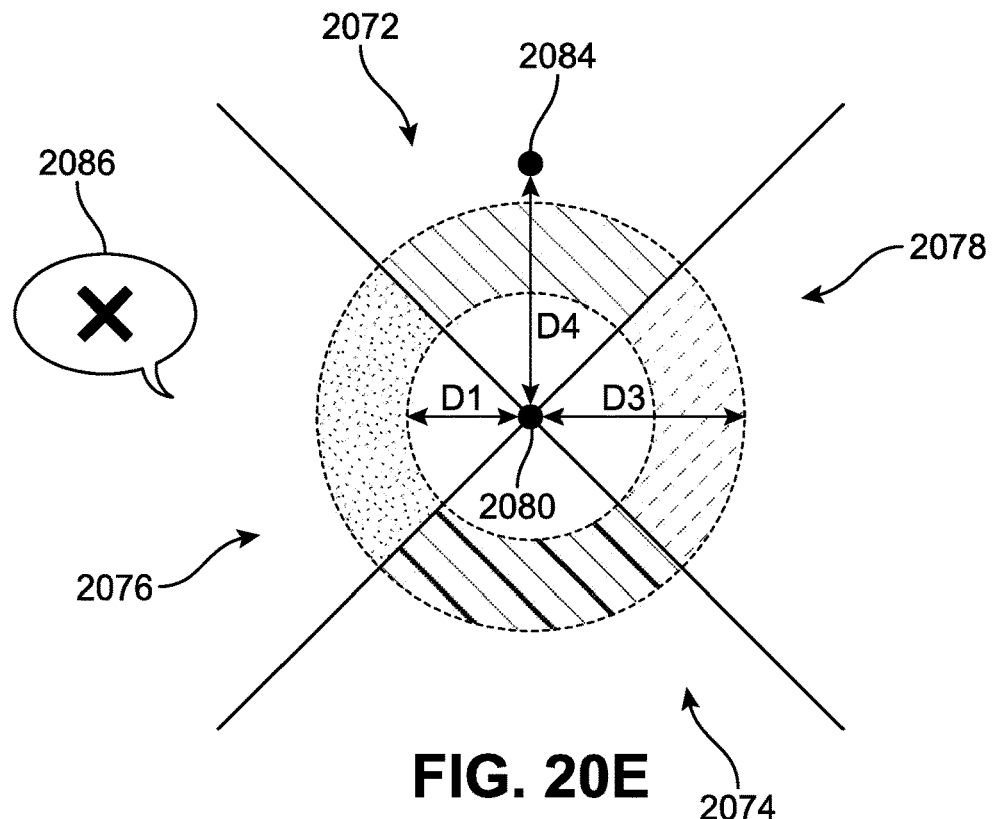
Figure 20F:
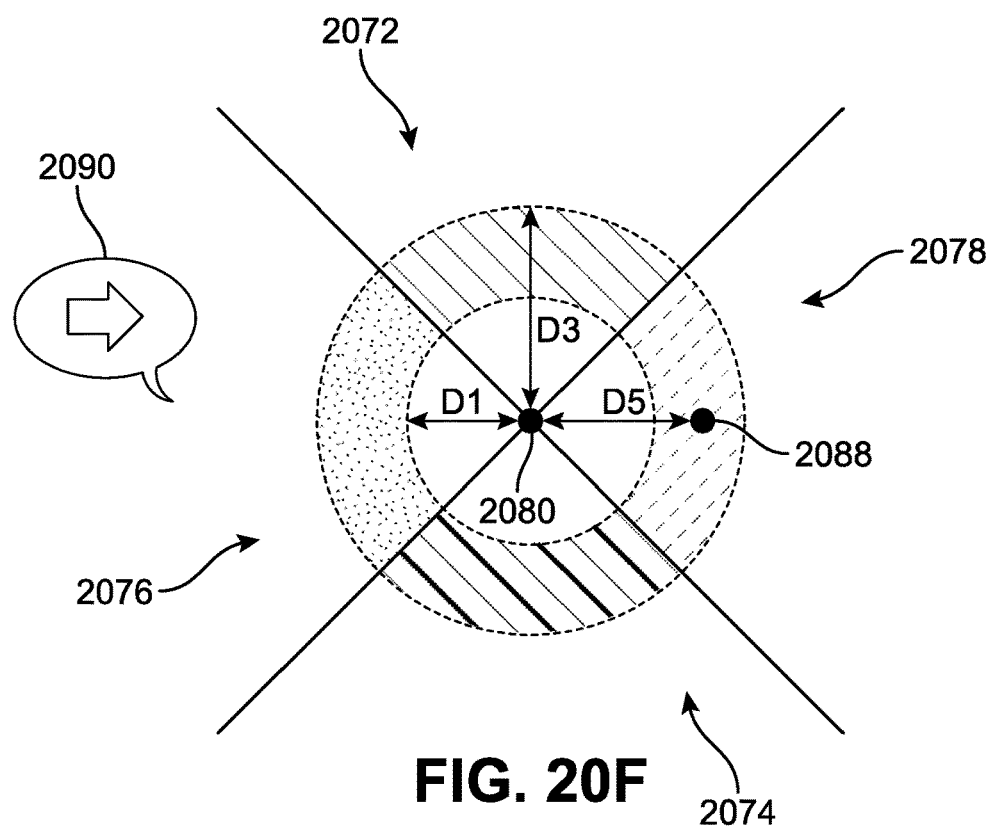

In some implementations, as shown in FIGS. 20E and 20F, a second threshold distance D3 may be used to define a maximum distance for the four regions 2072, 2074, 2076, 2078 from the center 2080. As a result, if the right thumb 2062 is rolled too far, it will not result in a navigation command being generated. In some implementations, a warning may also be provided to the user in such cases to encourage the third user not to move the right thumb to such a degree that will result in easily observable movements. One example of this is shown in FIG. 20E, where the right thumb has been moved to have a point of contact 2084 at a distance D4 that exceeds the second threshold distance D3 and as a result a warning 2086 is being presented. FIG. 20F illustrates another example in which the right thumb 2062 has been rolled upward such that its point of contact 2088 is at a distance D5 between the distances D1 and D3 from the center 2080 that extends into the fourth region 2078 and in response a navigation command 2090 is generated corresponding to a rightward direction.

It is to be understood that similar techniques as those described in FIGS. 20C-20F can also be applied to the first input region 2010. In some implementations, instead of quadrants, two regions may be used for the first input region 2010. As an example, one or more user commands generated by the first input region 2010 may require actuation for a threshold period of time. For example, an actuation of two or more seconds might be required in order to generate a submit command. In addition, the techniques shown in FIGS. 20C-20F may be applied in connection with the input interface 1740 instead of or in combination with force detection. In some examples, the threshold distances described in FIGS. 20C-20F may be different between four regions 2072, 2074, 2076, 2078 or different directions; for example, a user may demonstrate finer control in a vertical direction than a horizontal direction.

Referring to FIGS. 20G and 20H, an example in which a user command may be generated by tapping of the handheld computing device 2000. In FIGS. 20G and 20H, a user is shown tapping an exterior rear surface 2006 of the handheld computing device 2000 that is opposite to the touchscreen display 2002, resulting in an impact 2056 that is detected by a motion sensor 2090, such as an accelerometer, included in the handheld computing device 2000 resulting in a processor 2092 included in the handheld computing device 2000 generating a user command 2094. In this example, the user command 2094 is an actuation command. By generating a user command through this technique, the first input region 2010 may be eliminated. In addition, such a design provides a method of input that is not visible to an observer viewing the touchscreen display 2002.

Figure 21A:
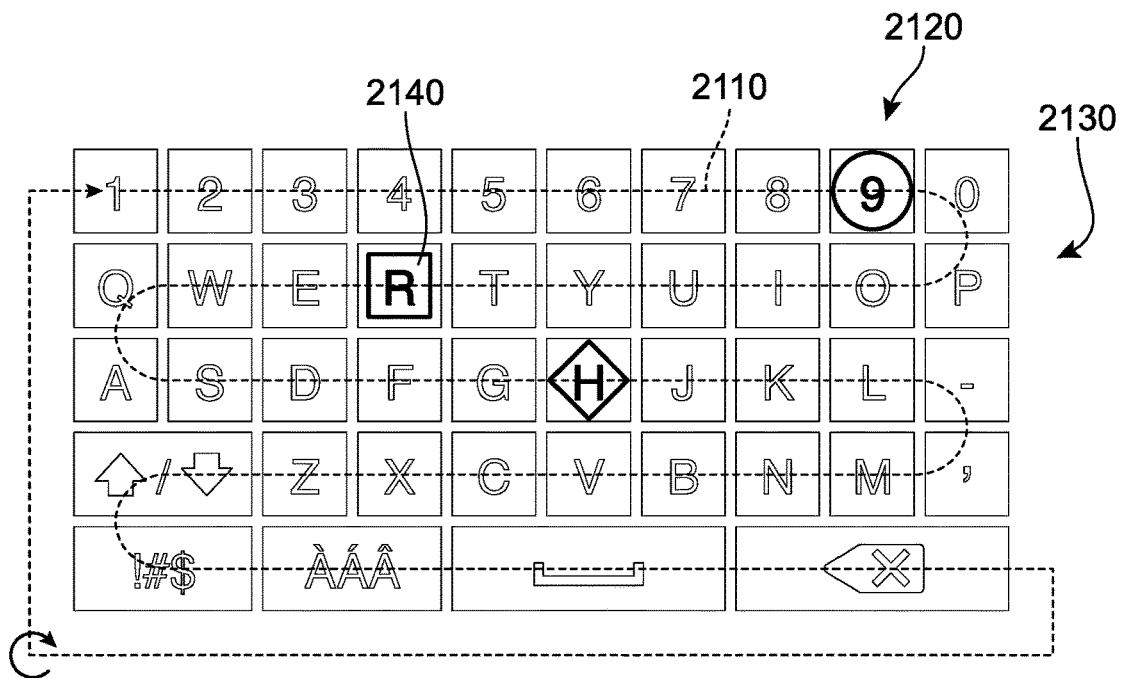
FIGS. 21A and 21B illustrate an example of degrees of input affecting speed during navigation.
Figure 21B:
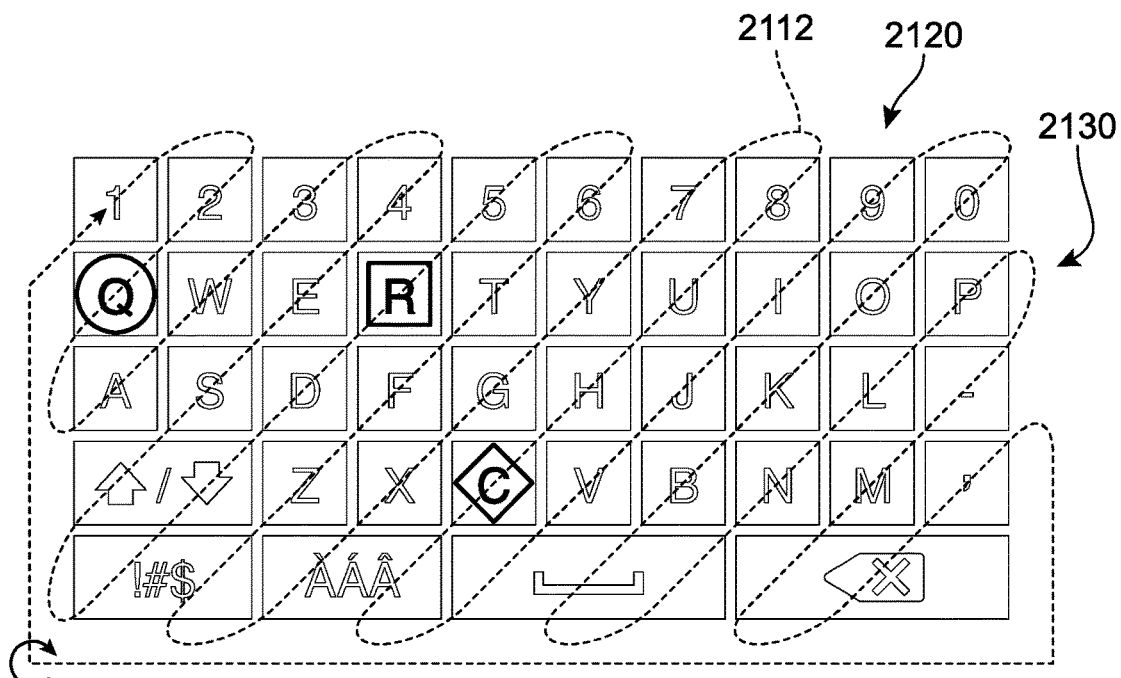

Referring next to FIGS. 21A and 21B, examples of degrees of input affecting speed are shown. In some implementations, the degree of input may be according to an amount of force measured by an obfuscation system, much as described in connection with FIGS. 19A-19D. In some implementations, the rolling of a user's digit input as described in connection with FIGS. 20C and 20D, and a resulting distance from a center position, may define the degree of input. FIG. 21A illustrates an example first target scanning path ("first path") 2110 through successive targets 2120 included in a fifth interface 2130. The first path 2110 defines a sequence through which current targets move through the targets 2120 at various speeds to move to and activate selected targets 2120, such that the targets are scanned horizontally. For example, a current user target 2140 may be moved at speeds corresponding to degree of input. FIG. 21B illustrates an example of a second target scanning path ("second path") 2112 through which the targets 2120 are scanned diagonally. It is understood that other scanning paths may be defined. In some implementations, current targets may be assigned different scanning paths to further obfuscate interactions with the fifth interface 2130.

Figure 22A:
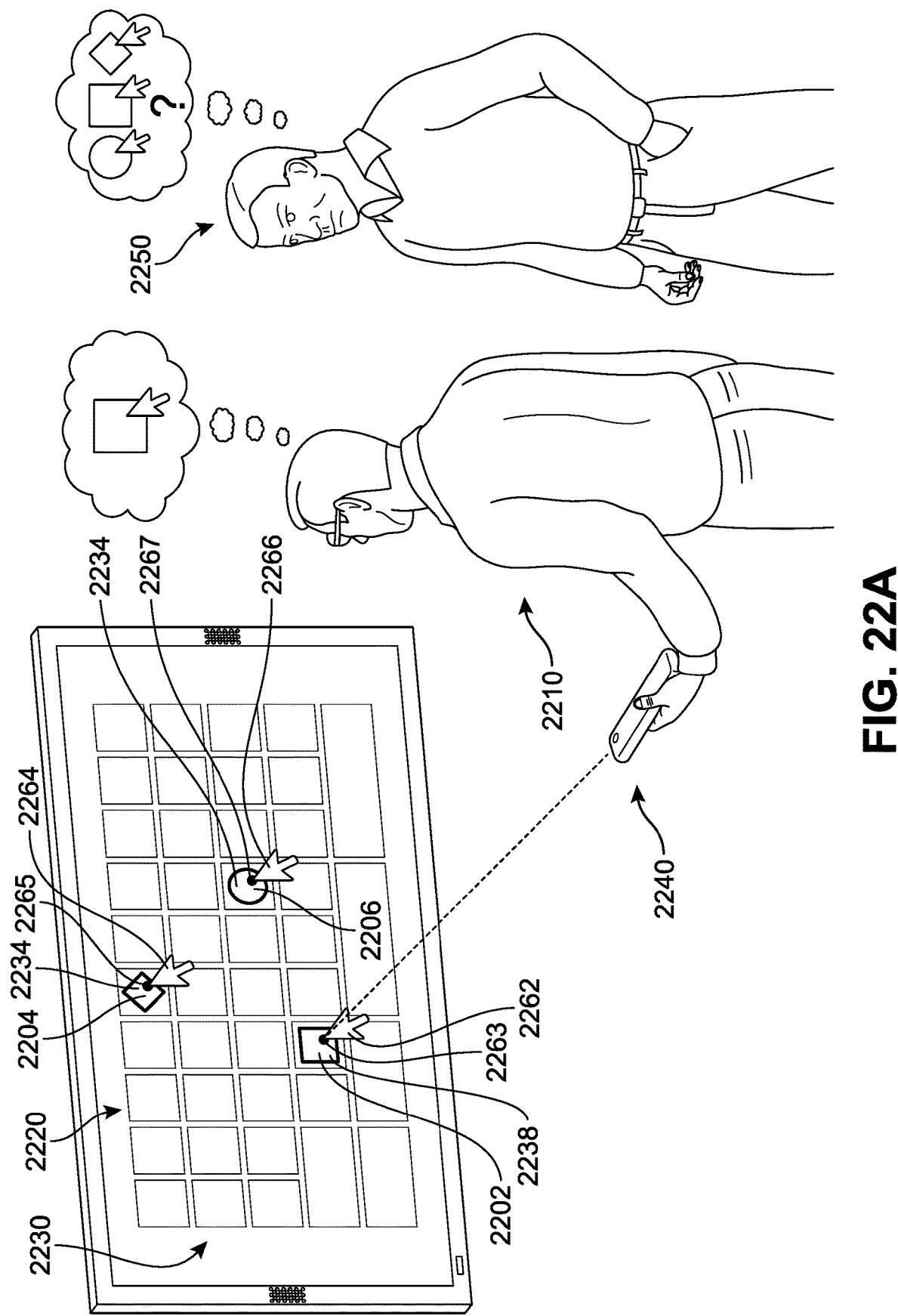
FIGS. 22A and 22B illustrate an example of a user performing navigation by providing a continuous directional input.

In the examples illustrated above from FIGS. 1-21B, the user is submitting discrete navigation commands that each move the current user target from one target to another. In other words, each navigation command by the user results in a move between one target to a different target. FIGS. 22A-31 present implementations of the obfuscation system in which the user instead is performing navigation by providing a continuous directional input, such as but not limited to, via computer mouse, or a handheld directional pointing device as shown in FIG. 22A. There are various differences between the discrete input and the continuous input. For example, continuous inputs can result in user positions in multiple user positions within an input interface all corresponding to a single target. In addition, the user position, as a result of manual control of the continuous input, results in curved or otherwise non-linear travel to and between desired targets.

Referring first to FIG. 22A, a display device 2220 presenting a sixth interface 2230 is shown. A fifth user 2210 is holding a handheld remote input device 2240 for interaction with the targets of sixth interface 2230. In contrast with the handheld remote input device 140 shown in FIG. 1, which may make use of an interface similar to input mechanism portion 400 in FIG. 4A to issue directional input, the handheld remote input device 2240 provides more freeform navigation within the sixth interface 2240. Operation of the handheld remote input device 2240 results in movement of a first pointer 2262 used to identify a current user target 2238. As the fifth user 2210 uses the handheld remote input device 2240 to move the first pointer 2262, the first pointer 2262 is also referred to as a "user pointer," a target identified by the first pointer 2262 (in this example, located at a two-dimensional first pointer position 2263) becomes the current user target 2238, associated with a first target 2202. In addition, a second pointer 2264 (in this example, located at a two-dimensional second pointer position 2265) corresponding to a first current distractor target 2232 associated with a second target 2204, and a third pointer 2266 (in this example, located at a two-dimensional third pointer position 2267) corresponding to a second current distractor target 2234 associated with a third target 2206 are also presented on the sixth interface 2230. In this example, the second pointer 2264 and the third pointer 2266 are moved by the obfuscation system and may be referred to as "distractor pointers." The sixth interface 2230 includes a user pointer and one or more distractor pointers. As illustrated in FIG. 22A, the fifth user 2210 is aware that their input controls movement of the first pointer 2262 used to select the current user target 2238; on the other hand, an observer 2250 is unable to determine which of the pointers (first pointer 2262, second pointer 2264, and third pointer 2266) and their associated current targets is being used by the fifth user 2210. It is noted that in this disclosure, the term "pointer" may be used to describe a pointer position, such as the first pointer position 2263, and/or a displayed cursor or other visual indication of the pointer position, such as the three cursors shown in FIG. 22A. In some examples, a cursor or other visual identifier of the pointer position may not be displayed.

Figure 22B:
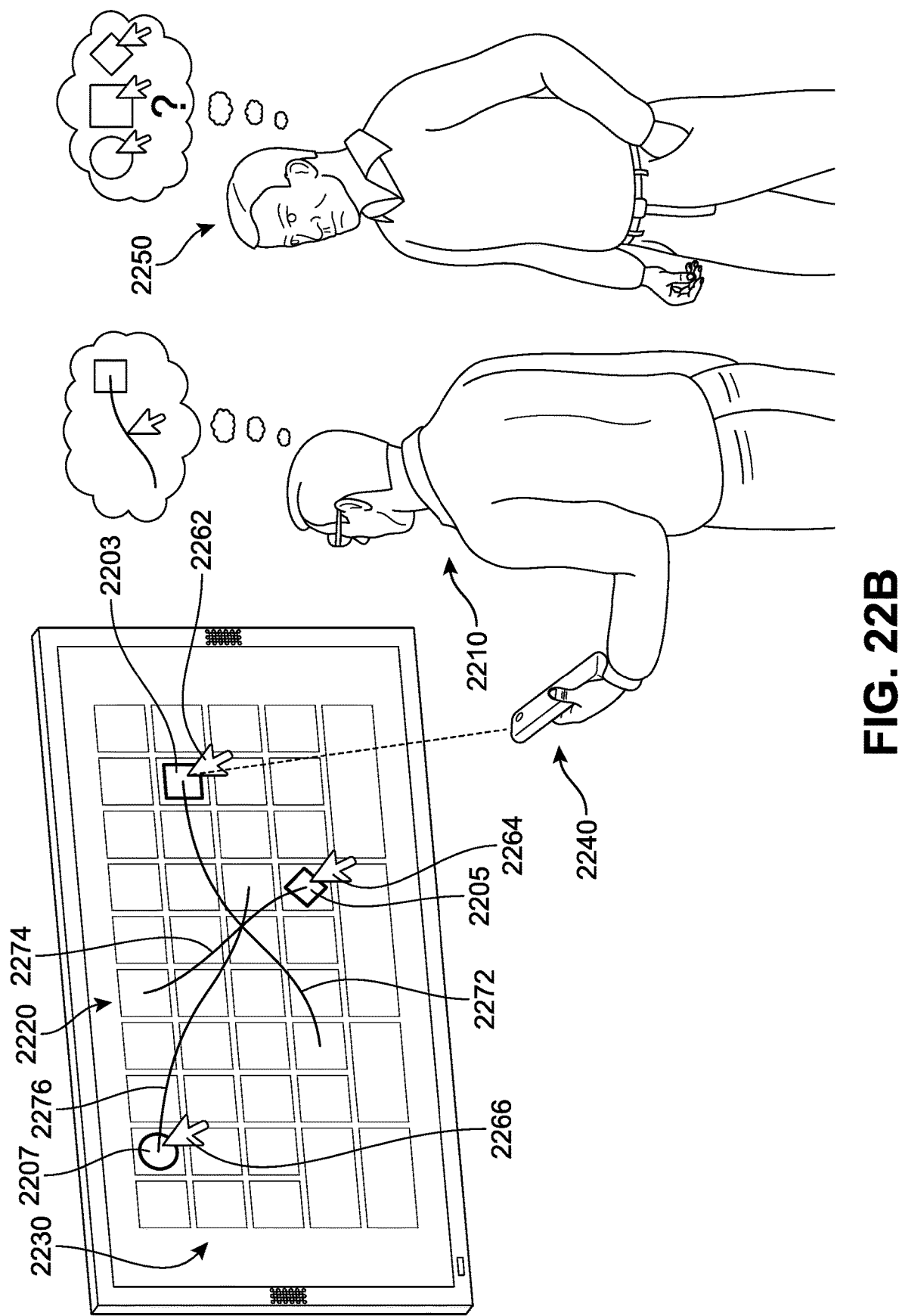

In FIG. 22B, the fifth user 2210 has moved the handheld remote input device 2240 and as a result the first pointer 2262 has moved along a first path 2272, from the position shown in FIG. 22A that was associated with the first target 2202 to a new position associated with a fourth target 2203 shown in FIG. 22B. At the same time, the second pointer 2264 moves along a second path 2274 from a position associated with the second target 2204 to a new position associated with a fifth target 2205. In addition, the third pointer 2266 moves along a third path 2276 from a position associated with the third target 2206 to a new position associated with a sixth target 2207. The second path 2274 and third path 2276 simulate paths that would result from continuous input provided by a human user. As a result, the observer 2250 remains unable to identify the current user target 2238.

Figure 23A:
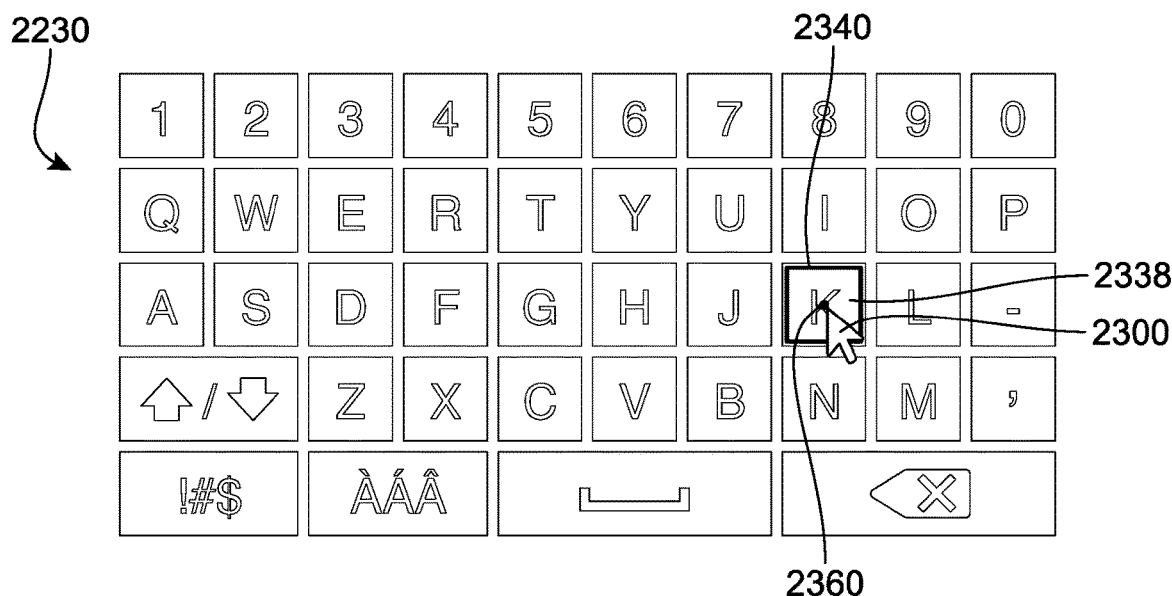
Figure 23B:
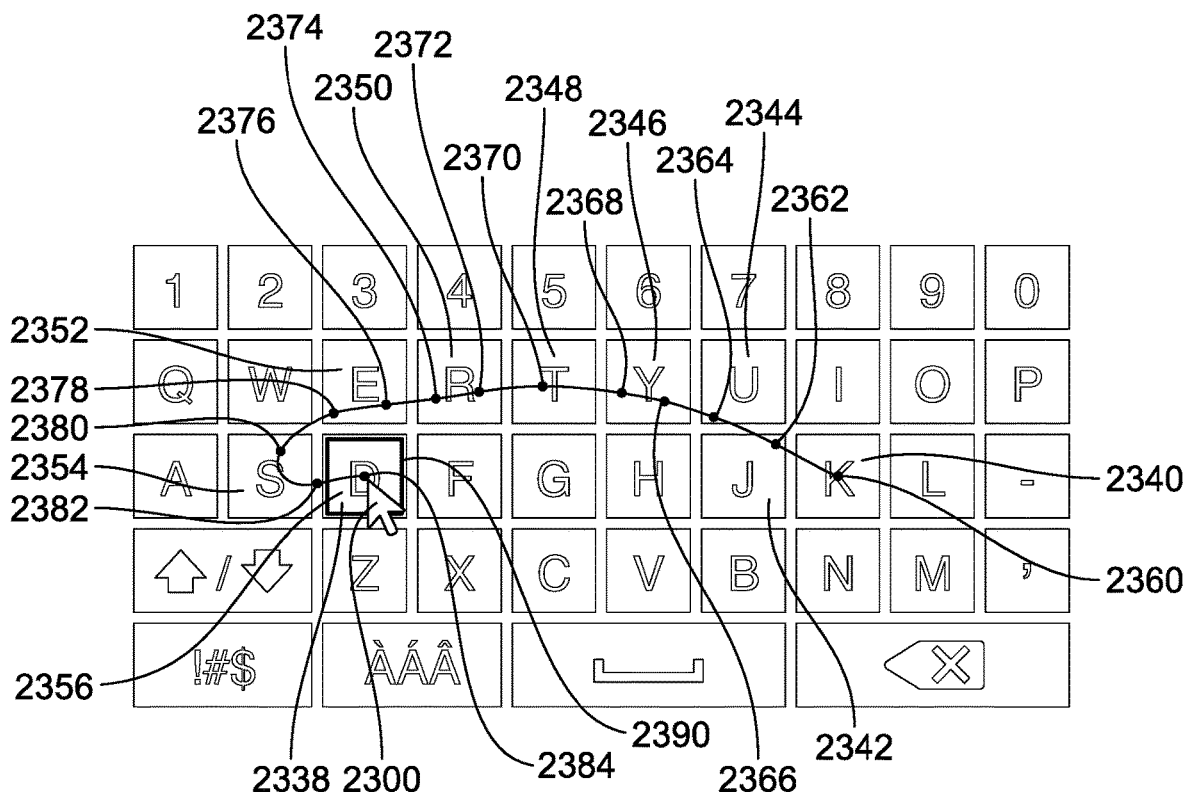

FIGS. 23A-23J illustrate an example of a pointer 2300 being moved along a path 2310 in a seventh interface 2330. In FIG. 23A the pointer 2300 is at a first point 2360 at a time T0. The first point 2360 is located within a first target 2340 and accordingly the first target 2340 ("K") is a current user target 2338. FIG. 23B shows the pointer 2300 being moved along the path 2310 from the time T0 to a time T12, passing through a series of points along the path 2310 including a second point 2362 at a time T1 and within a second target 2342 ("J"), a third point 2364 at a time T2 and within a third target 2344 ("U"), a fourth point 2366 at a time T3 and within a fourth target 2346 ("Y"), a fifth point 2368 at a time T4 and within the fourth target 2346 ("Y"), a sixth point 2370 at a time T5 and within a fifth target 2348 ("T"), a seventh point 2372 at a time T6 and within a sixth target 2350 ("R"), an eighth point 2374 at a time T7 and within the sixth target 2350 ("R"), a ninth point 2376 at a time T8 and within a seventh target 2352 ("E"), a tenth point 2378 at a time T9 and within the seventh target 2352 ("E"), an eleventh point 2380 at a time T10 and within a eighth target 2354 ("S"), a twelfth point 2382 at a time T11 and within a position between eighth target 2354 (S") and a ninth target 2356 ("D"), and a thirteenth point 2384 at a time T12 and within the ninth target 2356 ("D"). The pointer 2300 is shown in FIG. 23B at the end of the path 2310 at the thirteenth point 2384. The thirteenth point 2384 is located within the ninth target 2356 and accordingly the ninth target 2356 ("D") becomes the current user target 2338 at the time T12. A visual indicator 2390 is applied to the ninth target 2356 to visually identify it as the current user target 2338. It can be seen in FIG. 23B that the path 2310, as it passes through the eleventh point 2380 and the twelfth point 2382, has gone past the ninth target 2356 in the horizontal direction. This is an example of "overshoot", and is frequently observed in human pointer operation, as will be discussed in more detail below.

For purposes of illustration, the sequence of FIGS. 23C-23J shows the pointer 2300 as it moves through a series of points at the times T5-T12. In FIG. 23C, the pointer 2300 is at the sixth point 2370, having moved from the fifth point 2368. As the sixth point 2370 is located within the fifth target 2348 at the time T5, the fifth target 2348 becomes the current user target 2338 at time T5. In FIG. 23D, the pointer 2300 is at the seventh point 2372, having moved from the sixth point 2370. As the seventh point 2372 is located within the sixth target 2350 at the time T6, the sixth target 2350 becomes the current user target 2338 at time T6. In FIG. 23E, the pointer 2300 is at the eighth point 2374, having moved from the seventh point 2372. As the eighth point 2374 is also located in the sixth target 2350 where the previous seventh point 2372 was, the sixth target 2350 remains the current user target 2338 at time T7. In FIG. 23F the pointer 2300 is at the ninth point 2376, having moved from the eighth point 2374. As the ninth point 2376 is located within the seventh target 2352 at the time T8, the seventh target 2352 becomes the current user target 2338 at time T8. In FIG. 23G, the pointer 2300 is at the tenth point 2378, having moved from the ninth point 2376. As the tenth point 2378 is also located in the seventh target 2352 that the previous ninth point 2376 was, the seventh target 2352 remains the current user target 2338 at time T9. In FIG. 23H, the pointer 2300 is at the eleventh point 2380, having moved from the tenth point 2378. As the eleventh point 2380 is located within the eighth target 2354 at the time T8, the seventh target 2352 becomes the current user target 2338 at time T10.

In FIG. 23I, the pointer 2300 moves to the twelfth point 2382 from the eleventh point 2380. The twelfth point 2382 is located between the eighth target 2354 and the ninth target 2356. However, the twelfth point 2382 is not located in either of the eighth target 2354 or ninth target 2356. As a result the pointer 2300 is not considered to be in any of the targets of the sixth interface 2230. The visual indicator 2390 is not shown, and no current user target is indicated. If an actuation command is submitted while the pointer 2300 is at the twelfth point 2382, it will not result in any of the targets of the interface being actuated. In some implementations, the sixth interface 2230 does not include the gaps between targets as shown in FIG. 23I, thereby avoiding movement to positions that do not correspond to a target. Finally, in FIG. 23J, the pointer 2300 moves to the thirteenth point 2384 from the twelfth target 2382. As the thirteenth point 2384 is located within the ninth target 2356 at the time T12, the ninth target 2356 becomes the current user target 2338 at time T12. In this example, the ninth target 2356 was the user's desired target and shortly after time T12 the user submits an actuation command resulting in actuation of the ninth target 2356 and selection of the corresponding character "D".

Figure 24:
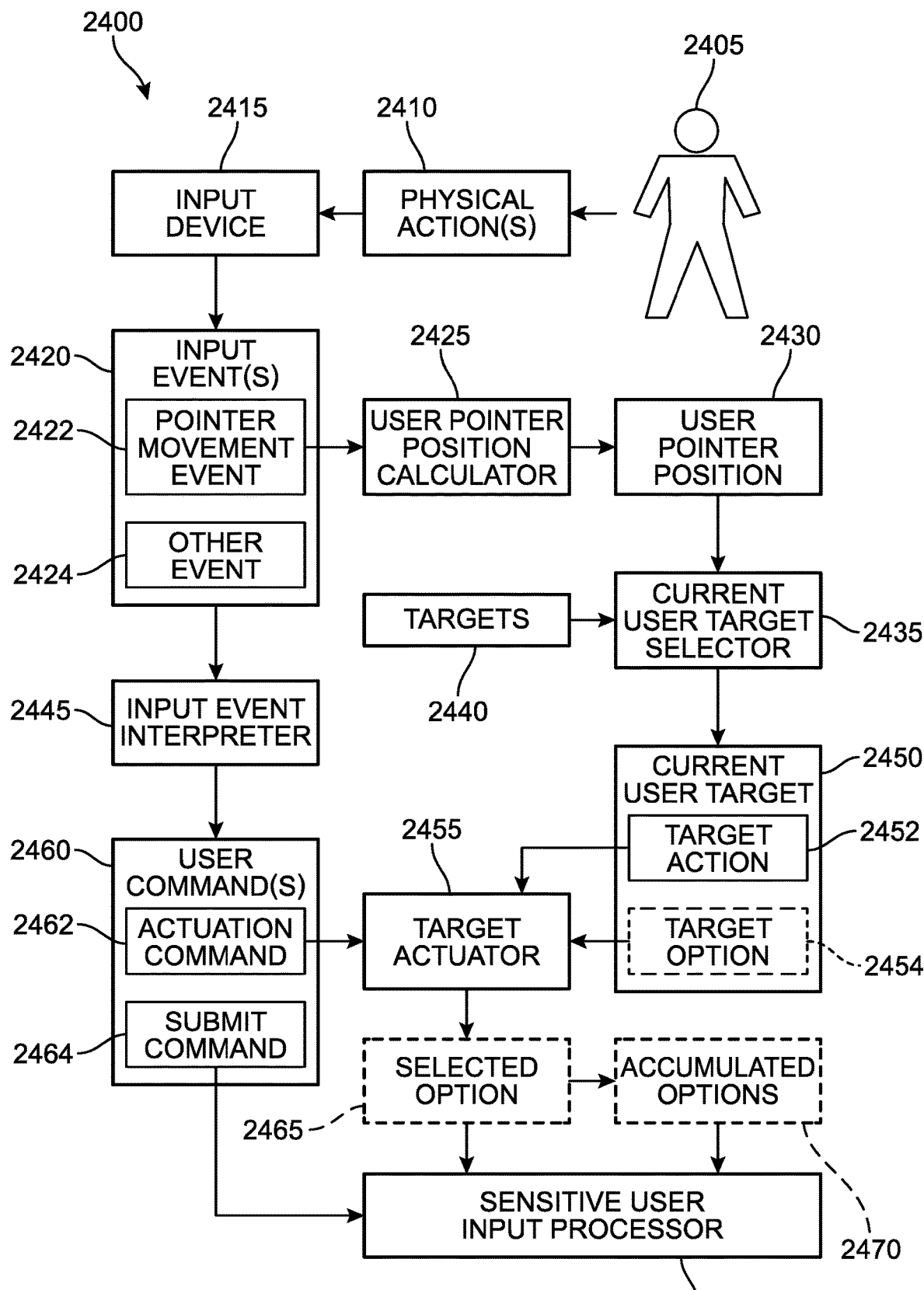
FIG. 24 illustrates an example in which a user submits sensitive data via an implementation of an obfuscation system with user commands for actuation and submission.

FIG. 24 illustrates an example in which a user 2405 submits sensitive data via an obfuscation system 2400 configured to apply techniques described herein. The user 2405 interacts with an input device 2415 by performing one or more physical action(s) 2410, resulting in one or more corresponding input event(s) 2420 being generated by the input device 2415. An input event 2420 may be a pointer movement event 2422 or some other event 2424. In response to receiving a pointer movement event 2422, a user pointer position calculator 2425 included in the obfuscation system 2400 determines an updated user pointer position 2430 based on the pointer movement event 2422. For an absolute input device there may simply be a direct mapping to the user pointer position 2430. For a relative input device, the pointer movement event 2422 may be used to calculate the user pointer position 2430. In some examples, the user pointer position calculator 2425 is performed by an operating system or other system component that provides the user pointer position 2430. Based on the updated user pointer position 2430, a current user target selector 2435 included in the obfuscation system 2435 determines which, if any, of currently active targets 2440 corresponds to the user pointer position 2430. If one of the targets 2440 is selected (for example, due to the user pointer position 2430 being within an image displayed for the target or an effective target area for the target), it becomes the current user target 2450.

An input event interpreter 2445 included in the obfuscation system 2400 generates one or more user command(s) 2460 corresponding to another event 2424 received from the input device 2415. FIG. 24 illustrates two examples of the user command(s) 2460: an actuate command 2462 and a submit command 2464. In some implementations, the obfuscation system 2400 is configured to perform the operations described for the submit command 2464 in response to receiving an actuation command 2462. In response to receiving the actuation command 2462, a target actuator 2455 included in the obfuscation system 2400 executes a target action 2452 associated with the current user target 2450. In some examples, the target action 2452 corresponds to performing a selection of a target option 2454 associated with the current user target 2450, resulting in a selected option 2465. In some implementations, the selected option 2465 may be appended to a series of accumulated options 2470. In response to receiving the submit command 2464, a sensitive user input processor 2475 receives and operates on the selected option 2465 and/or the accumulated options 2470.

Figure 25:
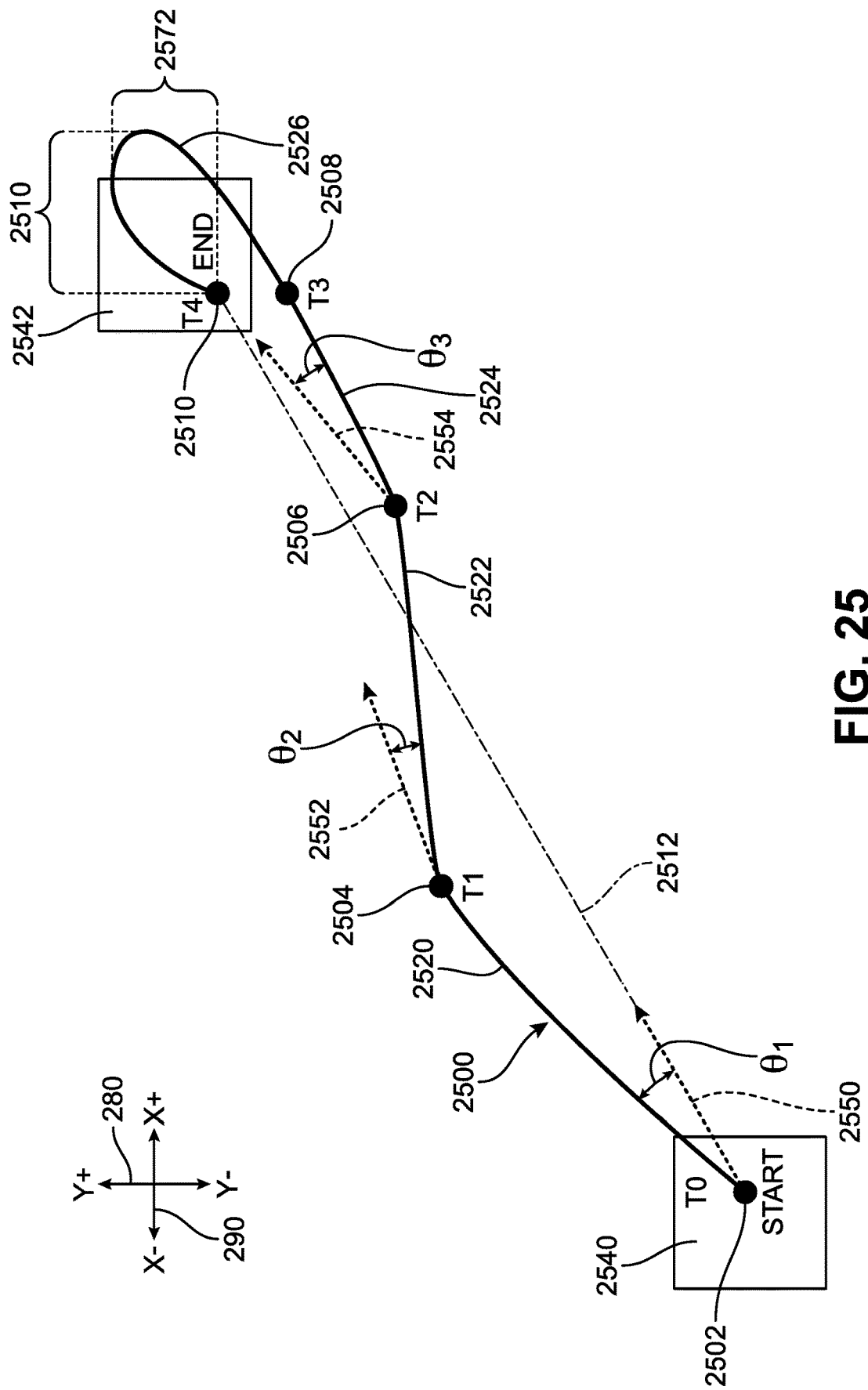
FIG. 25 illustrates various characteristics frequently observed with human pointer operation.

FIG. 25 illustrates various characteristics frequently observed with human pointer operation. The described features, characteristics, and behavior are useful for characterizing actual human pointer movement and synthesizing pointer movement for paths followed by distractor pointers. For purposes of reference, a first axis 2580 substantially parallel to a vertical axis is depicted, along with a second axis 2590 that is substantially orthogonal to the first axis. In this example, a pointer (not illustrated in FIG. 25) begins at a first point 2502, located within a first target 2540 at a time T0 and moves along a path 2500 to a fifth point 2510, located within a second target 2542 at a time T4.

For purposes of illustration, the path 2500 is shown divided into four path segments, including a first path segment 2520 ending at a second point 2504 at a time T1, a second path segment 2522 ending at a third point 2506 at a time T2, a third path segment 2524 ending at a fourth point 2508 at a time T3, and a fourth path segment 2526 ending at the fifth point 2510 at time T4. FIG. 25 also shows a dotted line 2512 directly connecting the first point 2502 and the final, fifth point 2510. However, real-world human pointer movements rarely move linearly between points, but instead tend to proceed along paths with trajectory and movement errors and attempts at correcting those errors as they occur. Although only the five points 2502, 2504, 2506, 2508, and 2510 are discussed, in some implementations, additional intermediate points would be obtained or generated by the obfuscation system.

For the first path segment 2520, although a first trajectory 2550 (lying on the line 2512) is the most direct trajectory to the fifth point 2510, the first path segment 2520 instead proceeds toward the second point 2504 with a first trajectory error θ1. As noted previously, such trajectory errors are common, particularly at the beginning of a pointer path. With respect to the second path segment 2522, at the second point 2504 an attempt is made to correct the first trajectory error θ1. From the second point 2504 a second trajectory 2552 is the most direct trajectory to the fifth point 2510. However, the second path segment 2522 instead makes an overcorrection with a second trajectory error θ2 in an opposite angular direction from the first trajectory θ1. Such attempts at correcting a pointer's trajectory and errors in such corrections are another common feature of human-operated pointer paths. The third path segment 2524 illustrates another example of trajectory correction. From the third point 2506 a third trajectory 2554 is the most direct trajectory to the fifth point 2510. However, the third path segment 2522 instead makes an undercorrection with a third trajectory error θ3. In human-operated pointer movement, such patterns of incorrect trajectory and incorrect corrective trajectories can be repeated multiple times, especially along longer pointer paths.

At the time T3, at the fourth point 2508, although the path 2500 has reached the horizontal position of the fifth point 2510, it is below the fifth point 2510 and not within the second target 2542. To correct the position of the pointer, during the fourth path segment 2526, an "overshoot" movement is performed where the user reverses the previous direction during the third path segment 2524 of the pointer movement to come back around and arrive the desired fifth point 2510 at time T4. Such overshoot maneuvers are common in human generated pointer operation. For purposes of this discussion, an overshoot maneuver may be characterized by a horizontal overshoot distance 2570 and a vertical overshoot distance 2572.

Another common feature of human-operated pointer movement, at least for longer pointer paths, is high acceleration and high velocity movement at a beginning of a path and significantly reduced velocity towards an end of a path. This can provide useful signaling for generating synthetic pointer paths in real time that end at about the same times as user-generated paths while maintaining a realistic appearance of naturally occurring human-generated paths. In some implementations, a high acceleration or high velocity shortly after the pointer being in an idle state can indicate to the obfuscation system that the user begun navigating to a new target. In response, the obfuscation system may then begin moving the distractor pointers to simulate similar target navigation paths. In some implementations, the obfuscation system is configured to determine when, after a path has traveled at least a threshold distance, a user pointer has sharply reduced its velocity. The obfuscation system can then in such circumstances begin bringing synthetic paths for distractor pointers to an end that resembles natural human pointer operation.

The overshoot maneuver shown for the fourth path segment 2526 reflects the difficulty for a user to accurately direct a pointer to a small target. Much as shown in FIG. 25, users often end up executing overshoot maneuvers as a final action to arrive at a desired point. Another common user behavior is a reduced pointer velocity towards an end of a path to facilitate more accurately arriving on a smaller target. In some implementations, an obfuscation system may make use of an intentionally reduced effective target size to increase pointing difficulty for a user, resulting in an increased occurrence of the above-noted overshoot maneuvers and reduced velocities and resultant pointer paths. Thus, by using smaller effective target sizes, user-generated pointer paths can have features that provide clearer and earlier signals of when a pointer path is nearing its end. This allows the obfuscation system to identify in advance when a user is likely to end a pointer path and bring synthetic pointer paths for distractor pointers to a more natural end. In some examples, an appearance of a target may be unchanged, but a smaller fraction of the area displayed for the target may be considered to be associated with the target. By doing this, a visual appearance may be maintained while achieving the results of smaller targets. Additionally, in some implementations, the obfuscation system may be configured to dynamically change effective target sizes achieve a better dynamic balance between user pointer effectiveness and realistic distractor pointer movement that is more likely to go undetected by an observer as being synthetic.

Figure 26:
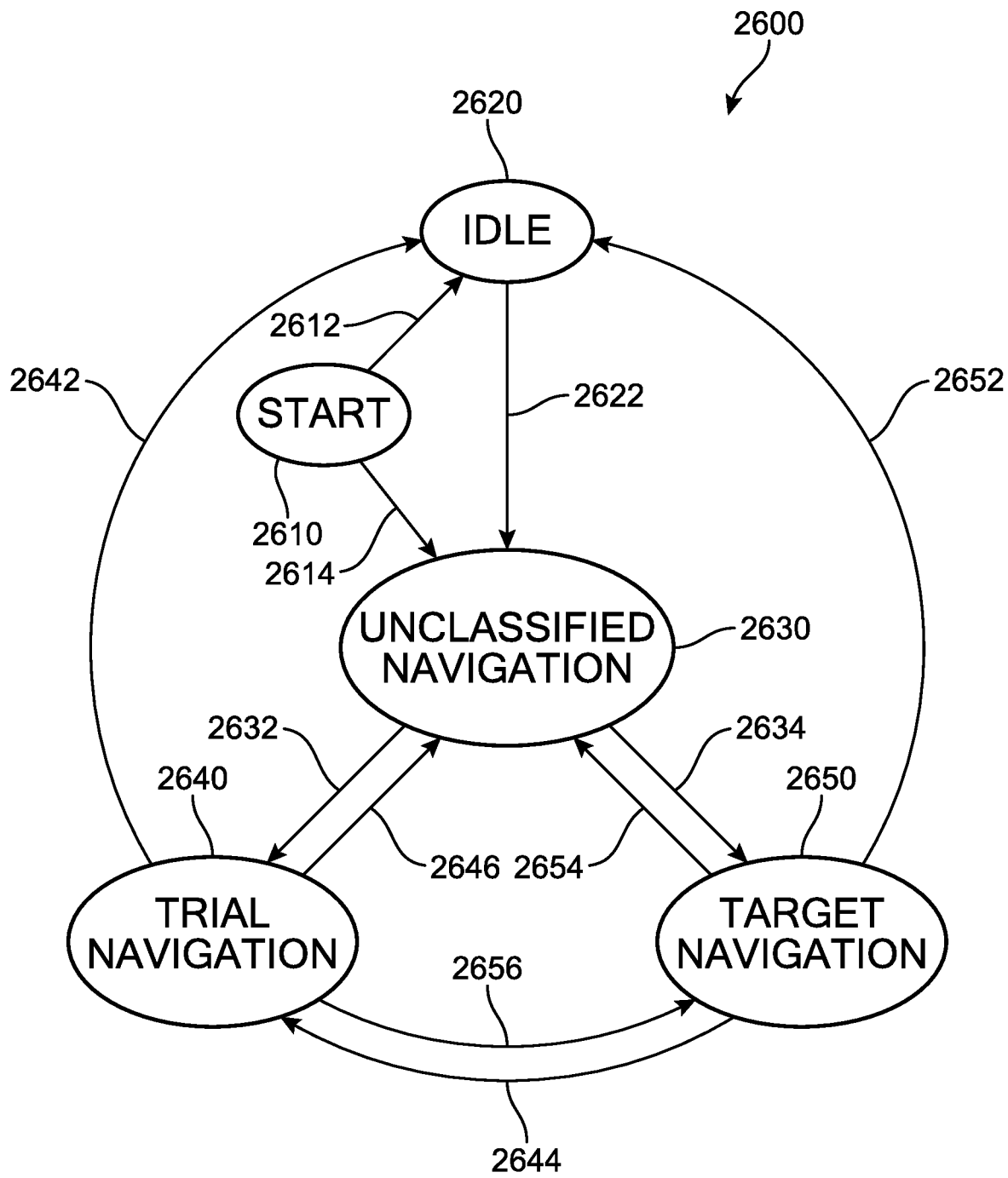
FIG. 26 illustrates an example in which an obfuscation system operates according to five states.

In some implementations, the obfuscation system may operate according to a plurality of states. FIG. 26 illustrates an example in which an obfuscation system operates according to five states, including a first state 2610, a second state 2620, a third state 2630, a fourth state 2640, and a fifth state 2650. The first state 2610 (labeled "START"), which may be referred to a "start state" corresponds to when an input interface is initially presented to a user. The obfuscation system, while in this start state 2610, may perform certain operations and/or set certain parameters that result in useful behavior when the user first starts interacting with an input interface. FIG. 26 illustrates two transitions 2612 and 2614 from the start state to other states. In some implementations, a timer may be used to determine when the obfuscation system may transition out of the start state 2610. If, after the timer has expired, the user pointer is making little to no movement, the transition 2612 occurs from the start state 2610 to the second state 2620, which may be referred to as an "idle state". On the other hand, if more significant user pointer movement is occurring at the expiration of the timer, the obfuscation system instead makes the transition 2614 from the start state 2610 to the third state 2630.

In the idle state 2620 (labeled "IDLE"), there is a single transition 2622 to the third state 2630, which occurs when the user pointer has performed a threshold amount of movement within a specified period of time. The third state 2630 (labeled "UNCLASSIFIED NAVIGATION") corresponds to a state in which the obfuscation system has not yet determined whether the user pointer is engaged in trial navigation corresponding to the fourth state 2640 or target navigation corresponding to the fifth state 2650. FIG. 26 also illustrates a transition 2632 from the third state 2630 to the fourth state 2640, which occurs when the obfuscation system, based on recent user pointer movement, classifies that movement as being performed for a trial navigation assessment. FIG. 26 further illustrates a transition 2634 from the third state 2630 to the fifth state 2650, which occurs when the obfuscation system, based on recent user pointer movement, classifies that movement as being performed by the user to direct a user pointer to a desired target for selection. As will be discussed below, in some implementations, such classifications may be performed with the aid of one or more machine-trained models.

In the fourth state 2640 (labeled "TRIAL NAVIGATION"), the obfuscation system has determined that a user is engaged in a trial navigation assessment and is configured to move one or more distractor pointers according to synthetic trial navigation assessments. In some implementations, the synthetic trial navigation assessments result in the user pointer moving in a manner that is distinct from the movements being performed by the user to facilitate the user quickly and correctly identifying the user pointer from among multiple pointers. As shown in FIG. 26, a transition 2642 may occur from the fourth state 2640 to the idle state 2620. In some examples, this may occur once the user pointer has performed less than a threshold amount of movement within or during a period of time. Also, in some implementations, a transition 2644 may occur from the fourth state 2640 to the fifth state 2650. For example, the transition 2644 may occur in response to detected high acceleration or high velocity user pointer movement. Finally, in some implementations, a transition 2646 may occur from the fourth state 2640 to the third state 2630. In some examples, the transition 2646 may occur in response to the obfuscation system no longer classifying user pointer movement as corresponding to a trial navigation assessment, determines that the user pointer is still actively moving, but is unable to classify the user pointer movement as target navigation behavior.

In the fifth state 2650 (labeled "TARGET NAVIGATION"), the obfuscation system has determined that a user is navigating the user pointer to a particular target for performing a selection. While operating in the fifth state 2650, the obfuscation system generates synthetic target navigation paths for the distractor pointers and moves them accordingly. In some implementations, the movement of the distractor pointers dynamically responds to detected changes in user pointer movement. For example, as noted above, detection of an overshoot maneuver or a significant reduction in user pointer velocity may result in previously planned paths and/or path generation parameters being modified to bring a synthetic path to a natural end concurrent with an end of the current user pointer path.

In some implementations, a transition 2652 may occur from the fifth state 2650 to the idle state 2620. In some examples, this may occur once the user pointer has failed to perform a threshold amount of movement within a period of time. In some implementations, a transition 2654 may occur from the fifth state 2650 to the third state 2630. In some examples, the transition 2654 may occur in response to the obfuscation system no longer classifying user pointer movement as corresponding to a user target navigation, and determines that the user pointer is still actively moving. In some implementations, a transition 2656 may occur from the fifth state 2650 to the fourth state 2640. For example, a high acceleration movement of the user pointer may occur at a beginning of either navigating to a target or a trial navigation assessment, and the obfuscation system may initially respond by transitioning to the fifth state 2650. However, subsequent movement of the user pointer may result in a determination that a trial navigation assessment is being performed and a corresponding transition 2656 from the fifth state 2650 to the fourth state 2640.

It is understood that although five states are shown in FIG. 26 and certain conditions for transitioning between the illustrated states are described here and elsewhere in this disclosure, the techniques described herein are not limited to the number of states shown, the activities performed in each of those states, and the various conditions used to transition between states. For example, a transition might occur from fifth state to a sixth state (not shown in FIG. 26) in response to detecting user pointer movement suggesting the user pointer will soon stop moving. In some implementations, as described or suggested for some of the above states, one or more machine-trained models may be applied the obfuscation system to identify circumstances in which the obfuscation system will transition from a current state to a different state.

In some implementations, starting and stopping of distractor pointer movements is synchronized with starting and stopping of the user pointer. In some examples, the obfuscation system, while in the third state 2630, may perform movement of distractor pointers (which may be initiated in response to the transitions 2614, 2622, 2646, and/or 2654), resulting in the distractor pointers appearing to be idle while the user pointer is idle and the distractor pointers initiating movement at the same time as the user pointer. In some examples, the obfuscation system may terminate movement of distractor pointers in response to a transition or expected transition to the idle state 2620. Synchronization of the user pointer and distractor pointers reduces concerns of an observer successfully determining when a user is causing the user pointer to move. In some implementations and according to various conditions, aspects of distractor pointer movement may be generated in real time in response to related aspects of user pointer movement. For example, a velocity, acceleration, and/or direction of user pointer movement may be used to produce a corresponding velocity, acceleration, and/or direction of distractor pointer movement at about the same time.

Figure 27A:
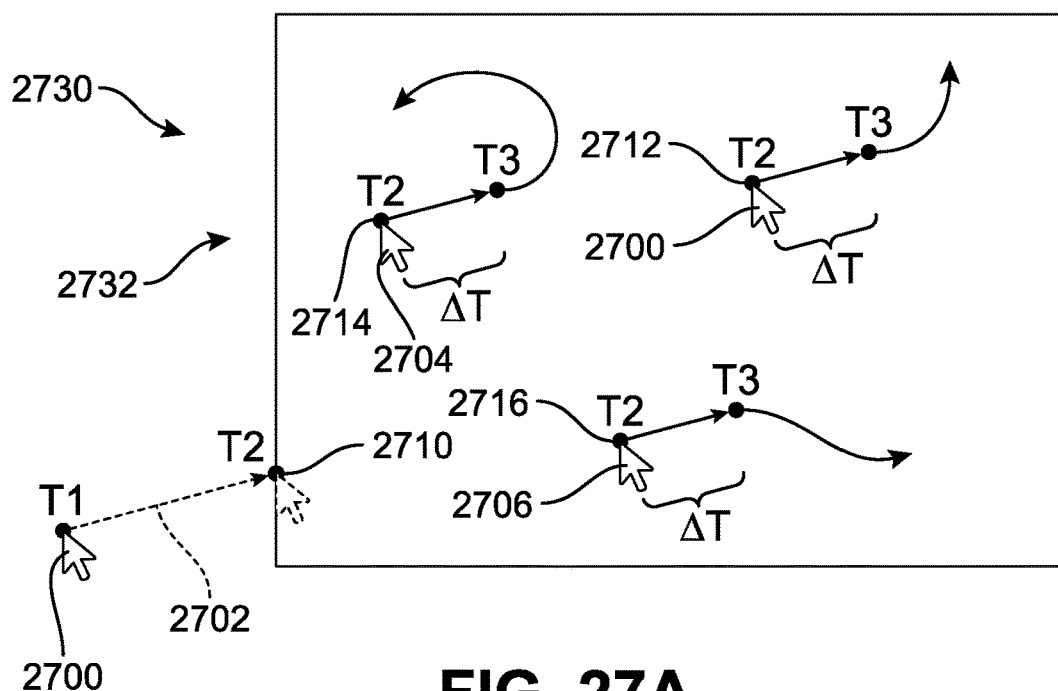
FIG. 27A illustrates an example in which an input interface is configured to move a user pointer to a new position no longer corresponding to a point at which it entered the user interface in order to confuse an observer.

In some circumstances, a user may enter an input interface from outside of the input interface. If the user pointer were to simply continue moving along in the input interface, in general the task of an observer identifying the user pointer may be significantly simplified. In FIGS. 27A-27D, various techniques, which may be performed in response to a determination that a user pointer has entered the input interface, are described to alleviate this concern. FIG. 27A illustrates an example in which an input interface 2730 is configured to move a user pointer 2700 to a new position no longer corresponding to a point at which it entered the user interface 2730 in order to confuse an observer. In this illustration, no targets are shown for the input interface 2730 for purposes of simplicity. Beginning at a time T1 the user pointer moves in a first direction 2702 toward the input interface 2730 and enters the input interface 2730 at a first position 2710 along a left-edge 2732 of the input interface 2730 at a time T2. Rather than the user pointer 2700 simply continuing along the first direction 2702 from the first position 2710, which would be easily tracked by an observer, the user pointer 2700 instead jumps to, abruptly moved to, or otherwise changed to a second position 2712 at a distance away, apart, and discontinuous from the first position 2710 at the time T2, resulting in a discontinuity from a pointer position and/or path of movement for the user pointer 2700 immediately before the time T2. In some implementations, as shown in FIG. 27A, at or about the time T2 one or more distractor pointers are also display at respective positions within the input interface 2730. In FIG. 27A, a first distractor pointer 2704 begins to be displayed at the time T2 at a third position 2714. Also, a second distractor pointer 2706 begins to be displayed at the time T2 at a fourth position 2716. In some examples, as shown in FIG. 27A, at the time T2 the second position 2712 for the user pointer 2700 is at a greater distance from the first point 2710 than at least one of the positions Recognizing that the user is likely to continue moving the user pointer 2700 in the first direction 2702 and that such behavior would be useful to an observer, in some implementations, the obfuscation system is configured to have the distractor pointers perform the same or substantially similar movements as the user pointer 2700 for a period of time Δt, which in FIG. 27A ends at a time T3. In some implementations, the time period Δt may be determined in response to detected movements of the user pointer 2700. For example, once the user pointer 2700 no longer continues in the first direction 2702, the distractor pointers may proceed to navigate according to other path generation algorithms. In some implementations, this matching of distractor pointer movement with user pointer movement is limited to the start state 2610 and a transition from the start state 2610 to a different state may occur at the end of the time period Δt.

Figure 27B:
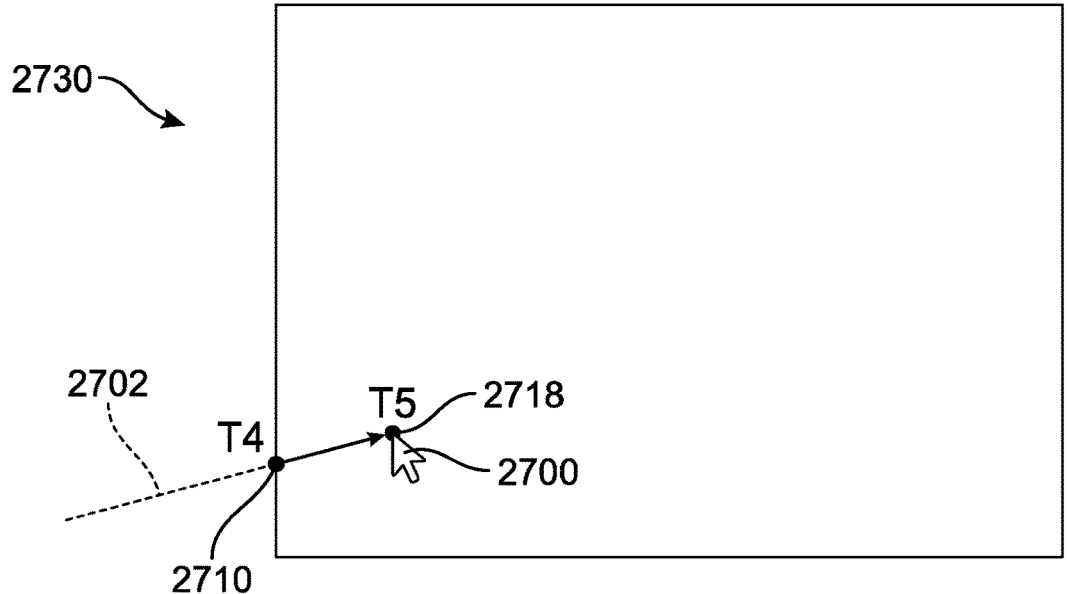
FIGS. 27B-27D illustrate an example in which the user pointer is "split" into multiple pointers to obfuscate the position and movements of the user pointer.
Figure 27C:
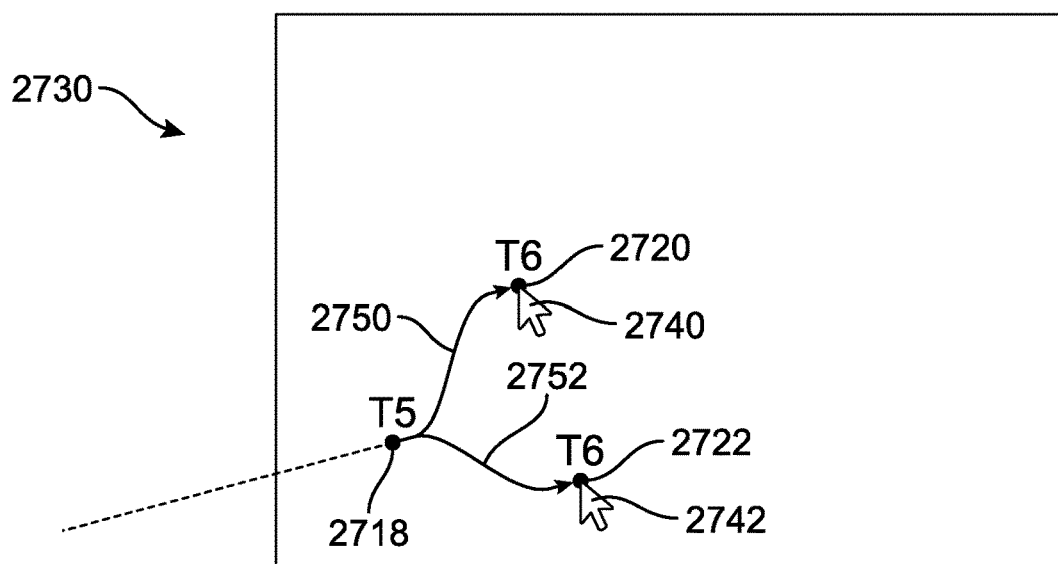
Figure 27D:
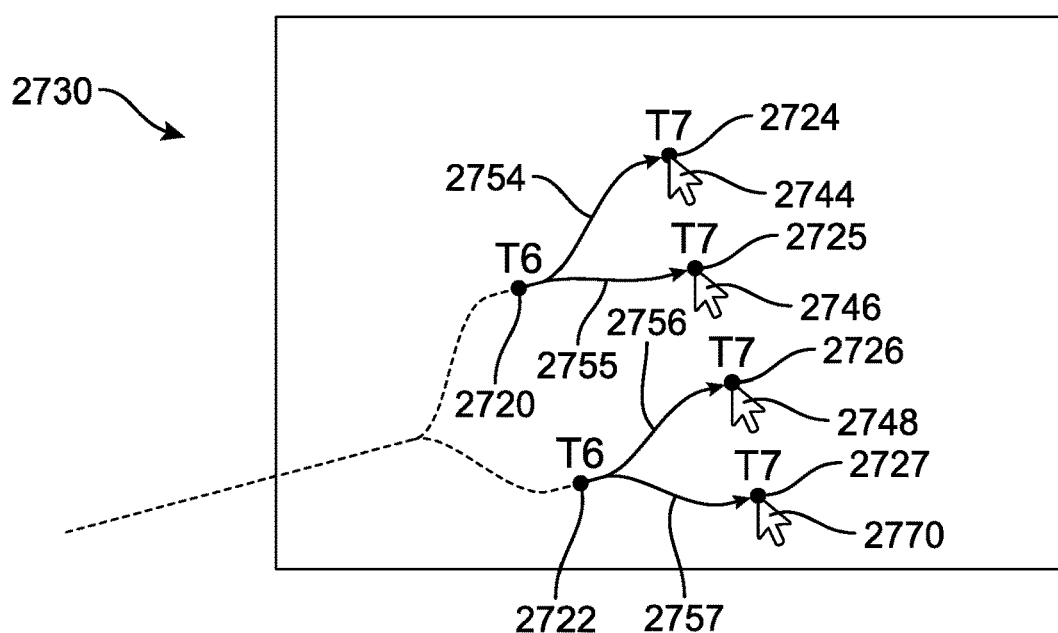

FIGS. 27B, 27C, and 27D illustrate an additional technique in which the user pointer 2700 is "split" into multiple pointers to obfuscate the position and movements of the user pointer 2700. In FIG. 27B, the user pointer 2700 enters the input interface 2730 at the first point 2710 at a time T4, much as shown in FIG. 27A. From there, the user pointer 2700 arrives at a fifth point 2718 at a time T5. Referring next to FIG. 27C, at the time T5 one or more pointers are added at about the fifth point 2718 in response to a determination that the user pointer 2700 entered the input interface 2730, such that the user pointer 2700 appears to have "split" into a first pointer 2740 and a second pointer 2742, which have moved along independent pointer paths 2750 and 2752 to arrive at a respective sixth point 2720 and a seventh point 2722 at a time T6. In some examples, no further splitting of the pointers 2740 and 2742 may occur, and one of the pointers 2740 and 2742 will, at and/or after the time T5, be used as the user pointer 2700 and the other pointer will be used as a distractor pointer. In some examples, the time T5 is, or is approximately, at the time T4 and/or the fifth point 2718 is, or is approximately, at the first point 2710.

However, in some implementations, a further splitting of one or both of the pointers 2740 and 2742 may occur after the time T6. FIG. 27D shows an example in which both of the pointers 2740 and 2742 are split. At the time T6 one or more pointers are added at about the sixth point 2720, such that the first pointer 2740 appears to have "split" into a third pointer 2744 and a fourth pointer 2746, which have moved along independent pointer paths 2754 and 2755 to arrive at a respective eighth point 2724 and a ninth point 2725 at a time T7. Also at the time T6, although a time different than the time T6 may be used, one or more pointers are added at about the seventh point 2722, such that the second pointer 2742 appears to have "split" into a fifth pointer 2748 and a sixth pointer 2770, which have moved along independent pointer paths 2756 and 2757 to arrive at a respective tenth point 2726 and an eleventh point 2727 at the time T7. In some examples, at or after the time T6, one of the pointers 2744, 2746, 2748, and 2770 is used as the user pointer.

It is further noted that this technique of splitting the user pointer can also be combined with the techniques described in FIG. 27A. For example, rather than having the distractor pointers 2704 and 2706 appear at or about the time T2, the distractor pointers 2704 and 2706 may be added later, much as the distractor pointers were added after the time T3 in FIGS. 27C and 27D. It is also noted that the random changing of pointer position shown in FIG. 27A may be applied in some respects to the techniques shown in FIGS. 27B-27D. As an example, instead of pointers 2744 and 2746 both proceeding along paths beginning at the sixth point 2720, the third pointer 2744 and/or the fourth pointer 2746 may be moved at the time T6 to different points positioned away from the sixth point 2720, resulting in an abrupt change in pointer position in combination with adding an additional pointer that further confuses an observer. Although not illustrated FIGS. 27A-27D, in some implementations, the obfuscation system is configured to also obscure pointer location when exiting an input interface. For example, although a user pointer might exit an upper edge of an input interface it may be immediately moved to a different position (for example, a randomly calculated position) to prevent an observer from determining which pointer was the user pointer.

In some implementations in which an input interface is configured to display a user pointer and distractor pointers, the input interface is configured to not allow an operating system provided pointer to be displayed within the input interface. Instead, much as the input interface has been described as displaying and moving distractor pointers, the input interface may also be configured to display and manage movement of the user pointer. In some implementations, this may allow the obfuscation system to better synchronize movements of the user pointer and the distractor pointers, resulting in additional time for generating synthetic distractor pointer movements in response to user pointer movements. In FIGS. 27A-27D, examples are depicted in which the user pointer enters the input interface 2730 from a previous pointer position outside of the input interface 2730. For example, in some circumstances for FIG. 27, the input interface 2730 is displayed while the user pointer 2700 is positioned outside of the input interface 2730. However, there are other circumstances in which the user pointer can enter the input interface 2730. For example, the user pointer 2730 may already be at a position within the input interface 2730 at a time that the input interface 2730 is initially displayed. At that time, the techniques of FIGS. 27A-27D may still be applied. As a result, knowledge of a position of the user pointer 2700 before the input interface 2730 is displayed is no longer useful to an observer.

Figure 28A:
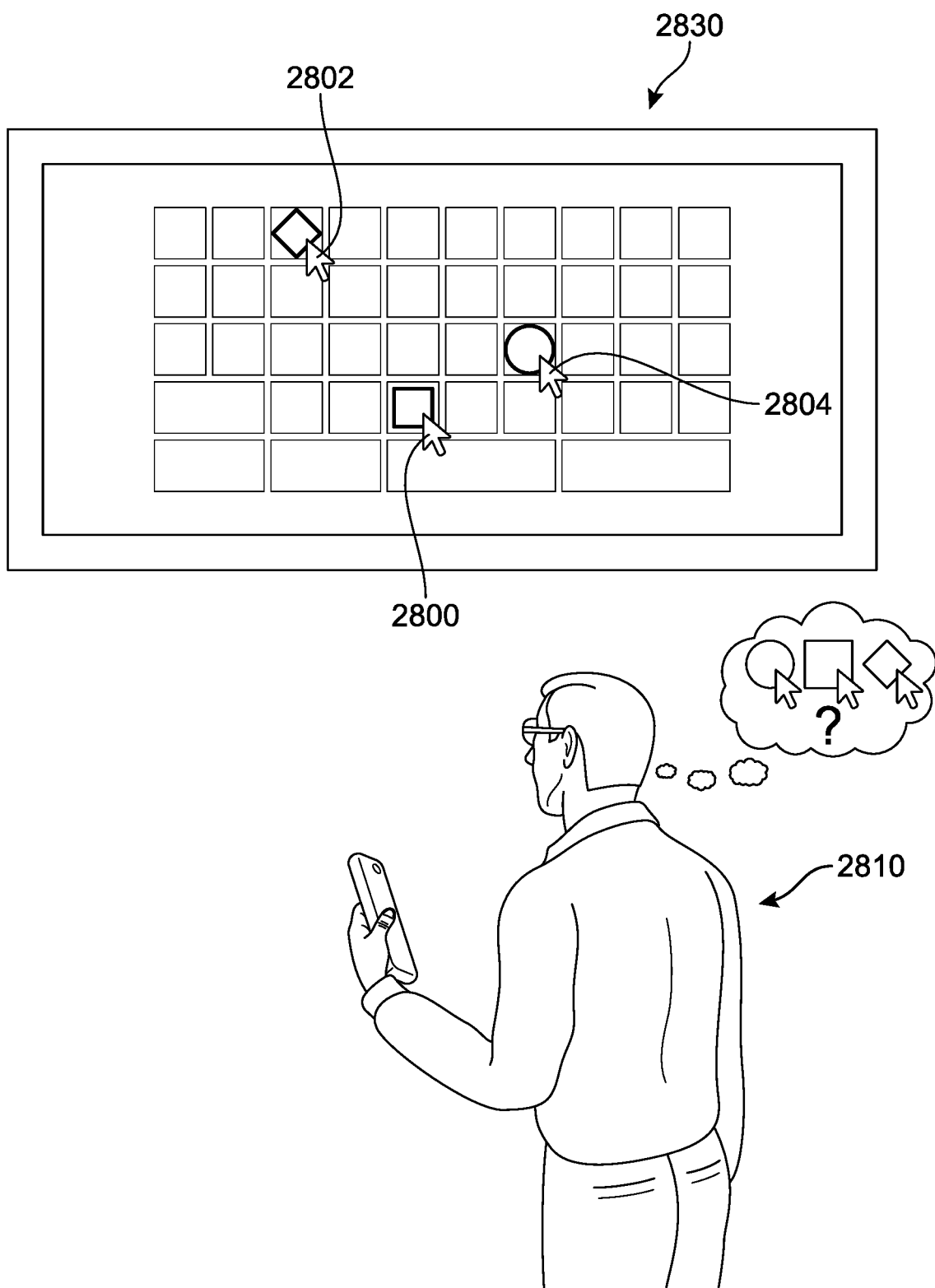
FIGS. 28A and 28B illustrate an example of trial navigation assessment patterns which can be detected and synthesized by an implementation of an obfuscation system.
Figure 28B:
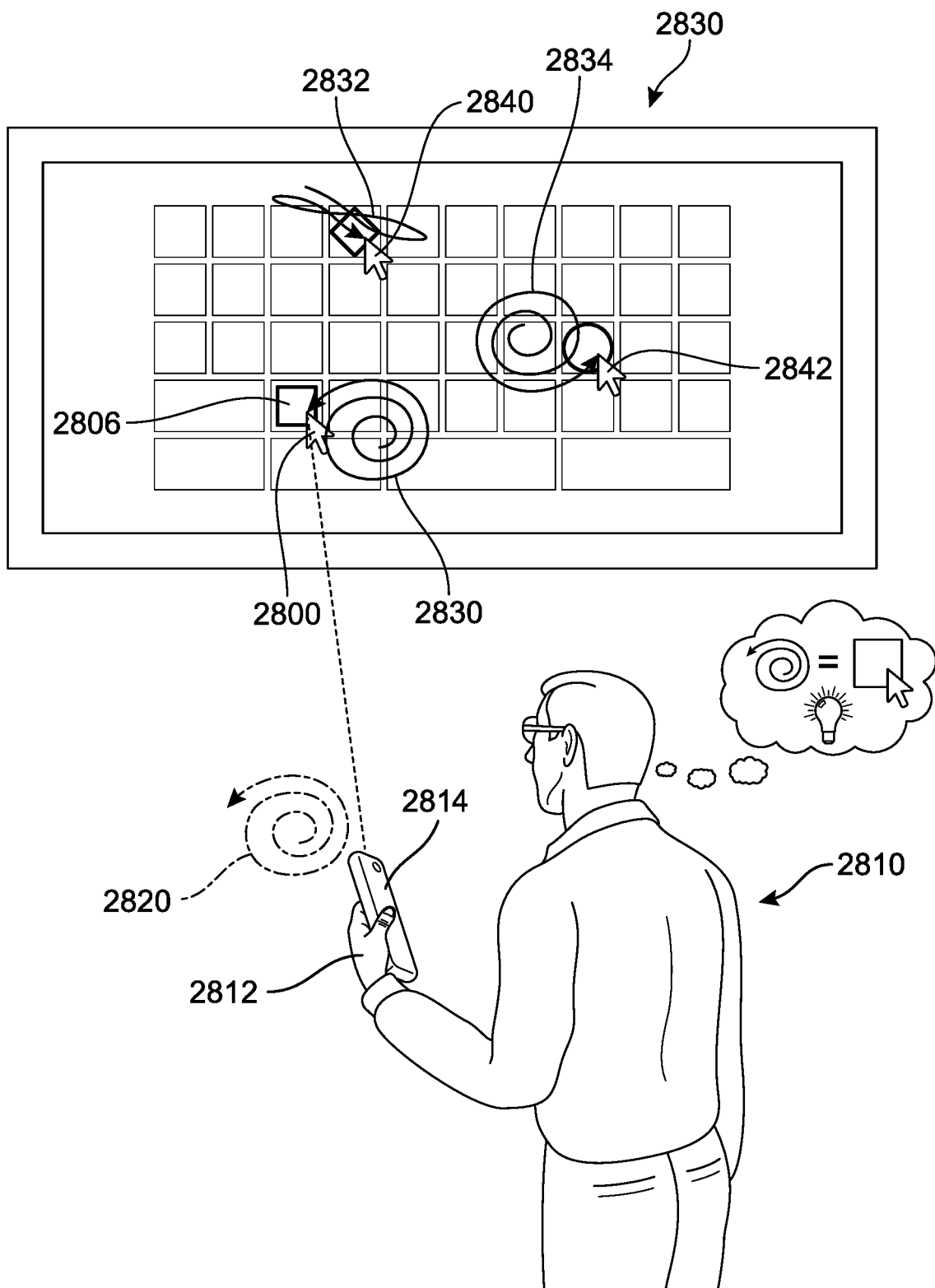

Referring next to FIGS. 28A and 28B, in various circumstances, a user may become uncertain as to which of the multiple pointers currently being displayed in an input interface 2830 is the user pointer. Many users, when faced with this situation, will perform a trial navigation assessment to observe which pointer moves according to the user-supplied navigation input. These trial navigation assessments often follow a number of common patterns, which can be both detected and synthesized by an obfuscation system. FIG. 28A illustrates an example in which a user 2810 is unsure as to which of three pointers (first pointer 2800, second pointer 2802, and third pointer 2804) is the user pointer. In some circumstances, the user 2810 might attempt to perform some initial movements or even begin attempting to navigate to a target and still not understand which of the pointers 2800, 2802, and 2804 is under the control of the user 2810.

To identify the user pointer, in FIG. 28B, the user 2810 is performing a trial navigation assessment by providing a first navigation input 2820 instructing the user pointer to be moved in a counterclockwise pattern. In response to the first navigation input 2820, the first pointer 2800 also moves along a first path 2830 according to the counterclockwise pattern submitted by the user 2810. Due to the first path 2830 matching the first navigation input 2820, the user 2810 realizes that the first pointer 2800 is a user pointer 2806. In some implementations, as illustrated in FIG. 28B, an obfuscation system is configured to recognize when a user begins performing a trial navigation assessment and transitions to the fourth state 2640 described in FIG. 26. While in the fourth state 2640, one or more distractor pointers (e.g., a first distractor pointer 2840 and a second distractor pointer 2842) begin performing synthesized trial navigation assessments, but in a manner that is readily identifiable to the user 2810 as not corresponding to the navigational input 2820. Thus, although an observer may recognize the user 2810 as engaging in behavior suggesting a trial navigation assessment is occurring, the synthesized trial navigation assessments confound the observer's attempt to identify the user pointer 2806.

With continuous input devices, there are a number of frequently encountered patterns used for trial navigation assessments. For example, a circular pattern similar to the first path 2830, which may proceed in a clockwise or counterclockwise direction. Another common pattern is illustrated by a first synthesized trial navigation assessment path 2832, resulting from a user moving a pointer back and forth generally along a common axis, in which that axis might reflect an up and down movement, left and right movement, or various other selected or preferred orientations. The obfuscation system is configured to, algorithmically and/or with the aid of one or more machine-trained models, identify one or more such patterns and as a result transition into the fourth state 2640 (see FIG. 26). In some implementations the obfuscation system may further be configured to distinguish between different types of user trial navigation assessment patterns; for example, distinguishing between the above-mentioned circular pattern and the back and forth pattern. In some implementations, a second synthesized trial navigation assessment path 2834 is generated by transforming the navigation input 2820 so as to be immediately responsive to the navigational input 2820 while also being clearly distinguishable from the first path 2830 that results from the navigational input 2820. In some examples, the transformation includes a symmetric translation of the first path 2830. For example, second synthesized trial navigation assessment path 2834 is essentially a mirror-image of the first path 2830. In some examples, the transformation includes a rotational and/or dilation transformation. As another example, first synthesized trial navigation assessment path 2832 has been produced by a dilation that compressed the movement of the first path 2830 in a first direction in combination with a rotation of the dilated path. In some implementations, one or more machine models may be trained and/or applied to detect, classify, and/or synthesize the trial navigation assessments. In some implementations, a style and/or parameter for generating a synthesized trial navigation assessment path for a particular distraction pointer may be based on a position and/or recent movement of the distraction pointer at a transition to the fourth state 2640. In some implementations, a detected and/or recorded hand used by the user 2810 for input may be used to generate a synthesized trial navigation assessment path. For example, use of a left hand 2812 by the user 2810 for an input device 2814 may be used as an input feature for a machine-trained model or determine a direction and/or amount of rotation of the first synthesized trial navigation assessment path 2832.

In some implementations, an obfuscation system is configured to dynamically respond to movements of a user pointer for real-time synthesis of a distractor pointer path. For example, it may be desired to stop moving a distractor pointer when the user pointer stops moving (and, in some examples, begin moving a distractor pointer when the user pointer begins moving as well) to prevent distractor pointer movement being presented that obviously does not correspond to a user's interactions. However, real-time generation of dynamically responsive distractor movement and paths is a significant challenge, as the movements of the user pointer, such as when and/or where the user pointer will stop, are unknown in advance.

Figure 29A:
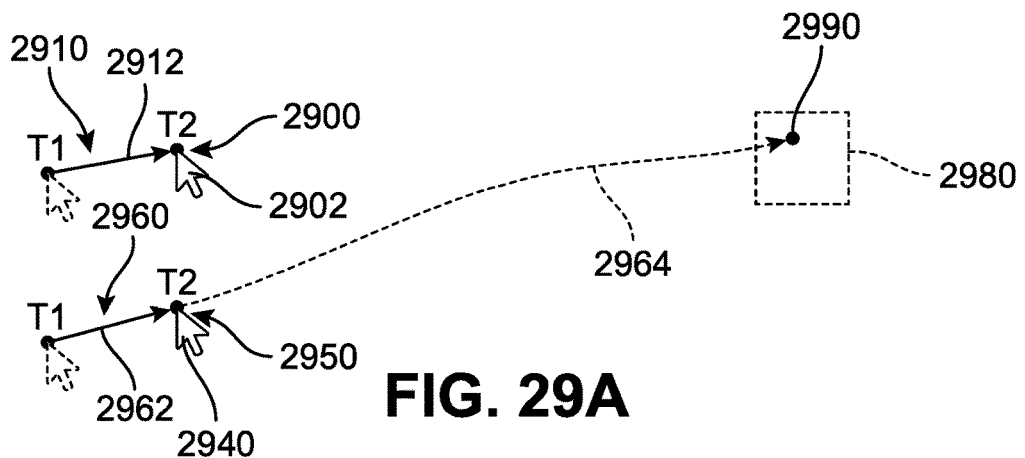
FIGS. 29A-29C illustrate examples of techniques that include detecting certain features of user pointer movement and generating distractor pointer paths accordingly.
Figure 29B:
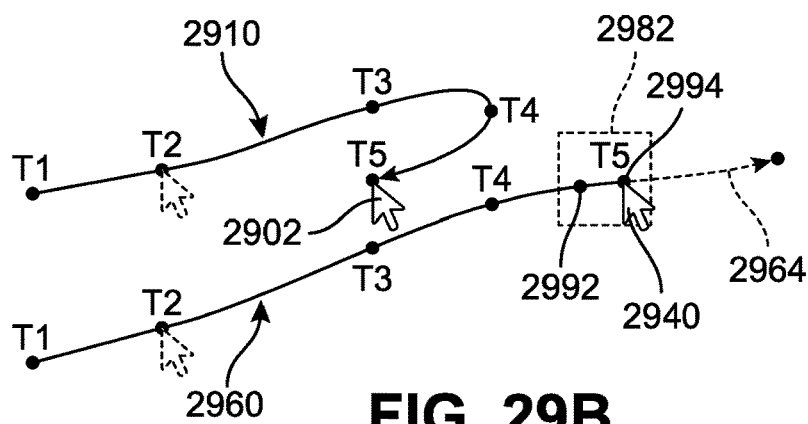
Figure 29C:
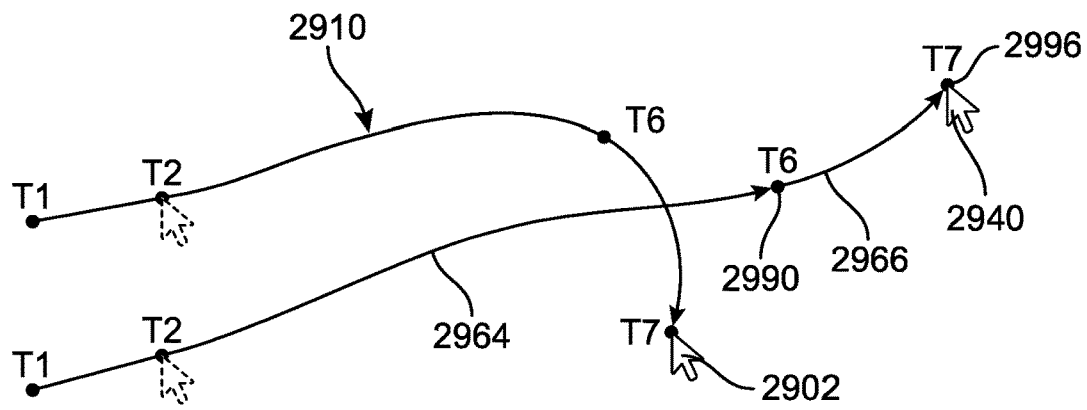

FIGS. 29A-29C illustrate techniques that include detecting certain features of user pointer movement and generating distractor pointer paths accordingly. In some implementations, the generation of a distractor pointer path may be based on which of the states 2610, 2620, 2630, 2640, and 2650 an obfuscation system is currently operating in. FIG. 29A illustrates generation of a distractor pointer path 2960 for a distractor pointer 2950 in response to movement of a user pointer 2900 along a user pointer path 2910. In FIG. 29A, the user pointer 2900 has moved along a first user path segment 2912 from a time T2 to a time T2. In response, for the same time period (from T1 to T2), the obfuscation system has generated a first distractor path segment 2962 for the distractor pointer 2950. In some implementations, the first distractor path segment 2962 may be generated in the third state 2930, which may be entered at the time T1 in response to detected initial movement of the user pointer 2900. In this example, at the time T2, the obfuscation system transitions to the fifth state 2650 (see FIG. 26). For example, this may be due to a threshold acceleration of the user pointer 2900 being detected, which may indicate the beginning of a target navigation. In some circumstances, a first destination point 2990 may be selected as an ending for the distractor pointer path 2960. In some examples, a pre-planned path 2964 ending at the first destination point 2990 may be generated at or about the time T2, although in some implementations, the distractor pointer path 2960 may be generated towards the first destination point 2990 piece-wise in real-time. In some examples, a destination target 2980 may be identified and the first destination point 2990 selected as a point located in the destination target 2980.

FIG. 29B illustrates an example in which the user path 2910 ends at a time T5. Immediately after completing an overshoot maneuver beginning at a time T3, in this example, from the time T2 through the time T3 and to the time T4 the distractor pointer path 2960 has proceeded along the pre-planned path 2964 shown in FIG. 29A. However, at the time T4, the obfuscation system has determined that the user pointer 2900 has begun performing an overshoot maneuver. For example, this may be due to a sudden change in the direction of the user pointer path 2910. In response to this determination that the user pointer 2900 is performing an overshoot maneuver, this is seen as a signal that the user pointer path 2910 is nearly complete and that the distractor pointer path 2960 will need to end before the distractor pointer path 2960 arrives at the previously planned original designation (first destination point 2990). In this example, this results in a new destination point (a second destination point 2992) being identified as an ending for the distractor pointer path 2960. However, it still is unknown when, or even if the user pointer 2900 will actually stop moving. Thus, in some implementations, rather than stopping the distractor pointer path 2960 at the second destination point 2992, the distractor pointer 2950 may slow down to a first velocity and continue moving along the pre-planned path 2964 until the user pointer 2900 stops moving. In this example, as a result of the user pointer 2900 moving slightly longer than anticipated, the distractor pointer path 2960 has continued along the pre-planned 2964 a bit beyond the second destination point 2992, instead ending at a point 2994 included in a target 2982. Thus, in the example shown in FIG. 29B, the distractor pointer path 2960 ends at or approximately at the time T5 at which the user pointer path 2910 ends.

FIG. 29C illustrates an example in which a longer user pointer path 2910 occurs than shown in FIG. 29B. At a time T6, the distractor pointer 2950 has reached the first destination point 2990 initially determined at the time T2, as shown in FIG. 29A. However, the user pointer 2900 is still moving at the time T6 and will not end at a time T7 (although the end time T7 is unknown at the time T6). As a result of the user pointer 2900 continuing to move, the destination pointer 2950 continues along an extended path segment 2966. In some implementations, the extended path segment 2966 proceeds in a same general direction as at or about the time T6, such as a general direction of a path segment 2964 between the times T2 and T6. However, if doing so is expected to take the extended path segment 2966 in a direction that is unlikely to arrive at a target or is likely to reach a peripheral boundary of the input interface, then a different direction may be selected. In any event, in the example shown in FIG. 29C, the user pointer 2900 and the distractor pointer 2950 both stop moving at or about the time T7, with the extended path segment 2966 ending at a point 2990.

Figure 30:
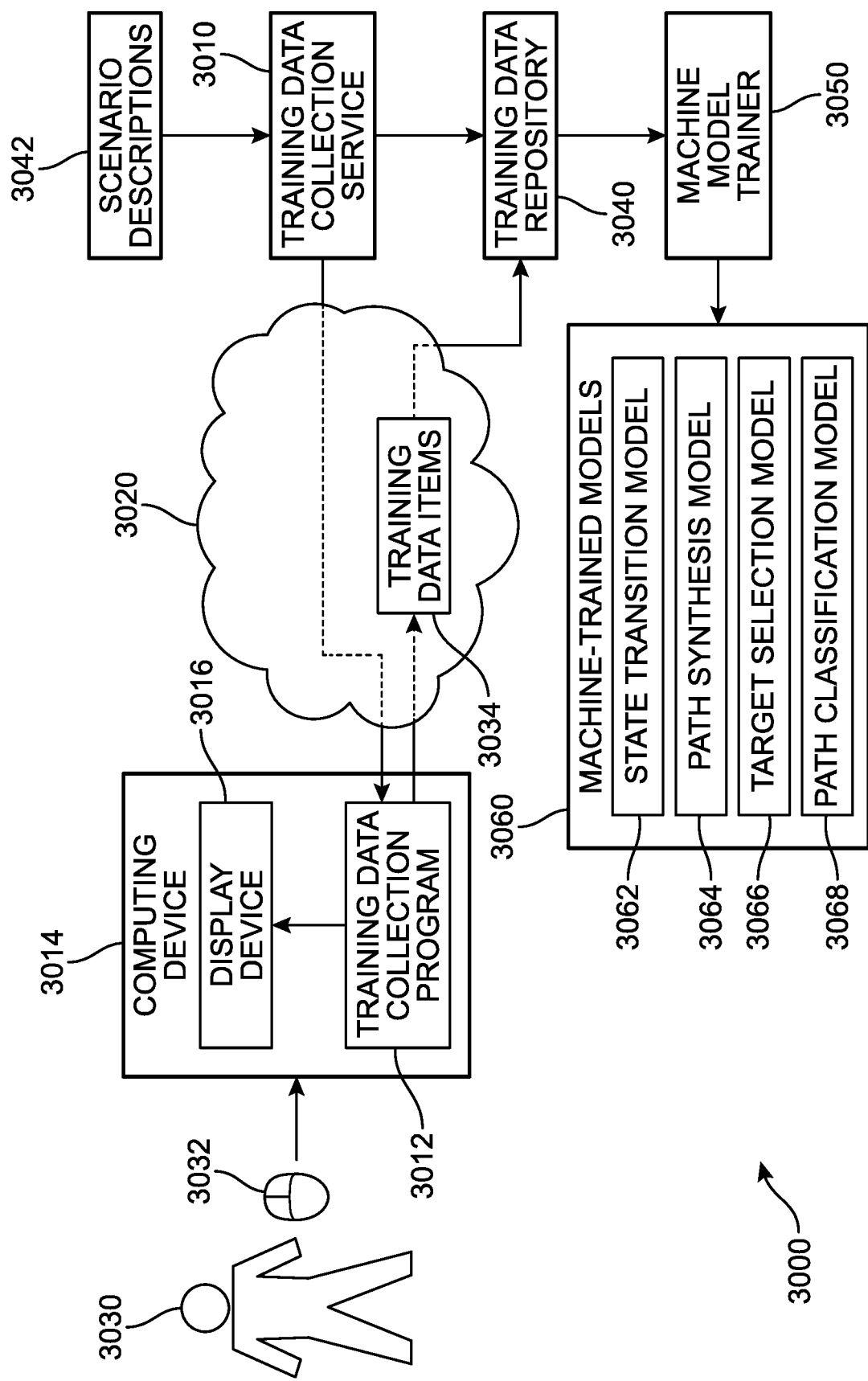
FIG. 30 illustrates an example of a model training system for generating machine trained models.

In some implementations, the training system may be configured to identify features in user pointer paths similar to those shown and described in FIG. 25 and characterize paths according to those features for machine training. As has been mentioned in previous figures, one or more machine-trained models may be applied by the obfuscation system to make various determinations of user behavior and/or synthesizing distractor pointer paths. FIG. 30 illustrates a model training system ("system") 3000 for generating such machine trained models ("models"). In this example, human-generated pointer operation data is obtained separate from actual user input interface interactions to avoid inadvertent collection of sensitive user information. Instead, the system 3000 includes a data collection service 3010 which is configured to, via a network 3020, identify a plurality of training users and distribute training data collection programs. An example of this is shown in FIG. 30, where a training user 3030 is interacting with a computing device 3014. The computing device 3014 receives a training data collection program 3012. The training data collection program 3012 includes instructions which, when executed by the computing device 3014, cause a variety of scenarios to be presented on a display device 3016. In response to each scenario provided by training data collection program 3012 the training user 3030 manipulates an input device 3032 resulting in collection of training data items 3034 which the training data collection program 3012 provides to a training data repository 3040. In some examples, a plurality of scenario descriptions 3042 are provided to the data collection service 3010, which in turn is used to generate specific scenarios presented to each of the training users.

The various scenarios are designed to elicit responses from a user that correspond to particular situations for which models are desired to recognize, characterize, and/or synthesize. For example, in order to train a model to identify when users start performing trial navigation assessments, various scenarios may be provided that prompt a training user to trial navigation assessments. For example, in a scenario multiple pointers may be displayed to a training user, much as shown in FIG. 28A, and a training user requested to perform an action requiring selection of the user pointer. From the resulting training data across multiple users, a first model can be produced and applied to determine when the transitions 2632 and/or 2656 to the fourth state 2640 are performed. In some examples, the same training data used to train the first model may also be used to train a second model directed to simulating user trial navigation assessments and applied generate synthesized distractor pointer movements while in the fourth state 2640. There are many other aspects of human input device usage that may be elicited for generating models reflecting those aspects.

The system 3000 also includes a model trainer 3050 which is configured to generate one or more trained models 3060 based on training data maintained by and obtained from the training data repository 3040. Examples of such models include state transition models 3062, which are applied to identify when a transition to a different state should occur, distractor pointer path synthesis models 3064 configured to generate movements of distractor pointers that realistically simulate actual human operations in similar situations, target selection models 3066 used to select targets or series of targets for distractor pointers that would reflect choices made by human users, and path classification models 3068 which may be used to classify a user's operation of a user pointer, with a determined classification used to generate distractor pointer movements and/or as an additional feature provided as an input to one or more other models.

Figure 31:
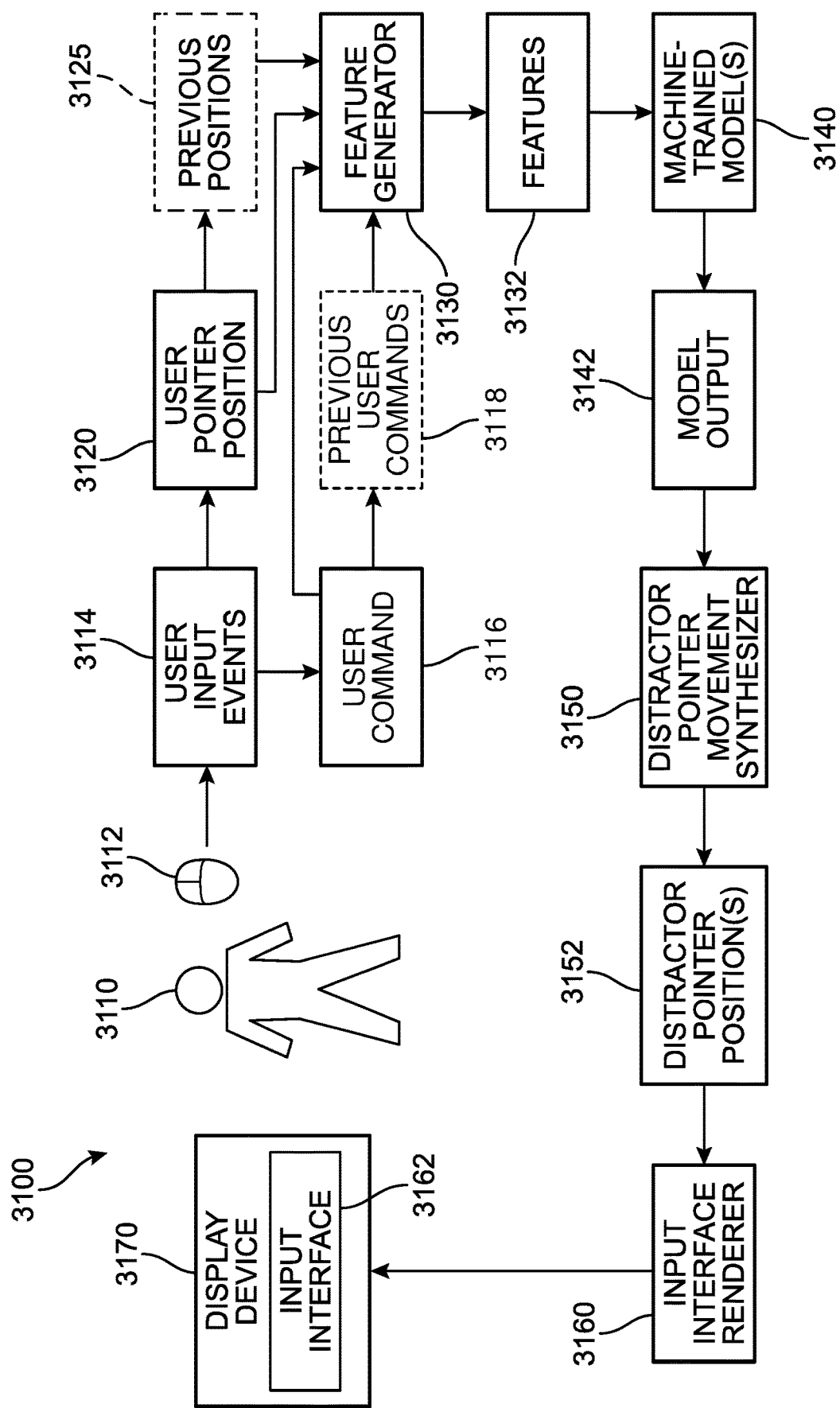
FIG. 31 illustrates an example of selected portions of an obfuscation system that may apply one or more models produced as described in FIG. 30.

Referring now to FIG. 31, selected portions of an obfuscation system 3100 that may apply one or more models produced as described in FIG. 30 are illustrated. In this example, a user 3110 operates an input device 3112 resulting in user input events 3114. The obfuscation system 3100 is configured to determine and/or change a user pointer position 3120. In some implementations, the user pointer position 3120, often in combination with previous user pointer positions, are used by a feature generator 3130 to generate one or more features 3132 used as inputs to one or more models 3140. In some implementations, the feature generator 3130 may generate features based on recent or previous positions 3125 of the user pointer. For example, one or more features 3132 corresponding to the features shown in FIG. 25 may be produced as a higher level characterization of a user pointer path rather than supplying the individual points into a model. The models 3140 correspond to the models 3060 described in FIG. 30 and may be applied in various ways to determine movements for distractor pointers. Based on the features 3132, the models 3140 generate a model output 3142. The obfuscation system 3100 includes a distractor pointer movement synthesizer 3150 configured to generate updated distractor pointer positions 3152 based on at least the model output 3142. The obfuscation system 3100 includes an input interface renderer 3160 which is configured to update an input interface 3162 on a display device 3170 based on the updated distractor pointer positions 3152 and the user pointer position 3120.

In some implementations, a machine model may be configured to output distractor path parameters directed to features such as those shown and described in FIG. 25. For example, a distractor pointer path may be synthesized, at least in part, producing a series of trajectory errors and simulated corrections at various points along a path to simulate human interaction with an input device. The parameters may also result in an overshoot maneuver with indicated characteristics being performed at an end of a synthesized distractor pointer path.

Figure 32A:
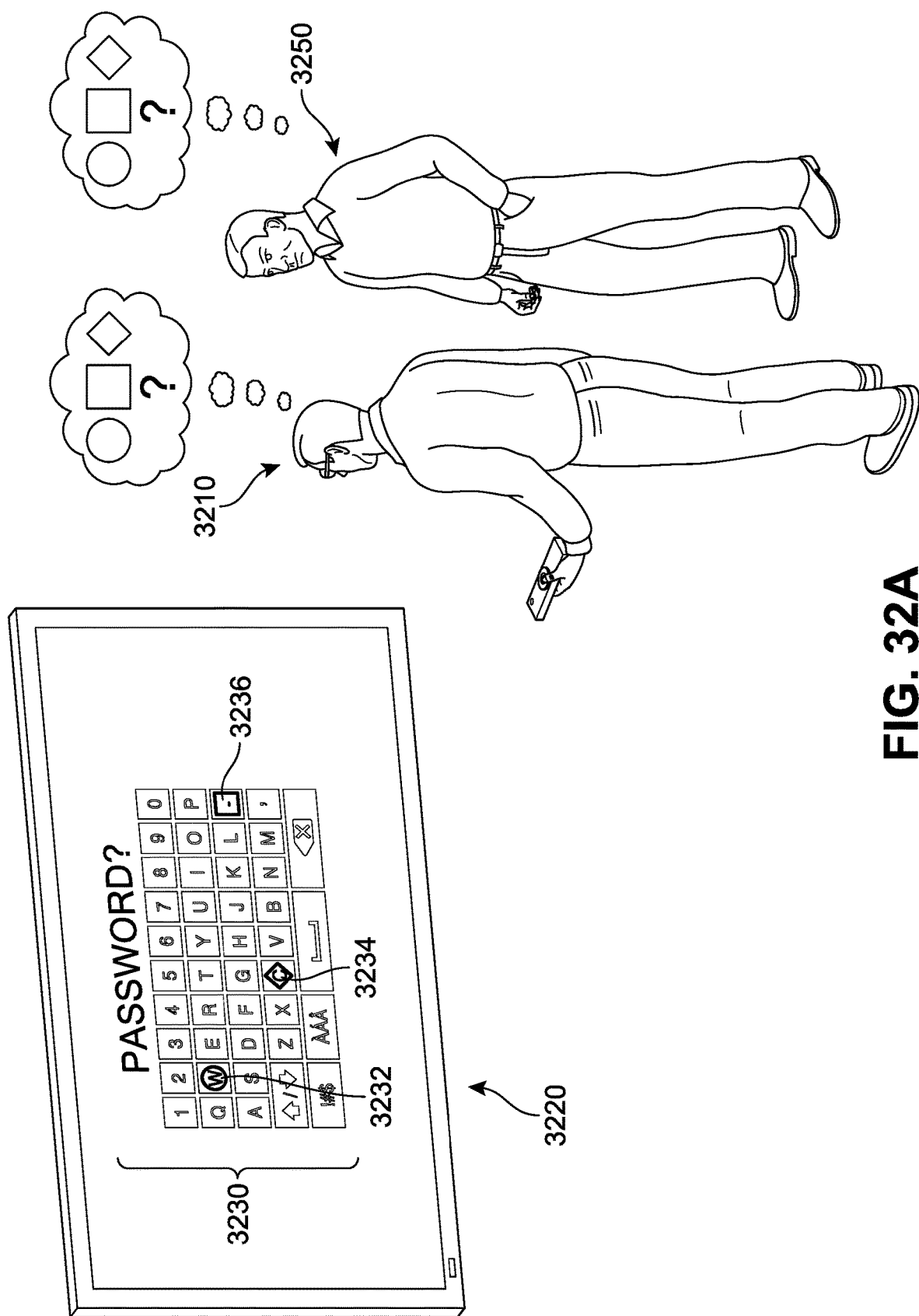
FIGS. 32A-32C illustrate an example of a mechanism by which inputting user can distinguish between their own current user target and those of the current distractor targets.

In different implementations, the systems described herein can include provisions for facilitating an inputting user's ability to distinguish between their own current user target and those of the current distractor targets. In FIG. 32A, an example of a fifth user 3210 positioned near a display device 3220 is shown. The display device 3220 in this example is a large-screen display that displays a seventh interface 3230 which may operate according to any of the previously described examples. At the time shown in FIG. 32A, neither the fifth user 3210 nor an adjacent observer 3250 is able to determine which of three displayed current targets 3232, 3234, and 3236 is the current user target that will be controlled by the fifth user 3210.

Figure 32B:
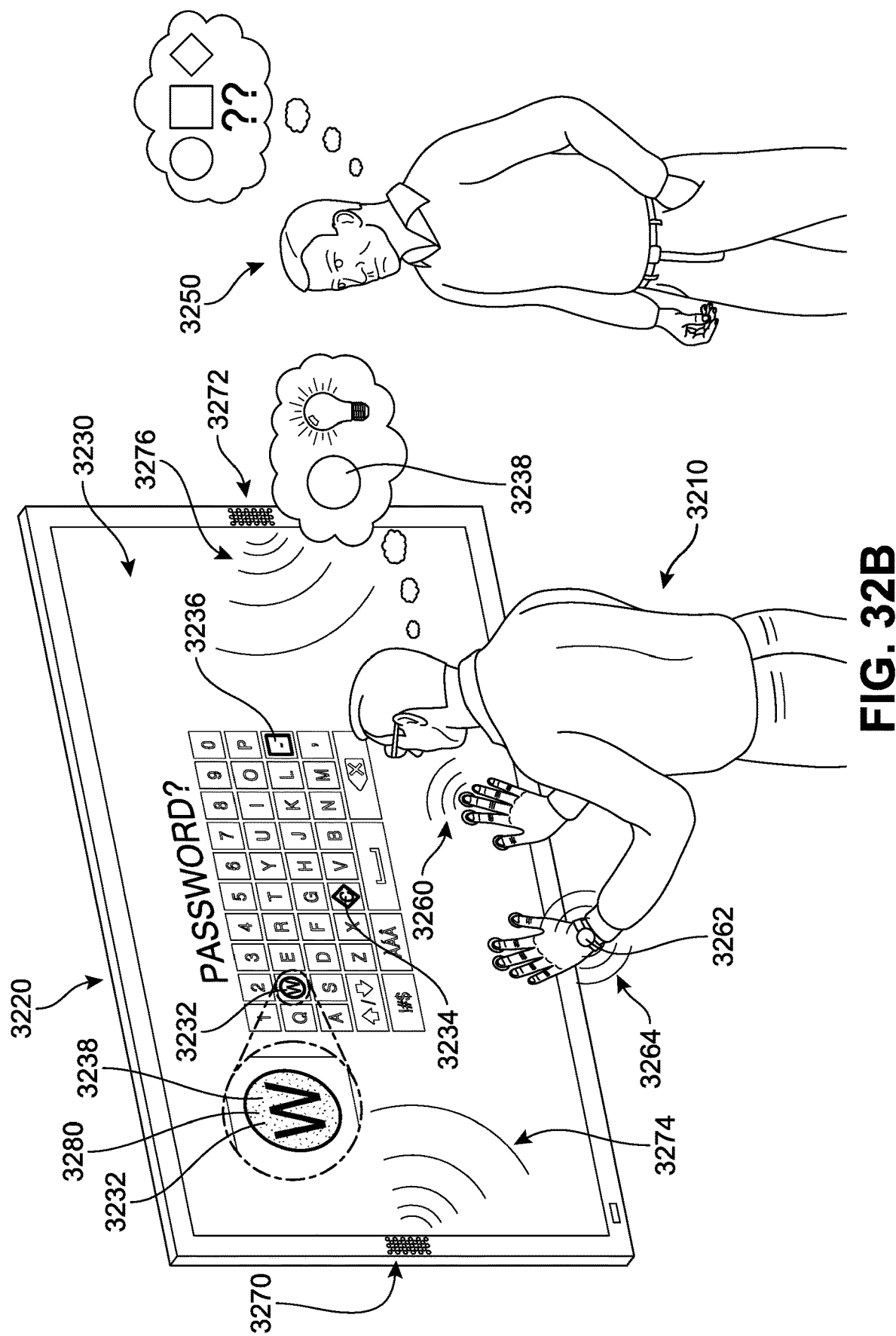

FIG. 32B continues the example of FIG. 32A, where the fifth user 3210 has moved into closer proximity to the display device 3220. In some implementations, the fifth user 3210 might be in physical contact with the display device 3220, as previously illustrated in FIGS. 17-19D, though this is not necessary. Due to being in close proximity to display device 3220, the fifth user 3210 is able to receive and understand one or more signals presented by the obfuscation system indicating which of the current targets 3232, 3234, and 3236 corresponds to a current user target 3238. In this case the current user target 3238 is the current target 3232. On the other hand, the observer 3250 is unable to perceive and/or interpret the signals provided by the obfuscation system and therefore remains unaware of which of the current targets 3232, 3234, and 3236 will be controlled by the fifth user 3210.

In some implementations, the signal may be provided in a form of a haptic output to the fifth user 3210 via a device in physical contact with the fifth user 3210. For example, where the fifth user 3210 is in contact with the display device 3220 as shown in FIGS. 17-19D, the display device 3220 may generate a first vibration 3260 providing the signal. In some implementations, the fifth user 3210 may have and be in physical contact with a first companion device 3262 which is configured to receive an electronic signal from the obfuscation system and generate a respective second vibration 3264. However, the observer 3250 is unable to detect the signal because the observer 3250 is not in contact with the vibrating device and an amplitude of the vibration is too small to be heard by the observer 3250.

In some other implementations, the signal may be provided in a form of audio output to the fifth user 3210 via a device that is near to the fifth user 3210. In the example shown in FIG. 32B, display device 3220 includes a first speaker 3270 for a first audio channel (here corresponding to a left side of the fifth user 3210) and a second speaker 3272 for a second audio channel (here corresponding to a right side of the fifth user 3210). In some implementations, the two speakers can produce auditory outputs 3274 and 3276 which, due to a proximity and/or position of the fifth user 3210, the fifth user 3210 is able to detect a discriminatory signal that will allow the fifth user 3210 to identify the current user target 3238. However, due to the observer 3250 being at a greater distance and/or at a different position relative to the first speaker 3270 and second speaker 3272, the observer 3250 is unable to perceive the signal being provided to the fifth user 3210.

As another example, the signal may be provided in the form of a visual indicator, such as a discriminatory visual indicator 3280 to the fifth user 3210 via the device display 3220. The fifth user 3210 is able to detect the discriminatory visual indicator 3280 as a result of being in close proximity to the discriminatory visual indicator 3280. However, at greater distances, the human visual system does not have sufficient acuity to detect the presence of the discriminatory visual indicator 3280. Accordingly, the observer 3250 does not perceive the signal being provided to the fifth user 3210 by the discriminatory visual indicator 3280. It can be appreciated that by use of these types of signals (e.g., haptic, audio, visual) the fifth user 3210 can avoid performing a trial navigation assessment as previously described in connection with FIGS. 12A-12C, thereby further reducing clues for the observer 3250 effective for identifying the current user target 3238.

Figure 32C:
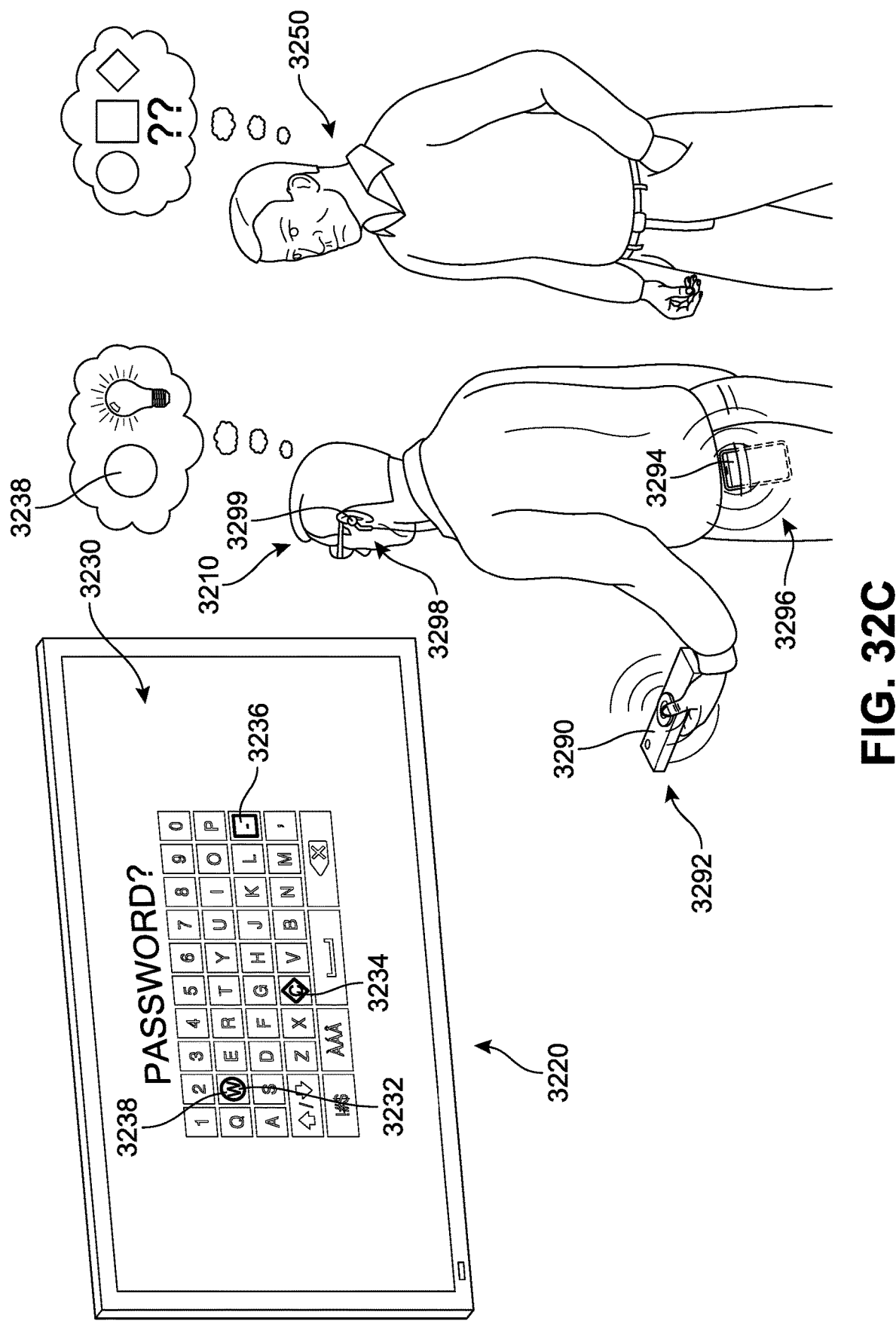

FIG. 32C provides another continuation of the example of FIG. 32A, where the fifth user 3210 is providing input to the obfuscation system using a handheld remote input device 3290 much as previously described, such as in regard to the input device 140 shown in FIG. 10. In some implementations, much as described for the first companion device 3262, the handheld remote input device 3290 is configured to receive an electronic signal from the obfuscation system and generate a respective third vibration 3292. In some other implementations, the fifth user 3210 may have a second companion device 3294. For example, in FIG. 32C, the second companion device 3294 is in the form of a mobile computing device which can provide a vibratory signal 3296 and/or an auditory signal 3298 via an in-ear headphone 3299. The observer 3250 is unable to detect any of these signals and therefore remains thwarted in his efforts to determine which current target 3232, 3234, and 3236 is the current user target 3238. Although the examples shown in FIGS. 32A-32C are with respect to a large format display device 3220 it is understood that similar signals may be provided to a user via a portable handheld computing device such as but not limited to a tablet computing device or smartphone to prevent casual observers from obtaining sensitive information being input by the user.

Figure 33A:
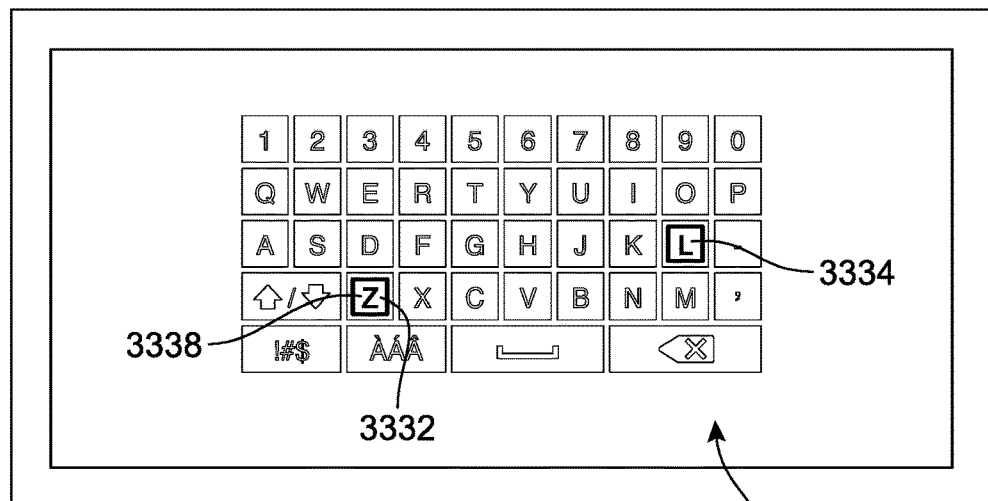
FIGS. 33A and 33B illustrate an example of a visual discriminatory signal being presented by an obfuscation system while a display device is at two different distances from a user.

Additional details with respect to these discriminatory signals will now be provided with reference to FIGS. 33A-38B. Referring first to FIGS. 33A and 33B, a display device 3320 is shown at two different distances from the user. In FIG. 33A, the display device 3320 is at a first distance from a prospective user, and in FIG. 33B the display device 3320 is at a second distance from a prospective user that is smaller than the first distance. In other words, the display device 3320 in FIG. 33A is positioned further away than the same display device 3320 in FIG. 33B.

Figure 33B:
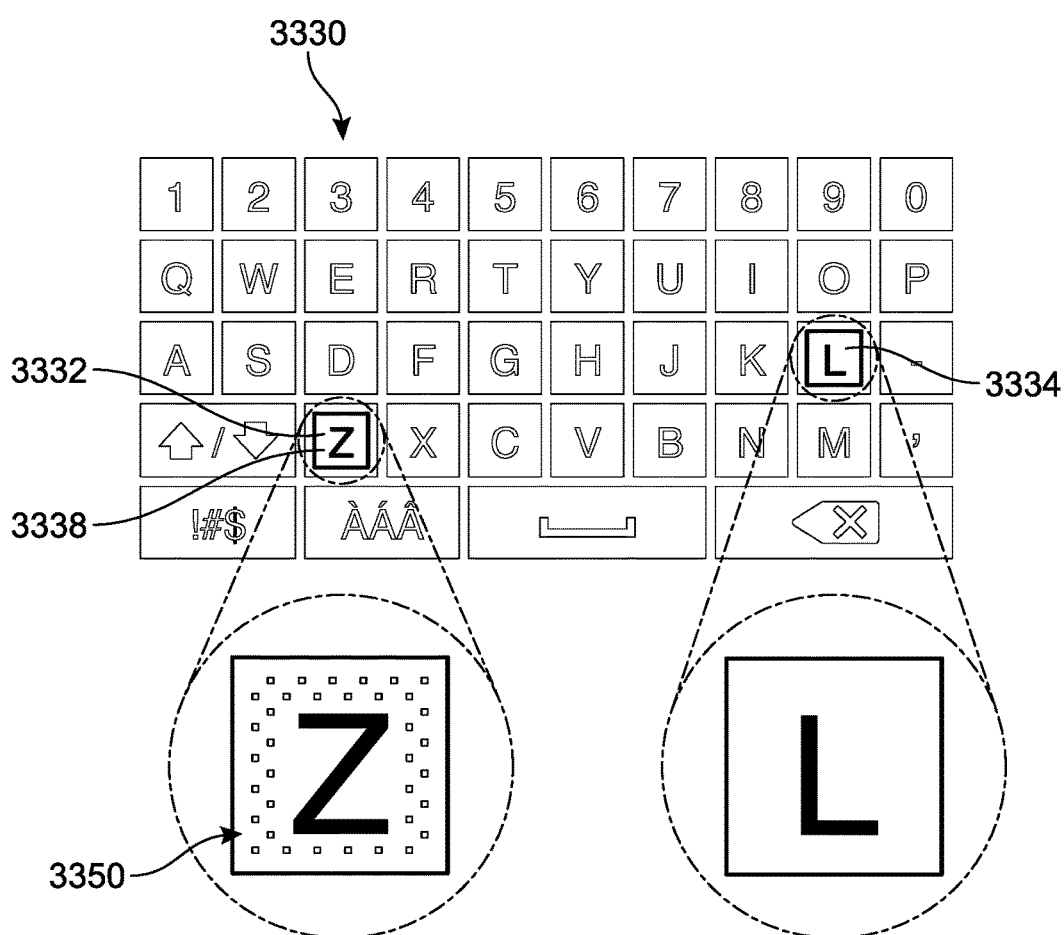

In this example, the display device 3320 presents an eighth interface 3330 which includes a plurality of targets that includes a first current target 3332 and a second current target 3334, of which the current target 3332 is also a current user target 3338. Although not visible to a viewer at the first distance of FIG. 33A, the current user target 3338 is displayed with a discriminatory visual indicator 3340. In FIG. 33B, as the user approaches or is positioned closer to the display device 3320, the discriminatory visual indicator 3340 becomes discernable. As shown in a magnified isolated view 3350, in some implementations, the discriminatory visual indicator 3350 may be provided via a patterned change in pixel colors that can be seen at near distances but at greater distances are no longer distinguishable or discernable by the same person. In some implementations, this may include applying a first modification to a selected first plurality of pixels associated with the current user target (but not necessarily at the current user target). For example, the first modification may be performed by increasing an amount of a particular first color component (such as an amount of blue in an RGB color) of an initial first pixel color to generate a modified second pixel color. Additionally, an offsetting second modification may be applied to a selected second plurality of pixels associated with the current user target, in which the second modification is configured to perform an offsetting pixel color change such that when viewed from a distance the down-sampled view of the current user target 3338 is the same whether or not the discriminatory visual indicator 3350 is used. The offsetting second modification avoids a shift in color that might otherwise be perceived by only applying the first modification. In some implementations, the discriminatory visual indicator 3350 may be animated, such as by changing which pixels are modified over time and/or changing an amount and/or type of modification over time, to further improve its visibility to a user in close proximity. In some implementations, a user may select a preferred visual effect, the selection maintained as a user preference, and the user preference applied for the user. In some implementations, reported or detected characteristics of the display 1020 may be used to select and/or modify a visual effect to improve its detectability.

Figure 34A:
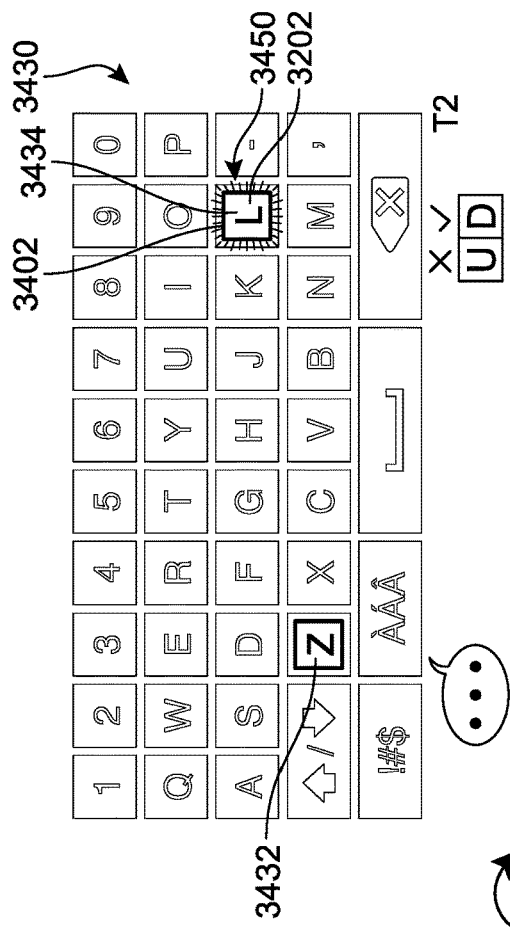
FIGS. 34A-34E present examples of haptic and auditory discriminatory signals provided in combination with a visual indictor for a current user target.

In order to introduce the reader to additional details regarding the haptic and auditory discriminatory signals, an example of a current target display is discussed for purposes of context with respect to FIGS. 34A-34D. In FIG. 34A, an isolated view of the ninth interface 3430 is shown, including a first current target 3432 and a second current target 3434. In this case, during the time period T1, the first current target 3432 is associated with a first visual indicator 3442, and the second current target 3434 is associated with a second visual indicator 3444 that each identify the targets as current targets. In addition, at selected times, the obfuscation system applies a secondary visual indicator 3450 to one of the currently displayed targets at a time. For example, during the time period T1 shown in FIG. 34A, the secondary visual indicator 3450 is applied to the first current target 3432. It is noted that the secondary visual indicator 3450 does not in and of itself signal to the user that the first current target 3432 is a current user target 3438 (i.e., under control of the user). Also during the time period T1 a haptic or audio signal 3460 is provided to the user. Together the secondary visual indicator 3450 and haptic or audio signal 3460 provide a discriminatory signal 3470. Therefore, in FIG. 34A, the concurrent presentation of the haptic or audio signal 3460 with the display of the secondary visual indicator 3450 in combination with the first current target 3432 informs the user that it is indeed the current user target 3438.

Figure 34B:
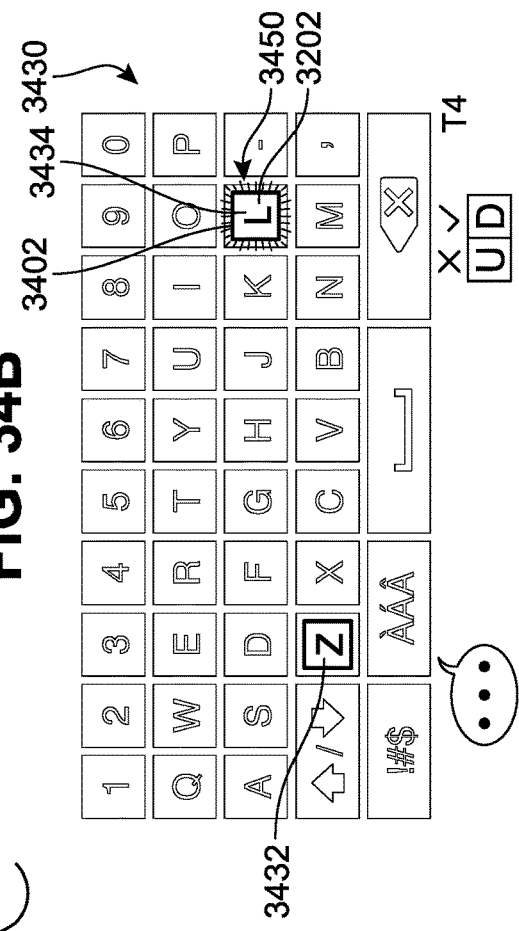
Figure 34C:
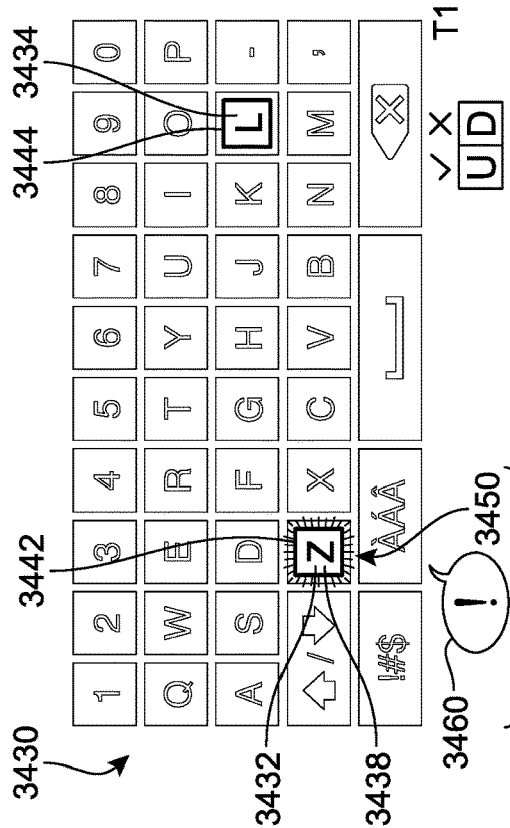
Figure 34D:
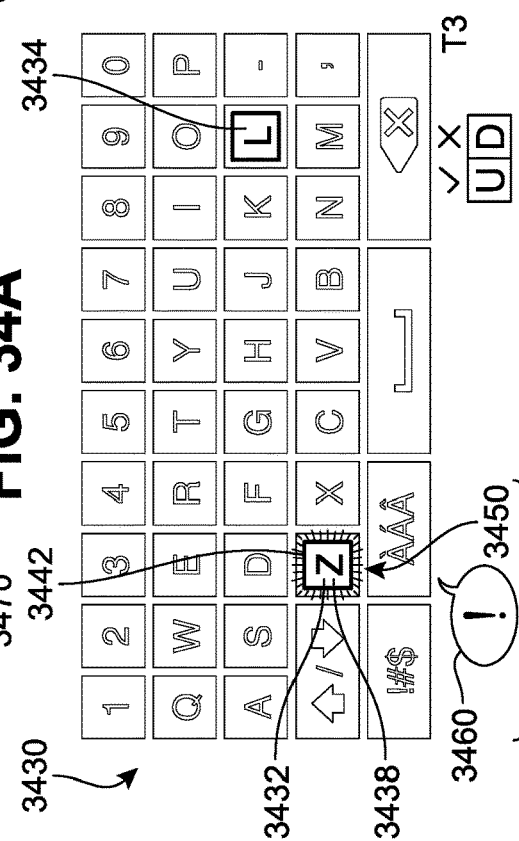

In contrast, in FIG. 34B, the secondary visual indicator 3450 is being applied to the second current target 3434, and has been removed the first current target 3432. However, during the time period T2 that immediately follows time period T1, no auditory or haptic signal is presented to the user. This indicates that the second current target 3434 is a current distractor target 3402. Similarly, in FIGS. 34C and 34D, the pattern is repeated. Thus, in FIG. 34C the concurrent presentation of the haptic or audio signal 3460 with the display of the secondary visual indicator 3450 in combination with the first current target 3432 during a time period T3 that immediately follows time period T1 informs the user that it is indeed the current user target 3438. In addition, in FIG. 34D, during the time period T4 that immediately follows time period T3, no auditory or haptic signal is presented to the user. This again indicates that the second current target 3434 is a current distractor target 3402. As shown in FIGS. 34A-34D, the secondary visual indicator 3450 is alternated between or rotated among the plurality of current targets.

Figure 34E:
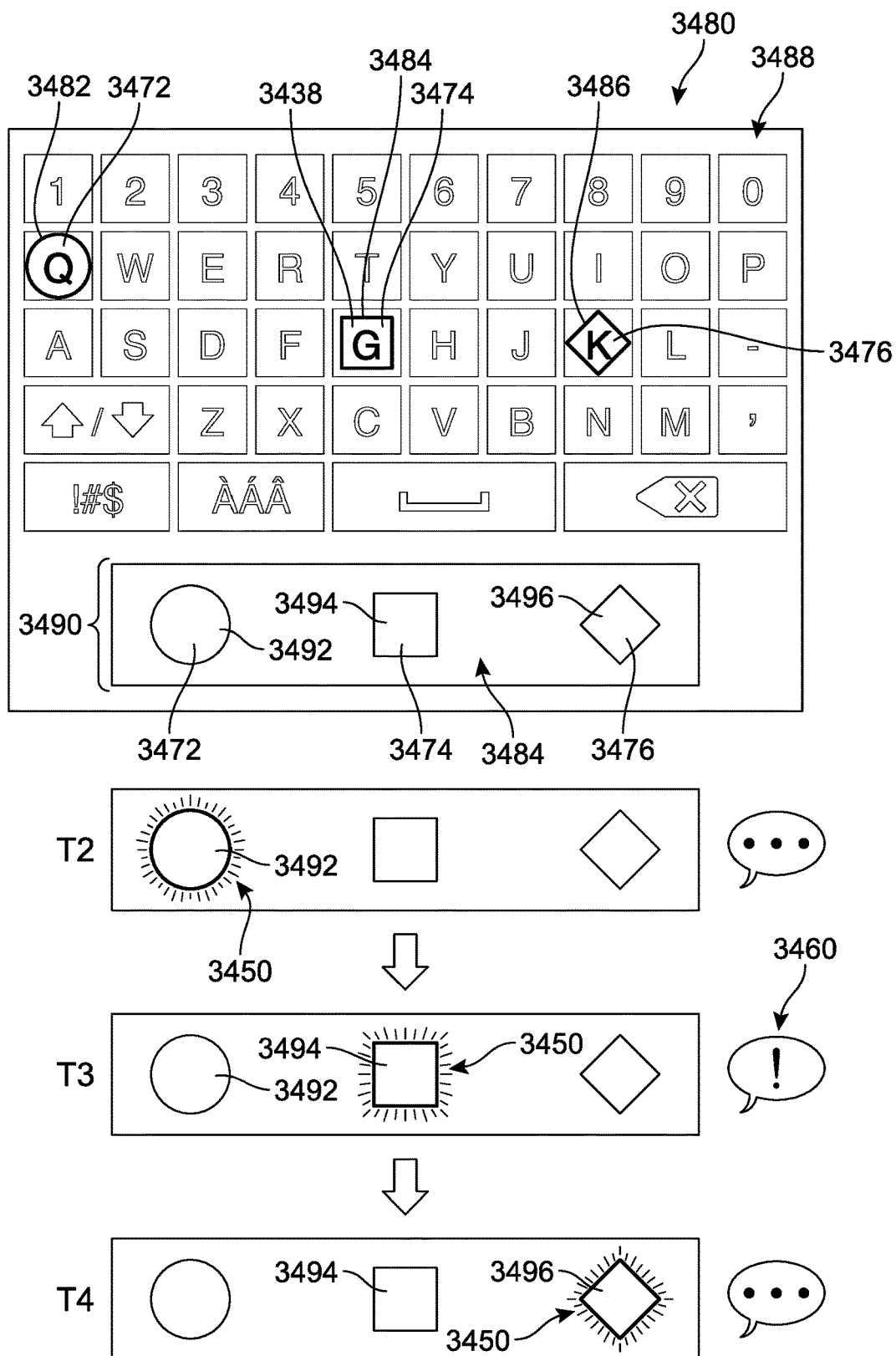

As an alternative approach to the display of the secondary visual indicator, FIG. 34E illustrates an isolated view of a tenth interface 3480 including a first current target 3482, a second current target 3484, and a third current target 3486 displayed in a target display region 3488 included in the tenth interface 3480. The first current target 3482 is associated with a third visual indicator 3472 (a circle), the second current target 3484 is associated with a fourth visual indicator 3474 (a square), and the third current target 3484 is associated with a fifth visual indictor 3476 (a diamond) that each identify the targets as current targets.

The tenth interface 3430 further includes a secondary region 3490 displaying a plurality of tertiary visual indicators 3490. In this example, the plurality of tertiary visual indicators 3490 include a first tertiary visual indicator 3492 corresponding to the first current target 3482 and displaying its associated third visual indicator 3472, a second tertiary visual indicator 3494 corresponding to the second current target 3484 and displaying its associated fourth visual indicator 3474, and a first tertiary visual indicator 3496 corresponding to the third current target 3486 and displaying its associated fifth visual indicator 3476. It is noted that the plurality of tertiary visual indicators 3490 may be arranged elsewhere in the tenth interface 3430, including according to arrangements in which they are not displayed together in a single region.

In contrast to the implementation shown in FIGS. 34A-34D in which the secondary visual indicator 3450 is applied to current targets in the target display region 3482, in FIG. 34E the secondary visual indicator 3450 is instead applied to the plurality of tertiary visual indicators 3490. As shown in FIG. 34E, during successive time periods T2, T3, and T4, the signal 3460 is only presented during the time period T3 during which the secondary visual indicator 3450 is applied to the second tertiary visual indicator 3494. As a result, the signal 3460 is alternated between or rotated among the plurality of tertiary visual indicators 3490. Based on this concurrent presentation of the signal 3460 and the secondary visual indicator 3450 in combination with the second tertiary visual indicator 3494, the user is informed that the second current target 3442 is the current user target 3438, much as in FIGS. 34A-34D.

Figure 35A:
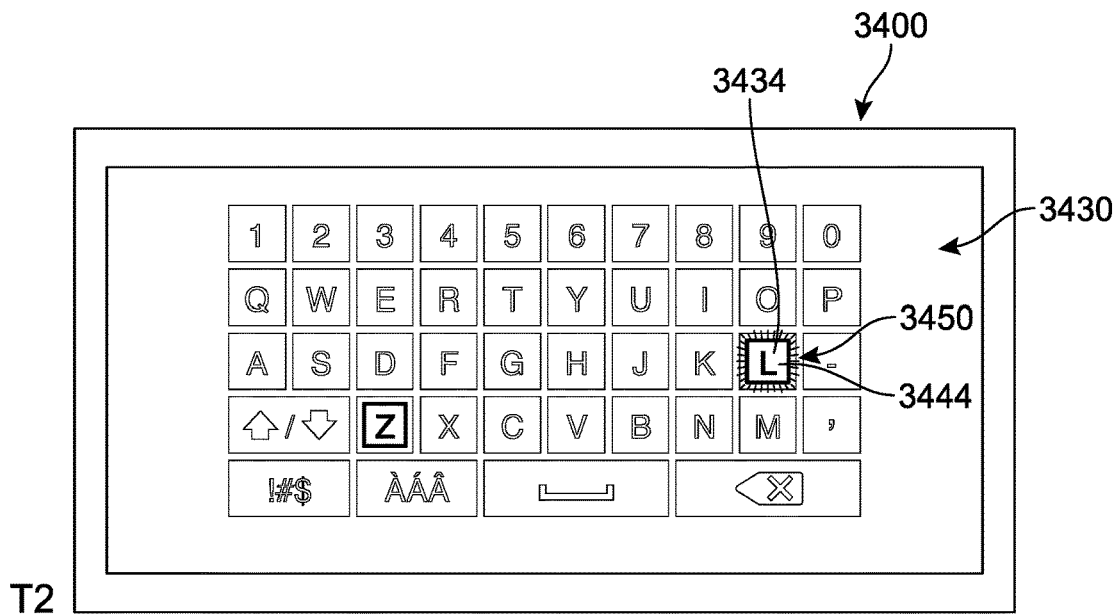
FIGS. 35A and 35B illustrate an example of a haptic signal being provided via a smartwatch concurrently with presentation of a visual indicator.
Figure 35B:
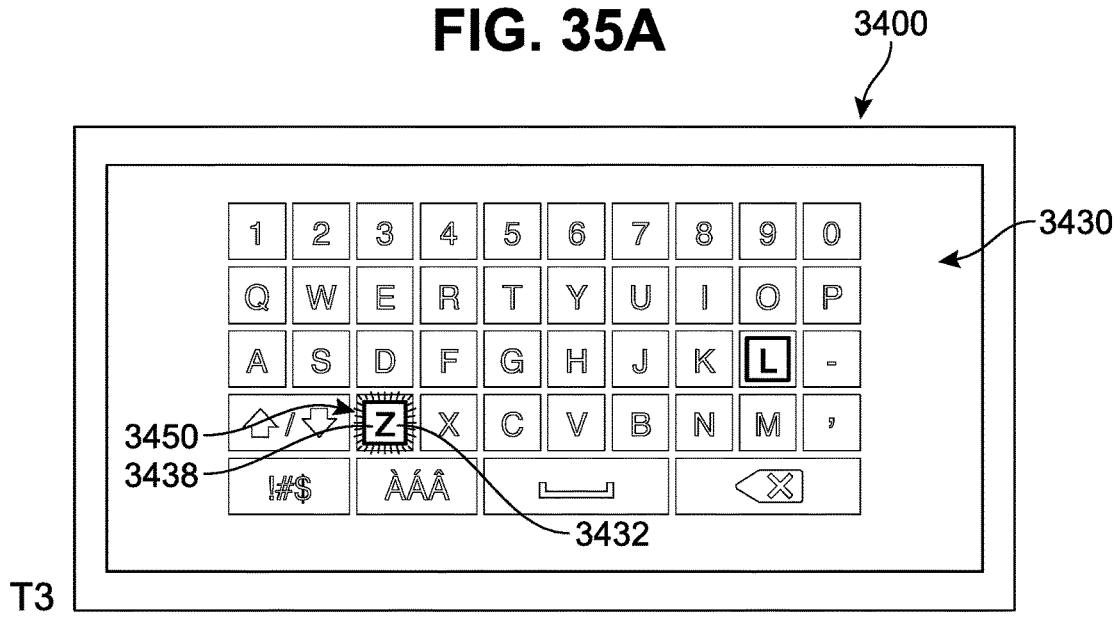

Referring next to FIGS. 35A-37B, various examples are illustrated in which a haptic signal is provided to the user. These examples may be applied in combination with the examples shown in FIGS. 34A-34E. In FIG. 35A, a sixth user 3510 has a companion device 3562 which in this example is in the form of a smartwatch worn by the sixth user 3510, although the companion device 3562 may be in a variety of other form factors in other implementations. FIG. 35A corresponds to the time period T2 shown in FIGS. 34B and 34E and for purposes of discussion the tenth interface 3430 is also shown here as illustrated in FIG. 34B via a display device 3400. During the time period T2 the secondary visual indicator 3450 is shown for a current distractor target 3444 and thus no haptic signal is presented to the user. This indicates to the sixth user 3510 that the second current target 3434 is not the user's current target. In contrast, in FIG. 35B, a concurrent presentation of a haptic signal 3560 with the display of the secondary visual indicator 3450 in combination with the first current target 3432 during the time period T3 informs the user that the first current target 3432 is indeed the current user target 3438. In different implementations, the tenth interface 3430 and/or obfuscation system can be configured to work in conjunction with the display device 3400 to provide a signal 3502, such as a message via a data communication link and/or network, to the companion device 3562 to initiate concurrent presentation of the haptic signal 3560 as the secondary visual indicator 3450 is applied to the first current target 3432.

Figure 36A:
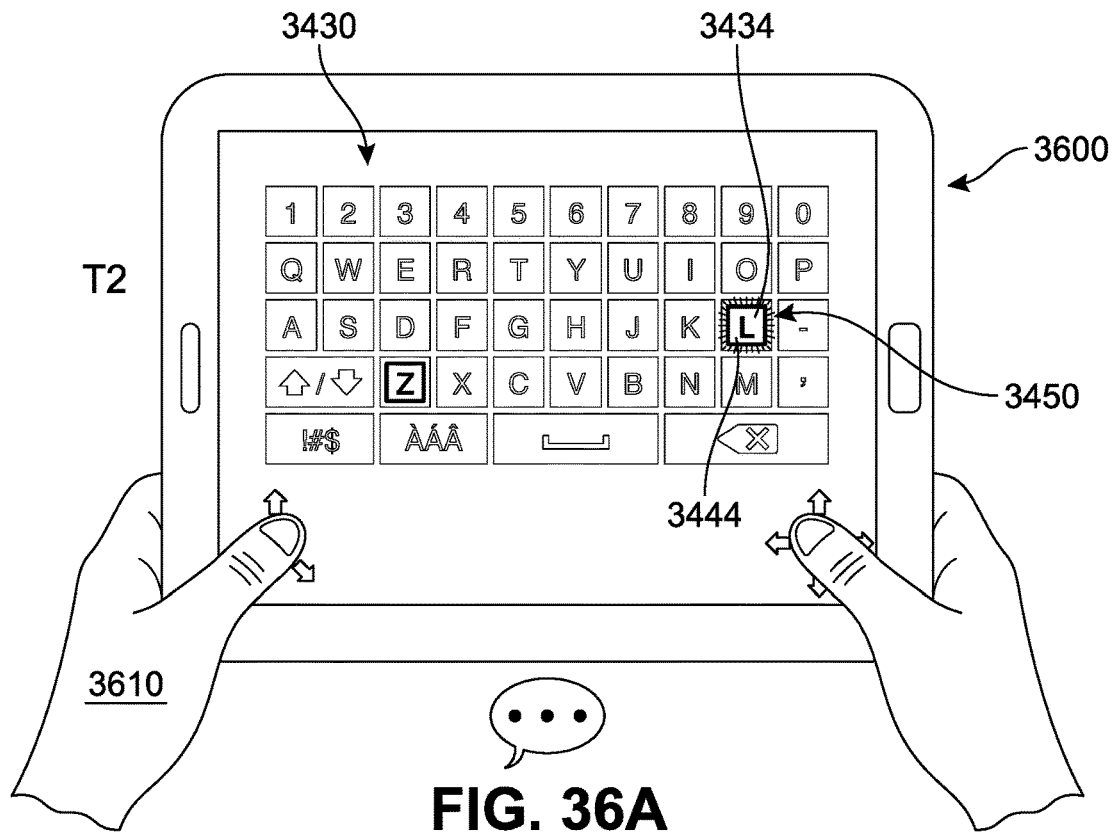
FIGS. 36A and 36B illustrate an example of a haptic signal being provided via a handheld computing device concurrently with presentation of a visual indicator.
Figure 36B:
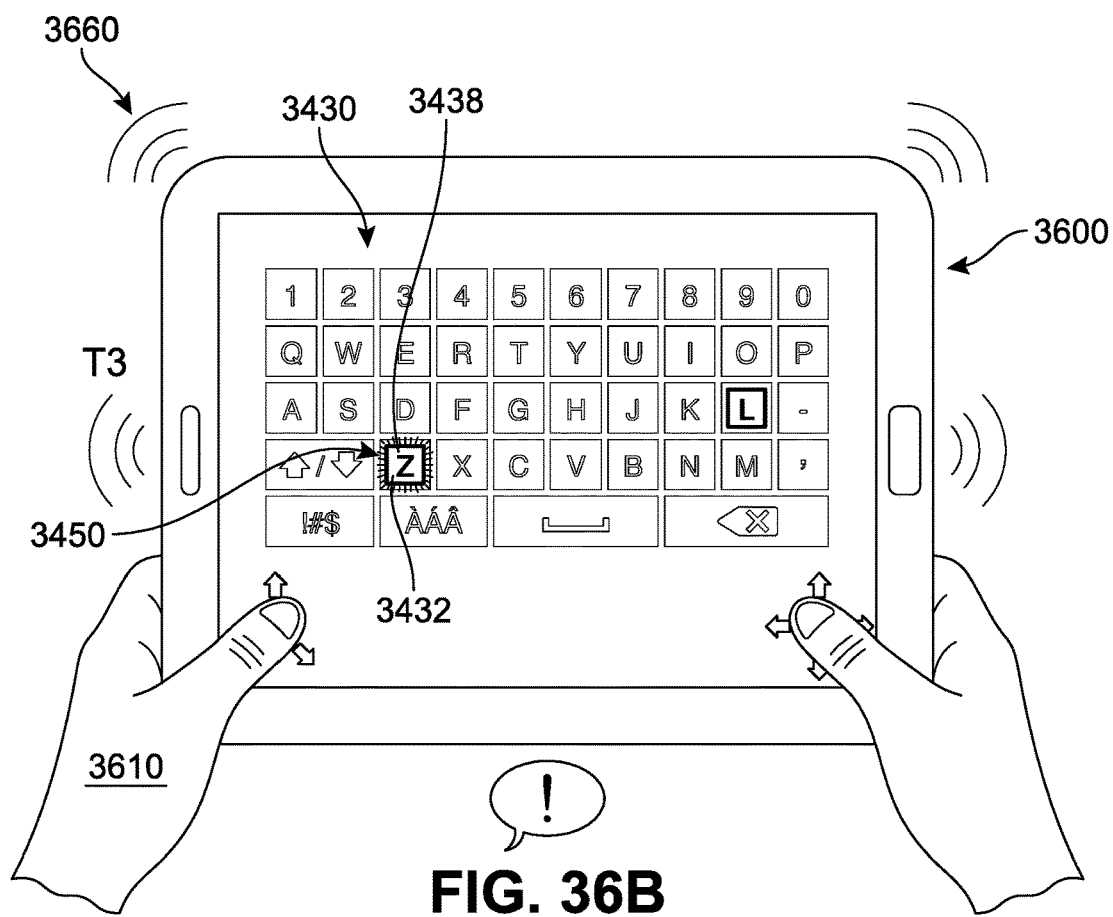

Similarly, in FIG. 36A, a seventh user 3610 has a handheld computing device 3600 which in this example is in the form of a gaming pad held in both hands by the seventh user 3610, although the handheld computing device 3600 may be in a variety of other form factors in other implementations. FIG. 36A corresponds to the time period T2 shown in FIGS. 34B and 34E and for purposes of discussion the tenth interface 3430 is also shown here as illustrated in FIG. 34B via a display of the handheld computing device 3600. During the time period T2 the secondary visual indicator 3450 is shown for a current distractor target 3444 and thus no haptic signal is presented to the user. This indicates to the seventh user 3610 that the second current target 3434 is not the user's current target. In contrast, in FIG. 36B, a concurrent presentation of a haptic signal 3660 with the display of the secondary visual indicator 3450 in combination with the first current target 3432 during the time period T3 informs the user that the first current target 3432 is indeed the current user target 3438. In different implementations, the obfuscation system can issue a command to the handheld computing device 3600 to generate the haptic signal at the correct period of time(s).

Figure 37A:
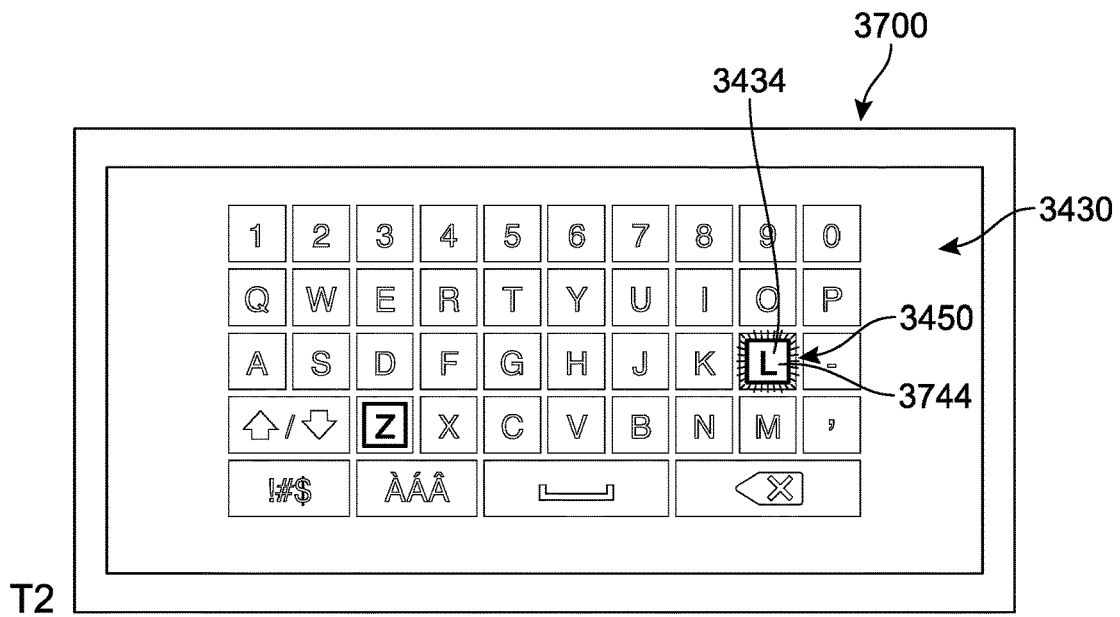
FIGS. 37A and 37B illustrate an example of a haptic signal being provided via a remote input device concurrently with presentation of a visual indicator.
Figure 37B:
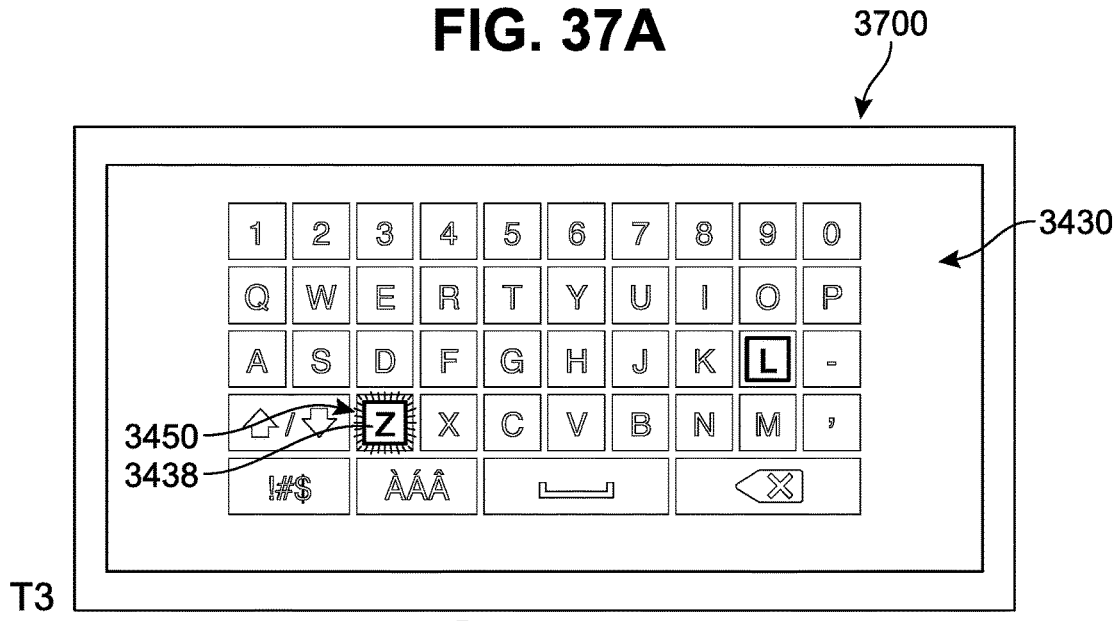

In FIG. 37A, an eighth sixth user 3710 has a remote input device 3702 that can be used to interact with, and provides commands and/or receives feedback from, the tenth interface 3430, shown on a device display 3700, although the remote input device 3702 may be in a variety of other form factors in other implementations. FIG. 37A corresponds to the time period T2 shown in FIGS. 34B and 34E. During the time period T2 the secondary visual indicator 3450 is shown for a current distractor target 3444 and thus no haptic signal is presented to the user. This indicates to the sixth user 3510 that the second current target 3434 is not the user's current target. In contrast, in FIG. 37B, a concurrent presentation of a haptic signal 3760 (generated from the remote input device 3702 held in the user's hand) with the display of the secondary visual indicator 3450 in combination with the first current target 3432 during the time period T3 informs the user that the first current target 3432 is indeed the current user target 3438. In different implementations, the tenth interface 3430 and/or obfuscation system can be configured to work in conjunction with the display device 3700 to provide a signal 3704, such as a message via a data communication link and/or network, to the remote input device 3702 to initiate concurrent presentation of the haptic signal 3760 as the secondary visual indicator 3450 is applied to the first current target 3432.

Figure 38A:
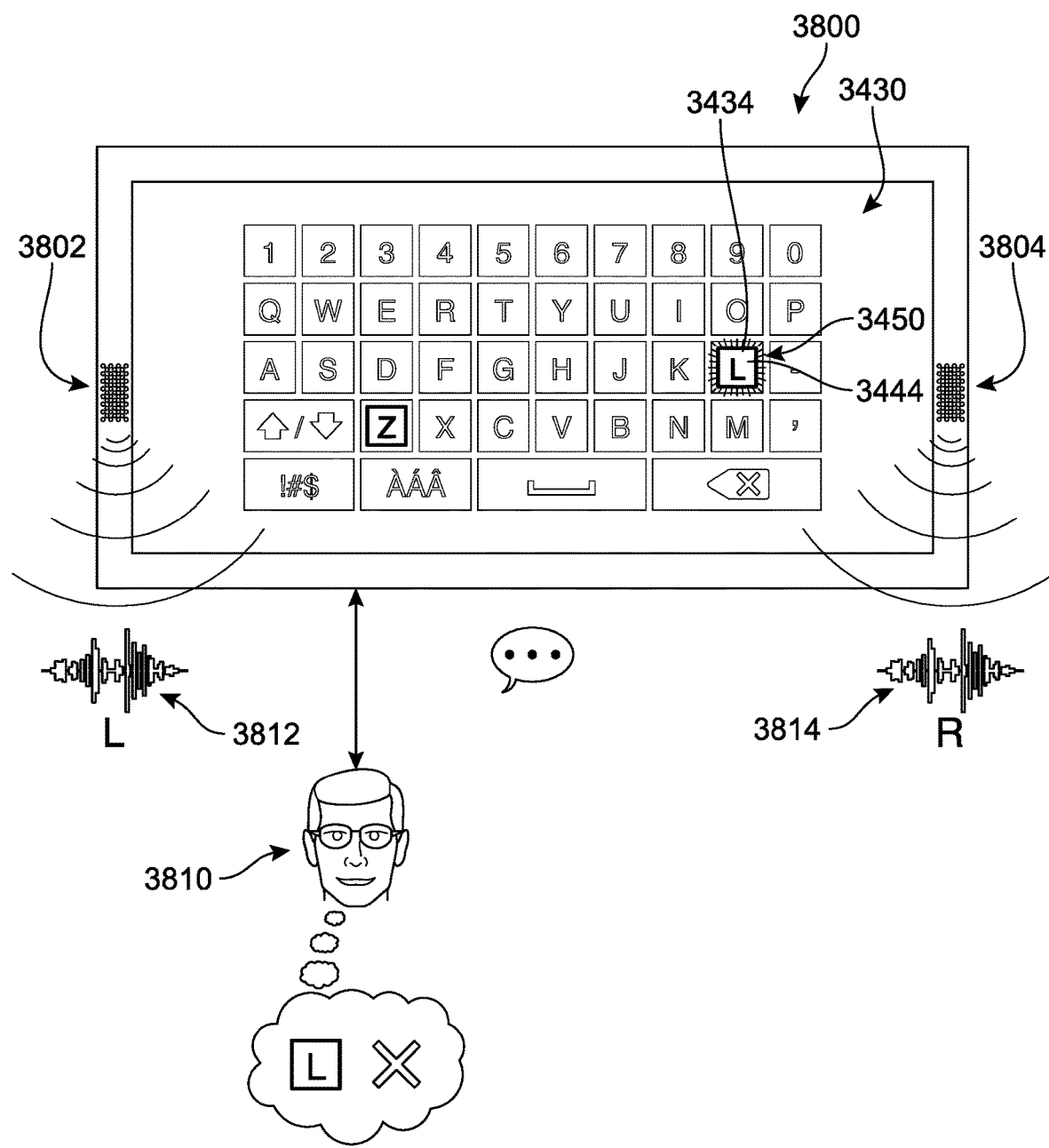
FIGS. 38A-38C illustrate an example of an audio signal being provided via a speaker concurrently with presentation of a visual indicator.
Figure 38B:
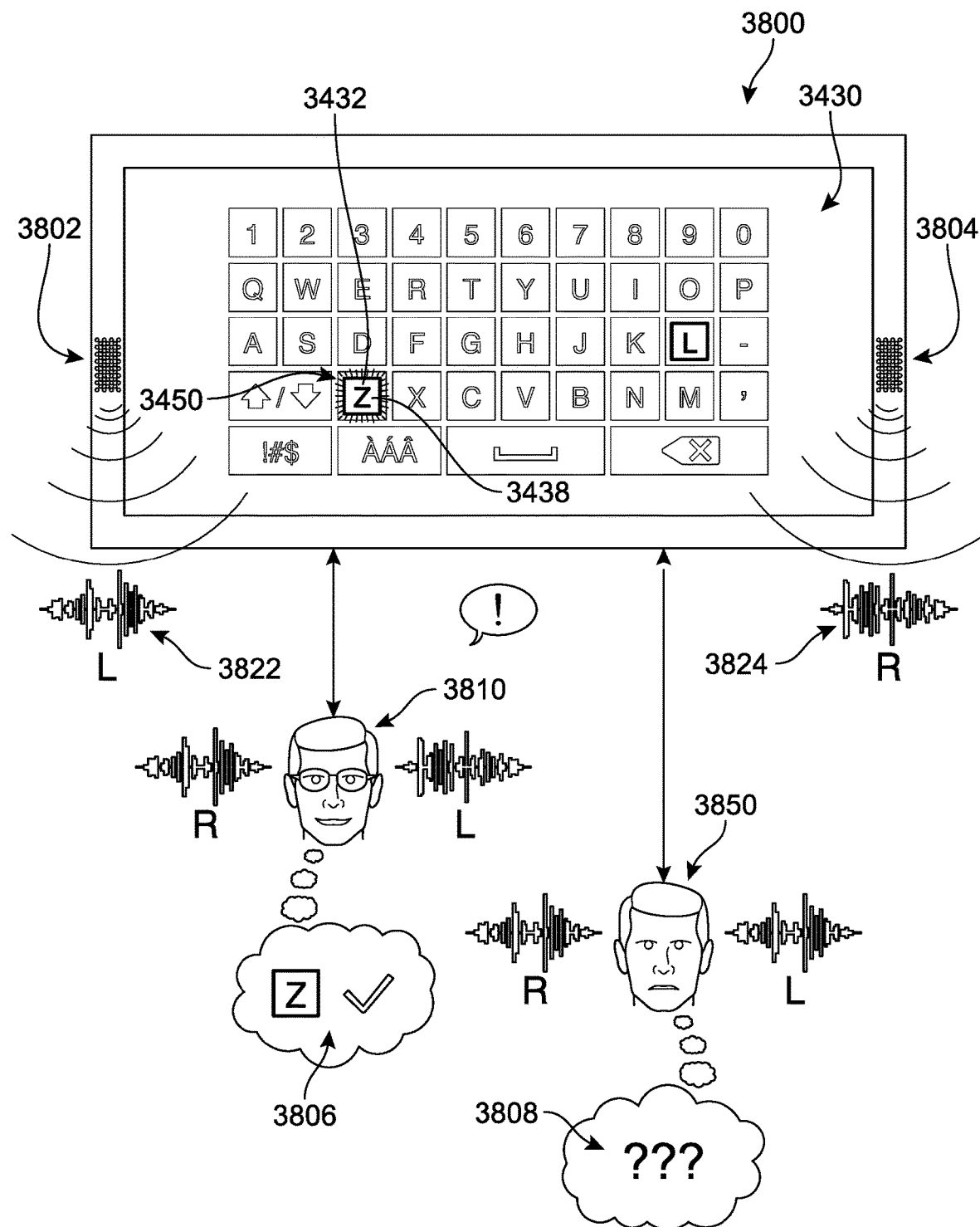
Figure 38C:
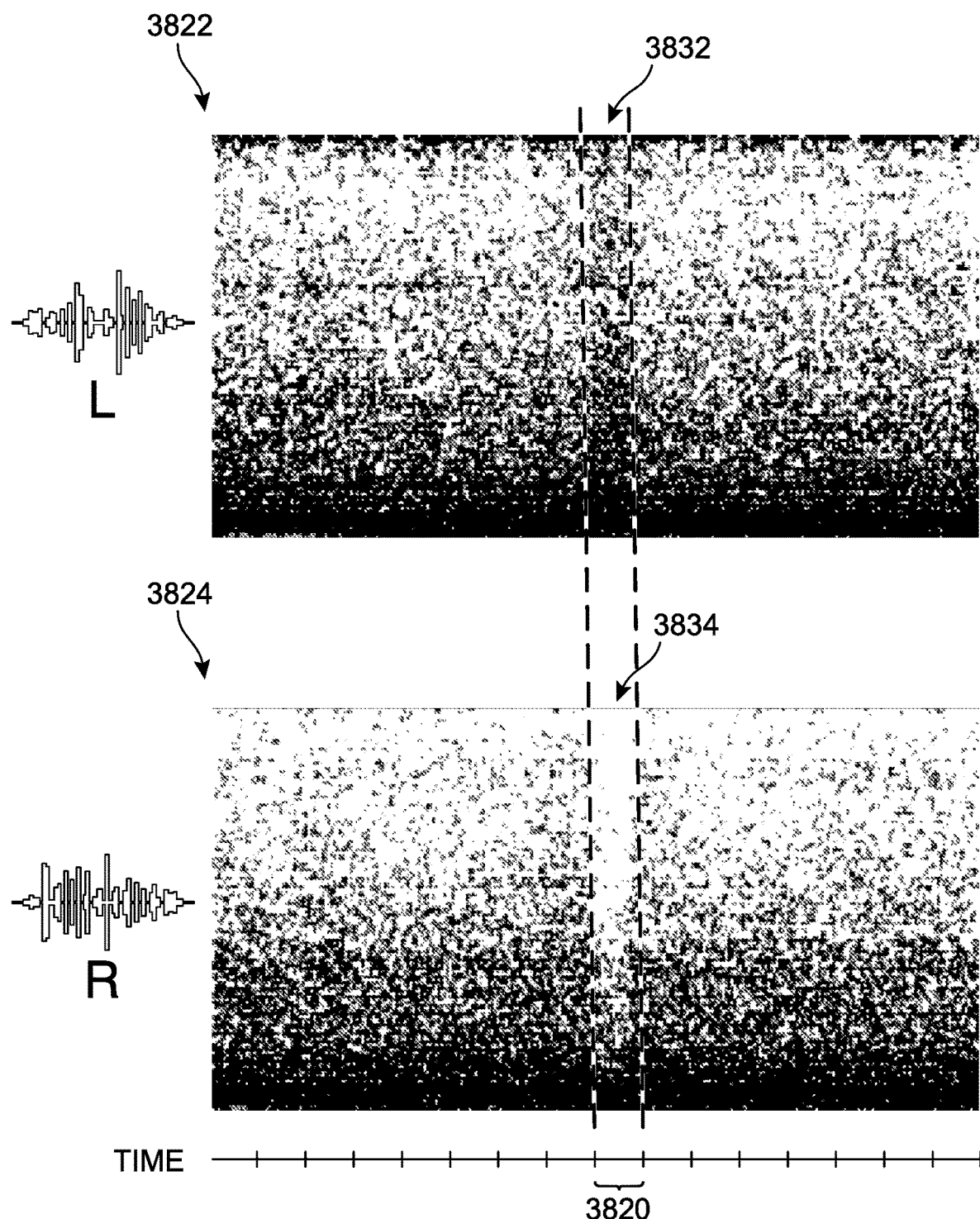

Referring next to FIGS. 38A-38C, an example is illustrated in which an audio signal is presented to the user. This example may be applied in combination with the examples shown in FIGS. 34A-34E. In FIG. 38A, a display device 3800 is shown that includes or is associated a first speaker 3802 and a second speaker 3804. FIG. 38A corresponds to the time period T2 shown in FIGS. 34B and 34E and for purposes of discussion the tenth interface 3430 is also shown here as illustrated in FIG. 34B via the display device 3800. Throughout the time period T2 the first speaker 3802 outputs a first audio signal 3812 for a first audio channel corresponding to a left side of the user and the second speaker 3804 outputs a second audio signal 3814 for a second audio channel corresponding to a right side of the user. The two audio signals 3812 and 3814 remain unchanged and/or substantially identical such that no discernable difference between the two audio signals is presented to the user during the time period T2 when the secondary visual indicator 3450 is shown for the current distractor target 3444. This indicates to the user that the second current target 3434 is not the user's current target.

FIG. 38B shows the time period T3 during which the secondary visual indicator 3450 is applied to the first current target 3432 which is also current user target 3438. During the time period T3, the first speaker 3802 outputs a third audio signal 3822 for the first audio channel and the second speaker 3804 outputs a fourth audio signal 3824 for the second audio channel. During one or intervals 3820 that occur during the time period T3, the third audio signal 3822 includes a first discriminatory audio signal 3832 and/or the fourth audio signal 3824 includes a second discriminatory audio signal 3834 as a signal to a user 3810 at a first position 3806 in close proximity to the display device 3800 and/or the speakers 3802 and 3804. At the first position 3806, the user 3810 as at a distance D1 from the display device 3800 and/or the speakers 3802 and 3804. At the first position 3806, the user 3810 perceives the third audio signal 3822 and fourth audio signal 3824 in a manner that the user 3810 recognizes that the first current target 3432 is indeed the current user target 3438. In contrast, an observer 3850 at a second position 3808 is at a distance D2 from the display device 3800 and/or the speakers 3802 and 3804. At the second position 3808, the observer 3850 perceives the third audio signal 3822 and fourth audio signal 3824 in a manner that the observer 3850 cannot detect that a discriminatory signal has been generated.

FIG. 38C illustrates an example of the third audio signal 3822 and fourth audio signal 3824 and an interval 3820 during which the third audio signal 3822 includes a fifth audio signal 3832 and the fourth audio signal 3834 includes a sixth audio signal 3834. In this particular example, the obfuscation system has recorded an ambient audio signal at the display device 3800 and reproduces the recorded ambient signal during the time period T2. However, during the interval 3820 the ambient signal is modified, for example by changing its phase to produce the fifth audio signal 3832 and sixth audio signal 3834. This change is readily perceived by user 3810 when in close proximity to the display device 3800. However, at greater distances, such as the distance D2 for the observer 3850, mixing of the fifth audio signal 3832 and sixth audio signal 3834 has occurred that destroys any perceptible change in the phase. In different implementations, other techniques can be used to modify one or both of the two audio signals in ways that enable discernment of such modifications only at close proximity to the audio source.

Figure 39A:
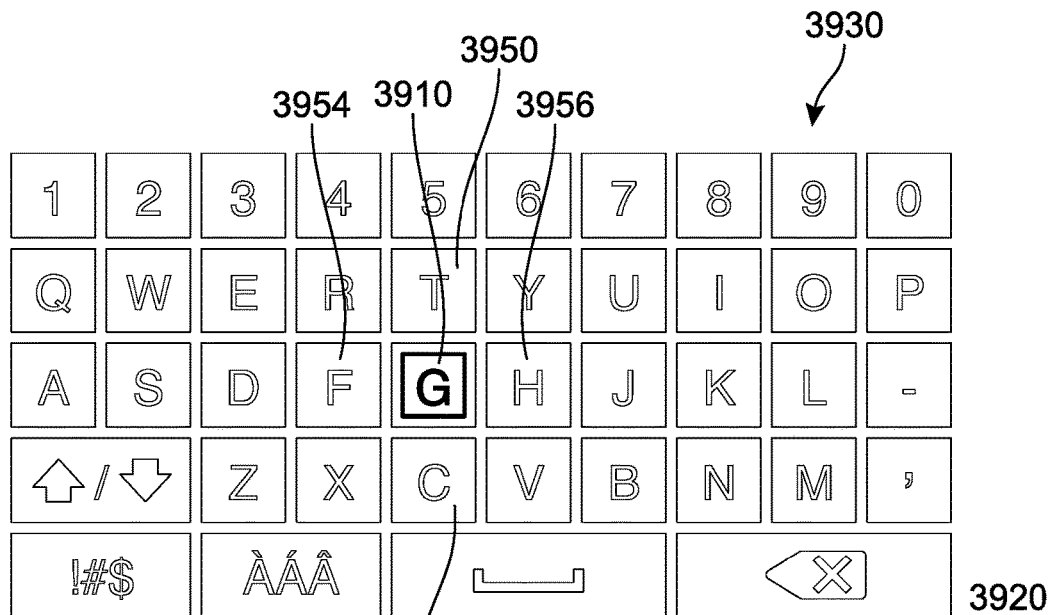
FIGS. 39A and 39B illustrate an example in which a user is permitted to instruct the obfuscation system as to which current target is to be used as the current user target.
Figure 39B:
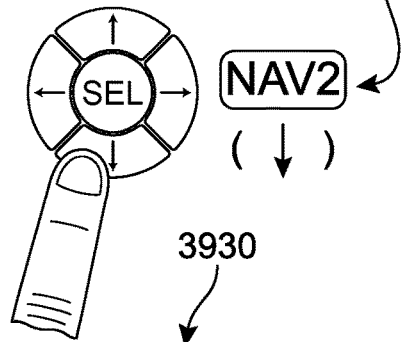
Figure 39B:
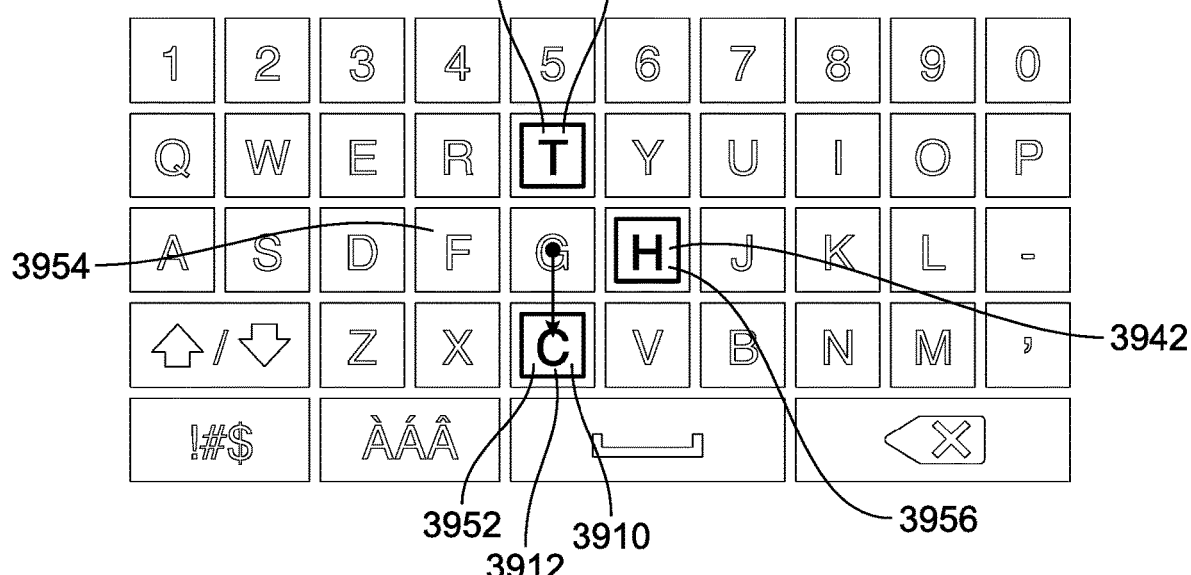

In the examples above in FIGS. 32A-38C, a user has been told which current target is the current user target. However, some implementations are configured to permit a user to instruct the obfuscation system as to which current target is to be used as the current user target. Referring to FIGS. 39A and 39B, one example of this process is illustrated. An isolated view of an eleventh interface 3930 is depicted in an initial state in FIG. 39A, prior to any navigational commands having been received from the user. A first current target 3910 ("G") is displayed, with four destination targets including a first destination target 3950 ("T") associated with a first navigation command, a second destination target 3952 ("C") associated with a second navigation command, a third destination target 3954 ("F") associated with a third navigation command, and a fourth destination target 3956 ("H") associated with a fourth navigation command. Then, as shown in FIG. 39B, the user provides an input 3920 corresponding to the second navigation command instructing that a current user target be moved in a downward direction. In response to the input 3920 the first current target 3910 moved downward to the second destination target 3952 and will thereafter be used as a current user target 3912. At the same time, one or more current distractor targets are created. In the example shown in FIG. 39B, a first current distractor target 3940 is created and a second current distractor target 3942 is also created, similar to the "splitting" process shown in FIG. 16B. In some implementations, each current distractor targets are created at two different destination targets (here the first destination target 3950 and the fourth destination target 3956). By this technique the user has unambiguously instructed the obfuscation system as to which of the three displayed current targets is to be used as the current user target.

It may be appreciated that in cases where a user is selecting multiple options, the user can desire reassurance or confirmation that an actuation command for each selection was received by the system. For example, FIG. 6 illustrated (at third stage 664) an interface in which an appearance of a selected target is briefly modified to provide a visual feedback that the selection was performed. In some other implementations, the feedback can be in the form of a sound that is generated when a selection is made, such as a click or a beep that serves as an audio feedback confirming that a selection was performed. In some implementations, the audio feedback can be provided in combination and/or simultaneously with the presentation visual feedback. However, an issue with these forms of visual or audio feedback is that they are also indicate to an observer which targets have been selected, which can serve as a significant clue as to a content of the sensitive information being submitted by the user.

Figure 40A:
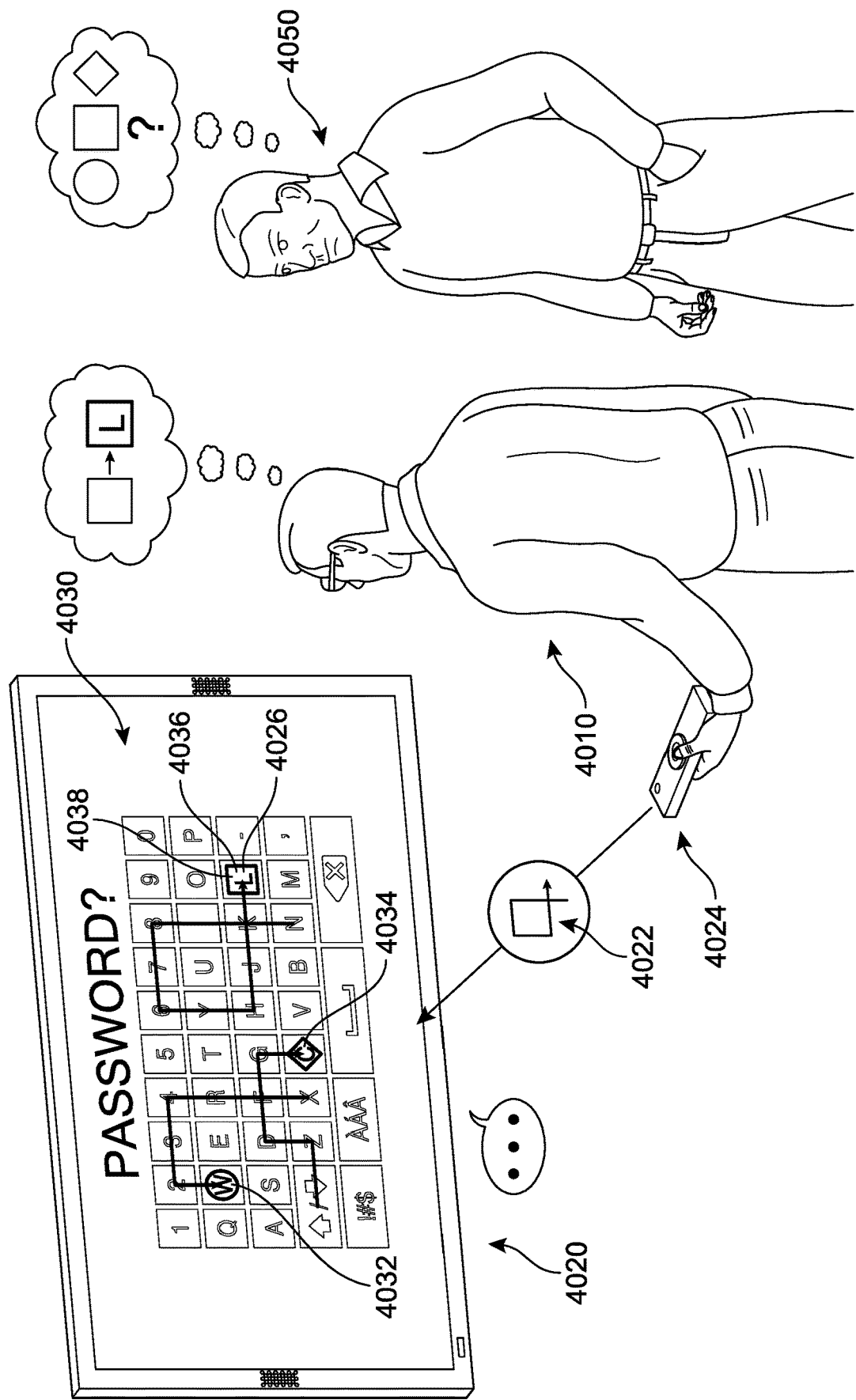
FIGS. 40A-40B, 41 and 42 illustrate various examples in which the visual, haptic, and/or audio signals described in FIGS. 33A, 33B, and 35A-38B are employed to provide feedback for target selections that will not be detected by an observer.

In different implementations, the obfuscation systems described herein can include provisions to reassure the user that the actuation command was received while retaining the privacy of the inputs. FIGS. 40A-42C illustrate various examples in which the visual, haptic, and/or audio signals described in FIGS. 33A, 33B, and 35A-38B are employed to provide feedback for target selections that will not be detected by an observer. Referring to FIG. 40A, an example of an eighth user 4010 positioned near a display device 4020 is shown. The display device 4020 in this example is a large-screen display that displays a twelfth interface 4030 which may operate according to any of the previously described examples. The twelfth interface 4030 includes a first current target 4032, a second current target 4034, and a third current target 4036. The eighth user 4010 is aware that the third current target 4036 is the current user target 4038 which the eighth user 4010 is navigating via navigation commands 4022 resulting from interaction with a handheld remote input device 4024. The eighth user 4010 has completed navigation to a desired target 4026 ("L"). In this example although an observer 4050 suspects that the third current target 4036 is being used as the current user target 4038, without knowing when target selections have occurred, the observer 4050 is left guessing as to the content of the sensitive information.

Figure 40B:
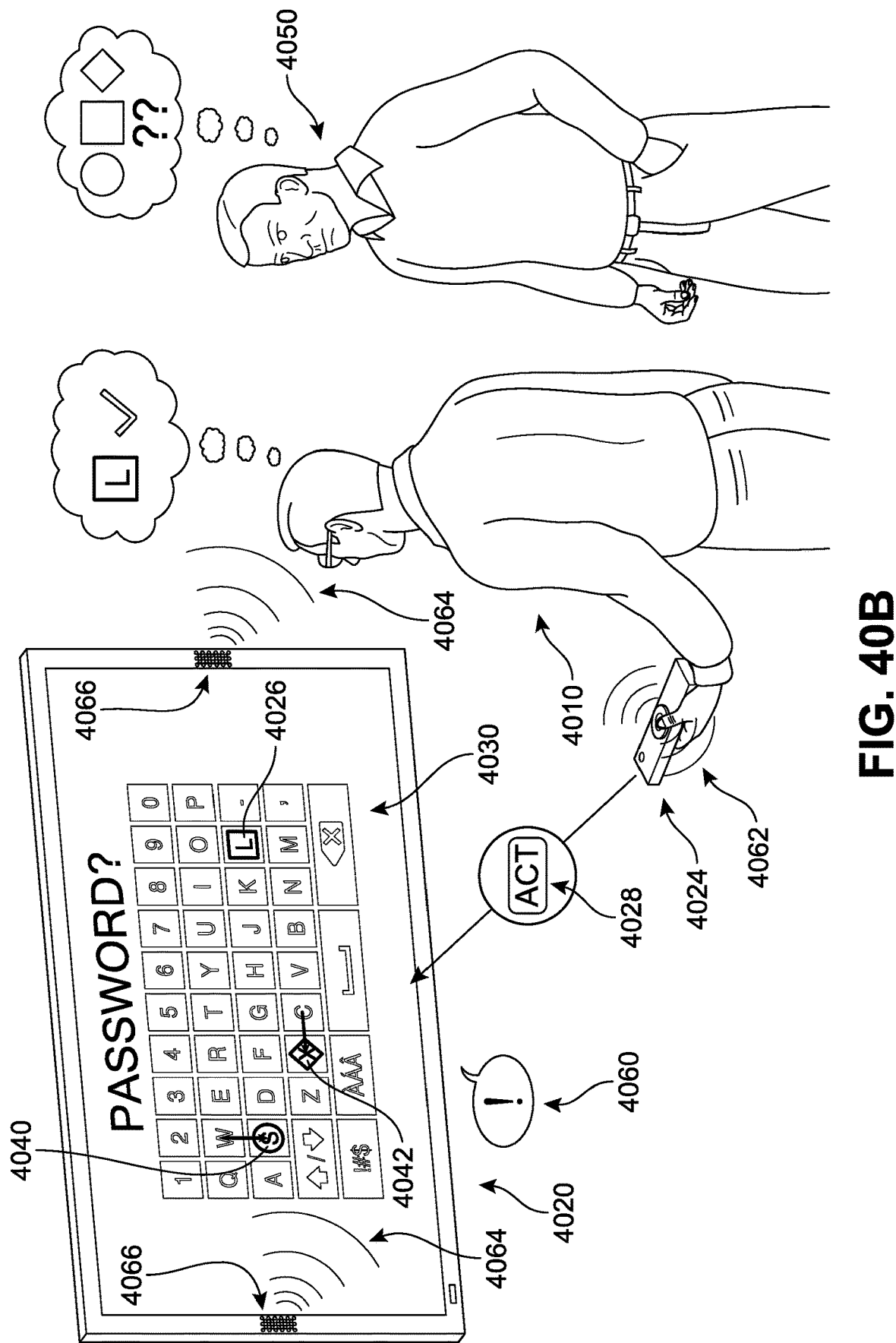

In FIG. 40B, the eighth user 4010 uses their thumb to submit an actuation command 4028 via handheld remote input device 4024 resulting in an actuation of the desired target 4026 but without any feedback perceived by the observer 4050. Instead, a feedback signal 4060 is generated to provide feedback to the eighth user 4010 such as an image based discriminatory signal (if the eighth user 4010 is in close proximity to the display device 4020), a haptic signal such as a vibration 4062 produced by the handheld remote input device 4024 in response to a signal from the obfuscation system, or an audio discriminatory signal 4064 produced by speakers 4066. Accordingly, the eighth user 4010 is reassured that the desired target 4026 has been properly selected. On the other hand, the observer 4050 is unaware that the eighth user 4010 performed a selection.

In some implementations, the obfuscation system is configured to move a first current distractor target 4040 and a second current distractor target 4042 synchronously with user navigation commands. However, the current distractor targets will not be navigated when an actuation command is received from the user. Accordingly, the current user target 4038 will not remain still while the first current distractor target 4040 and second current distractor target 4042 move, which might otherwise suggest to the observer 4050 that a target actuation had occurred at the current user target 4038.

Figure 41:
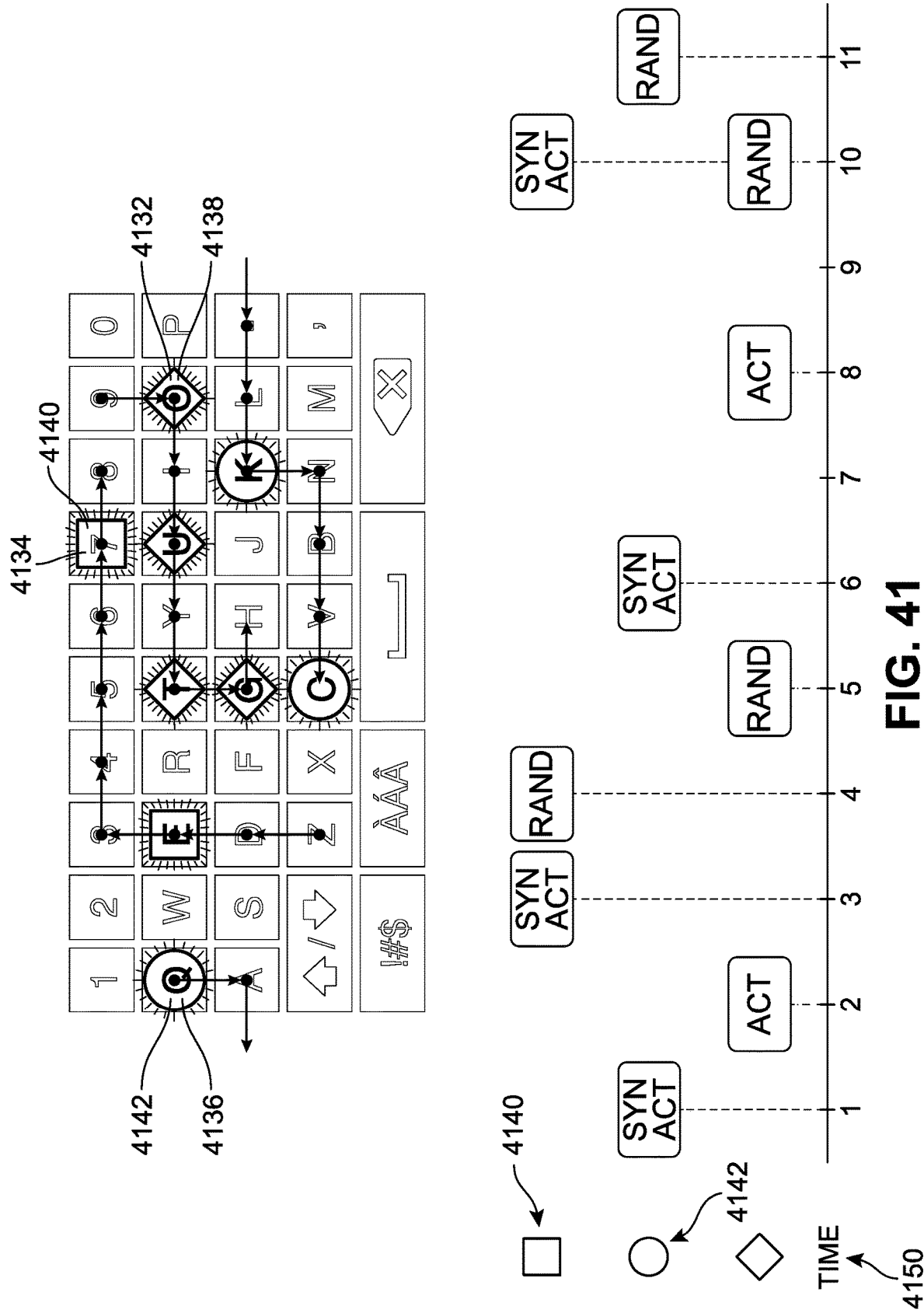

In different implementations, other types of approaches may be used to provide reassurance feedback to a user that do not necessarily rely on the discriminatory signals described above. For example, FIG. 41 presents an isolated view of a thirteenth interface 4130 including a first current target 4132, a second current target 4134, and a third current target 4136. In this case, the first current target 4132 is being used as a current user target 4138. The second current target 4134 is a first current distractor target 4140, and the third current target 4136 is a second current distractor target 4142. In the implementation of FIG. 41, the current user target 4138 will display a visual feedback, such as the blinking shown in the third stage 664 of FIG. 6, when the user actuates the current user target 4138. As reflected in a timeline 4150 of FIG. 41, this occurs at a time T2 and a time T8. Furthermore, in order to obfuscate when the user has performed a selection, the obfuscation system presents the visual feedback at additional times when the user has not performed a target actuation, as shown at a time T5 and a time T10. In addition, the first current distractor target 4140 and the second current distractor target 4142 also display the visual feedback to present virtual target actuations shown by the boxes labeled "SYN ACT" at times T1, T3, T6, and T10 that also serve to mislead an observer. In some implementations, the obfuscation system may additionally be configured to display the visual feedback for a current distractor target at other times to further obfuscate target selection events shown by the boxes labeled "RAND" at times T4 and T11. Although overall this results in the visual feedback being displayed many times across many current targets, at times that the user did not perform a target actuation, as the user is aware of which current target is the current user target 4138 as well as when the user performed a target actuation, the visual feedback displayed at the times T2 and T8 shown by the boxes labeled "ACT," serve to confirm and reassure the user that those actuation commands have been acknowledged. The user is able to simply ignore the additional visual feedback events, including the random visual feedback events shown by the boxes labeled "RAND" at times T5 and T10 with the current user target 4138.

As performing a random visual feedback for the current user target 4138 might otherwise be performed when a user is expecting the current user target 4138 to move according to a submitted navigation command, in some implementations the obfuscation system is instead configured to insert the random visual feedback between actual user commands and also perform virtual commands for the current distractor targets. This avoids the visual feedback being presented at the same time that the current user target 4138 is being moved to a new destination target, which would not occur in response to a real series of user commands. In some implementations, this is done shortly after an actual user command in order to avoid an unnaturally short period of time between the random visual feedback event and the subsequent real user command.

Figure 42:
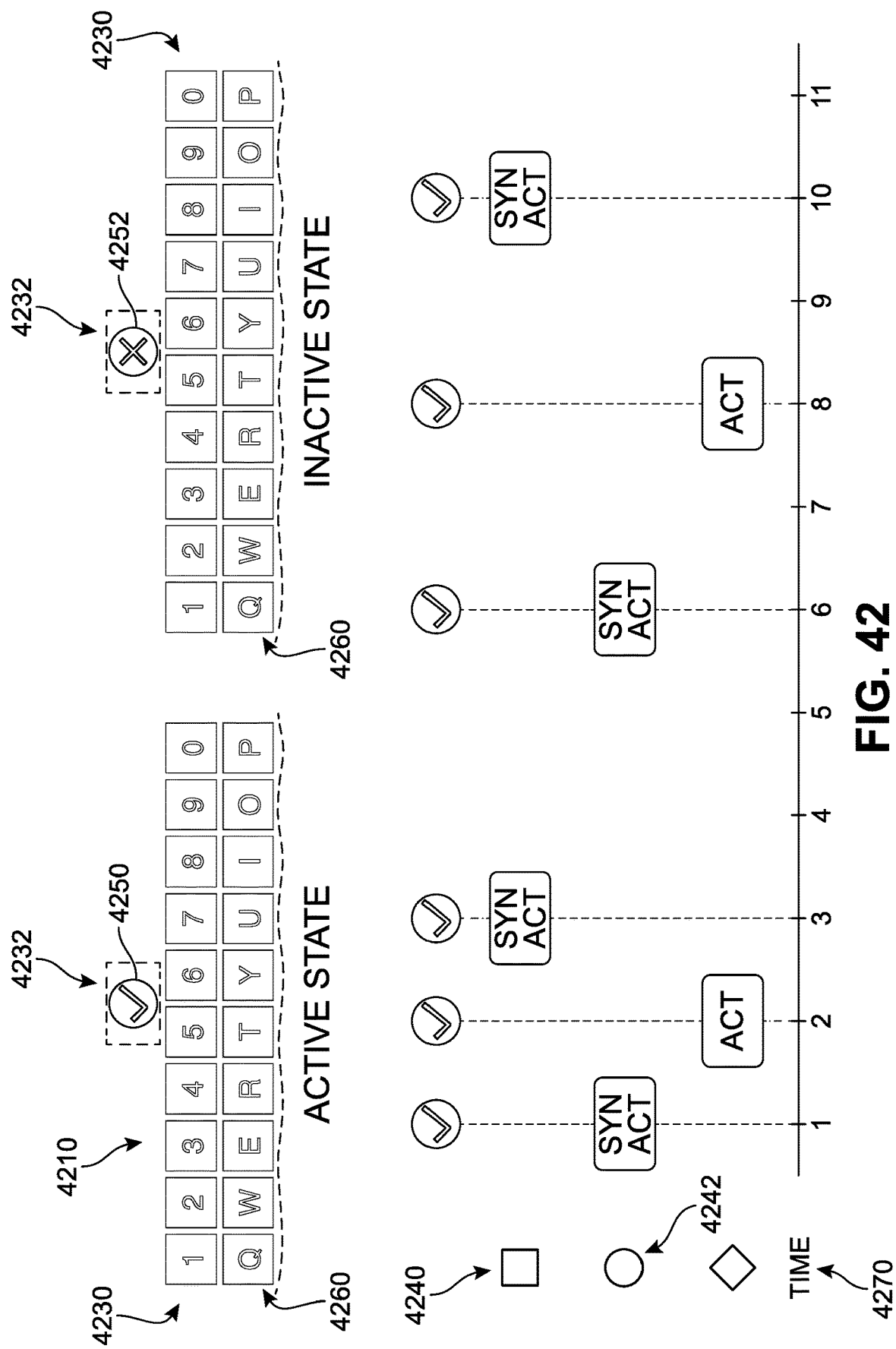

Referring to FIG. 42 an implementation of a partial view of a fourteenth interface 4230 that includes a region 4232 configured to present a shared visual feedback indicator 4250 is shown. Although the region is shown apart from a target display portion 4210, in other implementations the region and the shared visual feedback indicator 4250 may overlap with the target display portion 4210 and/or modify the appearance of some or all of the target display portion 4210 during an active state 4260. For example, the target display portion 4210 might blink or the appearances of all of the current targets may briefly change to indicate that an actual target actuation or virtual target actuation was performed.

In the active state 4260, the region 4232 includes the shared visual feedback indicator 4250. The shared visual feedback indicator 4250 is displayed as visual feedback when either an actual target activation command is received from a user, as shown at times T2 and T8 (see a timeline 4270 below) or a virtual actuation occurs for a current distractor target, as shown at times T3 and T10 for a first current distractor target 4240, and at times T1 and T6 for a second current distractor target 4242. At other times, the region 4232 is in an inactive state 4262. While in the inactive state 4262 the shared visual feedback indicator 4250 is not displayed. In some implementations, a different visual indicator 4252 may instead be displayed within the region 4232, while in other implementations the region 4232 may simply be left vacant. As a result, during the period of time shown in FIG. 42 across timeline 4270, an observer sees the shared visual feedback indicator 4250 being presented six times, but the observer is unable to determine how many, if any at all, correspond to a target actuation being performed by the user. It is noted that the discriminatory signaling described in connection with 33A, 33B, and 35A-38B can also be used in combination with the techniques described in FIGS. 41 and 42, thereby offering a user an even greater sense of reassurance.

Figure 43:
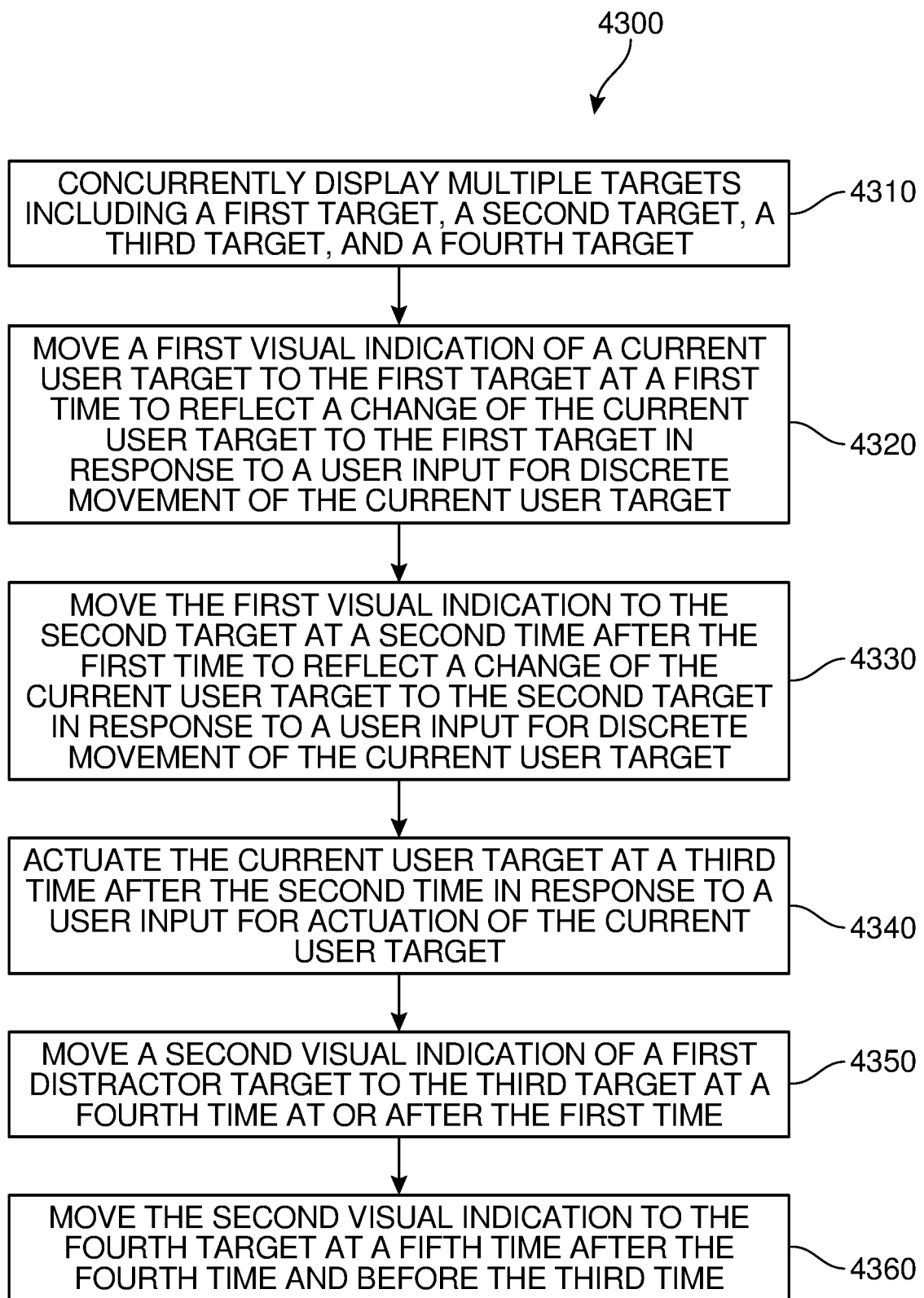
FIGS. 43, 44, 45, 46, 47, 48, and 49 present flow charts illustrating implementations of various example processes for obfuscating user input using any of the features herein described.

FIG. 43 is a flow chart illustrating an implementation of an example process 4300 for obfuscating user input. In some examples, some or all of the process 4300 may be performed in combination with any of the features discussed in connection with FIGS. 1-16C, 50, and 51, although they may also be performed with any other features described herein. In FIG. 43, a first operation 4310 may include concurrently displaying multiple targets including a first target, a second target, a third target, and/or a fourth target. In a second operation 4320, the process 4300 includes moving a first visual indication of a current user target to the first target at a first time to reflect a change of the current user target to the first target in response to a first user input for discrete movement of the current user target. In a third operation 4330, the process 4300 may include moving the first visual indication to the second target at a second time after the first time to reflect a change of the current user target to the second target in response to a second user input for discrete movement of the current user target. In a fourth operation 4340, the process 4300 may include actuating the current user target at a third time after the second time in response to a third user input for actuation of the current user target. In a fifth operation 4350, the process 4300 includes moving a second visual indication of a first distractor target to the third target at a fourth time at or after the first time. In a sixth operation 4360, the process 4300 includes moving the second visual indication to the fourth target at a fifth time after the fourth time and before the third time.

Figure 44:
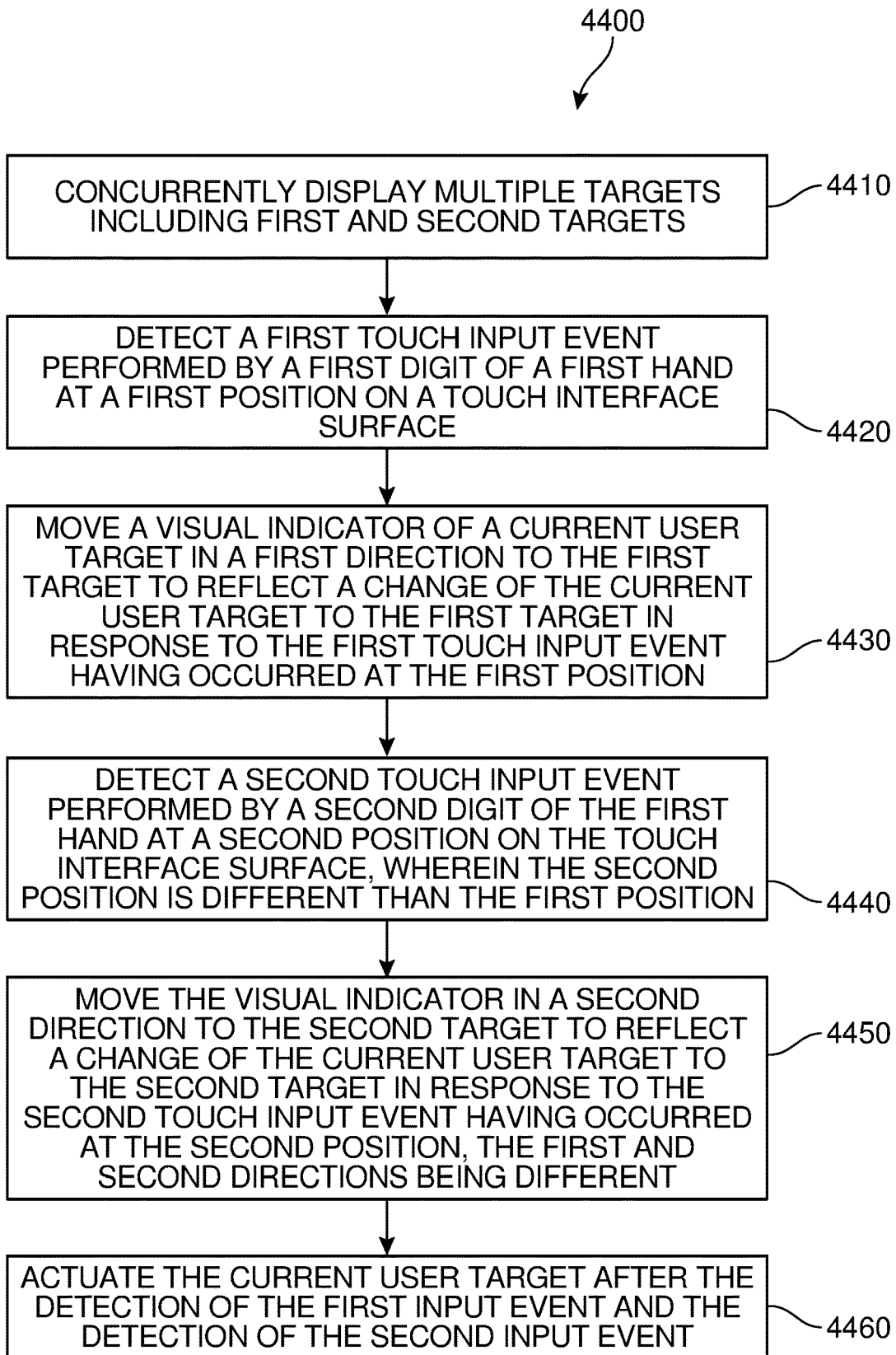

FIG. 44 is a flow chart illustrating an implementation of an example process 4400 for obfuscating user input. In some examples, some or all of the process 4400 may be performed in combination with any of the features discussed in connection with FIGS. 1-21B, 50, and 51, although they may also be performed with any other features described herein. In FIG. 44, a first operation 4410 includes concurrently displaying multiple targets including a first target and/or a second target. In a second operation 4420, the process 4400 includes detecting a first touch input event performed by a first digit of a first hand at a first position on a touch interface surface. In a third operation 4430, the process 4400 includes moving a first visual indicator of a current user target in a first direction to the first target to reflect a change of the current user target to the first target in response to the first touch input event having occurred at the first position. In a fourth operation 4440, the process 4400 includes detecting a second touch input event performed by a second digit of the first hand at a second position on the touch interface surface, wherein the second position is different than the first position. In a fifth operation 4450, the process 4400 includes moving the first visual indicator in a second direction to the second target to reflect a change of the current user target to the second target in response to the second touch input event having occurred at the second position, wherein the second direction is different than the first direction. In a sixth operation 4460, the process 4400 may include actuating the current user target after the detection of the first input event and the detection of the second input event. Additionally, for the process 4400, at least with respect to the operations 4420, 4430, 4440, and 4450, the first digit is in continuous contact with the touch interface surface up to the performance of the first touch input event and until the performance of the second touch input event.

Figure 45:
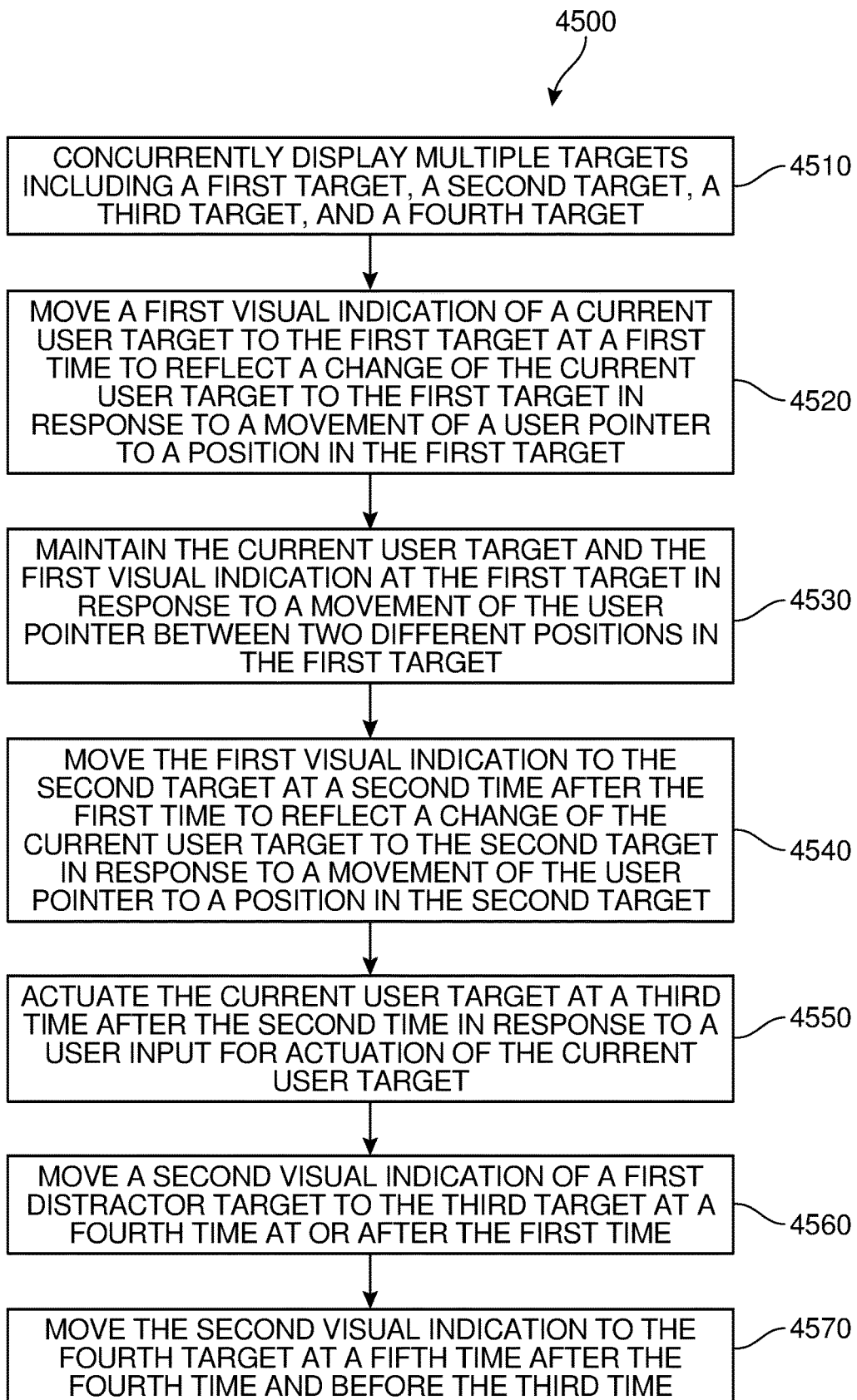

FIG. 45 is a flow chart illustrating an implementation of an example process 4500 for obfuscating user input. In some examples, some or all of the process 4500 may be performed in combination with any of the features discussed in connection with FIGS. 22A-31, 50, and 51, although they may also be performed with any other features described herein. In FIG. 45, a first operation 4510 includes concurrently displaying multiple targets including a first target, a second target, a third target, and/or a fourth target. In a second operation 4520, the process 4500 includes moving a first visual indication of a current user target to the first target at a first time to reflect a change of the current user target to the first target in response to a first movement of a user pointer to a first position within the first target. In a third operation 4530, the process 4500 includes maintaining the current user target and the first visual indication at the first target in response to a second movement of the user pointer between two different positions within the first target. In a fourth operation 4540, the process 4500 may include moving the first visual indication to the second target at a second time after the first time to reflect a change of the current user target to the second target in response to a third movement of the user pointer to a second position within the second target. In a fifth operation 4550, the process 4500 may include actuating the current user target at a third time after the second time in response to a first user input for actuation of the current user target. In a sixth operation 4560, the process 4500 includes moving a second visual indication of a first distractor target to the third target at a fourth time at or after the first time. In a seventh operation 4570, the process 4500 includes moving the second visual indication to the fourth target at a fifth time after the fourth time and before the third time.

Figure 46:
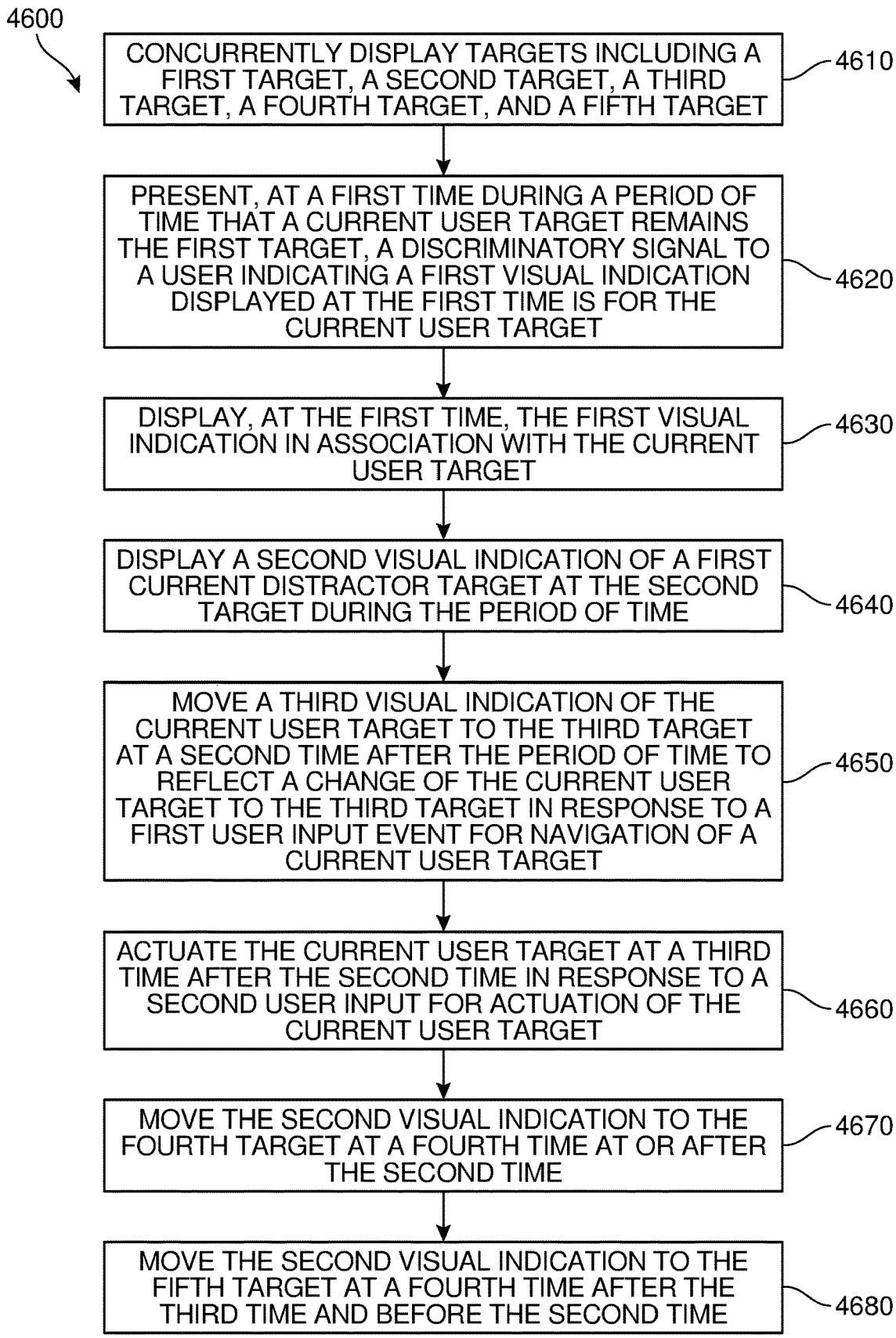

FIG. 46 is a flow chart illustrating an implementation of an example process 4600 for obfuscating user input. In some examples, some or all of the process 4600 may be performed in combination with any of the features discussed in connection with FIGS. 1-16C, 22A-39, 50, and 51, although they may also be performed with any other features described herein. In FIG. 46, a first operation 4610 includes concurrently displaying multiple targets including a first target, a second target, a third target, a fourth target, and/or a fifth target. In a second operation 4620, the process 4600 includes presenting, at a first time during a first period of time that a current user target remains the first target, a discriminatory signal to a user indicating a first visual indication displayed at the first time is for the current user target. In various implementations, the discriminatory signal may include a haptic signal generated by a device in physical contact with the user, an audio signal, and/or a modified image for which an image has been temporarily modified for the first period of time to indicate the first visual indication is for the current user target. In a third operation 4630, the process 4600 includes displaying, at the first time, the first visual indication in association with the current user target. In a fourth operation 4640, the process 4600 may include displaying a second visual indication of a first current distractor target at the second target during the first period of time. In a fifth operation 4650, the process 4600 may include moving a third visual indication of the current user target to the third target at a second time after the first period of time to reflect a change of the current user target to the third target in response to a first user input event for navigation of a current user target. In a sixth operation 4660, the process 4600 may include actuating the current user target at a third time after the second time in response to a second user input for actuation of the current user target. In a seventh operation 4670, the process 4600 may include moving the second visual indication to the fourth target at a fourth time at or after the second time. In an eighth operation 4680, the process 4600 may include moving the second visual indication to the fifth target at a fifth time after the third time and before the second time.

Figure 47:
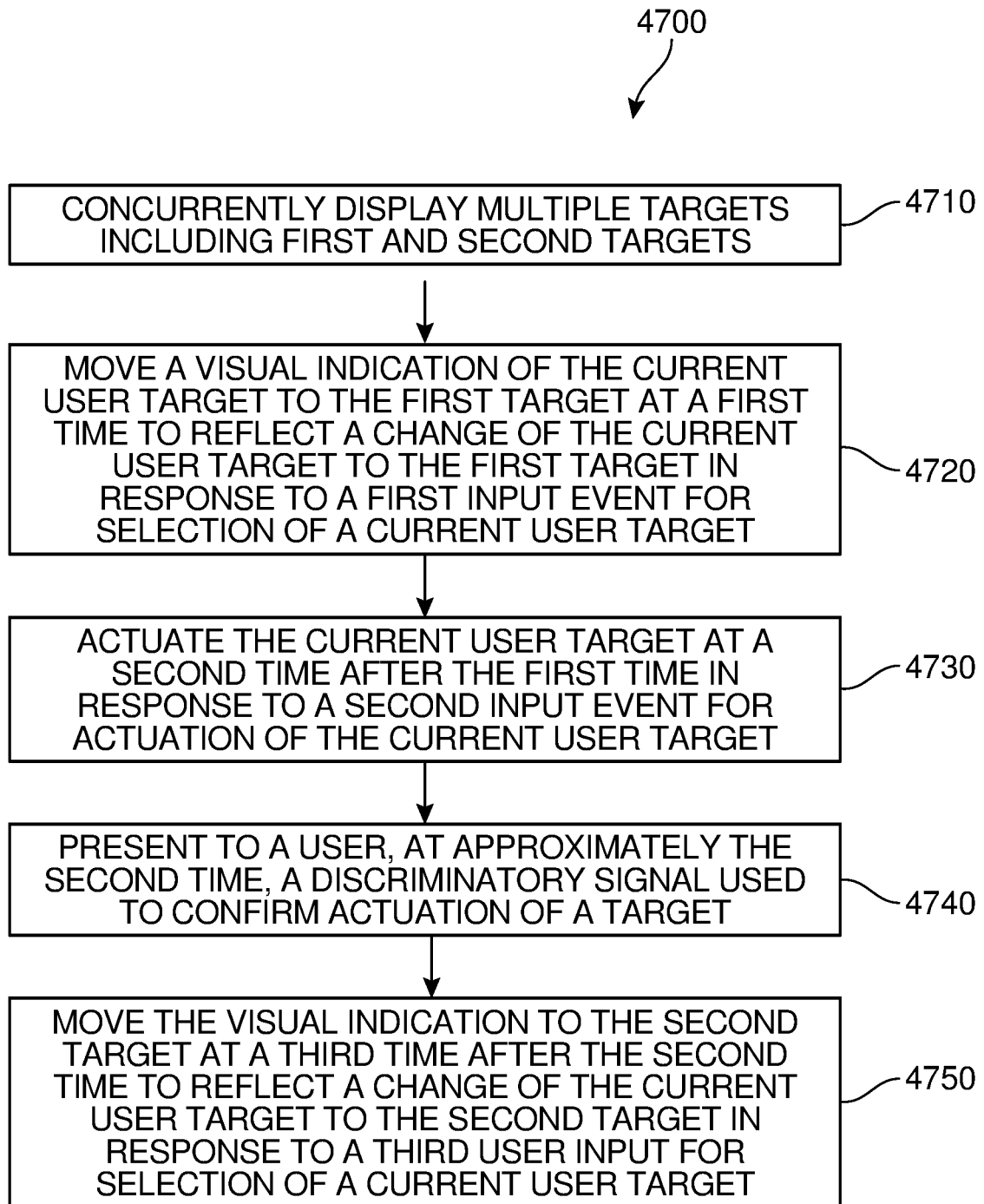

FIG. 47 is a flow chart illustrating an implementation of an example process 4700 for obfuscating user input. In some examples, some or all of the process 4700 may be performed in combination with any of the features discussed in connection with FIGS. 1-16C, 22A-31, 40A-41, 50, and 51, although they may also be performed with any other features described herein. In FIG. 47, a first operation 4710 may include concurrently displaying multiple targets including a first target and/or a second target. In a second operation 4720, the process 4700 includes moving a first visual indication of the current user target to the first target at a first time to reflect a change of the current user target to the first target in response to a first input event for selection of a current user target. In a third operation 4730, the process 4700 includes actuating the current user target at a second time after the first time in response to a second input event for actuation of the current user target. In a fourth operation 4740, the process 4700 includes presenting to a user, at approximately the second time, a discriminatory signal used to confirm actuation of a target. In various implementations, the discriminatory signal may include a haptic signal generated by a device in physical contact with the user, an audio signal, and/or a modified image for which an image has been temporarily modified for the first period of time to indicate the first visual indication is for the current user target. In a fifth operation 4750, the process 4700 may include moving the first visual indication to the second target at a third time after the second time to reflect a change of the current user target to the second target in response to a third user input for selection of a current user target.

Figure 48:
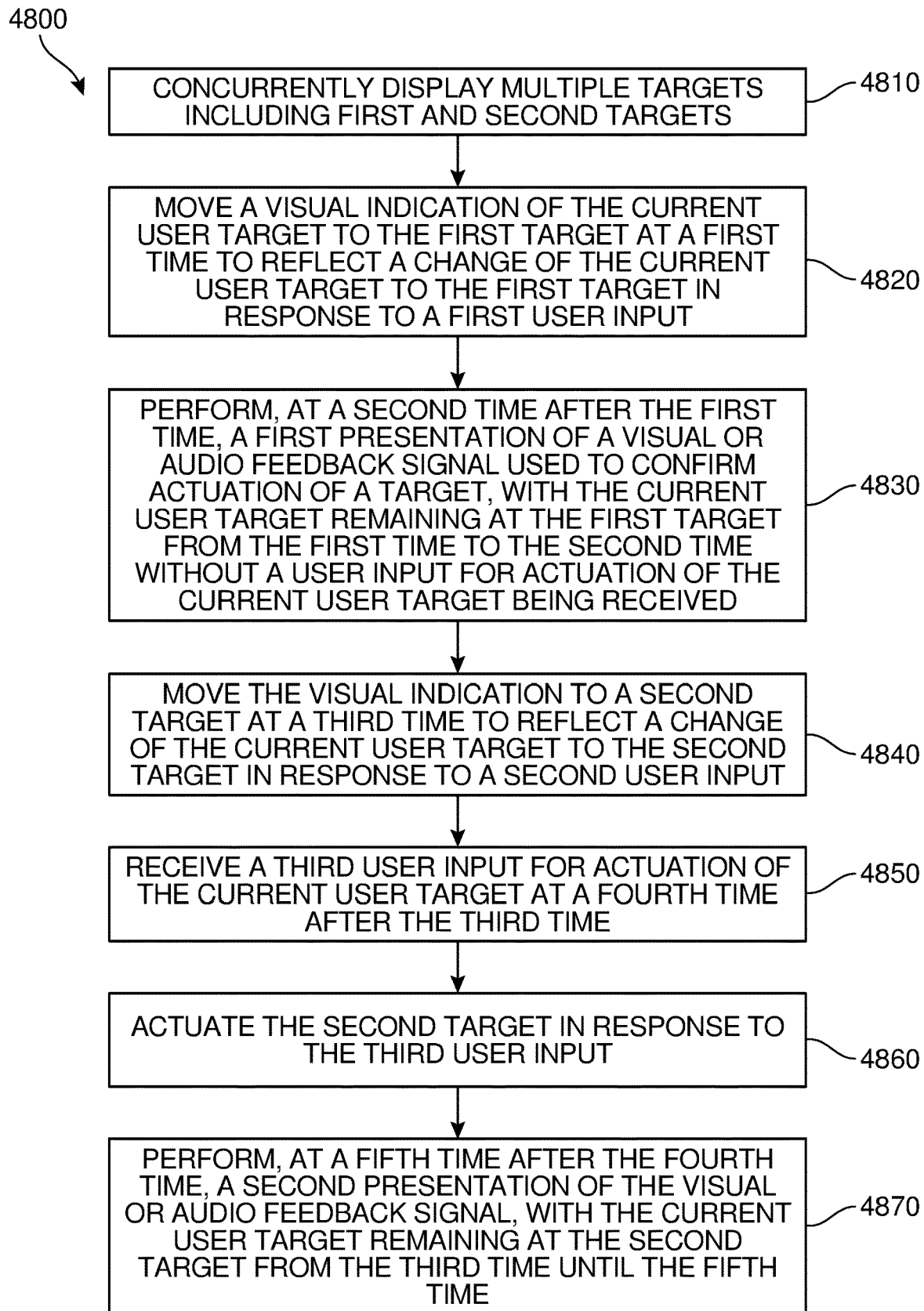

FIG. 48 is a flow chart illustrating an implementation of an example process 4800 for obfuscating user input. In some examples, some or all of the process 4800 may be performed in combination with any of the features discussed in connection with FIGS. 1-16C, 22A-31, 40A, 40B, 42, 50, and 51, although they may also be performed with any other features described herein. In FIG. 48, a first operation 4810 includes concurrently displaying multiple targets including a first target and/or a second target. In a second operation 4820, the process 4800 may include moving a first visual indication of the current user target to the first target at a first time to reflect a change of the current user target to the first target in response to a first user input. In a third operation 4830, the process 4800 includes performing, at a second time after the first time, a first presentation of a first visual or audio feedback signal used to confirm actuation of a target, wherein the current user target has remained the first target from the first time to the second time without a user input for actuation of the current user target being received between the first time and the second time. In a fourth operation 4840, the process 4800 may include moving the first visual indication to a second target at a third time to reflect a change of the current user target to the second target in response to a second user input. In a fifth operation 4850, the process 4800 may include receiving a third user input for actuation of the current user target at a fourth time after the third time. In a sixth operation 4860, the process 4800 includes actuating the second target in response to the third user input. In a seventh operation 4870, the process 4800 may include performing, at a fifth time after the fourth time, a second presentation of the first visual or audio feedback signal, wherein the current user target has remained at second target from the third time until the fifth time.

Figure 49:
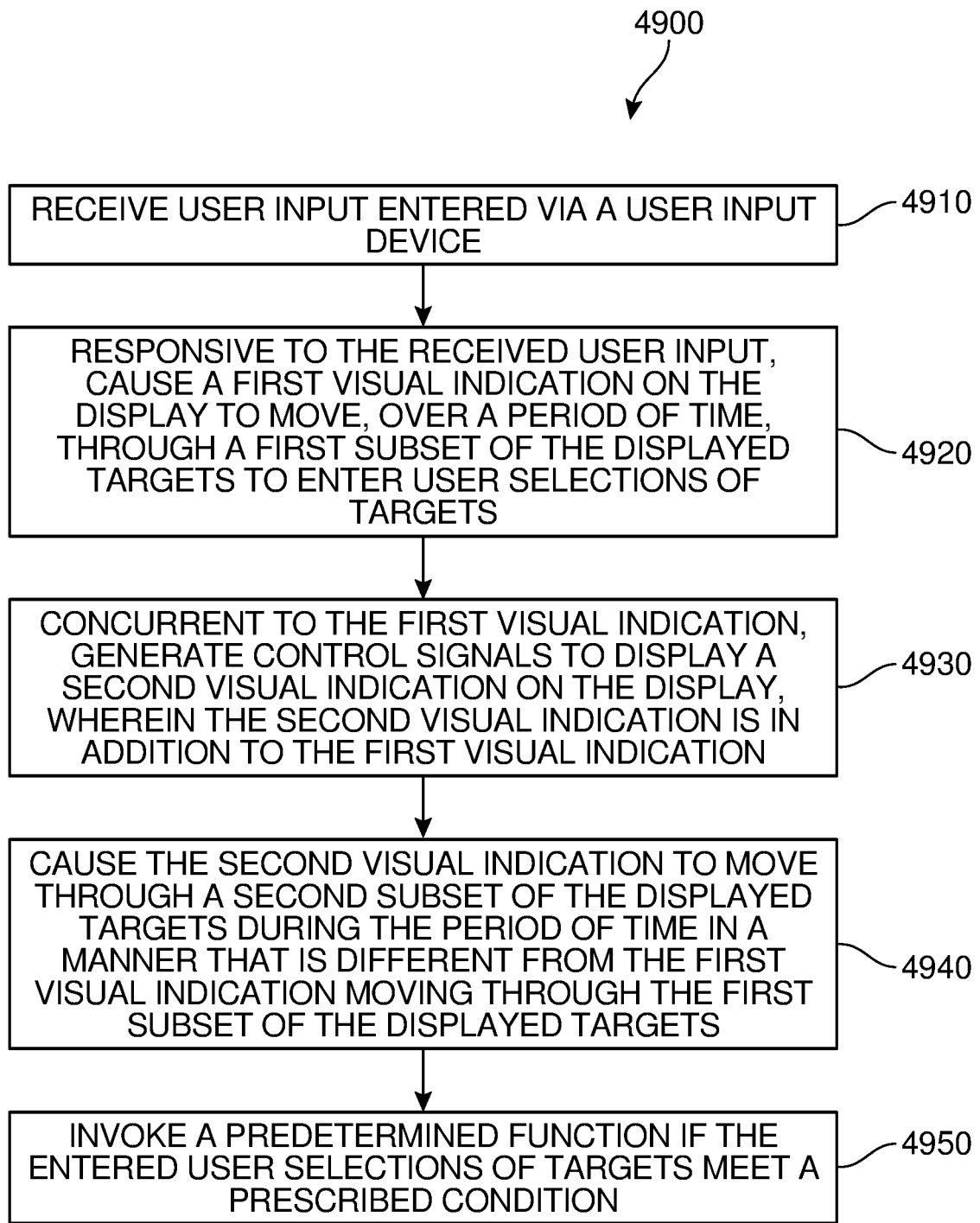

FIG. 49 is a flow chart illustrating an implementation of an example process 4900 for obfuscating user input. In some examples, some or all of the process 4900 may be performed in combination with any of the features discussed in connection with FIGS. 1A-48, 50, and 51. In FIG. 49, a first operation 4910 includes receiving user input entered via a user input device. In a second operation 4920, the process 4900 includes, responsive to the received user input, causing a first visual indication on the display to move, over a period of time, through a first subset of the displayed targets to enter user selections of targets. In a third operation 4930, the process 4900 includes, concurrent to the first visual indication, generating control signals to display a second visual indication on the display, wherein the second visual indication is in addition to the first visual indication. In a fourth operation 4940, the process 4900 includes causing the second visual indication to move through a second subset of the displayed targets during the period of time in a manner that is different from the first visual indication moving through the first subset of the displayed targets. In a fifth operation 4950, the process 4900 includes invoking a predetermined function if the entered user selections of targets meeting a prescribed condition. For example, the prescribed condition may be the entered user selections correctly matching a password or an indication from another system that the entered user selections were acceptable.

Examples of the operations illustrated in the flow charts shown in FIGS. 43-49 are described in connection with FIGS. 1A-42, 50, and 51, and example arrangements and operations of system elements shown in FIGS. 3, 24, 30, and 31 are described in connection with FIGS. 1A-51. It is understood that the specific orders or hierarchies of elements and/or operations disclosed in FIGS. 3, 24, 30, 31, and 43-49 are example approaches. Based upon design preferences, it is understood that the specific orders or hierarchies of elements and/or operations in FIGS. 3, 24, 30, 31, and 43-49 can be rearranged while remaining within the scope of the present disclosure. FIGS. 3, 24, 30, 31, and 43-49 present elements of the various operations in sample orders, and are not meant to be limited to the specific orders or hierarchies presented. Also, the accompanying claims present various elements and/or various elements of operations in sample orders, and are not meant to be limited to the specific elements, orders, or hierarchies presented.

The detailed examples of systems, devices, and techniques described in connection with FIGS. 1-49 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-49 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 50:
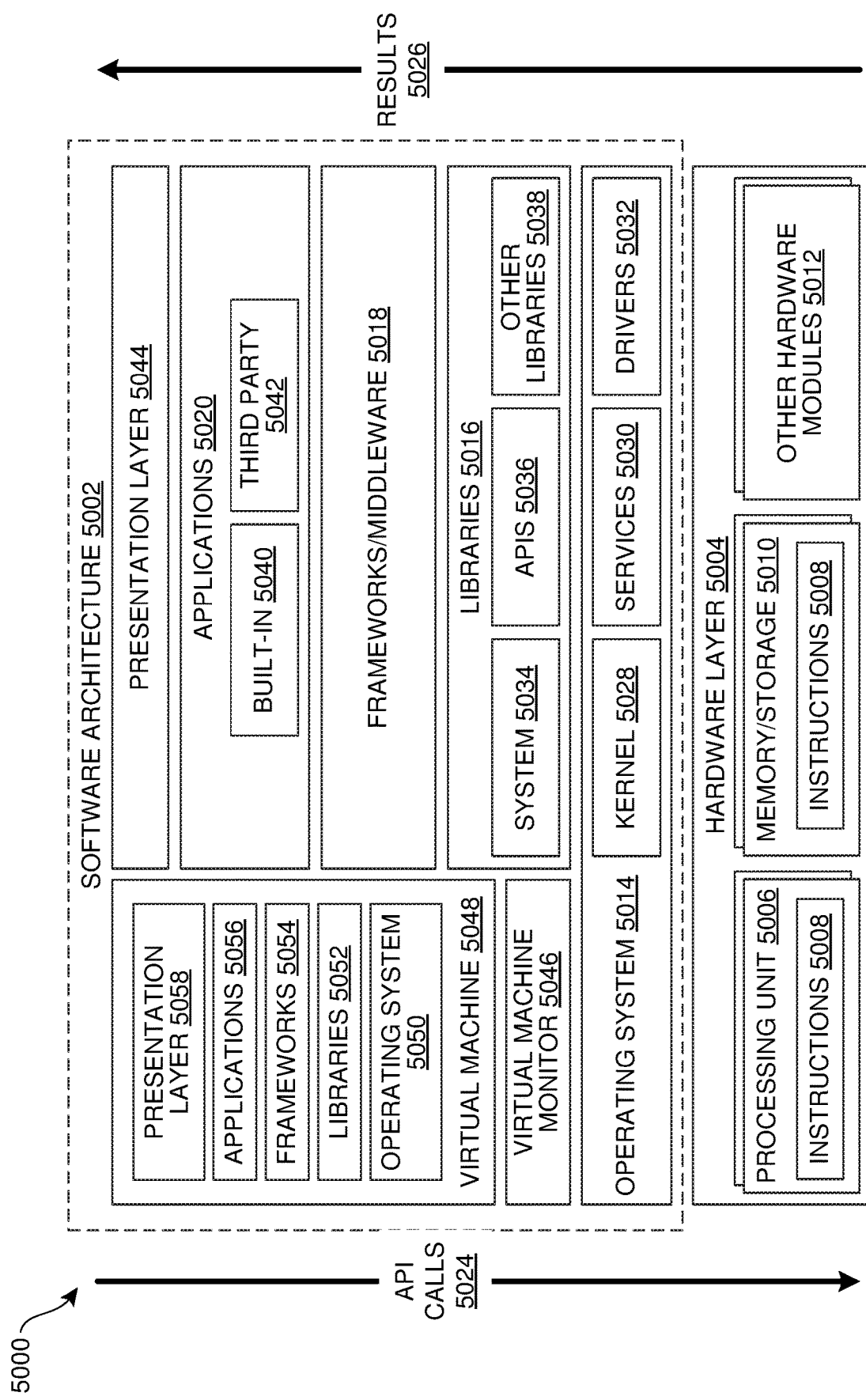
FIG. 50 is a block diagram illustrating an example software architecture, various portions of which may be used in conjunction with various hardware architectures herein described, which may implement any of the features herein described.

FIG. 50 is a block diagram 5000 illustrating an example software architecture 5002, various portions of which may be used in conjunction with various hardware architectures herein described, which may implement any of the above-described features. FIG. 50 is a non-limiting example of a software architecture and it will be appreciated that many other architectures may be implemented to facilitate the functionality described herein. The software architecture 5002 may execute on hardware such as a machine 5100 of FIG. 51 that includes, among other things, processors 5110, memory 5130, and input/output (I/O) components 5150. A representative hardware layer 5004 is illustrated and can represent, for example, the machine 5100 of FIG. 51. The representative hardware layer 5004 includes a processing unit 5006 and associated executable instructions 5008. The executable instructions 5008 represent executable instructions of the software architecture 5002, including implementation of the methods, modules and so forth described herein. The hardware layer 5004 also includes a memory/storage 5010, which also includes the executable instructions 5008 and accompanying data. The hardware layer 5004 may also include other hardware modules 5012. Instructions 5008 held by processing unit 5008 may be portions of instructions 5008 held by the memory/storage 5010.

The example software architecture 5002 may be conceptualized as layers, each providing various functionality. For example, the software architecture 5002 may include layers and components such as an operating system (OS) 5014, libraries 5016, frameworks 5018, applications 5020, and a presentation layer 5050. Operationally, the applications 5020 and/or other components within the layers may invoke API calls 5024 to other layers and receive corresponding results 5026. The layers illustrated are representative in nature and other software architectures may include additional or different layers. For example, some mobile or special purpose operating systems may not provide the frameworks/middleware 5018.

The OS 5014 may manage hardware resources and provide common services. The OS 5014 may include, for example, a kernel 5028, services 5030, and drivers 5032. The kernel 5028 may act as an abstraction layer between the hardware layer 5004 and other software layers. For example, the kernel 5028 may be responsible for memory management, processor management (for example, scheduling), component management, networking, security settings, and so on. The services 5030 may provide other common services for the other software layers. The drivers 5032 may be responsible for controlling or interfacing with the underlying hardware layer 5004. For instance, the drivers 5032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 5016 may provide a common infrastructure that may be used by the applications 5020 and/or other components and/or layers. The libraries 5016 typically provide functionality for use by other software modules to perform tasks, rather than rather than interacting directly with the OS 5014. The libraries 5016 may include system libraries 5034 (for example, C standard library) that may provide functions such as memory allocation, string manipulation, file operations. In addition, the libraries 5016 may include API libraries 5036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 5016 may also include a wide variety of other libraries 5038 to provide many functions for applications 5020 and other software modules.

The frameworks 5018 (also sometimes referred to as middleware) provide a higher-level common infrastructure that may be used by the applications 5020 and/or other software modules. For example, the frameworks 5018 may provide various graphic user interface (GUI) functions, high-level resource management, or high-level location services. The frameworks 5018 may provide a broad spectrum of other APIs for applications 5020 and/or other software modules.

The applications 5020 include built-in applications 5040 and/or third-party applications 5042. Examples of built-in applications 5040 may include, but are not limited to, a contacts application, a browser application, a location application, a media application, a messaging application, and/or a game application. Third-party applications 5042 may include any applications developed by an entity other than the vendor of the particular platform. The applications 5020 may use functions available via OS 5014, libraries 5016, frameworks 5018, and presentation layer 5050 to create user interfaces to interact with users.

Some software architectures use virtual machines, as illustrated by a virtual machine 5048. The virtual machine 5048 provides an execution environment where applications/modules can execute as if they were executing on a hardware machine (such as the machine 5100 of FIG. 51, for example). The virtual machine 5048 may be hosted by a host OS (for example, OS 5014) or hypervisor, and may have a virtual machine monitor 5046 which manages operation of the virtual machine 5048 and interoperation with the host operating system. A software architecture, which may be different from software architecture 5002 outside of the virtual machine, executes within the virtual machine 5048 such as an OS 5050, libraries 5052, frameworks 5054, applications 5056, and/or a presentation layer 5058.

Figure 51:
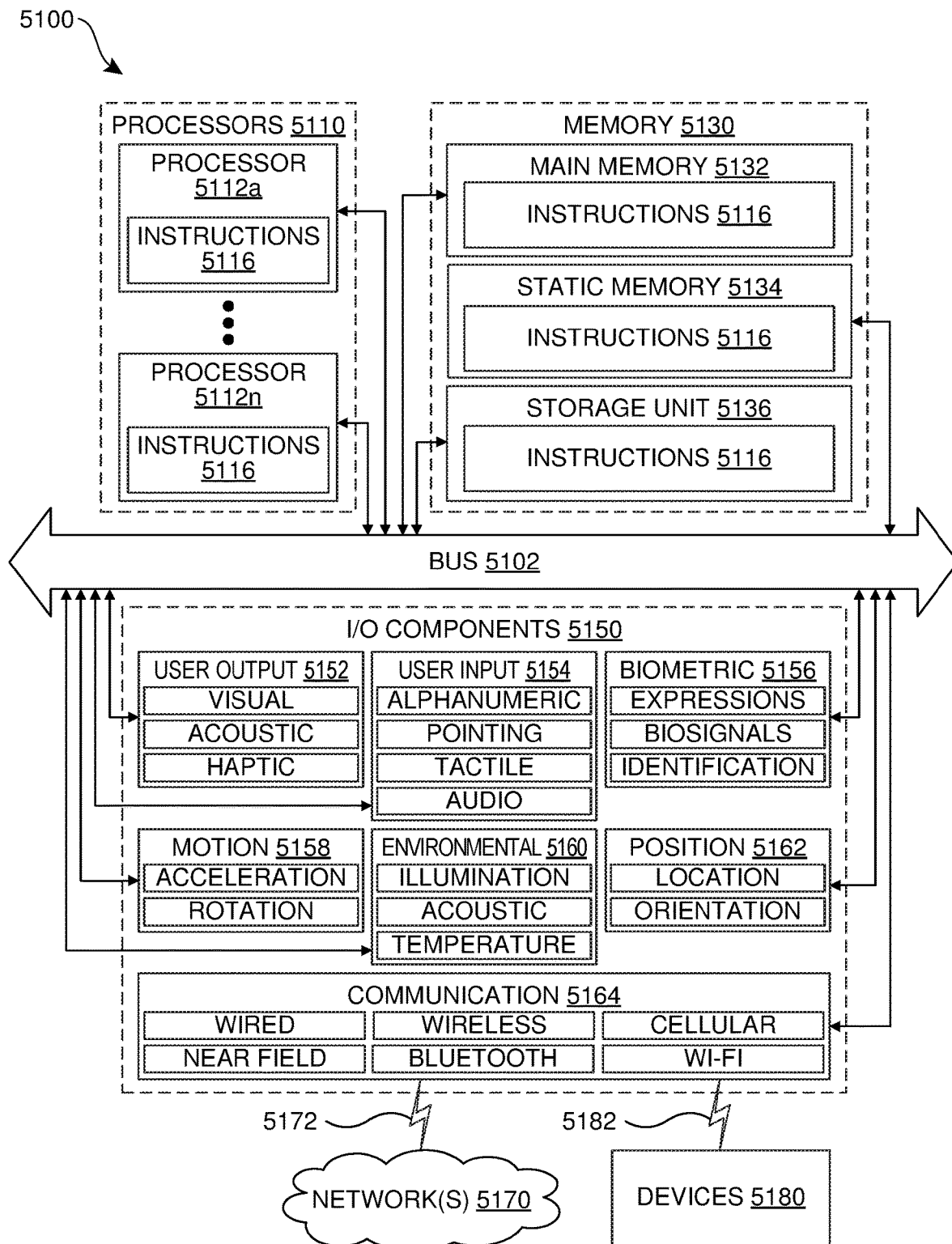
FIG. 51 is a block diagram illustrating components of an example machine configured to read instructions from a machine-readable medium and perform any of the features described herein.

FIG. 51 is a block diagram illustrating components of an example machine 5100 configured to read instructions from a machine-readable medium (for example, a machine-readable storage medium) and perform any of the features described herein. The example machine 5100 is in a form of a computer system, within which instructions 5116 (for example, in the form of software components) for causing the machine 5100 to perform any of the features described herein may be executed. As such, the instructions 5116 may be used to implement modules or components described herein. The instructions 5116 cause unprogrammed and/or unconfigured machine 5100 to operate as a particular machine configured to carry out the described features. The machine 5100 may be configured to operate as a standalone device or may be coupled (for example, networked) to other machines. In a networked deployment, the machine 5100 may operate in the capacity of a server machine or a client machine in a server-client network environment, or as a node in a peer-to-peer or distributed network environment. Machine 5100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 5100 is illustrated, the term "machine" include a collection of machines that individually or jointly execute the instructions 5116.

The machine 5100 may include processors 5110, memory 5130, and I/O components 5150, which may be communicatively coupled via, for example, a bus 5102. The bus 5102 may include multiple buses coupling various elements of machine 5100 via various bus technologies and protocols. In an example, the processors 5110 (including, for example, a central processing unit (CPU), a graphics processing unit (GPU), a digital signal processor (DSP), an ASIC, or a suitable combination thereof) may include one or more processors 5112a to 5112n that may execute the instructions 5116 and process data. In some examples, one or more processors 5110 may execute instructions provided or identified by one or more other processors 5110. The term "processor" includes a multi-core processor including cores that may execute instructions contemporaneously. Although FIG. 51 shows multiple processors, the machine 5100 may include a single processor with a single core, a single processor with multiple cores (for example, a multi-core processor), multiple processors each with a single core, multiple processors each with multiple cores, or any combination thereof. In some examples, the machine 5100 may include multiple processors distributed among multiple machines.

The memory/storage 5130 may include a main memory 5132, a static memory 5134, or other memory, and a storage unit 5136, both accessible to the processors 5110 such as via the bus 5102. The storage unit 5136 and memory 5132, 5134 store instructions 5116 embodying any one or more of the functions described herein. The memory/storage 5130 may also store temporary, intermediate, and/or long-term data for processors 5110. The instructions 5116 may also reside, completely or partially, within the memory 5132, 5134, within the storage unit 5136, within at least one of the processors 5110 (for example, within a command buffer or cache memory), within memory at least one of I/O components 5150, or any suitable combination thereof, during execution thereof. Accordingly, the memory 5132, 5134, the storage unit 5136, memory in processors 5110, and memory in I/O components 5150 are examples of machine-readable media.

As used herein, "machine-readable medium" refers to a device able to temporarily or permanently store instructions and data that cause machine 5100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 5116) for execution by a machine 5100 such that the instructions, when executed by one or more processors 5110 of the machine 5100, cause the machine 5100 to perform and one or more of the features described herein.

Accordingly, a "machine-readable medium" may refer to a single storage device, as well as "cloud-based" storage systems or storage networks that include multiple storage apparatus or devices. The term "machine-readable medium" excludes signals per se.

The I/O components 5150 may include a wide variety of hardware components adapted to receive input, provide output, produce output, transmit information, exchange information, capture measurements, and so on. The specific I/O components 5150 included in a particular machine will depend on the type and/or function of the machine. For example, mobile devices such as mobile phones may include a touch input device, whereas a headless server or IoT device may not include such a touch input device. The particular examples of I/O components illustrated in FIG. 51 are in no way limiting, and other types of components may be included in machine 5100. The grouping of I/O components 5150 are merely for simplifying this discussion, and the grouping is in no way limiting. In various examples, the I/O components 5150 may include user output components 5152 and user input components 5154. User output components 5152 may include, for example, display components for displaying information (for example, a liquid crystal display (LCD) or a projector), acoustic components (for example, speakers), haptic components (for example, a vibratory motor or force-feedback device), and/or other signal generators. User input components 5154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 5150 may include biometric components 5156, motion components 5158, environmental components 5160, and/or position components 5162, among a wide array of other physical sensor components. The biometric components 5156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 5158 may include, for example, acceleration sensors (for example, an accelerometer) and rotation sensors (for example, a gyroscope). The environmental components 5160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 5162 may include, for example, location sensors (for example, a Global Position System (GPS) receiver), altitude sensors (for example, an air pressure sensor from which altitude may be derived), and/or orientation sensors (for example, magnetometers).

The I/O components 5150 may include communication components 5164, implementing a wide variety of technologies operable to couple the machine 5100 to network(s) 5170 and/or device(s) 5180 via respective communicative couplings 5172 and 5182. The communication components 5164 may include one or more network interface components or other suitable devices to interface with the network (s) 5170. The communication components 5164 may include, for example, components adapted to provide wired communication, wireless communication, cellular communication, Near Field Communication (NFC), Bluetooth communication, Wi-Fi, and/or communication via other modalities. The device(s) 5180 may include other machines or various peripheral devices (for example, coupled via USB).

In some examples, the communication components 5164 may detect identifiers or include components adapted to detect identifiers. For example, the communication components 5164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 5162, such as, but not limited to, geo-location via Internet Protocol (IP) address, location via Wi-Fi, cellular, NFC, Bluetooth, or other wireless station identification and/or signal triangulation.

The disclosed implementations can incorporate any of the features, components, methods, systems, software, and other aspects described in U.S. Patent Application Publication Numbers 2019/0068585 (entitled "LOCAL CLAIM-BASED SECURITY SERVICE WITH CROSS-BROWSER COMPATIBILITY" and published on Feb. 28, 2019), 2018/0288026 (entitled "PASSWORD STATE MACHINE FOR ACCESSING PROTECTED RESOURCES" and published on Oct. 4, 2018), 2018/0225433 (entitled "Multi-Factor User Authentication Framework Using Asymmetric Key" and published on Aug. 9, 2018), 2018/0101850 (entitled "USER AND DEVICE AUTHENTICATION FOR WEB APPLICATIONS" and published on Apr. 12, 2018), 2018/0084422 (entitled "SIMPLIFIED LOGIN FOR A COMPUTING SYSTEM" and published on Mar. 22, 2018), 2017/0302648 (entitled "Web Service Picture Passwords" and published on Oct. 19, 2017), 2017/0300675 (entitled "LOGIN INTERFACE SELECTION FOR COMPUTING ENVIRONMENT USER LOGIN" and published on Oct. 19, 2017), 2016/0034179 (entitled "DUAL DIRECTIONAL CONTROL FOR TEXT ENTRY" and published on Feb. 4, 2016), 2015/0326560 (entitled "REGISTRATION AND NETWORK ACCESS CONTROL" and published on Nov. 12, 2015), 2014/0245205 (entitled "KEYBOARD NAVIGATION OF USER INTERFACE" and published on Aug. 28, 2014), and 2012/0293439 (entitled "MONITORING POINTER TRAJECTORY AND MODIFYING DISPLAY INTERFACE" and published on Nov. 22, 2012), each of which are incorporated by reference herein in their entireties.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system comprising a processor and machine-readable media including instructions which, when executed by the processor, cause the processor to:
    concurrently display a first plurality of targets including a first target, a second target, a third target, and a fourth target;
    move a first visual indication of a current user target to the first target at a first time to reflect a change of the current user target to the first target in response to a first user input for discrete movement of the current user target;
    move the first visual indication to the second target at a second time after the first time to reflect a change of the current user target to the second target in response to a second user input for discrete movement of the current user target;
    actuate the current user target at a third time after the second time in response to a third user input for actuation of the current user target;
    automatically move a second visual indication of a first distractor target to the third target at a fourth time at or after the first time by applying a virtual navigation model generated based on measured human navigation behavior and configured to output synthesized navigation of targets and by generating movement of the second visual indication from target to target based on the output of the virtual navigation model; and
    automatically move the second visual indication to the fourth target at a fifth time after the fourth time and before the third time by applying the virtual navigation model generated based on human navigation behavior.

2. The system of claim 1, wherein the instructions further cause the processor to present the first plurality of targets as virtual keys for entering corresponding characters.

3. The system of claim 1, wherein the instructions further cause the processor to:
    move the first visual indication to a fifth target at a sixth time after the first time and before the second time to reflect a change of the current user target to the fifth target in response to a fourth user input for discrete movement of the current user target,
    move the first visual indication to a sixth target at a seventh time after the sixth time and before the second time to reflect a change of the current user target to the sixth target in response to a fifth user input for discrete movement of the current user target,
    maintain the current user target at the first target from the first time until the sixth time,
    maintain the current user target at the fifth target from the sixth time until the seventh time,
    maintain the current user target at the sixth target from the seventh time until the second time, and
    maintain the second visual indication at the third target from the fourth time until the fifth time, wherein:
    the first plurality of targets includes the fifth target and the sixth target,
    the fifth time is before the second time, and
    a change of the current user target directly from the third target to the fourth target would be inconsistent with the first user input, the second user input, and the third user input.

4. The system of claim 1, wherein the instructions further cause the processor to:

add a first option associated with the current user target to a series of accumulated options in response to the actuation of the current user target at the third time;
actuate a fifth target at a sixth time after the third time in response to a fourth user input for actuation of the current user target, wherein the fifth target is included in the first plurality of targets;
add a second option associated with the fifth target to the series of accumulated options in response to the actuation of the fifth target; and
process the series of accumulated options at a seventh time after the sixth time in response to a fourth user input for submitting the series of accumulated options.

5. The system of claim 1, wherein:
the fourth time is at the first time;
the moving the second visual indication to the third target at the fourth time is performed in response to the first user input;
the fifth time is at the second time;
the moving the second visual indication to the fourth target at the fifth time is performed in response to the second user input; and
the instructions further cause the processor to:
display a third visual indication of actuation of a target at the current user target in response to the third user input, wherein the third visual indication is different than the first visual indication, and
display a fourth visual indication of actuation of a target at the first distractor target in response to the third user input, wherein the fourth visual indication is different than the second visual indication.

6. The system of claim 1, wherein the instructions further cause the processor to generate a sequence of virtual navigation commands for the first distractor target by applying the virtual navigation model generated based on human navigation behavior, wherein:
the moving the second visual indication to the third target at the fourth time is performed according to a first virtual navigation command included in the sequence of virtual navigation commands, and
the moving the second visual indication to the fourth target at the fifth time is performed according to a second virtual navigation command included in the sequence of virtual navigation commands after the first virtual navigation command.

7. The system of claim 1, wherein the instructions further cause the processor to:
determine that the current user target being at the first target and the first distractor target does not satisfy a first condition; and
select, before the fourth time, the third target from a second plurality of available destination targets for the first distractor target based on either:
the first current distractor target being at the third target and the current user target being at the first target satisfying the first condition, or
the first current distractor target being at a fifth target and the current user target being at the first target satisfying the first condition, wherein the fifth target is included in the first plurality of targets and a virtual navigation sequence for the first current distractor target to the fifth target passing through the third target.

8. A system comprising a processor and machine-readable media including instructions which, when executed by the processor, cause the processor to:
concurrently display a first plurality of targets including a first target, a second target, a third target, and a fourth target;
move a first visual indication of a current user target to the first target at a first time to reflect a change of the current user target to the first target in response to a first user input for discrete movement of the current user target;
move the first visual indication to the second target at a second time after the first time to reflect a change of the current user target to the second target in response to a second user input for discrete movement of the current user target;
actuate the current user target at a third time after the second time in response to a third user input for actuation of the current user target;
move a second visual indication of a first distractor target to the third target at a fourth time at or after the first time;
move the second visual indication to the fourth target at a fifth time after the fourth time and before the third time;
determine, at a sixth time and in response to a fourth user input for discrete movement of the current user target, that the current user target is being navigated in accordance with a user performing a trial navigation assessment;
move, at a seventh time before the sixth time, the second visual indication directly from a fifth target to a sixth target;
maintain the second visual indication at the sixth target from the seventh time until an eighth time after the sixth time; and
move, at the eighth time and in response to the fourth user input, the second visual indication from the sixth target to the fifth target.

9. A method performed by a data processing system for obfuscating a user target actuation, the method comprising:
concurrently displaying on a display associated with the data processing system a first plurality of targets including a first target, a second target, a third target, and a fourth target;
moving, using a processor of the data processing system, a first visual indication, on the display, of a current user target to the first target at a first time to reflect a change of the current user target to the first target in response to a first user input, received via a user input device, for discrete movement of the current user target;
moving, using the processor, the first visual indication, on the display, to the second target at a second time after the first time to reflect a change of the current user target to the second target in response to a second user input, received via the user input device, for discrete movement of the current user target;
actuating, using the processor, the current user target at a third time after the second time in response to a third user input, received via the user input device, for actuation of the current user target;
automatically moving, using the processor, a second visual indication, on the display, of a first distractor target to the third target at a fourth time at or after the first time by applying a virtual navigation model generated based on measured human navigation behavior and configured to output synthesized navigation of targets and generating movement of the second visual indication from target to target based on the output of the virtual navigation model; and automatically moving, using the processor, the second visual indication, on the display, to the fourth target at a fifth time after the fourth time and before the third time by applying the virtual navigation model generated based on human navigation behavior.

10. The method of claim 9, wherein:
the first plurality of targets includes a fifth target and a sixth target; and
the method further comprises:
   moving the first visual indication to the fifth target at a sixth time after the first time and before the second time to reflect a change of the current user target to the fifth target in response to a fourth user input for discrete movement of the current user target,
   moving the first visual indication to the sixth target at a seventh time after the sixth time and before the second time to reflect a change of the current user target to the sixth target in response to a fifth user input for discrete movement of the current user target,
   maintaining the current user target at the first target from the first time until the sixth time,
   maintaining the current user target at the fifth target from the sixth time until the seventh time,
   maintaining the current user target at the sixth target from the seventh time until the second time, and
   maintaining the second visual indication at the third target from the fourth time until the fifth time,
   wherein:
      the fifth time is before the second time, and
      a change of the current user target directly from the third target to the fourth target would be inconsistent with the first user input, the second user input, and the third user input.

11. The method of claim 9, wherein the first plurality of targets are presented as virtual keys for entering corresponding characters.

12. The method of claim 9, further comprising:
adding a first option associated with the current user target to a series of accumulated options in response to the actuation of the current user target at the third time;
actuating a fifth target at a sixth time after the third time in response to a fourth user input for actuation of the current user target, wherein the fifth target is included in the first plurality of targets;
adding a second option associated with the fifth target to the series of accumulated options in response to the actuation of the fifth target; and
processing the series of accumulated options at a seventh time after the sixth time in response to a fourth user input for submitting the series of accumulated options.

13. The method of claim 9, wherein:
the fourth time is at the first time;
the moving the second visual indication to the third target at the fourth time is performed in response to the first user input;
the fifth time is at the second time;
the moving the second visual indication to the fourth target at the fifth time is performed in response to the second user input; and
the method further includes:
   displaying a third visual indication of actuation of a target at the current user target in response to the third user input, wherein the third visual indication is different than the first visual indication, and
   displaying a fourth visual indication of actuation of a target at the first distractor target in response to the third user input, wherein the fourth visual indication is different than the second visual indication.

14. The method of claim 9, further comprising generating a sequence of virtual navigation commands for the first current distractor target by applying the virtual navigation model generated based on human navigation behavior, wherein:
the moving the second visual indication to the third target at the fourth time is performed according to a first virtual navigation command included in the sequence of virtual navigation commands, and
the moving the second visual indication to the fourth target at the fifth time is performed according to a second virtual navigation command included in the sequence of virtual navigation commands after the first virtual navigation command.

15. The method of claim 14, further comprising determining timings for a portion of the sequence of virtual navigation commands by applying the virtual navigation model, wherein:
the fourth time is determined based on a first timing included in the timings and associated with the first virtual navigation command, and
the fifth time is determined based on a second timing included in the timings and associated with the second virtual navigation command.

16. A method performed by a data processing system for obfuscating a user target actuation, the method comprising:
concurrently displaying a first plurality of targets including a first target, a second target, a third target, and a fourth target;
moving a first visual indication of a current user target to the first target at a first time to reflect a change of the current user target to the first target in response to a first user input for discrete movement of the current user target;
moving the first visual indication to the second target at a second time after the first time to reflect a change of the current user target to the second target in response to a second user input for discrete movement of the current user target;
actuating the current user target at a third time after the second time in response to a third user input for actuation of the current user target;
moving a second visual indication of a first distractor target to the third target at a fourth time at or after the first time;
moving the second visual indication to the fourth target at a fifth time after the fourth time and before the third time;
selecting, at a sixth time, an endpoint target for the first distractor target to navigate to from a fifth target, wherein the first plurality of targets includes the fifth target and the endpoint target;
generating a first virtual navigation sequence from the fifth target to the endpoint target; and
selecting, from a plurality of user navigation patterns, a first user navigation pattern defining a second navigation sequence from a sixth target to a seventh target based on the second navigation sequence and the first virtual navigation sequence having a same horizontal navigation distance and the second navigation sequence and the first virtual navigation sequence having a same vertical navigation distance, wherein the first plurality of targets includes the sixth target and the seventh target, and the seventh target is different than the endpoint target.

17. The method of claim 9, further comprising:
determining that the current user target being at the first target and the first distractor target does not satisfy a first condition; and
selecting, before the fourth time, the third target from a second plurality of available destination targets for the first current distractor target based on either:
the first current distractor target being at the third target and the current user target being at the first target satisfying the first condition, or
the first current distractor target being at a fifth target and the current user target being at the first target satisfying the first condition, wherein the fifth target is included in the first plurality of targets and a virtual navigation sequence for the first current distractor target to the fifth target passing through the third target.

18. A method performed by a data processing system for obfuscating a user target actuation, the method comprising:
concurrently displaying a first plurality of targets including a first target, a second target, a third target, and a fourth target;
moving a first visual indication of a current user target to the first target at a first time to reflect a change of the current user target to the first target in response to a first user input for discrete movement of the current user target;
moving the first visual indication to the second target at a second time after the first time to reflect a change of the current user target to the second target in response to a second user input for discrete movement of the current user target;
actuating the current user target at a third time after the second time in response to a third user input for actuation of the current user target;
moving a second visual indication of a first distractor target to the third target at a fourth time at or after the first time;
moving the second visual indication to the fourth target at a fifth time after the fourth time and before the third time;
determining, at a sixth time and in response to a fourth user input for discrete movement of the current user target, that the current user target is being navigated in accordance with a user performing a trial navigation assessment;
moving, at a seventh time before the sixth time, the second visual indication directly from a fifth target to a sixth target;
maintaining the second visual indication at the sixth target from the seventh time until an eighth time after the sixth time; and
moving, at the eighth time and in response to the fourth user input, the second visual indication from the sixth target to the fifth target.

19. One or more machine-readable media storing instructions which, when executed by one or more processors, cause the processors to perform the method of claim 9.

20. The system of claim 1, wherein the virtual navigation model is based on obtained usage patterns of a user of the system.

21. The system of claim 1, wherein the virtual navigation model is based on obtained usage patterns of a plurality of users of the system.

22. The system of claim 1, wherein the virtual navigation model is configured to generate sequences of virtual navigation commands and to determine timings for executing each of the virtual commands of the sequences of the virtual navigation commands.

23. A computer-readable storage medium on which are stored instructions that, when executed, cause a processor of a programmable device to perform functions of:
concurrently displaying on a display associated with the programmable device a first plurality of targets including a first target, a second target, a third target, and a fourth target;
moving, using the processor, a first visual indication, on the display, of a current user target to the first target at a first time to reflect a change of the current user target to the first target in response to a first user input, received via a user input device associated with the programmable device, for discrete movement of the current user target;
moving, using the processor, the first visual indication, on the display, to the second target at a second time after the first time to reflect a change of the current user target to the second target in response to a second user input, received via the user input device, for discrete movement of the current user target;
actuating, using the processor, the current user target at a third time after the second time in response to a third user input, received via the user input device, for actuation of the current user target;
automatically moving, using the processor, a second visual indication, on the display, of a first distractor target to the third target at a fourth time at or after the first time by applying a virtual navigation model generated based on measured human navigation behavior and configured to output synthesized navigation of targets and by generating movement of the second visual indication from target to target based on the output of the virtual navigation model; and
automatically moving, using the processor, the second visual indication, on the display, to the fourth target at a fifth time after the fourth time and before the third time by applying the virtual navigation model generated based on human navigation behavior.

24. The system of claim 1, wherein the output of the virtual navigation model includes timing information for controlling timing of the movement of the second visual indication among the first plurality of targets, and wherein the instructions further cause the processor to:
determine the fourth time at which the first distractor target is moved to the third target based on the output of the timing information of the output of the virtual navigation model; and
determine the fifth time at which the first distractor target is moved to the fourth target based on the output of the timing information of the output of the virtual navigation model.

* * * * *